(12) United States Patent
Li et al.

(10) Patent No.: US 11,928,904 B2
(45) Date of Patent: *Mar. 12, 2024

(54) METHODS AND SYSTEMS FOR CONTROLLING A SMART LOCK

(71) Applicant: YUNDING NETWORK TECHNOLOGY (BEIJING) CO., LTD., Beijing (CN)

(72) Inventors: Tao Li, Beijing (CN); Binghui Peng, Beijing (CN); Qi Yi, Beijing (CN); Yuchuan Liu, Beijing (CN); Xiancang Li, Beijing (CN)

(73) Assignee: YUNDING NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,718

(22) Filed: Aug. 10, 2022

(65) Prior Publication Data

US 2022/0383678 A1     Dec. 1, 2022

Related U.S. Application Data

(63) Continuation of application No. 17/454,048, filed on Nov. 8, 2021, now Pat. No. 11,417,159, which is a
(Continued)

(30) Foreign Application Priority Data

Aug. 2, 2019   (CN) .......................... 201910711989.X
Aug. 5, 2019   (CN) .......................... 201910716929.7
(Continued)

(51) Int. Cl.
*G07C 9/00* (2020.01)
*G08B 7/06* (2006.01)
(Continued)

(52) U.S. Cl.
CPC ........... *G07C 9/00309* (2013.01); *G08B 7/06* (2013.01); *H04L 9/0822* (2013.01);
(Continued)

(58) Field of Classification Search
CPC ...... G07C 9/00309; G07C 2009/00412; G08B 7/06; H04L 9/0822; H04L 9/0863; H04L 63/0428; H04L 63/123; H04L 67/141
(Continued)

(56) References Cited

U.S. PATENT DOCUMENTS 6,988,203 B2   1/2006   Davis et al.
7,069,437 B2   6/2006   Williams
(Continued)

FOREIGN PATENT DOCUMENTS

CN   2431357 Y    5/2001
CN   1344854 A    4/2002
(Continued)

OTHER PUBLICATIONS

International Search Report in PCT/CN2020/106653 dated Nov. 9, 2020, 6 pages.
(Continued)

*Primary Examiner* — Amare F Tabor
(74) *Attorney, Agent, or Firm* — METIS IP LLC

(57) ABSTRACT

The present disclosure discloses methods and systems for controlling a smart lock. The method may include establishing a secure connection with a network, obtaining security control information through the secure connection, obtaining an operation input; performing a security verification based on the security control information and the operation input, and performing a corresponding operation based on the operation input when the security verification is passed.

18 Claims, 33 Drawing Sheets

Related U.S. Application Data continuation of application No. PCT/CN2020/106653, filed on Aug. 3, 2020.

(30) Foreign Application Priority Data

| Aug. 6, 2019 | (CN) | 201910721490.7 |
| Aug. 10, 2019 | (CN) | 201910736714.1 |
| Aug. 13, 2019 | (CN) | 201910743893.1 |
| Nov. 21, 2019 | (CN) | 201922029811.5 |

(51) Int. Cl.
  *H04L 9/08* (2006.01)
  *H04L 9/40* (2022.01)
  *H04L 67/141* (2022.01)

(52) U.S. Cl.
  CPC ........ *H04L 9/0863* (2013.01); *H04L 63/0428* (2013.01); *H04L 63/123* (2013.01); *H04L 67/141* (2013.01); *G07C 2009/00412* (2013.01)

(58) Field of Classification Search
  USPC .......................................................... 713/152
  See application file for complete search history.

(56) References Cited

U.S. PATENT DOCUMENTS

| 7,779,254 | B1 | 8/2010 | Crosmer et al. |
| 7,877,604 | B2 | 1/2011 | Van Dijk et al. |
| 8,286,259 | B2 | 10/2012 | Murayama et al. |
| 9,021,597 | B2 | 4/2015 | Moore et al. |
| 9,230,374 | B1 | 1/2016 | Burge et al. |
| 9,613,478 | B2 * | 4/2017 | Dumas .................. G07C 9/257 |
| 9,741,186 | B1 * | 8/2017 | Lemke ................ H04W 12/069 |
| 9,866,561 | B2 | 1/2018 | Psenka et al. |
| 9,942,761 | B1 | 4/2018 | Cheng et al. |
| 10,210,470 | B2 | 2/2019 | Datta Ray |
| 10,650,626 | B2 * | 5/2020 | Shadid ............... G07C 9/00571 |
| 11,085,226 | B2 * | 8/2021 | Honjo ...................... G07C 9/37 |
| 11,197,463 | B2 * | 12/2021 | Burton ...................... E06B 7/32 |
| 2009/0193230 | A1 | 7/2009 | Findeisen et al. |
| 2009/0292389 | A1 | 11/2009 | Jung et al. |
| 2010/0250497 | A1 | 9/2010 | Redlich et al. |
| 2012/0213362 | A1 | 8/2012 | Bliding et al. |
| 2012/0233687 | A1 | 9/2012 | Métivier et al. |
| 2014/0265359 | A1 * | 9/2014 | Cheng .................... E05B 47/00 292/144 |
| 2015/0045013 | A1 * | 2/2015 | Simmons ................ H04W 4/80 455/420 |
| 2016/0042581 | A1 * | 2/2016 | Ku ...................... G07C 9/00309 340/5.61 |
| 2016/0080393 | A1 | 3/2016 | Shippy et al. |
| 2016/0248738 | A1 | 8/2016 | Brandsma et al. |
| 2016/0337508 | A1 | 11/2016 | Roy et al. |
| 2017/0193724 | A1 * | 7/2017 | Johnson ............. G07C 9/00309 |
| 2017/0359324 | A1 | 12/2017 | Geerlings et al. |
| 2018/0130273 | A1 * | 5/2018 | Eid .................... G07C 9/00309 |
| 2018/0225900 | A1 | 8/2018 | Wishne |
| 2018/0247568 | A1 * | 8/2018 | Wang ...................... G09B 29/12 |
| 2018/0363327 | A1 | 12/2018 | Kim |
| 2019/0362574 | A1 | 11/2019 | Tang |
| 2020/0028672 | A1 | 1/2020 | Tang |
| 2020/0347643 | A1 * | 11/2020 | Burke ..................... E05B 47/02 |

FOREIGN PATENT DOCUMENTS

| CN | 2658862 | Y | 11/2004 |
| CN | 1991661 | A | 7/2007 |
| CN | 101059878 | A | 10/2007 |
| CN | 101409944 | A | 4/2009 |
| CN | 101654994 | A | 2/2010 |
| CN | 101702191 | A | 5/2010 |
| CN | 201681427 | U | 12/2010 |
| CN | 202815965 | U | 3/2013 |
| CN | 103295296 | A | 9/2013 |
| CN | 203188776 | U | 9/2013 |
| CN | 103578165 | A | 2/2014 |
| CN | 103793960 | A | 5/2014 |
| CN | 103914901 | A | 7/2014 |
| CN | 103986582 | A | 8/2014 |
| CN | 104157029 | A | 11/2014 |
| CN | 104217478 | A | 12/2014 |
| CN | 104453532 | A | 3/2015 |
| CN | 104464054 | A | 3/2015 |
| CN | 104486650 | A | 4/2015 |
| CN | 104602312 | A | 5/2015 |
| CN | 104660719 | A | 5/2015 |
| CN | 104732631 | A | 6/2015 |
| CN | 104778773 | A | 7/2015 |
| CN | 104806085 | A | 7/2015 |
| CN | 104869612 | A | 8/2015 |
| CN | 104952128 | A | 9/2015 |
| CN | 105118116 | A | 12/2015 |
| CN | 105139491 | A | 12/2015 |
| CN | 105184931 | A | 12/2015 |
| CN | 204904392 | U | 12/2015 |
| CN | 105279832 | A | 1/2016 |
| CN | 105488870 | A | 4/2016 |
| CN | 105787576 | A | 7/2016 |
| CN | 105788050 | A | 7/2016 |
| CN | 105871874 | A | 8/2016 |
| CN | 205427993 | U | 8/2016 |
| CN | 105931485 | A | 9/2016 |
| CN | 105952278 | A | 9/2016 |
| CN | 106097486 | A | 11/2016 |
| CN | 106211044 | A | 12/2016 |
| CN | 106228655 | A | 12/2016 |
| CN | 106408697 | A | 2/2017 |
| CN | 106504391 | A | 3/2017 |
| CN | 106549939 | A | 3/2017 |
| CN | 106609605 | A | 5/2017 |
| CN | 106815905 | A | 6/2017 |
| CN | 106952445 | A | 7/2017 |
| CN | 106971442 | A | 7/2017 |
| CN | 107134028 | A | 9/2017 |
| CN | 107195042 | A | 9/2017 |
| CN | 107610432 | A | 1/2018 |
| CN | 107978033 | A | 5/2018 |
| CN | 108053527 | A | 5/2018 |
| CN | 108109348 | A | 6/2018 |
| CN | 108230512 | A | 6/2018 |
| CN | 108234458 | A | 6/2018 |
| CN | 108427298 | A | 8/2018 |
| CN | 108447153 | A | 8/2018 |
| CN | 207909222 | U | 9/2018 |
| CN | 108756483 | A | 11/2018 |
| CN | 108924612 | A | 11/2018 |
| CN | 108965222 | A | 12/2018 |
| CN | 109039840 | A | 12/2018 |
| CN | 109147119 | A | 1/2019 |
| CN | 109326025 | A | 2/2019 |
| CN | 109348458 | A | 2/2019 |
| CN | 109377593 | A | 2/2019 |
| CN | 109544731 | A | 3/2019 |
| CN | 109555432 | A | 4/2019 |
| CN | 109584410 | A | 4/2019 |
| CN | 109629914 | A | 4/2019 |
| CN | 109826542 | A | 5/2019 |
| CN | 209149424 | U | 7/2019 |
| EP | 0688491 | B1 | 8/2003 |
| GB | 2430847 | B | 5/2010 |
| WO | 2016023558 | A1 | 2/2016 |

OTHER PUBLICATIONS

First Office Action in Chinese Application No. 201910721490.7 dated Jun. 11, 2021, 25 pages.

First Office Action in Chinese Application No. 201910711989.X dated Jun. 22, 2021, 19 pages.

(56) References Cited

OTHER PUBLICATIONS

First Office Action in Chinese Application No. 201910716929.7 dated May 25, 2021, 15 pages.
First Office Action in Chinese Application No. 201910736714.1 dated Jun. 22, 2021, 26 pages.
First Office Action in Chinese Application No. 201910743893.1 dated Jun. 22, 2021, 31 pages.
The Third Office Action in Chinese Application No. 201910736714.1 dated Jul. 25, 2022, 28 pages.
The Second Office Action in Chinese Application No. 201910716929.7 dated Nov. 12, 2021, 13 pages.
International Search Report in PCT/CN2018/073369 dated Apr. 16, 2018, 8 pages.
International Search Report in PCT/CN2018/079999 dated Jun. 7, 2018, 6 pages.

* cited by examiner

METHODS AND SYSTEMS FOR CONTROLLING A SMART LOCK

CROSS-REFERENCE TO RELATED APPLICATIONS

This application is a Continuation of U.S. patent application Ser. No. 17/454,048, filed on Nov. 8, 2021, which is a Continuation of International Application No. PCT/CN2020/106653, filed on Aug. 3, 2020, which claims priority of Chinese Patent Application No. 201910711989.X, filed on Aug. 2, 2019, Chinese Patent Application No. 201910721490.7, filed on Aug. 6, 2019, Chinese Patent Application No. 201910736714.1, filed on Aug. 10, 2019, Chinese Patent Application No. 201910716929.7, filed on Aug. 5, 2019, Chinese Patent Application No. 201922029811.5, filed on Nov. 21, 2019, and Chinese Patent Application No. 201910743893.1, filed on Aug. 13, 2019, the entire contents of each of which are incorporated herein by reference.

TECHNICAL FIELD

The present disclosure relates to the controlling of a smart device, and in particular, to methods and systems for controlling a smart lock.

BACKGROUND

With the continuous development of the Internet and communication technology, locks with a single function and unlocking mechanism can no longer meet the needs of users, and in the process of data transmission, an unlocking password or lock related information (e.g., address information, installation codes) may be illegally obtained. In addition, as people have higher and higher expectations for personal and property safety, locks with multiple security and protection functions (e.g., video surveillance, identity verification, abnormity warning, information reporting, etc.) are more popular among users. Therefore, it is desirable to provide methods and systems for controlling a smart lock with higher security.

SUMMARY

An aspect of the present disclosure relates to a method for controlling a smart lock. The method may include establishing a secure connection with a network, obtaining security control information through the secure connection, obtaining an operation input, performing a security verification based on the security control information and the operation input, and performing a corresponding operation based on the operation input when the security verification is passed.

In some embodiments, the establishing a secure connection with the network may include sending characteristic information of the smart lock through the network, obtaining an encryption key through the network, wherein the encryption key may be related to the characteristic information, and encrypting, based on the encryption key, the characteristic information sent through the network.

In some embodiments, the method may further include receiving a binding request, obtaining, based on the binding request, control device information of a control device, and sending, based on the control device information, warning information to the control device when the security verification is failed.

In some embodiments, at least part of the operation input may be encrypted, and the performing a security verification based on the security control information and the operation input may include performing the security verification based on the at least partially encrypted operation input and the security control information.

In some embodiments, the operation input may at least include first verification information composed of a plurality of characters, and the performing a security verification based on the security control information and the operation input may include obtaining second verification information based on the security control information, and the security verification may be passed when the second verification information and the first verification information satisfy a preset condition.

In some embodiments, the obtaining the operation input may include obtaining one or more inputs, which may include obtaining a character input, obtaining a biological characteristic input, and obtaining a wireless input.

In some embodiments, the corresponding operation may include an unlocking operation. The method may further include performing an unlocking verification operation, and executing, based on a verification result, at least one of a locking operation or a prompting operation.

Another aspect of the present disclosure relates to a system for controlling a smart lock. The system may include at least one storage device storing a set of instructions, and at least one processor in communication with the at least one storage device. When executing the set of instructions, the at least one processor may cause the system to establish a secure connection with a network, obtain security control information through the secure connection, obtain an operation input. perform a security verification based on the security control information and the operation input, and perform a corresponding operation based on the operation input when the security verification is passed.

In some embodiments, to establish a secure connection with the network, the at least one processor may be configured to cause the system to send characteristic information of the smart lock through the network, obtain an encryption key through the network, wherein the encryption key may be related to the characteristic information, and encrypt, based on the encryption key, the characteristic information sent through the network.

In some embodiments, the at least one processor may be further configured to cause the system to receive a binding request, acquire, based on the binding request, control device information of a control device, and send, based on the control device information, warning information to the control device when the security verification is failed.

In some embodiments, the operation input may include encrypted input information, and to perform a security verification based on the security control information and the operation input, the at least one processor may be configured to cause the system to perform the security verification based on the encrypted input information and the security control information.

In some embodiments, the operation input may at least include first verification information composed of a plurality of characters, and to perform a security verification based on the security control information and the operation input, the at least one processor may be configured to cause the system to obtain second verification information based on the security control information, and the security verification may be passed when the second verification information and the first verification information satisfy a preset condition.

In some embodiments, to obtain the operation input, the at least one processor may be configured to cause the system to obtain one or more inputs, which may include obtaining a character input, obtaining a biological characteristic input, and obtaining wireless input.

In some embodiments, the corresponding operation may include an unlocking operation, and the at least one processor may be further configured to cause the system to perform an unlocking verification operation after performing the unlocking operation, and execute, based on a verification result, at least one of a locking operation or a prompting operation.

A further aspect of the present disclosure relates to a system for controlling a smart lock. The system may include a processing module configured to establish a secure connection with a network, a communication module configured to obtain security control information through the secure connection, an input/output module configured to obtain an operation input, a security module configured to perform a security verification based on the security control information and the operation input, and a control module configured to perform a corresponding operation based on the operation input when the security verification is passed.

A further aspect of the present disclosure relates to a computer-readable storage medium including executable instructions that, when executed by at least one computer, direct the at least one computer to implement a method. The method may include establishing a secure connection with a network, obtaining security control information through the secure connection, obtaining an operation input, performing a security verification based on the security control information and the operation input, and performing a corresponding operation based on the operation input when the security verification is passed.

A further aspect of the present disclosure relates to a method for secure communication. The method may include obtaining a secure connection request of a smart lock, the secure connection request including characteristic information of the smart lock, determining an encryption key corresponding to the smart lock based on the secure connection request, and sending the encryption key corresponding to the smart lock to the smart lock. The encryption key corresponding to the smart lock may be obtained by encrypting an original network key using a Hash value corresponding to the smart lock, and the Hash value corresponding to the smart lock may be obtained by performing a Hash operation on the characteristic information of the smart lock.

In some embodiments, after sending the encryption key corresponding to the smart lock to the smart lock, the method may further include receiving request information of an application layer key sent by the smart lock, allocating an original application layer key specific to the smart lock to the smart lock, obtaining an encrypted application layer key corresponding to the smart lock by encrypting the original application layer key specific to the smart lock using the Hash value corresponding to the smart lock, and sending the encrypted application layer key corresponding to the smart lock to the smart lock.

In some embodiments, after sending the encrypted application layer key corresponding to the smart lock to the smart lock, the method may further include receiving an encrypted data packet sent by the smart lock, the encrypted data packet including network layer data encrypted by the original network key and application layer data encrypted by the original application layer key specific to the smart lock, and decrypting the encrypted data packet using the original network key and the original application layer key specific to the smart lock.

A further aspect of the present disclosure relates to a method for binding a smart lock. The method may include receiving a binding request. The binding request may carry device information of the smart lock and device information of a user terminal, and the device information of the smart lock may be obtained by the user terminal after scanning the smart lock. The method may further include obtaining binding information by binding the smart lock with the user terminal, and sending the binding information to the smart device and the user terminal.

In some embodiments, after sending the binding information to the smart lock and the user terminal, the method may further include performing a time synchronization on the user terminal and the smart lock, and/or obtaining state information of the smart lock, and sending the state information to the user terminal.

In some embodiments, after sending the binding information to the smart lock and the user terminal, the method may further include obtaining operation information generated by the user terminal, sending the operation information to the smart lock, obtaining an operation result of the smart lock, and sending the operation result to the user terminal.

A further aspect of the present disclosure relates to a method for controlling a smart lock. The method may include obtaining an operation input. The operation input may include encrypted input information. The method may further include obtaining decrypted input information by decrypting the encrypted input information, determining whether the decrypted input information matches security control information, and in response to determining that the decrypted input information matches the security control information, which indicates that a security verification is passed, performing, based on the operation input, a corresponding operation.

In some embodiments, a process of encrypting the input information may include encrypting the input information based on an encryption password. If the operation input is received from a user terminal, the obtaining the operation input may include receiving an encryption password generation request sent by the user terminal, obtaining the encryption password based on the encryption password generation request, sending the encryption password to the user terminal, and obtaining the encrypted input information by causing the user terminal to encrypt, based on the encryption password, the operation input.

In some embodiments, the obtaining the decrypted input information by decrypting the encrypted input information may include decrypting, based on the encryption password, the encrypted input information.

In some embodiments, the obtaining the operation input may include obtaining an encrypted encryption password by encrypting, based on a key, the encryption password, and encrypting the operation input based on the encrypted encryption password. The obtaining the decrypted input information by decrypting the encrypted input information may include obtaining the encrypted encryption password by encrypting, based on the key, the encryption password, and decrypting the encrypted input information based on the encrypted encryption password.

In some embodiments, the decrypted input information may include biological characteristic information, and the determining whether the decrypted input information matches the security control information may include performing an identity authentication based on the decrypted input information. And the method may further include sending a result of the identity authentication and a result of performing the corresponding operation to a first designated device.

In some embodiments, the decrypted input information may include an associated information marker, and the method may further include sending associated information corresponding to the associated information marker to a server.

A further aspect of the present disclosure relates to a method for unlocking. The method may include obtaining an operation input, parsing the operation input, and determining whether the operation input includes ending flag bit information. The method may further include, in response to determining that the operation input includes the ending flag bit information, obtaining first verification information in the operation input. The method may further include determining whether the first verification information and preset second verification information satisfy a preset condition, and in response to determining that the first verification information and the preset second verification information satisfy the preset condition, performing a corresponding operation based on the operation input.

In some embodiments, the preset condition may include a preset time condition and a condition that the first verification information matches the second verification information.

In some embodiments, before obtaining the operation input, the method may include detecting whether an input device of the operation input is in a working state, in response to detecting that the input device of the operation input is in the working state, obtaining the operation input; and in response to detecting that the input device of the operation input is not in the working state, clearing the operation input.

In some embodiments, the determining whether the operation input includes the ending flag bit information may include in response to determining that the operation input does not include the ending flag bit information, determining that the operation input is invalid.

In some embodiments, the determining whether the first verification information and the preset second verification information satisfy the preset condition may include obtaining network time protocol time, and calibrating local time based on the network time protocol time.

A further aspect of the present disclosure relates to a control circuit of a smart lock. The control circuit may include a control unit, a display unit configured to display information of the smart lock, wherein the display unit may be in communication connection with the control unit. The control circuit may further include an unlocking unit including a touch input module configured to receive character input information of a user, a biological characteristic input module configured to receive biological characteristic input information of the user, and one or more wireless communication modules configured to establish communication with another wireless communication module and obtain security control information stored in the wireless communication module. The control unit may be configured to perform a security verification based on the character input information, the biological characteristic input information, and the security control information.

In some embodiments, the control circuit may further include a state detection unit including at least one detecting sensor configured to detect a state of the smart lock, and transmit a detected state of the smart lock to the control unit.

In some embodiments, the state detection unit may further include an infrared detection sensor connected with the control unit. The infrared detection sensor may be configured to quickly wake up the control unit to enable the control unit to be switched from a sleep mode to a working mode.

In some embodiments, the state detection unit may further include a noise detection sensor connected with the control unit. The noise detection sensor may be configured to detect noise of surrounding environment of the smart lock, and the control unit may adjust a volume of a doorbell in real time according to detected noise.

In some embodiments, the control circuit may further include a security detection unit configured to detect whether the smart lock is picked, and send an alarming signal to the control unit when the smart lock is picked, or detect whether the user opens a door via an inner panel handle, in response to detecting that the user opens the door via the inner panel handle, allow the door to be opened normally, and in response to detecting that the user does not open the door via the inner panel handle, prevent the door from being opened.

In some embodiments, the control circuit may further include a wireless communication unit and an encryption unit, wherein the control unit may communicate with a server through the wireless communication unit, and upload information related to the smart lock to the server. The encryption unit may be configured to encrypt the information related to the smart lock before the information related to the smart lock is uploaded to the server, and encrypt information transmitted in a communication process. And the information related to the smart lock may include unlocking information, state information of the smart lock, security information of the smart lock, and battery level information.

A further aspect of the present disclosure relates to a method for controlling a smart lock. The method may include performing an unlocking verification operation on a smart lock, and determining whether a verification result indicates a successful unlocking of the smart lock, in response to determining that the verification result indicates the successful unlocking, recording and reporting unlocking information, and performing a locking operation and/or a prompting operation, and in response to determining that the verification result does not indicate the successful unlocking, performing a prompting operation.

In some embodiments, the performing the unlocking verification operation on the smart lock may include detecting whether a potential of an input and output interface of a preset component of the smart lock has changed. In response to detecting that the potential of the input and output interface of the preset component of the smart lock has changed, determining that a target unlocking operation of the smart lock is detected.

In some embodiments, the performing the unlocking verification operation on the smart lock may include detecting whether an operation input is received, the operation input may include an operation instruction and/or operation information, in response to detecting that the operation input is received, determining that the target unlocking operation of the smart lock is detected.

In some embodiments, after determining that the verification result indicates the successful unlocking, the performing the locking operation may include after determining that the verification result indicates the successful unlocking, detecting whether a door body installed with the smart lock is in a closed state, and in response to determining that the door body installed with the smart lock is in the closed state, causing the smart lock to execute the locking operation.

In some embodiments, after determining that the verification result indicates the successful unlocking, the executing the locking operation may include after determining that the verification result indicates the successful unlocking, starting timing, and when a time duration is greater than a preset duration, causing the smart lock to execute the locking operation.

In some embodiments, after the smart lock executes the locking operation, the method further may include generating an associated device linkage instruction configured to control an opening of a camera device associated with the smart lock, and sending the associated device linkage instruction to the camera device.

In some embodiments, after the smart lock executes the locking operation, the method may further include recording locking information and reporting the locking information.

A further aspect of the present disclosure relates to a method for secure communication. The method may include receiving, through a gateway, a network access request sent by a smart device. The network access request may carry address information of the smart device. The method may include causing the gateway to send an encrypted network key corresponding to the smart device to the smart device and allocate a network address to the smart device according to the address information of the smart device. The encrypted network key corresponding to the smart device may be obtained by the gateway by encrypting an original network key using a Hash value corresponding to the smart device. The Hash value corresponding to the smart device may be obtained by a Hash calculation of the gateway on installation code information specific to the smart device sent by the smart device.

In some embodiments, after causing the gateway to send an encrypted network key corresponding to the smart device to the smart device and allocate a network address to the smart device according to the address information of the smart device, the method may further include receiving, through the gateway, request information for an application layer key sent by the smart device, causing the gateway to allocate the original application layer key specific to the smart device to the smart device, obtaining an encrypted application layer key corresponding to the smart device by causing the gateway to encrypt the original application layer key specific to the smart device using the Hash value corresponding to the smart device, and causing the gateway to send the encrypted application layer key corresponding to the smart device to the smart device.

In some embodiments, after causing the gateway to send the encrypted application layer key corresponding to the smart device to the smart device, the method may further include receiving, through the gateway, an encrypted data packet sent by the smart device, wherein the encrypted data packet may include network layer data encrypted by the original network key, and application layer data encrypted by the original application layer key specific to the smart device. The method may further include the causing the gateway to decrypt the encrypted data packet using the original network key and the original application layer key specific to the smart device.

In some embodiments, after receiving, through a gateway, the network access request sent by the smart device, the method may further include determining whether the smart device has a network access permission according to the address information of the smart device. In response to determining that the smart device has the network access permission, causing the gateway to execute the operation of sending an encrypted network key corresponding to the smart device to the smart device and allocating a network address to the smart device according to the address information of the smart device.

In some embodiments, the method may further include causing the gateway to detect, according to a preset time period, a packet loss rate when communicating with the smart device and an environmental noise floor of the environment in which the gateway is located, determining whether the packet loss rate is greater than a first threshold and whether the environmental noise floor is greater than a second threshold, and in response to determining that the packet loss rate is greater than the first threshold, and/or the environmental noise floor is greater than the second threshold, causing the gateway to switch to other idle channels to create a network and send channel switching notification information to the smart device, wherein the channel switching notification information may carry identification information of the switched channel.

A further aspect of the present disclosure relates to a method for secure communication. The method may include sending a network access request to a gateway using a smart device, wherein the network access request may carry address information of the smart device, receiving an encrypted network key corresponding to the smart device sent by the gateway and obtaining a network address allocated by the gateway using the smart device, wherein the encrypted network key corresponding to the smart device may be obtained by the gateway by encrypting an original network key using a Hash value corresponding to the smart device. The Hash value corresponding to the smart device may be obtained by a Hash calculation of the gateway on installation code information specific to the smart device sent by the smart device. The method may further include obtaining, using the smart device, the original network key by decrypting the encrypted network key corresponding to the smart device to using the Hash value corresponding to the smart device.

In some embodiments, after the smart device receives the encrypted network key corresponding to the smart device sent by the gateway and obtains the network address allocated by the gateway, the method may further include sending, using the smart device, request information for an application layer key to the gateway, receiving, using the smart device, an encrypted application layer key corresponding to the smart device allocated by the gateway, wherein the encrypted application layer key may be obtained by the gateway by encrypting the original application layer key specific to the smart device using the Hash value corresponding to the smart device. The method may further include obtaining, using the smart device, the original application layer key specific to the smart device by decrypting the encrypted application layer key corresponding to the smart device using the Hash value corresponding to the smart device.

In some embodiments, after obtaining, using the smart device, the original application layer key specific to the smart device by decrypting the encrypted application layer key corresponding to the smart device using the Hash value corresponding to the smart device, the method may further include obtaining, using the smart device, encrypted network layer data by encrypting network layer data in a data packet using the original network key, obtaining, using the smart device, encrypted application layer data by encrypting application layer data in the data packet using the original application layer key specific to the smart device, and sending, using the smart device, an encrypted data packet to the gateway, wherein the encrypted data packet may include the encrypted network layer data and the encrypted application layer data.

A further aspect of the present disclosure relates to an apparatus for secure communication. The apparatus may be applied to a gateway and include a first receiving unit configured to receive a network access request sent by a smart device, wherein the network access request may carry address information of the smart device. The apparatus may further include a first sending unit configured to send an encrypted network key corresponding to the smart device to the smart device and allocate a network address to the smart device according to the address information of the smart device, wherein the encrypted network key corresponding to the smart device may be obtained by the gateway by encrypting an original network key using a Hash value corresponding to the smart device. The Hash value corresponding to the smart device may be obtained by a Hash calculation of the gateway on installation code information specific to the smart device sent by the smart device.

In some embodiments, the apparatus may further include a second receiving unit configured to receive request information for an application layer key sent by the smart device, an allocation unit configured to allocate an original application layer key specific to the smart device to the smart device, an encryption unit configured to obtain an encrypted application layer key corresponding to the smart device by encrypting the original application layer key specific to the smart device using the Hash value corresponding to the smart device, and a second sending unit configured to send the encrypted application layer key corresponding to the smart device to the smart device.

A further aspect of the present disclosure relates to an apparatus for secure communication. The apparatus may be applied to a smart device and include a first sending unit configured to send a network access request to a gateway, wherein the network access request may carry address information of the smart device. The apparatus may further include a first receiving unit configured to receive an encrypted network key corresponding to the smart device sent by the gateway, and obtain a network address allocated by the gateway, wherein the encrypted network key corresponding to the smart device may be obtained by the gateway by encrypting an original network key using a Hash value corresponding to the smart device. The Hash value corresponding to the smart device may be obtained by a Hash calculation of the gateway on installation code information specific to the smart device sent by the smart device. The apparatus may further include a first decryption unit configured to obtain the original network key by decrypting the encrypted network key corresponding to the smart device using the Hash value corresponding to the smart device.

In some embodiments, the apparatus may further include a second sending unit configured to send request information of an application layer key to the gateway, a second receiving unit configured to receive an encrypted application layer key corresponding to the smart device allocated by the gateway, wherein the encrypted application layer key may be obtained by the gateway by encrypting the original application layer key specific to the smart device using the Hash value corresponding to the smart device, and a second decryption unit configured to obtain an original application layer key specific to the smart device by decrypting the encrypted application layer key corresponding to the smart device using the Hash value corresponding to the smart device.

A further aspect of the present disclosure relates to a computer-readable medium including executable instructions that, when executed by at least one computer, direct the at least one computer to perform the methods described in any embodiment of the present disclosure.

A further aspect of the present disclosure relates to a processor configured to run a program to implement the methods described in any embodiment of the present disclosure.

A further aspect of the present disclosure relates to a device. The device may include one or more processors, a storage device storing one or more programs that, when executed by the one or more processors, direct the one or more processors to implement the methods described in any embodiment of the present disclosure.

A further aspect of the present disclosure relates to a method for binding a device. The method may include scanning a device to be bound, sending a device information acquisition request to the scanned device to be bound, obtaining device information of the device to be bound returned by the device to be bound, sending a device binding request to a server, wherein the device binding request may carry the device information of the device to be bound and device information of a first device, and receiving binding information returned by the server after binding the device to be bound with the first device, wherein the device to be bound and the first device may obtain at least part of information in the binding information, respectively.

In some embodiments, the method may be applied to the first device. The first device may be a user terminal, and the device to be bound may be an electronic lock. The receiving the binding information returned by the server after binding the device to be bound with the first device, wherein the device to be bound and the first device may obtain at least part of information in the binding information, respectively may include receiving the binding information returned by the server after binding the electronic lock with the user terminal, obtaining and saving part of the information corresponding to the electronic lock from the binding information, obtaining part of the information corresponding to the user terminal from the binding information, and sending the part of the information corresponding to the user terminal to the electronic lock.

In some embodiments, the method may be applied to the first device. The first device may be a user terminal, and the device to be bound may be an electronic lock. After receiving the binding information returned after the server binds the device to be bound with the first device, wherein the device to be bound and the first device may obtain at least part of information in the binding information, respectively, the method may further include performing a time synchronization on the user terminal and the electronic lock, and/or causing the user terminal to obtain power information of the electronic lock.

In some embodiments, the method may be applied to the first device. The first device may be a user terminal, and the device to be bound may be an electronic lock. After receiving the binding information returned after the server binds the device to be bound with the first device, wherein the device to be bound and the first device may obtain at least part of information in the binding information, respectively, the method may further include causing the user terminal to send an unlocking password to the electronic lock, and receiving, using the user terminal, a notification that the unlocking password returned by the electronic lock has taken effect.

In some embodiments, the method may be applied to the user terminal. The first device may be an electronic lock, and the device to be bound may be a keypad device. The receiving the binding information returned after the server binds the device to be bound with the first device, wherein the device to be bound and the first device may obtain at least part of information in the binding information, respectively may include receiving the binding information returned by the server after binding the keypad device and the electronic lock, obtaining part of the information corresponding to the keypad device from the binding information, sending the part of the information corresponding to the keypad device to the electronic lock, obtaining part of the information corresponding to the electronic lock from the binding information, and sending the part of the information corresponding to the electronic lock to the keypad device.

In some embodiments, the server and the keypad device may pre-store device identifications and a preset key of the keypad device. The obtaining the device information of the device to be bound returned by the device to be bound may include obtaining an encrypted device identification returned by the keypad device after encrypting the device identification using the preset key. The sending the device binding request to the server, the device binding request carrying the device information of the device to be bound and the device information of the first device may include sending the device binding request to the server such that the server may obtain the device identification of the keypad device by decrypting the encrypted device identification using the stored preset key and determine whether the device identification of the keypad device is one of the pre-stored device identifications, and the device binding request may carry the encrypted device identification and the device information of the electronic lock. The receiving the binding information returned by the server after binding the keypad device and the electronic lock may include receiving the binding information returned by the server after binding the keypad device with the electronic lock in response to determining that the device identification of the keypad device is one of the pre-stored device identifications.

A further aspect of the present disclosure relates to a method for binding a device. The method may be applied to a device to be bound. The method may include sending a broadcast message and obtain a device information acquisition request returned by a user terminal after receiving the broadcast message, sending device information of the device to be bound to the user terminal such that the user terminal may send a device binding request to a server, wherein the device binding request may carry the device information of the device to be bound and device information of a first device. The method may further include obtaining at least part of information in binding information returned by the server after binding the device to be bound with the first device, wherein the first device may obtain at least part of information in the binding information.

In some embodiments, the first device may be the user terminal, the device to be bound may be an electronic lock, and the at least part of information in the binding information obtained by the electronic lock may be part of the information in the binding information corresponding to the user terminal. The at least part of information in the binding information obtained by the user terminal may be part of information in the binding information corresponding to the electronic lock.

In some embodiments, the first device may be an electronic lock, the device to be bound may be a keypad device, and the at least part of information in the binding information obtained by the electronic lock may be part of information in the binding information corresponding to the keypad device. The at least part of information in the binding information obtained by the keypad device may be part of information in the binding information corresponding to the electronic lock.

In some embodiments, the server and the keypad device may pre-store device identifications and a preset key of the keypad device. The sending the device information of the device to be bound to the user terminal such that the user terminal may send the device binding request to the server, wherein the device binding request may carry the device information of the device to be bound and the device information of the first device may include causing the keypad device to obtain an encrypted device identification by encrypting a device identification thereof using the preset key, sending the encrypted device identification to the user terminal such that the user terminal may send the device binding request to the server, and the server may obtain the device identification of the keypad device by decrypting the encrypted device identification using the preset key and determine whether the obtained device identification of the keypad device is one of the pre-stored device identifications, wherein the device binding request may carry the encrypted device identification and the device information of the electronic lock. The obtaining at least part of information in the binding information returned by the server after binding the device to be bound with the first device may include obtaining at least part of information in the binding information returned by the server after binding the device to be bound with the first device in response to determining that the device identification of the keypad device is one of the pre-stored device identifications.

A further aspect of the present disclosure relates to a user terminal. The user terminal may include a processor, a memory, and a program stored in the memory and executable on the processor. The processor may implement the following steps when executing the program: scanning a device to be bound, sending a device information acquisition request to the scanned device to be bound, obtaining device information of the device to be bound returned by the device to be bound, sending a device binding request to a server, wherein the device binding request may carry device information of the device to be bound and device information of a first device, and receiving the binding information returned by the server after binding the device to be bound with the first device, wherein the device to be bound and the first device may obtain at least part of information in the binding information, respectively.

A further aspect of the present disclosure relates to a device to be bound. The device to be bound may include a processor, a memory, and a program stored in the memory and executable on the processor. The processor may implement the following steps when executing the program: sending a broadcast message and obtain a device information acquisition request returned by a user terminal after receiving the broadcast message, sending device information of the device to be bound to the user terminal such that the user terminal may send a device binding request to the server, wherein the device binding request may carry device information of the device to be bound and device information of a first device, and obtaining at least part of information in binding information returned by the server after binding the device to be bound with the first device.

A further aspect of the present disclosure relates to a user terminal. The user terminal may include a device scanning unit, a first request sending unit, a first information obtaining unit, a binding request unit, and an information receiving unit. The device scanning unit may be configured to scan a device to be bound. The first request sending unit may be configured to send a device information acquisition request to the scanned device to be bound. The first information obtaining unit may be configured to obtain device information of the device to be bound returned by the device to be bound. The binding request unit may be configured to send a device binding request to a server, and the device binding request may carry the device information of the device to be bound and device information of the first device. The information receiving unit may be configured to receive binding information returned by the server after binding the device to be bound with the first device such that the device to be bound and the first device may obtain at least part of the information in the binding information.

A further aspect of the present disclosure relates to a device to be bound. The device to be bound may include a broadcast sending unit, a second request sending unit, and a second information obtaining unit. The broadcast sending unit may be configured to send a broadcast message and obtain a device information acquisition request returned by a user terminal after receiving the broadcast message. The second request sending unit may be configured to send device information of the device to be bound to the user terminal such that the user terminal may send a device binding request to the server, and the device binding request may carry the device information of the device to be bound and device information of the first device. The second information obtaining unit may be configured to obtain at least part of the information in the binding information returned by the server after binding the device to be bound with the first device.

A further aspect of the present disclosure relates to a method for controlling a smart lock. The method may include receiving a control instruction. The method may further include if the control instruction includes an encrypted password encrypted by a preset encryption algorithm, obtaining a decrypted password by decrypting the encrypted password. The method may further include if the decrypted password matches a pre-stored password, performing a control operation corresponding to the control instruction.

In some embodiments, an encryption process of the preset encryption algorithm may include encrypting a password to be encrypted based on an encryption password. If the control instruction is received from a user terminal, and the control instruction includes the encrypted password, before receiving the control instruction, the method may further include receiving an encryption password generation request sent by the user terminal, generating the encryption password based on the encrypted password generation request randomly, and returning the randomly generated encryption password to the user terminal such that the user terminal may encrypt the password to be encrypted based on the randomly generated encryption password and obtain the encrypted password.

In some embodiments, the decrypting the encrypted password may include decrypting the encrypted password based on the randomly generated encryption password.

In some embodiments, the encryption process of the preset encryption algorithm may further include obtaining an encrypted encryption password by encrypting the encrypted password using a secret key, and encrypting the password to be encrypted using the encrypted encryption password. The decrypting the encrypted password based on the randomly generated encryption password may include obtaining an encrypted encryption password by encrypting the randomly generated encryption password using the secret key, and decrypting the encrypted password using the encrypted encryption password.

In some embodiments, the method may further include if the decrypted password belongs to biometric information, performing an identity authentication based on the decrypted password. After performing the control operation corresponding to the control instruction, the method may further include sending a result of performing the control operation and a result of the identity authentication to a first designated device.

In some embodiments, if the decrypted password is pre-associated with an anti-hijacking flag, when the control operation corresponding to the control instruction is performed, the method may further include sending information to the server for prompting that the user is hijacked such that the server may send warning information to a second designated device.

In some embodiments, the control instruction may include an unlocking instruction, a locking instruction, an information viewing instruction, and an information updating instruction.

A further aspect of the present disclosure relates to an apparatus for controlling a smart lock. The apparatus may include a receiving module configured to receive a control instruction, a decrypting module configured to obtain a decrypted password by decrypting an encrypted password if the control instruction includes an encrypted password encrypted by a preset encryption algorithm, and an execution module configured to perform a control operation corresponding to the control instruction if the decrypted password matches a pre-stored password.

A further aspect of the present disclosure relates to a computer-readable medium with a computer program stored thereon, wherein the program may be executed by a processor to implement the methods for controlling a smart lock as described in any embodiment of the present disclosure.

A further aspect of the present disclosure relates to a processor for executing a program to implement the methods for controlling a smart lock as described in any embodiment of the present disclosure.

A further aspect of the present disclosure relates to a device. The device may include one or more processors, and a storage device storing one or more programs that, when executed by the one or more processors, direct the one or more processors to implement the methods for controlling a smart lock as described in any embodiment of the present disclosure.

A further aspect of the present disclosure relates to a method for unlocking. The method may be applied to a smart device and include obtaining a first unlocking password, and parsing the first unlocking password. The method may further include obtaining a second unlocking password in the first unlocking password if end flag information indicating an end of a password input is obtained through parsing. The method may further include performing an unlocking operation based on the second unlocking password if the second unlocking password matches a preset real password and current time satisfies a time condition.

In some embodiments, the time condition may include that the current time is within a specified effective time range, and the specified effective time range may include at least one of: a preset time range allowed to unlock, a valid time range calculated based on effective time corresponding to the real password and expiration time corresponding to the real password.

In some embodiments, the first unlocking password may be input through a keypad. Before obtaining the first unlocking password, the method may further include in response to a detection of the first unlocking password input by a user through the keypad, determining whether the keypad is currently in a working state. And the obtaining the first unlocking password may include in response to determining that the keypad is currently in the working state, obtaining the first unlocking password.

In some embodiments, the method may further include in response to determining that the keypad is not currently in the working state, clearing the first unlocking password.

In some embodiments, the parsing the first unlock password may include searching whether the first unlocking password carries the end flag information indicating the end of the password input, and the first unlocking password as an invalid password if the first unlocking password does not carry the end flag information.

In some embodiments, the smart device may include a clock chip, and a process for obtaining the current time may include obtaining local time of the clock chip, and determine the local time as the current time.

In some embodiments, the method may further include obtaining Network Time Protocol (NTP) time, and calibrating the local time of the clock chip based on the NTP time.

In some embodiments, the smart device may communicate with the user terminal, and the obtaining the NTP time may include receiving the NTP time sent by the user terminal, wherein the NTP time may be obtained by the user terminal from a server.

A further aspect of the present disclosure relates to an apparatus for unlocking. The apparatus may be applied to a smart device and include a processing unit configured to obtain a first unlocking password and parse the first unlocking password, an obtaining unit configured to obtain a second unlocking password in the first unlocking password if end flag information indicating an end of a password input is obtained through parsing, and an unlocking unit configured to perform an unlocking operation based on the second unlocking password if the second unlocking password matches a preset real password and current time satisfies a time condition.

In some embodiments, the first unlocking password may be input through a keypad. The apparatus may further include a determination unit configured to determine whether the keypad is currently in a working state in response to a detection of the first unlocking password input by the user through the keypad. The processing unit may be further configured to in response to the determination unit determining that the keypad is currently in the working state, obtain the first unlocking password.

In some embodiments, the processing unit may be further configured to search whether the first unlocking password carries the end flag information indicating the end of the password input, and determine the first unlocking password as an invalid password if the first unlocking password does not carry the end flag information.

A further aspect of the present disclosure relates to a control circuit for controlling a door lock. The control circuit may include a control unit, and a display unit and an unlocking unit electrically connected to the control unit. The display unit may be configured to display information of the door lock. The unlocking unit may include a touch input module, a biometric input module, and one or more wireless communication modules. The touch input module may be configured to receive a numeral password input by a user. The biometric input module may be configured to input biometric information of the user. The wireless communication module may be configured to establish communication with another wireless communication module and obtain password information stored thereon. The control unit may determine whether to unlock the door lock according to the numeral password, the entered biometric information, and the password information.

In some embodiments, the control circuit may also include a state detection unit. The state detection unit may include a plurality of detection sensors configured to detect a state of the door lock and transmitting the detected state of the door lock to the control unit.

In some embodiments, the state detection unit may include a spring bolt detection sensor, a handle detection sensor, and a key detection sensor connected to the control unit. The state of the door lock may include a state of a door lock body, a state of a handle, and an unlocking state of a mechanical key. The spring bolt detection sensor, the handle detection sensor, and the key detection sensor may be respectively configured to detect the state of the door lock body, the handle, and the unlocking state of the mechanical key, and transmit the state of the door lock body, the handle, and the unlocking state of the mechanical key to the control unit.

In some embodiments, the state detection unit may also include an infrared detection sensor connected to the control unit, which may be configured to quickly wake up the control unit to switch from a sleep mode to a working mode.

In some embodiments, the infrared detection sensor may also be configured to detect a brightness of light surrounding the door lock, and adjust the brightness of the display unit in real time according to the detected brightness.

In some embodiments, the state detection unit further may include a noise detection sensor connected to the control unit. The noise detection sensor may be configured to detect noise in the surrounding environment of the door lock, and the control unit may adjust a volume of a doorbell in real time according to the detected noise.

In some embodiments, the control circuit may also include a safety detection unit. The safety detection unit may include a first tamper-proof sensor. The first tamper-proof sensor may be configured to detect whether the door lock is picked and send an alarming signal to the control unit when the door lock is picked.

In some embodiments, the safety detection unit may also include a second tamper-proof sensor configured to detect whether the user opens the door via an inner panel handle. If the user opens the door via the inner panel handle, the door may be opened normally, otherwise, the door may not be opened.

In some embodiments, the control circuit may also include a power management unit including a battery, a power output module, and a charging module. The battery may be connected to the control unit through the power output module to supply power to the control unit. The battery may be charged by connecting to a power source through the charging module.

In some embodiments, the power management unit may further include a power collection module configured to obtain battery power in real time, and transmit the battery power to the control unit.

In some embodiments, the control circuit may also include a wireless communication unit and an encryption unit. The control unit may communicate with the server through the wireless communication unit, and upload unlocking information, door lock state information, door lock safety information, and battery power information to the server. The encryption unit may be configured to encrypt the information mentioned above before uploading. The encryption unit may also be configured to encrypt information transmitted in a communication process.

A further aspect of the present disclosure relates to a door lock. The door lock may include a door lock and a door lock control circuit arranged therein. The door lock control circuit may be the door lock control circuit according to any embodiment of the present disclosure.

A further aspect of the present disclosure relates to a method for controlling a smart door lock. The method may include detecting a target unlocking operation of the smart door lock, wherein the target unlocking operation may be a preset unlocking mechanism to be detected. The method may further include after detecting the target unlocking operation of the smart door lock, recording unlocking operation information and reporting the unlocking operation information. The method may further include after confirming that a successful unlocking, controlling the smart door lock to perform an automatic locking operation.

In some embodiments, the detecting the target unlocking operation of the smart door lock may include detecting whether a potential of an input and output (10) interface of a preset component of the smart door lock has changed, and in response to detecting that the potential of the input and output interface of the preset component of the smart lock has changed, determining that a target unlocking operation of the smart lock is detected.

In some embodiments, the detecting whether the potential of the IO interface of the preset component of the smart door lock has changed may include detecting whether a potential of the IO interface of a key lock cylinder has changed, or detecting whether a potential of the IO interface of a lock control mechanism of the smart door lock has changed.

In some embodiments, the detecting the target unlocking operation of the smart door lock may include detecting whether an unlocking instruction sent by a target terminal device is received, wherein the target terminal device may be a terminal device associated with the smart door lock, and determining that the target unlocking operation of the smart door lock is detected if the unlocking instruction is detected.

In some embodiments, the detecting whether the unlocking instruction sent by the target terminal device is received may include detecting whether a Bluetooth unlocking instruction sent by the target terminal device is received, or detecting whether a remote unlocking instruction sent by the target terminal device is received, or detecting whether an NFC unlocking instruction sent by the target terminal device is received.

In some embodiments, the detecting the target unlocking operation of the smart door lock may include detecting whether a password unlocking instruction is received, and determining that the target unlocking operation of the smart door lock is detected if the password unlocking instruction is detected.

In some embodiments, the detecting whether the password unlocking instruction is received may include detecting whether a numeral password unlocking instruction is received, or detecting whether a biometric code unlocking instruction is received.

In some embodiments, after confirming the successful unlocking, controlling the smart door lock to perform an automatic locking operation may include after confirming that the successful unlocking, detecting whether a door body installed with the smart door lock is in a closed state, and in response to determining that the door body installed with the smart lock is in the closed state, causing the smart lock to execute the locking operation.

In some embodiments, the smart door lock may include a first sensor and a second sensor. The detecting whether the door body installed with the smart door lock is in the closed state may include obtaining data collected by the first sensor, determining an acceleration of the door body according to the data collected by the first sensor, obtaining data collected by the second sensor when the acceleration is greater than a preset threshold, and determining whether the door body is in the closed state or an open state according to the data collected by the second sensor.

In some embodiments, the smart door lock may further include a first timer. The obtaining data collected by the second sensor when the acceleration is greater than a preset threshold may include when the acceleration is greater than the preset threshold, obtaining data collected by the second sensor before a timing duration of the first timer reaches a first preset duration, and after the timing duration of the first timer reaches the first preset duration, controlling the second sensor to be in a dormant state.

In some embodiments, the second sensor may be a geomagnetic sensor. The obtaining the data collected by the second sensor may include obtaining a geomagnetic flux collected by the geomagnetic sensor. The determining whether the door body is in the closed state or the open state according to the data collected by the second sensor may include when the geomagnetic flux is within a preset geomagnetic flux interval, determining that the door body is in the closed state, and when the geomagnetic flux is outside the preset geomagnetic flux interval, determining that the door body is in the open state.

In some embodiments, the smart door lock may also include a second timer. The after confirming the successful unlocking, controlling the smart door lock to perform the automatic locking operation may include after confirming the successful unlocking, triggering the second timer to start timing, and when a timing duration of the second timer is greater than a second preset duration, controlling the smart door lock to perform the automatic locking operation.

In some embodiments, after controlling the smart door lock to perform the automatic locking operation, the method may further include generating an associated device linkage instruction, wherein the associated device linkage instruction may be configured to control an opening of a camera device associated with the smart door lock, and sending the associated device linkage instruction to the camera device.

In some embodiments, after controlling the smart door lock to perform the automatic locking operation, the method may further include recording automatic locking information and reporting the automatic locking information.

A further aspect of the present disclosure relates to an apparatus for controlling a smart door lock. The apparatus may include an unlocking operation detection unit configured to detect a target unlocking operation of the smart door lock, wherein the target unlocking operation may be a preset unlocking mechanism to be detected, a recording unit configured to record unlocking operation information and report the unlocking operation information after the target unlocking operation of the smart door lock is detected, and an automatic locking unit configured to control the smart door lock to perform an automatic locking operation after confirming a successful unlocking.

In some embodiments, the automatic locking unit may include a door body state detection sub-unit configured to detect whether the door body installed with the smart door lock is in a closed state after confirming the successful unlocking, and an automatic locking sub-unit configured to control the smart door lock to perform an automatic locking operation in response to detecting that the door body is in the closed state.

In some embodiments, the apparatus may further include a linkage unit configured to generate an associated device linkage instruction after controlling the smart door lock to perform the automatic locking operation, wherein the associated device linkage instruction may be configured to control an opening of a camera device associated with the smart door lock, and sending the associated device linkage instruction to the camera device.

A further aspect of the present disclosure relates to a computer-readable medium with a computer program stored thereon, wherein the program may be executed by a processor to implement the methods described in any embodiment of the present disclosure.

A further aspect of the present disclosure relates to a processor configured to execute a program to implement the methods described in any embodiment of the present disclosure.

A further aspect of the present disclosure relates to a device. The device may include one or more processors, and a storage device storing one or more programs that, when executed by the one or more processors, direct the one or more processors to implement the methods described in any the embodiment of the present disclosure.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
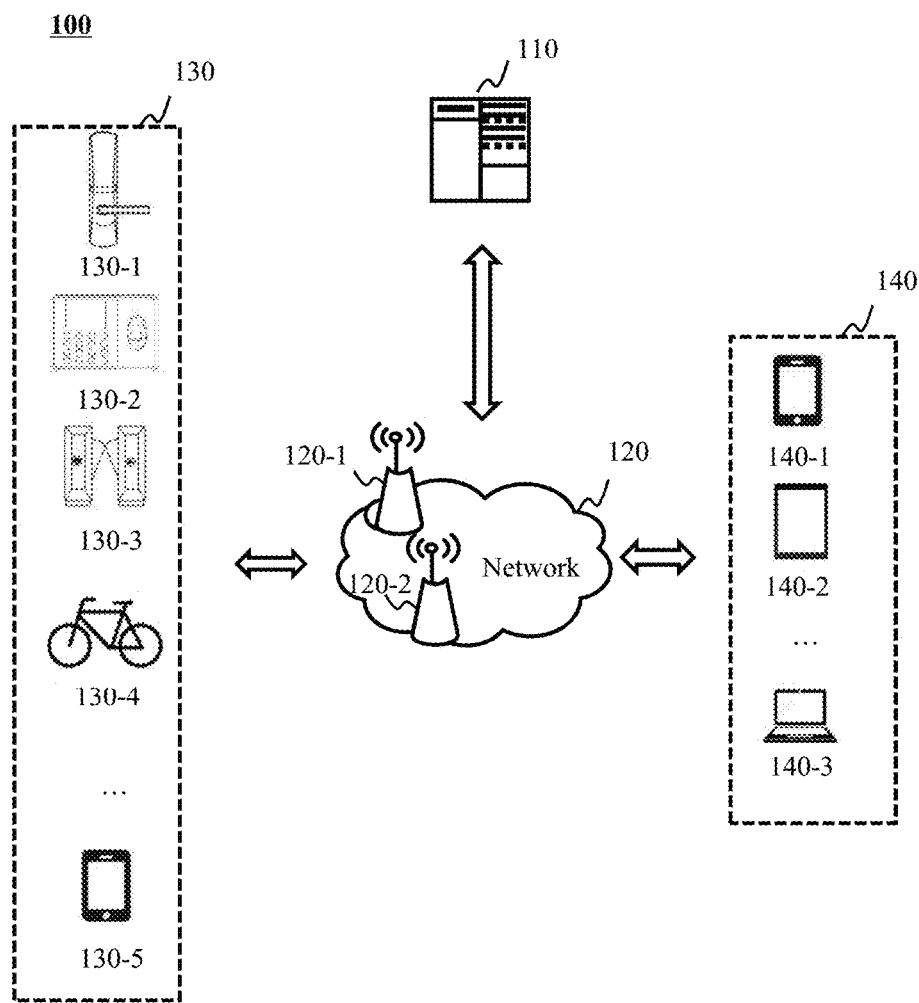
FIG. 1 is a schematic diagram illustrating an application scenario of a smart lock control system according to some embodiments of the present disclosure.

To describe the technical solutions of the embodiments of the present disclosure clearly, the following may introduce the drawings illustrated in the description of the embodiments briefly. The drawings in the following description may be some examples or embodiments of the present disclosure. For those ordinary skilled in the art, the present disclosure may be applied to other similar scenarios based on these drawings without creative work. Unless obtained from the context or the context illustrates otherwise, the same numbers in the drawings may refer to the same structure or operation.

It should be understood that the "system", "device", "unit" and/or "module" used herein may be a method for distinguishing different components, elements, parts, or assemblies of different levels. However, if other words may achieve the same purpose, the words may be replaced by other expressions.

As used in the disclosure and the appended claims, the singular forms "a," "an," and "the" may include plural referents unless the content dictates otherwise. Generally speaking, the terms "comprise" and "include" may only suggest that the steps and elements that have been clearly identified may be included, and these steps and elements do not constitute an exclusive list, and the method or device may also include other steps or elements.

A flowchart is used in the present disclosure to illustrate the operations performed by the system according to the embodiments of the present disclosure. It should be understood that the preceding or following operations may not be necessarily performed exactly in order. Instead, the steps may be processed in reverse order or simultaneously. At the same time, other operations to these processes may be added, or a step or several operations from these processes may be removed.

FIG. 1 is a schematic diagram illustrating an application scenario of a smart lock control system according to some embodiments of the present disclosure.

The smart lock control system 100 may be widely used in various production and life fields such as residential buildings, office buildings, factories, warehouses, shopping malls, schools, hospitals, hotels, rented houses, airports, railway stations, and subway stations. As shown in FIG. 1, the smart lock control system 100 may include a server 110, a network 120, a smart lock 130, and a user terminal 140.

The smart lock control system 100 may obtain security control information, perform a security verification on an operation input of a user of the smart lock 130, and perform a corresponding operation (e.g., an unlocking operation, a locking operation, or a reminding operation) on the smart lock 130 after confirming that the security verification is passed. In some embodiments, the operation input may include an operation instruction and/or operation information. The smart lock control system 100 may be applied to various scenarios, for example, the smart lock control system 100 may be applied to an access control device (e.g., a door lock, a gate machine), and the smart lock 130 may be the access control device in this scenario. According to the operation instruction and/or operation information of the user, the security verification may be performed to determine whether the user is permitted to pass through the access control device. Further, if the security verification is passed, it may be determined that the user is permitted to pass through the access control device. The smart lock control system 100 may control the unlocking of the access control device. As another example, the smart lock control system 100 may be applied to an attendance checking device (e.g., an attendance checking machine). Whether identity information of the user exists in a database corresponding to the attendance checking device may be determined by performing the security verification according to the operation instruction and/or operation information of the user. Further, if the identity information of the user exists in the database corresponding to the attendance checking device, the smart lock control system 100 may record the current moment as attendance checking information of the user. As another example, the smart lock control system 100 may be applied to a transportation device (e.g., bicycles, electric vehicles, automobiles, etc.). The transportation device may be a private transportation device (e.g., a private car) or a shared transportation device (e.g., a shared car, a shared bicycle). According to the operation instruction and/or operation information of the user, the security verification may be performed to determine whether the user is the owner of the transportation device or a current tenant, and then to determine whether to open a lock of the transportation device. As another example, the smart lock control system 100 may be an online service platform for an Internet service, such as an online payment platform that requires an identity authentication (such as an online shopping platform), an online bank, an online car-hailing platform, or an online meal ordering platform. According to the operation instruction and/or operation information of the user, the smart lock control system 100 may search for and associate related accounts in the platform to perform the security verification to determine whether to permit a service request of the user. As another example, the smart lock control system 100 may also be applied to an electronic device that requires an identity authentication (e.g., a mobile phone, a notebook computer, or a tablet personal computer). According to the operation instruction and/or operation information of the user, the smart lock control system 100 may perform a security verification to determine whether to permit an operation request such as startup and shutdown, system entering, and software downloading of the electronic device itself, as well as the use permission of an application therein. As another example, the smart lock control system 100 may also be applied to an electrical equipment or a smart electrical equipment (e.g., a washing machine, a refrigerator, an air conditioner, an air purifier, a TV set, or heating equipment). According to the operation instruction and/or operation information of the user, the security verification may be performed to determine whether the user is the owner of the electrical equipment or a legal user, and then to determine whether to open a switch lock of the electrical equipment. It should be noted that the smart lock control system 100 may also be applied to other devices, scenarios, and applications that require the security verification, which is not limited herein, and any device, scenario, and/or application that may use an identity verification method included in the present disclosure may be within the protection scope of the present disclosure.

In some embodiments, the server 110 may be configured to process and determine information and/or data related to a user identity. For example, the server 110 may process identity verification information of the user in the smart lock 130, and complete a verification of the user identity according to the identity verification information. In some embodiments, the identity verification information may include first identification information and second identification information. As another example, the server 110 may compare and match the user identity verification information obtained from the smart lock 130 with pre-stored user identity verification information to confirm the identity of the user. As another example, the server 110 may generate an instruction for controlling the smart lock 130 according to a verification result of the user identity. The server 110 may be an independent server or a server group. The server group may be centralized or distributed (e.g., the server 110 may be a distributed system).

In some embodiments, the server 110 may be regional or remote. For example, the server 110 may access information and/or data stored in the smart lock 130 and the user terminal 140 through the network 120. In some embodiments, the server 110 may be directly connected with the smart lock 130 and the user terminal 140 to access the information and/or data stored therein. For example, the server 110 may be located in the smart lock 130 or directly connected with the smart lock 130. In some embodiments, the server 110 may be executed on a cloud platform. For example, the cloud platform may include one of a private cloud, a public cloud, a hybrid cloud, a community cloud, a decentralized cloud, an internal cloud, or the like, or any combination thereof.

In some embodiments, the server 110 may include a processing device. The processing device may process data and/or information related to control of the smart lock 130 to perform one or more functions described in the present disclosure. For example, the processing device may receive an operation instruction and/or operation information signal sent by the user terminal 140, and send the operation instruction to the smart lock 130. As another example, the processing device may obtain an execution condition of the smart lock 130 to the operation instruction and/or operation information, and send the execution condition to the user terminal 140, or perform subsequent operations according to the execution condition (e.g., execute a locking operation on the smart lock 130). In some embodiments, the processing device may include one or more sub-processing devices (e.g., a single-core processing device or a multi-core processing device). As an example, the processing device may include central processing unit (CPU), application specific integrated circuit (ASIC), special instruction processor (ASIP), graphics processing unit (GPU), physical processor (PPU), digital signal processor (DSP), Field Programmable Gate Array (FPGA), Editable Logic Circuit (PLD), Controller, Microcontroller Unit, Reduced Instruction Set Computer (RISC), Microprocessor, or the like, or any combination thereof.

The network 120 may facilitate the exchange of data and/or information in the smart lock control system 100. In some embodiments, one or more components in the smart lock control system 100 (e.g., the server 110, the smart lock 130, and the user terminal 140) may send data and/or information to other components in the smart lock control system 100 via the network 120. For example, the operation input information of the smart lock 130 may be transmitted to the server 110 via the network 120. As another example, the result of the security verification in the server 110 may be transmitted to the user terminal 140 via the network 120. In some embodiments, the network 120 may be any type of wired or wireless network. For example, the network 120 may include a cable network, a wired network, an optical fiber network, a telecommunication network, an internal network, an Internet network, a local area network (LAN), a wide area network (WAN), a wireless local area network (WLAN), and a metropolitan area network (MAN), Public Switched Telephone Network (PSTN), Bluetooth network, ZigBee network, Near Field Communication (NFC) network, or the like, or any combination thereof. In some embodiments, the network 120 may include one or more network entry and exit points. For example, the network 120 may include wired or wireless network access points, such as base stations and/or Internet exchange points 120-1, 120-2, . . . . Through these access points, one or more components of the smart lock control system 100 may be connected to the network 120 to exchange data and/or information.

The smart lock 130 may obtain the security control information and the operation instruction and/or operation information of the user, and perform the security verification on the operation instruction and/or operation information of the user according to the security control information. After the security verification is passed, the corresponding operation (such as the unlocking operation or the locking operation) may be performed according to the operation instruction and/or operation information of the user. In some embodiments, the smart lock 130 may include a door lock device 130-1, an attendance checking device 130-2, a gate machine device 130-3, a transportation device 130-4, or a communication device 130-5. For example, when the smart lock 130 is the door lock device 130-1, whether the user is permitted to open the door lock device 130-1 may be determined according to the operation instruction and/or operation information of the user. After the security verification of the operation instruction and/or operation information of the user is passed, the door lock device 130-1 may be unlocked. The door lock device 130-1 may be applied to door bodies, parking locks, safe boxes, luggage cases, or the like. In some embodiments, distinguished by category, the door lock device 130-1 may include at least one of a button type door lock, a dial type door lock, an electronic key type door lock, a touch type door lock, a password identification type door lock, a remote control type door lock, a card identification type door lock (such as a magnetic card, and an IC card), a biological identification type door lock (such as a fingerprint, a finger vein, a palm print, a facial feature, voice, an iris, and a retina), or the like, or any combination thereof. As another example, when the smart lock 130 is the attendance checking device 130-2, whether the identity information of the user exists in a storage device corresponding to the attendance checking device 130-2 may be determined according to the operation instruction and/or operation information of the user. Further, if the identity information of the user exists in the storage device corresponding to the attendance checking device, the attendance checking device 130-2 may record the identity information of the user and the current moment as attendance checking information of the user (e.g., a name, a job number, attendance checking time, and a geographical position of the user). In some embodiments, the attendance checking device 130-2 may include a biological identification attendance checking device and a mobile attendance checking device. In some embodiments, the biological identification attendance checking device may include a fingerprint attendance checking device, a finger vein attendance checking device, a palm print attendance checking device, a facial feature attendance checking device, a voice attendance checking device, an iris attendance checking device, a retina attendance checking device, or the like, or any combination thereof. In some embodiments, the mobile attendance checking device may refer to a mobile terminal (e.g., a mobile phone, a computer, a smart watch, a wearable device, etc.) that completes attendance checking by installing a corresponding attendance checking client (e.g., software, mobile phone APP, etc.). As another example, when the smart lock 130 is the gate machine device 130-3, the security verification may be performed according to the operation instruction and/or operation information of the user, and whether the user is permitted to pass through the gate machine device 130-3 may be determined. Further, if a result of the determination is that the user is permitted to pass through the gate machine device 130-3, the gate machine device 130-3 may be unlocked to allow the user to pass through; otherwise, the gate machine device 130-3 may not be unlocked. The gate machine device 130-3 may be applied to entrances or exits where the user identity needs to be determined, such as airports, subway stations, light rail stations, bus passenger stations, railway stations, office buildings, and residential areas. In some embodiments, the gate machine device 130-3 may include a swing gate device, a wing gate device, a three-roller gate device, a rotary gate device, a translation gate device, or the like, or any combination thereof. As another example, when the smart lock 130 is the transportation device 130-4 (such as a bicycle, an electric vehicle, an automobile, etc.), the transportation device 130-4 may be a private transportation device (such as a private car) or a shared transportation device (e.g., a shared car, and a shared bicycle). According to the operation instruction and/or operation information of the user, the security verification may be performed to determine whether the user is the owner of the transportation device or the current tenant, and then to determine whether to open a lock of the transportation device. After the security verification of the operation instruction and/or operation information of the user is passed by the transportation device 130-4, the transportation device 130-4 may be unlocked or be started. When the smart lock 130 is the communication device 130-5, the security verification may be performed according to the operation instruction and/or operation information of the user, and the communication device 130-5 may determine whether to permit operation requests such as startup and shutdown, system entering, and software downloading of the electronic device, as well as the use permission of applications (e.g., an online payment platform) therein. For the specific form of the communication device 130-5, refer to the relevant description of the user terminal 140 in the present disclosure.

It should be noted that the smart lock 130 is not limited to the door lock device 130-1, the attendance checking device 130-2, the gate machine device 130-3, the transportation device 130-4, and the communication device 130-5 shown in FIG. 1, and may also be applied to other devices that need to perform the unlocking or locking, which is not limited herein. Any device that may use a method for controlling a smart lock included in the present disclosure is within the protection scope of the present disclosure.

In some embodiments, the user terminal 140 may obtain information or data in the smart lock control system 100. In some embodiments, the user terminal 140 may obtain push information about a state of the smart lock 130. In some embodiments, the push information may include on-off state information of the smart lock 130, user pass-through information, user usage information, alarming information, or the like. In some embodiments, the user may obtain the operation instruction and/or operation information of the user through the user terminal 140. For example, the user terminal 140 may be connected to the smart lock 130 through the network 120 (e.g., wired connection, and wireless connection), and the user may obtain the operation instruction and/or operation information of the user through the user terminal 140, and the operation instruction and/or operation information of the user may be transmitted to the server 110 through the user terminal 140. For example, in some embodiments, the user terminal 140 may include one of a mobile device 140-1, a tablet computer 140-2, a notebook computer 140-3, or the like, or any combination thereof. In some embodiments, the mobile device 140-1 may include a smart home device, a wearable device, a smart mobile device, a virtual reality device, an augmented reality device, or the like, or any combination thereof. In some embodiments, the smart home device may include a smart lighting device, a control device of a smart electrical appliance, a smart monitoring device, a smart TV, a smart camera, a walkie-talkie, or the like, or any combination thereof. In some embodiments, the wearable device may include a smart bracelet, a smart footwear, smart glasses, a smart helmet, a smart watch, smart clothes, a smart backpack, smart accessories, or the like, or any combination thereof. In some embodiments, the smart mobile device may include a smart phone, a personal digital assistant (PDA), a game device, a navigation device, a POS device, or the like, or any combination thereof. In some embodiments, the virtual reality device and/or augmented reality device may include a virtual reality helmet, virtual reality glasses, virtual reality goggles, an augmented reality helmet, augmented reality glasses, augmented reality goggles, or the like, or any combination thereof.

In some embodiments, the smart lock control system 100 may also include a control device. The control device may be a device or an apparatus or the like that may give instructions to control the smart lock 130 to perform the corresponding operation. In some embodiments, the control device and the user terminal may be the same device, such as smart phones, smart handheld terminals, smart wearable devices, notebook computers, and desktop computers. In some embodiments, the control device may establish a binding relationship with the smart lock 130, and send the operation instruction to the smart lock 130 to control the smart lock 130 to perform operations such as unlocking and locking.

In some embodiments, the smart lock control system 100 may also include an input device. The input device may be a device or an apparatus that receives one or more types of input information, such as, a password keypad, an image acquisition device, a voice acquisition device, a biological characteristic acquisition device, a Bluetooth device, and an NFC device. In some embodiments, the input device and the user terminal may be the same device. The input device may receive various input information and send the various input information to the smart lock 130. The various input information may include, but is not limited to, text input information, image input information, voice input information, biological characteristic input information, network data input information, or the like.

In some embodiments, the smart lock control system 100 may also include a storage device. The storage device may store data (e.g., security control information) and/or instructions (e.g., unlocking/closing instructions, and alarming instructions). In some embodiments, the storage device may store the data obtained from the smart lock 130 and/or the user terminal 140. In some embodiments, the storage device may store information and/or instructions for execution or use by the server 110 to execute the exemplary method described in the present disclosure. In some embodiments, the storage device may include mass memory, removable memory, volatile read-write memory (e.g., random access memory (RAM)), read-only memory (ROM), or the like, or any combination thereof. In some embodiments, the storage device may be implemented on a cloud platform. For example, the cloud platform may include private cloud, public cloud, hybrid cloud, community cloud, distributed cloud, internal cloud, or the like, or any combination thereof.

In some embodiments, the storage device may be connected to the network 120 to communicate with one or more components (e.g., the server 110, the smart lock 130, the user terminal 140, etc.) of the smart lock control system 100. One or more components of the smart lock control system 100 may access the data or instructions stored in the storage device through the network 120. In some embodiments, the storage device may be directly connected to or communicate with one or more components (e.g., the server 110, the smart lock 130, and the user terminal 140) in the smart lock control system 100. In some embodiments, the storage device may be part of the server 110. In some embodiments, the server 110 may be arranged independently from the smart lock 130. In some embodiments, the server 110 may also be located in the smart lock 130.

Figure 2:
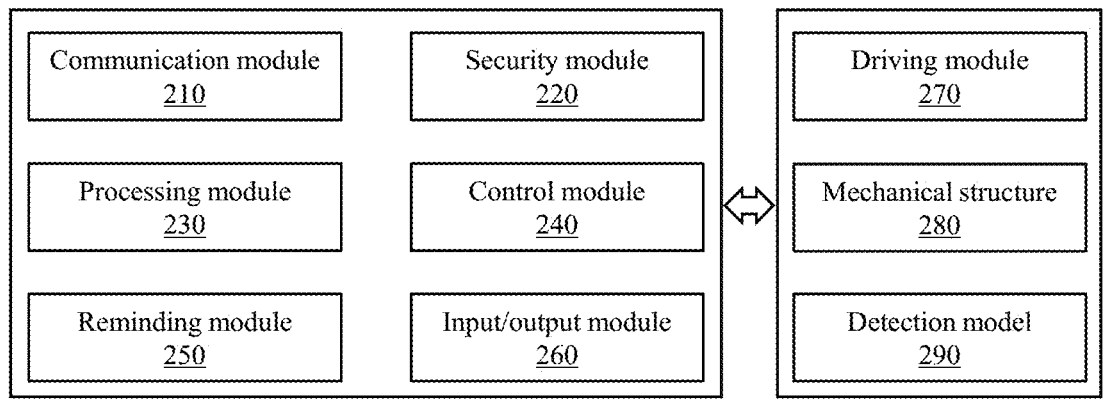
FIG. 2 is a schematic diagram illustrating exemplary hardware and/or software of a smart lock control device according to some embodiments of the present disclosure.

FIG. 2 is a schematic diagram illustrating exemplary hardware and/or software of a smart lock control device according to some embodiments of the present disclosure.

As shown in FIG. 2, a smart lock control device 200 may include a communication module 210, a security module 220, a processing module 230 (also referred to as a processor), a control module 240 (also referred to as a control unit), a reminding module 250, an input/output module 260, a driving module 270 (also referred to as an automatic locking unit), a mechanical structure 280, a detection module 290, or the like. It should be noted that the module, unit, and sub-unit mentioned in the present disclosure may be implemented by hardware, software, or a combination of software and hardware, wherein the hardware may be implemented by using circuits or structures composed of entity components, and the software may be implemented by storing operations corresponding to the module, unit, and sub-unit in a memory in a form of codes to be executed by appropriate hardware, such as a microprocessor. When the module, unit, and sub-unit mentioned herein execute their operations, if there is no special description, it may indicate that a software code containing the function may be executed, or hardware with the function may be used. At the same time, the module, unit, and sub-unit mentioned herein may not limit a structure of the corresponding hardware when corresponding to hardware, and the hardware that may realize the function is within the protection scope of the present disclosure. For example, different modules, units, and sub-units mentioned herein may correspond to the same hardware structure. As another example, the same module, unit, and sub-unit mentioned herein may also correspond to a plurality of independent hardware structures.

The communication module 210 may be used for information or data exchange. In some embodiments, the communication module 210 may be used for data transmission between various components (e.g., the security module 220, the processing module 230, the control module 240, the reminding module 250, the input/output module 260, the driving module 270, etc.) of the smart lock control device 200. For example, the reminding module 250 may send reminding information to the input/output module 260 through the communication module 210 for output. As another example, the control module 240 may send control information to the driving module 270 through the communication module 210 to perform corresponding operations. In some embodiments, the communication module 210 may also be used for data transmission between various components (e.g., the smart lock 130, the network 120, the control device, the input device, the storage device, and the server 110) of the smart lock control system 100. For example, the control device may send the operation instruction to the network 120 through the communication module 210. As another example, the smart lock 130 may obtain data or information (e.g., the operation instruction or operation information) from the network 120 through the communication module 210. In some embodiments, the communication module 210 may be used for obtaining security control information through a secure connection. For example, the communication module 210 may obtain the identity verification information sent by the server 110 from the network 120. The communication module 210 may adopt wired, wireless, and wired/wireless hybrid technologies. The wired technology may be based on one or a combination of various optical cables, such as metal cables, hybrid cables, and optical cables. The wireless technologies may include Bluetooth, wireless fidelity (Wi-Fi), ZigBee, Near Field Communication (NFC), Radio Frequency Identification (RFID), cellular networks (including GSM, CDMA, 3G, 4G, 5G, etc.), cellular-based Narrow Band Internet of Things (NBIoT), or the like. In some embodiments, the communication module 210 may adopt one or more encoding methods to encode transmitted information, for example, the encoding method may include phase encoding, non-return-to-zero codes, differential Manchester codes, or the like. In some embodiments, the communication module 210 may select different transmitting and encoding methods according to a type of data needing to be transmitted or a network type. In some embodiments, the communication module 210 may include one or more communication interfaces for different communication methods. In some embodiments, the various components (the smart lock 130, the network 120, the control device, the input device, the storage device, and the server 110) of the smart lock control system 100 may be scattered on multiple devices. In this case, each module may respectively include one or more communication modules 210 to transmit information between the modules. In some embodiments, the communication module 210 may include a receiver and a transmitter. In other embodiments, the communication module 210 may be a transceiver.

In some embodiments, units or modules having a function of receiving (obtaining) or sending information and/or data may be regarded as the communication module 210 or the sub-modules, for example, a first receiving module, a first sending unit, a first request sending unit, a first information obtaining unit, an information receiving unit, a broadcast sending unit, a wireless communication unit, or the like.

The security module 220 may be used for performing security processing (e.g., a data encryption, a data decryption, a security verification, etc.) on data. In some embodiments, the security module 220 may perform security processing on information or data in part of other modules (e.g., the communication module 210, the input/output module 260, etc.) in the smart lock control device 200. In some embodiments, the security module 220 may perform the security processing on data exchange of various components in the smart lock control system 100. For example, the security module 220 may encrypt data transmitted in the network 120 to improve data transmission security. In some embodiments, the security module 220 may be used for performing the security verification based on the security control information and the operation input. For example, the security module 220 may perform the security verification on the operation information and/or operation instruction in the smart lock control system 100 based on the security control information.

In some embodiments, units or modules with data encryption, data decryption, or security verification functions may all be considered as the security module 220 or the sub-modules, for example, an encryption unit, a decryption unit, a decryption module, an identity authentication module, or the like.

The processing module 230 may process data from various components (e.g., the communication module 210, the security module 220, the control module 240, the reminding module 250, the input/output module 260, etc.) of the smart lock control device 200. For example, the processing module 230 may process the security verification information from the security module 220. As another example, the processing module 230 may process the operation information or operation instruction from the input/output module 260. In some embodiments, the processed data may be stored in the memory or a hard disk. In some embodiments, the processing module 230 may transmit the processed data to one or more components of the smart lock control system 100 through the communication module 210 or the network 120. For example, the processing module 230 may send a determination result of the operation instruction to the control module 240, and the control module 240 may execute subsequent operations or instructions according to the determination result. For example, when the determination result of the operation instruction and/or operation information indicates that the operation instruction and/or operation information are passed, the control module 240 may send an instruction to the driving module 270 to control the smart lock 130 to perform unlocking. In some embodiments, the processing module 230 may be used for establishing a secure connection with the network. For example, the processing module 230 may establish the secure connection between the smart lock 130 the network 120. As another example, the processing module 230 may establish the secure connection between the server 110 and the network 120.

The control module 240 may be used for managing a data processing process and controlling a operation state of the device. The control module 240 may be associated with other modules in the smart lock control device 200. In some embodiments, the control module 240 may control the operation state of part of other modules (e.g., the communication module 210, the security module 220, the reminding module 250, the input/output module 260, the driving module 270, etc.) in the smart lock control device 200. For example, the control module 240 may control the driving module 270 to start or stop. As another example, the control module 240 may manage an obtaining or sending process of data in the communication module 210. As another example, the control module 240 may control the reminding module 250 to send out reminding information. In some embodiments, the control module 240 may be used for performing the corresponding operation based on the operation input when the security verification is passed. For example, the control module 240 may control the smart lock 130 to execute the unlocking operation after the identity verification of the user is passed.

In some embodiments, modules or units having functions of managing the data processing process and controlling the operation state of the device all may be regarded as the control module 240 or the sub-modules, for example, a switching unit, an executing module, or the like.

The reminding module 250 may be used for generating and sending reminding or warning information. The reminding module 250 may send the generated reminding or warning information to part of other modules (e.g., the input/output module 260, etc.) in the smart lock control device 200 through the communication module 210. The reminding module 250 may also send the generated reminding or warning information to each component in the smart lock control system 100. In some embodiments, exemplary warning manners may include a sound warning, a lamplight warning, a remote warning, or the like, or any combination thereof. For example, when the warning manner is the remote warning, the reminding module 250 may send the reminding information or warning information to the associated control device through the communication module 210, and the communication module 210 may also establish a communication (e.g., a voice communication, a video communication) between the smart lock 130 and the associated control device. In some embodiments, when the security verification result of the operation instruction and/or operation information indicates that the security verification is passed, the reminding module 250 may also send the reminding information to the control device through the communication module 210. For example, the reminding module 250 may send the reminding information related to successful identity verification to the control device.

The input/output module 260 may acquire, transmit, and send signals. Other modules in the smart lock control device 200 may be connected to or in communication with each other through the input/output module 260. The input/output module 260 may also be connected or in communication with other components in the smart lock control system 100. In some embodiments, the input/output module 260 may be used for obtaining the operation input (e.g., the operation instruction and/or operation information). In some embodiments, the input/output module 260 may be a module located in the site of the smart lock 130 for data input or output in the site of the smart lock 130. In some embodiments, a manner for performing data input from the site may include, but is not limited to: a touch input, a scan input, a voice input, a short-range communication input, or the like. For example, input data may be input through a keypad on the site. As another example, data may be input by scanning biological characteristics of the user. As another example, data may be input through a Bluetooth device or the like. In some embodiments, the input/output module 260 may perform data output on site through an output device (e.g., a display device, a microphone, etc.) on the smart lock 130. For example, the display device of the smart lock 130 may display information about whether the smart lock 130 performs unlocking successfully or not. In some embodiments, the input/output module 260 may also be a remote module for remotely inputting or outputting data through the network 120. For example, the input/output module 260 may obtain data (e.g., the operation instruction) from a remote device (e.g., the control device, and the server 110) through the network 120, and transmit the obtained data to other modules in the smart lock control device 200 through the communication module 210. As another example, the input/output module 260 may output a control result of the control module 240 to the remote device (e.g., the control device). The input/output module 260 may be a wired USB interface, a serial communication interface, a parallel communication port, or wireless Bluetooth, infrared, radio-frequency identification (RFID), a wireless local area network (Wlan) authentication and privacy infrastructure (WAPI), a General Packet Radio Service (GPRS), Code Division Multiple Access (CDMA), or the like, or any combination thereof. In some embodiments, the input/output module 260 may include VCC, GND, RS-232, RS-485 (e.g., RS485-A, and RS485-B), a general network interface, or the like, or any combination thereof. In some embodiments, the input/output module 260 may transmit the obtained operation information to the security module 220 via the network 120. In some embodiments, the input/output module 260 may use one or more encoding methods to encode the transmitted signal. The encoding method may include phase encoding, non-return-to-zero codes, differential Manchester codes, or the like, or any combination thereof.

The driving module 270 may be used for driving the mechanical structure 280 to execute corresponding actions or operations. The driving module 270 may operate under the control of the control module 240. In some embodiments, the driving module 270 may include one or more driving force sources. In some embodiments, the driving force source may include a driving motor driven by electric power. In some embodiments, the driving motor may be one or a combination of a DC motor, an AC induction motor, a permanent magnet motor, a switch reluctance motor, or the like. In some embodiments, the driving module 270 may include one or more driving motors. The driving force source of the driving module 270 may be correspondingly configured according to content of an electrical signal (e.g., the driving motor in the driving module 270 correspondingly rotates at a specific rotating speed per minute for a specific time), and rotation of the driving motor may drive a change of a state (e.g., unlocking, locking, or starting) of the mechanical structure 280 connected to the driving motor.

The mechanical structure 280 may be used for executing actions or operations. The mechanical structure 280 may be connected to the driving module 270 and execute actions or operations under the driving force of the driving module 270. In some embodiments, the mechanical structure 280 may be a lock structure in the smart lock 130, and the driving module 270 may drive the mechanical structure 280 to execute the unlocking or locking operation.

The detection module 290 may be used for detecting working states of other modules. The detection module 290 may include various sensors, and the various sensors may include, but are not limited to, a force sensor, an infrared sensor, a visible light sensor, a displacement sensor, an acoustic sensor, a time sensor, or the like. For example, the detection module 290 may include a spring bolt detection sensor, and the spring bolt detection sensor may detect a position of a spring bolt so as to determine whether the smart lock is in an unlocking state or a locking state. As another example, the detection module 290 may include a noise sensor, and the noise sensor may determine whether the smart door lock is in the unlocking state or the locking state by detecting an unlocking noise signal. As another example, the detection module 290 may detect unlocking time or locking time of the smart lock, and send time information to the control module 240 to determine whether the smart door lock needs to be automatically locked. In some embodiments, the detection module 290 may be connected to the mechanical structure 280 to detect the working state of the mechanical structure 280 (e.g., the unlocking state, the locking state, etc.). In some embodiments, the detection module 290 may be connected to the driving module 270 to detect the working state of the driving module 270 (e.g., whether the driving module 270 is started, etc.). In some embodiments, the detection module 290 may send detection information to the control module 240 through the communication module 210. In some embodiments, the detection module 290 may also record a working state of a module to be detected, and send recorded information to other modules (e.g., the control module 240) through the communication module 210. In the present disclosure, a third-party device with a detection function may also be regarded as a detection module, and the detection information may be transmitted to other modules through the communication module 210. The third-party device with the detection function may be a video detection device, an ultrasonic detection device, or the like.

In some embodiments, modules or units with a function of detecting the working states of other modules all may be considered as the detection module 290 or the sub-modules, for example, a state detection unit, a security detection unit, an unlocking operation detection unit, or the like.

It should be noted that the smart lock control device 200 may also include other modules for maintaining the operation, for example, a power supply module used for providing electric power for other modules (e.g., the communication module 210, the security module 220, the processing module 230, the control module 240, the reminding module 250, the input/output module 260, the driving module 270, the mechanical structure 280, and the detection module 290) in the smart lock control device 200, which may not be repeated herein.

It should be noted that each module in the smart lock control device 200 may be applied to each module in the smart lock control system 100. For example, the control module 240 may be a functional module in the server 110, also a functional module in the control device, or a functional module in the smart lock 130. As another example, the security module 220 may be implemented in the server 110, the control device, and/or the smart lock 130.

It should be understood that the system and the modules shown in FIG. 2 may be implemented in various manners. For example, in some embodiments, the system and the modules may be implemented by hardware, software, or a combination of software and hardware, wherein a hardware part may be implemented by using special logic, and a software part may be stored in the memory and executed by an appropriate instruction executing system, such as the microprocessor or specially designed hardware. Those skilled in the art may understand that the above-mentioned methods and systems may be implemented by using computer-executable instructions and/or by being included in processor control codes, for example, on a carrier medium such as a magnetic disk, CD or DVD-ROM, a programmable memory such as a read-only memory (firmware) or a data carrier such as an optical or electronic signal carrier, such codes may be provided. The system and the modules of one or more embodiments of the disclosure not only may be implemented by hardware circuits such as super-large-scale integrated circuits or gate arrays, semiconductors such as logic chips, and transistors, or programmable hardware devices such as field programmable gate arrays, and programmable logic devices, but also may be implemented by software executed by various types of processors, or may also be implemented by a combination of the above hardware circuit and software (e.g., firmware).

It should be noted that the above description of the smart lock control device 200 and the modules may be only for convenience of description, which does not limit one or more embodiments of the present disclosure within the scope of the embodiments. It may be understood that for those skilled in the art, after understanding the principles of the system, various modules may be arbitrarily combined, or subsystems may be formed to connect with other modules without departing from the principles, or one or more of the modules may be omitted. In some embodiments, the reminding module 250 in FIG. 2 may be omitted. For example, the smart lock control device 200 may only perform operations in a site device without sending the reminding information. In some embodiments, the driving module 270 and the detection module 290 may be one module, and the module may have a function of detecting and driving the mechanical structure 280. Such deformations are all within the protection scope of one or more embodiments of the present disclosure.

Figure 3:
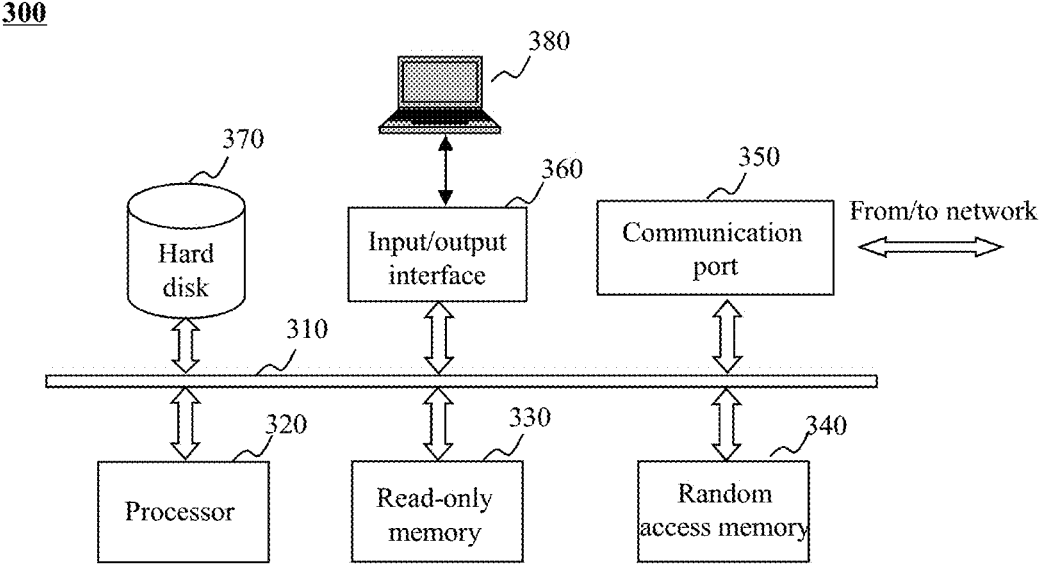
FIG. 3 is a schematic diagram illustrating exemplary hardware and/or software of a computing device according to some embodiments of the present disclosure.

FIG. 3 is a schematic diagram illustrating exemplary hardware and/or software of a computing device according to some embodiments of the present disclosure. In some embodiments, the server 110 and/or the user terminal 140 may be implemented on a computing device 300. For example, the processing device may implement and execute functions of the processing device disclosed in the present disclosure on the computing device 300. As shown in FIG. 3, the computing device 300 may include an internal communication bus 310, a processor 320, a read-only memory 330, a random access memory 340, a communication port 350, an input/output interface 360, a hard disk 370, and a user interface 380.

The internal communication bus 310 may implement data communication between various components in the computing device 300. For example, the processor 320 may send data to other hardware such as the memory or the input/output port 360 through the internal communication bus 310. In some embodiments, the internal communication bus 310 may be an industry standard (ISA) bus, an extended industry standard (EISA) bus, a video electronics standard (VESA) bus, a peripheral component interconnection standard (PCI) bus, or the like. In some embodiments, the internal communication bus 310 may be used for connecting various modules (e.g., the detection module 290, the processing module 230, the control module 240, the communication module 210, the input/output module 260, and the driving module 270) in the smart lock control system 100 shown in FIG. 1.

The processor 320 may execute a computing instruction (program code) and execute the functions of the smart lock control system 100 described in the present disclosure. The computing instruction may include programs, objects, components, data structures, processes, modules, and functions (the functions refer to specific functions described in the present application). For example, the processor 320 may process the operation input (e.g., the operation instruction and/or operation information) obtained from the smart lock 130 or/or the user terminal 140 of the smart lock control system 100, and perform the security verification according to the operation input to determine whether to perform corresponding operations (e.g., the unlocking operation, the locking operation, or the reminding operation) on the smart lock 130. In some embodiments, the processor 320 may include a microcontroller, a microprocessor, a reduced instruction set computer (RISC), an application specific integrated circuit (ASIC), an application specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device and any circuit, processor, or the like, that may perform one or more functions, or any combination thereof. For illustration only, only one processor may be described for the computing device 300 in FIG. 3, but it should be noted that the computing device 300 in the present disclosure may also include a plurality of processors.

A memory (e.g., the read only memory (ROM) 330, the random access memory (RAM) 340, the hard disk 370, etc.) of the computing device 300 may store data/information obtained from any other components of the smart lock control system 100. In some embodiments, the memory of the computing device 300 may be located in the smart lock 130 or in the server 110. Exemplary ROMs may include mask ROM (MROM), programmable ROM (PROM), erasable programmable ROM (PEROM), electrically erasable programmable ROM (EEPROM), compact disk ROM (CD-ROM), digital Universal disk ROM, or the like. Exemplary RAM may include dynamic RAM (DRAM), double rate synchronous dynamic RAM (DDR SDRAM), static RAM (SRAM), thyristor RAM (T-RAM), zero capacitance (Z-RAM), or the like.

The input/output interface 360 may be used for inputting or outputting signals, data or information. In some embodiments, the input/output interface 360 may enable the user to interact with the smart lock control system 100. For example, the input/output interface 360 may include the communication module 210 to realize a function of the smart lock control system 100 100 to obtain security control information. In some embodiments, the input/output interface 360 may include an input device and an output device. Exemplary input devices may include a keypad, a mouse, a touch screen, a microphone, or the like, or any combination thereof. Exemplary output devices may include a display device, a speaker, a printer, a projector, or the like, or any combination thereof. Exemplary display devices may include a liquid crystal display (LCD), a light emitting diode (LED)-based display, a flat panel display, a curved display, a television, a cathode ray tube (CRT), or the like, or any combination thereof. The communication port 350 may be connected to a network for data communication. The connection may be a wired connection, a wireless connection, or a combination thereof. Wired connections may include a cable, an optical cable, a telephone line, or the like, or any combination thereof. The wireless connection may include Bluetooth, Wi-Fi, WiMax, WLAN, ZigBee, mobile networks (e.g., 3G, 4G, or 5G, etc.), or the like, or any combination thereof. In some embodiments, the communication port 350 may be a standardized port, such as RS232, RS485, or the like. In some embodiments, the communication port 350 may be a specially designed port.

The hard disk 370 may be used for storing information and data generated by the server 110 or received from the server 110. For example, the hard disk 370 may store the operation input of the user. In some embodiments, the hard disk 370 may include a mechanical hard disk (HDD), a solid state disk (SSD), or a hybrid hard disk (HHD), or the like. In some embodiments, the hard disk 370 may be arranged in the server 110 or the smart lock 130. The user interface 380 can implement interaction and information exchange between the computing device 300 and the user. In some embodiments, the user interface 380 may be used for presenting the information and data generated by the smart lock control system 100 to the user. For example, the user interface 380 may display the security verification result (e.g., security verification being passed, and security verification being failed) of the smart lock control system 100 to the user. In some embodiments, the user interface 380 may include a physical display, such as a display with a loudspeaker, an LCD display, an LED display, an OLED display, and an electronic ink display (E-Ink).

Figure 4:
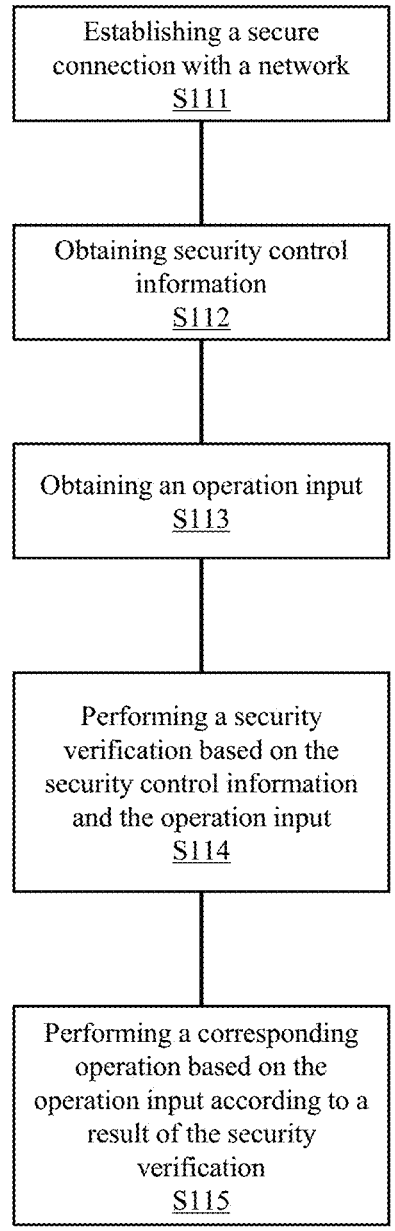
FIG. 4 is a flowchart illustrating an exemplary process for controlling a smart lock according to some embodiments of the present disclosure.

FIG. 4 is a flowchart illustrating an exemplary process for controlling a smart lock according to some embodiments of the present disclosure.

As shown in FIG. 4, in some embodiments, a process 400 may include following steps:

Step S111: a secure connection may be established with the network 120. In some embodiments, step S111 may be implemented by the processing module 230.

The secure connection may be a data channel that may ensure safe transmission of data, for example, an encrypted data transmission, a Hypertext Transfer Protocol over Secure Socket Layer (HTTPS), a Virtual Private Network (VPN), or the like. In some embodiments, the processing module 230 may establish the secure connection between the network 120 and other components (e.g., the server 110, the smart lock 130, etc.) in the smart lock control system 100.

In some embodiments, the processing module 230 may establish the secure connection between the smart lock 130 and the network 120. In some embodiments, the smart lock 130 may obtain an encryption key, transmit data in an encrypted manner based on the encryption key during network transmission, and therefore establish the secure connection. In some embodiments, the smart lock 130 may obtain the encryption key through the network 120. In some embodiments, the smart lock 130 may obtain a preset encryption key from a local storage, or may also obtain the preset encryption key from a network storage device or other storage devices connected to the smart lock 130.

In some embodiments, through the secure connection, the smart lock 130 may securely transmit data with one or more of the control device, the storage device, and the server 110.

More specific embodiments regarding the establishing the secure connection may be found elsewhere in the present disclosure. See, e.g., FIG. 5 and the description thereof.

Step S112: security control information may be obtained. In some embodiments, step S112 may be implemented by the communication module 210.

The security control information may refer to information that may perform security control on the operation of the smart lock 130. The security control information may be encrypted verification information such as numeric passwords, biological characteristic information, Bluetooth keys, NFC passwords, or the like, encrypted by an encryption algorithm. In some embodiments, after the smart lock 130 establishes the secure connection with the network 120, the security control information may be obtained from the network 120 through the communication module 210. In some embodiments, the smart lock 130 may also obtain the security control information locally through the communication module 210.

In some embodiments, the smart lock 130 may obtain user identity information from the security control information, verify the user identity, and determine whether to perform the operation required in the operation instruction sent by the user through the control device.

In some embodiments, the smart lock 130 may obtain second verification information from the security control information, and perform security verification under a preset condition on the second verification information and the operation information to determine whether the security verification of the operation information is passed. More description regarding the second verification information may be found elsewhere in the present disclosure. See, e.g., FIG. 36 and the relevant description thereof.

More description regarding obtaining the security control information may be found elsewhere in the present disclosure. See, e.g., FIG. 35 and the relevant description thereof.

Step S113: an operation input may be obtained. In some embodiments, step S113 may be implemented by the input/output module 260.

The operation input may be information or instructions input by the user when performing an operation in the smart lock control system 100. In some embodiments, the operation input may include operation instructions and operation information. The operation instruction may be instruction information for controlling the smart lock 130 to perform corresponding operations, for example, an unlocking instruction, a locking instruction, an unlocking detection instruction, or the like. The operation instruction may also be instruction information for setting the smart lock 130, for example, setting a state of the smart lock 130, starting or forbidding certain functions. The operation information may be related input information required by the smart lock 130 to perform the corresponding operation, for example, unlocking password information, preset password information, or the like. In some embodiments, the user may perform the operation input on the components (e.g., the control device, the input device, etc.) in the smart lock control system 100 through the input/output module 260.

In some embodiments, the user may input the operation instruction in the control device. In some embodiments, a manner for the user to input the operation instruction may include, but is not limited to, a touch input, a biological characteristic input, a keypad input, or the like. In some embodiments, the operation instruction may be encrypted through the network 120 and then transmitted to the smart lock 130 securely.

In some embodiments, the user may input the operation information in the input device, and the smart lock 130 may directly obtain the operation information input by the user from the input device. The manner for the user to input the operation information may include, but is not limited to, a touch input, a biological characteristic input, a keypad input, or the like. In some embodiments, the operation information may include encrypted input information. In some embodiments, the input device may encrypt the input information of the user. In some embodiments, the operation information may include first verification information including a plurality of characters. More description regarding the first verification information may be found elsewhere in the present disclosure. See, e.g., FIG. 36 and the relevant description thereof.

Step S114: a security verification may be performed based on the security control information and the operation input. In some embodiments, step S114 may be implemented by the security module 220.

The security verification may be a verification performed to improve the security of the smart lock 130 when performing corresponding operations such as an identity verification, a timeliness verification, a permission verification, or the like.

In some embodiments, the security module 220 may perform the security verification based on an encrypted operation input (e.g., the operation instruction and/or operation information) and the security control information. In some embodiments, the security module 220 may perform the security verification based on the first verification information of the operation information and the second verification information of the security control information. In some embodiments, the security module 220 may determine whether to perform the corresponding operation based on a result of the security verification.

More description regarding performing the security verification on the operation instruction and/or operation information may be found elsewhere in the present disclosure. See, e.g., FIG. 27 and the relevant description thereof.

Step S115: a corresponding operation may be performed based on the operation input according to the result of the security verification. In some embodiments, step S115 may be implemented by the control module 240.

The corresponding operation may refer to an operation performed by the smart lock 130 corresponding to the result of the security verification. The corresponding operation performed by the smart lock 130 may include, but is not limited to, an unlocking operation, a locking operation, an unlocking detection operation, or the like.

In some embodiments, when the security verification is passed, the control module 240 may control the smart lock 130 to perform the unlocking operation. In some embodiments, the smart lock 130 may detect a target unlocking operation, and the control module 240 may control the smart lock 130 to record and report the unlocking operation information, and perform an automatic locking operation. The target unlocking operation may be an unlocking operation of a specific user determined based on the user identity verification information, or may be an unlocking operation that satisfies other preset conditions.

More description regarding the performing the corresponding operation based on the operation instruction according to the result of the security verification may be found elsewhere in the present disclosure. See, e.g., FIG. 27 and the relevant description thereof.

In some embodiments, the method for controlling the smart lock may further include that the smart lock 130 may establish a binding relationship with the control device.

The binding relationship may be to establish a corresponding relationship between at least two devices or apparatuses, such that certain information transmission or operation such as a Bluetooth pairing, an MAC address binding, etc. may only be performed between corresponding devices or apparatuses.

The smart lock 130 and/or the control device may obtain device information of a device of the other party, and send a device binding request carrying the device information of the other party, thereby establishing the binding relationship.

The smart lock 130 may receive the operation instruction or information sent by the control device that has established the binding relationship, and perform the corresponding operation.

More description regarding establishing the binding relationship may be found elsewhere in the present disclosure. See, e.g., FIG. 14 and the relevant description thereof.

It should be noted that the foregoing description of the process 400 is only for examples and descriptions, which does not limit the scope of the present disclosure. For those skilled in the art, various modifications and changes may be made to the process 400 under the guidance of the description. However, these modifications and changes are still within the scope of the present disclosure. In some embodiments, step S111 may be omitted, that is, the smart lock control device 200 may work in an offline state and obtain the security control information locally. In some embodiments, sequences of step S112 and step S113 may be interchanged. In some embodiments, step S112 and step S113 may also be performed at the same time.

In some embodiments, the processing module 230 may establish the secure connection with the network 120, which reduces the probability that a network key is cracked and improves security of wireless communication. In general, in order to ensure the security of wireless communication, the network 120 may transmit an encryption key to the smart lock. Since the encryption key sent by the network 120 to all smart locks is the same, all the smart locks in the network may also use the encryption key to encrypt data, which may lead to a problem of communication security. In order to improve the communication security, the network 120 may perform a calculation on characteristic information of the smart lock sent by the smart lock 130 to obtain a calculated value (such as a Hash value) of the characteristic information of the smart lock, and then use the calculated value to encrypt an original network key to obtain an encrypted key, and the encrypted key may be sent to the smart lock. Since the network 120 uses the calculated value of the characteristic information of the smart lock to encrypt the original network key, and the calculated value is obtained by performing the calculation on the characteristic information of the smart lock, only the corresponding smart lock 130 may understand a decryption method of the encrypted key, such that the encrypted key may not be captured by a packet capturer or cracked, which improves the security of wireless communication.

Figure 5:
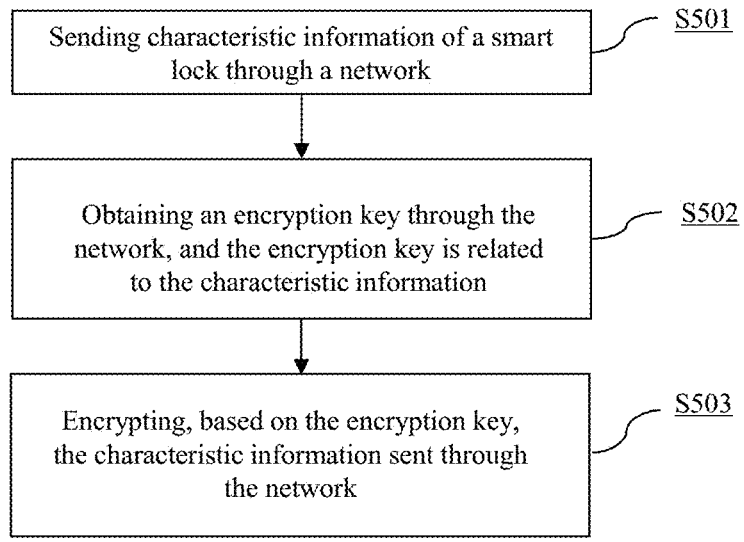
FIG. 5 is a flowchart illustrating an exemplary process 500 for controlling a smart lock according to some embodiments of the present disclosure.

Some embodiments of the present disclosure provide a method for controlling a smart lock to establish the secure connection between a smart lock and a network. FIG. 5 is a flowchart illustrating an exemplary process 500 for controlling a smart lock according to some embodiments of the present disclosure.

As shown in FIG. 5, in some embodiments, the processing module 230 may establish the secure connection with the network according to the following steps:

S501: characteristic information of the smart lock may be sent through the network. The step may be implemented by the processing module 230. The characteristic information may be information such as an installation code, an MAC address, a serial number, etc. that is specific to the smart lock and represent an identity of the smart lock.

In some embodiments, the processing module 230 may send characteristic information including one or more of the installation code, the MAC address, or the like of the smart lock through the network 120. In some embodiments, the smart lock may send the installation code and the MAC address of the smart lock to a smart phone through the network. More description regarding sending the characteristic information may be found elsewhere in the present disclosure. See, e.g., S601 and S602 in FIG. 6 and the description thereof.

S502: an encryption key may be obtained through the network, and the encryption key may be related to the characteristic information. The processing module 230 may obtain the encryption key through the network 120, the encryption key may be obtained by encrypting an original network key, and the encryption key may be a calculated value based on the characteristic information of the smart lock, for example, a Hash value of the characteristic information of the smart lock.

In some embodiments, the smart phone may use an encryption algorithm to encrypt the original key. A key used for encryption may be the Hash value of the installation code of the smart lock, and the smart lock may receive the encryption key sent by the smart phone through the network. More description regarding obtaining the encryption key may be found elsewhere in the present disclosure. See, e.g., S603 in FIG. 6 and the description thereof.

S503: an encryption operation may be performed, based on the encryption key, on the characteristic information sent through the network. The control module 230 may use the original network key to encrypt the characteristic information sent through the network. The original network key may be obtained by decrypting the encryption key. A decrypted key may be a calculated value based on the characteristic information of the smart lock, for example, the Hash value of the characteristic information of the smart lock.

In some embodiments, the smart lock may decrypt the encryption key to obtain the original network key, use the original network key to encrypt the serial number of the smart device, and send the encrypted serial number to the smart phone through the network. More description regarding decrypting the encryption key may be found elsewhere in the present disclosure. See, e.g., S604 in FIG. 6 and the description thereof.

Figure 6:
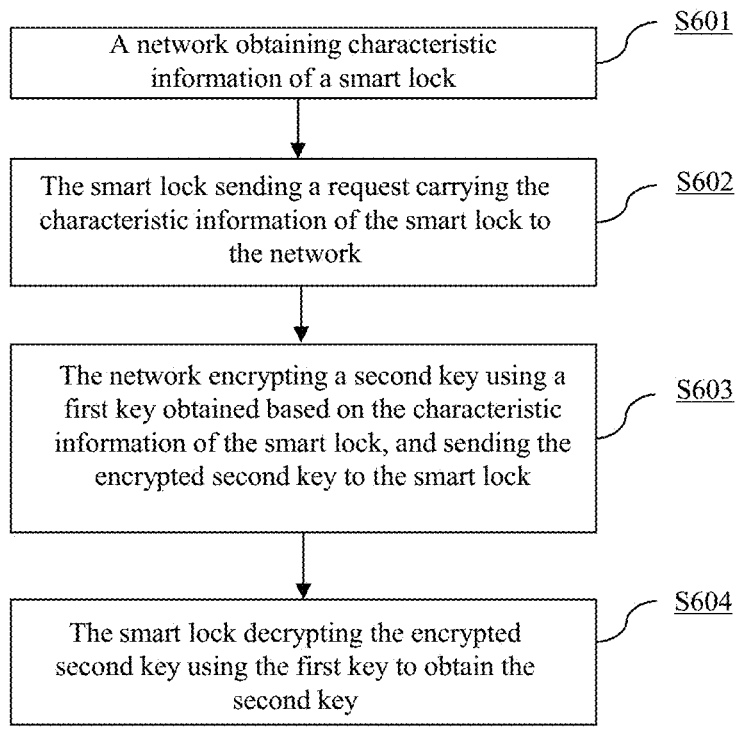
FIG. 6 is a flowchart illustrating an exemplary process for a secure communication according to some embodiments of the present disclosure.

FIG. 6 is a flowchart illustrating an exemplary process for a secure communication according to some embodiments of the present disclosure.

The smart lock may be the smart lock 130, and the network may also be the network 120. A secure connection may be established between the smart lock 130 and the network 120. In some embodiments, the network 120 may receive a network access request of the smart lock 130. According to address information of the smart lock 130, the encryption key corresponding to the smart device may be sent to the smart lock 130, and a network address may be allocated to the smart lock 130. The encryption key corresponding to the smart lock 130 may be obtained by the network 120 by encrypting the original network key using the calculated value of the characteristic information of the smart lock 130. And the calculated value may be obtained by the network 120 by performing a calculation on the characteristic information of the smart lock 130 sent by the smart lock 130. In some embodiments, the network 120 may be a gateway.

As shown in FIG. 6, some embodiments of the present disclosure provide a process 600 for a secure communication including the following steps:

Step S601: a network may obtain characteristic information of a smart lock. The network may be a gateway, and the smart lock may be the smart lock 130. In some embodiments, the smart lock 130 may send characteristic information of the smart lock 130 to the gateway. The characteristic information of the smart lock 130 may be an installation code, an MAC address, etc. specific to the smart lock 130.

Step S602: the smart lock may send a request carrying the characteristic information of the smart lock to the network. For example, the smart lock 130 may send a request carrying the characteristic information of the smart lock 130 to the gateway. In some embodiments, the smart lock 130 may send a network access request carrying the MAC address of the smart lock 130 to the gateway.

Step S603: the network may encrypt a second key using a first key obtained based on the characteristic information of the smart lock, and send the encrypted second key to the smart lock. The first key may be a key obtained by performing a calculation on the characteristic information of the smart lock 130, and the second key may be an original network key. In some embodiments, the gateway may also allocate a network address to the smart lock 130 when sending the encrypted second key to the smart lock 130. In some embodiments, the gateway may use a result of processing based on one or more characteristic information of the smart lock 130 as the first key, for example, obtain a Hash value of the installation code of the smart lock 130 using a Hash algorithm, and use the Hash value as the first key to encrypt the original network key. In some embodiments, the original network key may be allocated by the gateway or obtained by the gateway from other places.

Step S604, the smart lock may decrypt the encrypted second key using the first key to obtain the second key. In some embodiments, the smart lock 130 may use the first key obtained by performing the calculation based on the characteristic information of the smart lock 130 to decrypt the encrypted second key received from the gateway, and then obtain the original network key. For example, the smart lock 130 may use the Hash algorithm to calculate the Hash value of the installation code of the smart lock 130, and use the Hash value as a decryption key (that is, the first key) to decrypt the encrypted second key. In some embodiments, after the smart lock 130 obtains the corresponding original network key, the smart lock 130 may use the original network key as an encryption key to encrypt communication data sent to the gateway to realize the secure communication.

Figure 7:
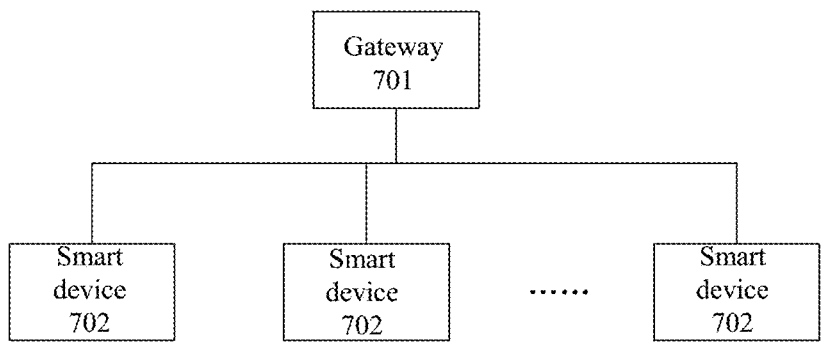
FIG. 7 is a schematic diagram of illustrating an exemplary system according to some embodiments of the present disclosure.

FIG. 7 is a schematic diagram of illustrating an exemplary system according to some embodiments of the present disclosure.

As shown in FIG. 7, an embodiment of the present disclosure discloses a secure communication system 700, including: a gateway 701 and a smart device 702. The gateway 701 and the smart device 702 may be connected in wireless communication manner. The smart device 702 may be an electronic device with a communication function, such as a computer, a mobile phone, or a smart door lock.

In the description of the figure, the network may include the gateway 701, and the smart lock may be the smart device 702. The embodiment may illustrate sending characteristic information of the smart lock through the network and obtaining an encryption key through the network, and the encryption key may be related to the characteristic information.

In the secure communication system 700 provided by the embodiment of the present disclosure, after the smart device 702 sends a network access request to the gateway 701, the gateway 701 may send an encrypted network key corresponding to the smart device 702 to the smart device 702, and allocate a network address for the smart device 702. The encrypted network key corresponding to the smart device 702 may be obtained by encrypting an original network key using a Hash value corresponding to the smart device 702. The Hash value corresponding to the smart device 702 may be obtained by performing a Hash calculation according to installation code information specific to the smart device 702. Therefore, after receiving the encrypted network key, the smart device 702 may perform the Hash calculation according to the installation code information specific to the smart device 702 to obtain the Hash value corresponding to the smart device 702. The smart device 702 may further decrypt the encrypted network key using the Hash value to successfully receive the network key sent by the gateway 701.

In the secure communication system 700 provided by the present disclosure, the encrypted network key sent by the gateway 701 may be obtained by the gateway 701 by encrypting the original network key using the Hash value corresponding to the smart device 702, and the Hash value corresponding to the smart device 702 may be obtained by the gateway 701 by performing the Hash calculation on the installation code information specific to the smart device 702 sent by the smart device 702. In such cases, only the gateway 701 and the smart device 702 may know the Hash value used for decrypting the encrypted network key, which may be difficult to be captured and cracked by a packet grabber, thereby improving security of the secure communication system 700.

Specifically, the process for the secure communication may be described below according to several embodiments, respectively.

Figure 8:
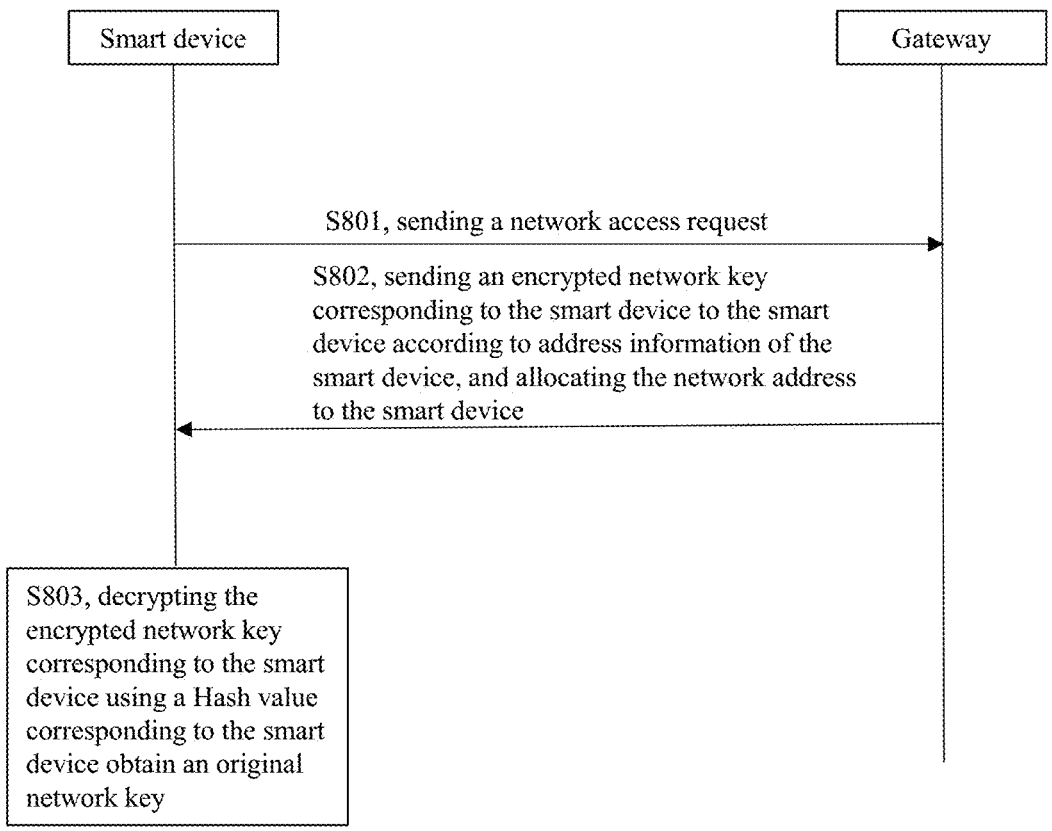
FIG. 8 is a flowchart illustrating an exemplary process for a secure communication according to some embodiments of the present disclosure.

FIG. 8 is a flowchart illustrating an exemplary process for secure communication according to some embodiments of the present disclosure.

As shown in FIG. 8, the embodiment of the present disclosure discloses a process for the secure communication, which includes the following steps.

In the description of the figure, the network may include a gateway, and the smart lock may be a smart device. The embodiment may illustrate the obtaining of an encryption key through the network, and the encryption key may be related to the characteristic information.

S801: the smart device may send a network access request to the gateway.

The network access request of the smart device may carry address information of the smart device. The address information of the smart device may refer to Media Access Control (MAC) address information of the smart device. An MAC address may be used for describing a position of the smart device in the network. The MAC address may be unique, that is, an MAC address of each smart device may be unique in the network, and the MAC address may be regarded as an identification of the smart device. The network access request sent by the smart device to the gateway through a wireless channel may carry the address information of the smart device such that the gateway may query, according to the address information of the smart device, whether the smart device has permission to access the network. If the smart device has the permission to access the network, the gateway may perform an operation such as allocating a network address to the smart device.

It should be noted that step S801 may also be regarded as that the gateway may receive the network access request of the smart device.

S802: the gateway may send an encrypted network key corresponding to the smart device to the smart device according to the address information of the smart device, and allocate the network address to the smart device The encrypted network key corresponding to the smart device may be obtained by the gateway by encrypting an original network key using a Hash value corresponding to the smart device. The Hash value corresponding to the smart device may be obtained by the gateway by performing a Hash calculation on installation code information specific to the smart device sent by the smart device.

The original network key may refer to a key that has not been encrypted. The original network key may be generated by the gateway. The gateway may send the original network key to the smart device, and the smart device may use the original network key to encrypt a data packet to be sent. Then the gateway may use the original network key to perform decryption so as to realize the secure communication between the gateway and the smart device.

The encrypted network key corresponding to the smart device may be obtained by the gateway according to the address information sent by the smart device and the installation code information specific to the smart device after the gateway and the smart device are bound. Since the installation code information of the smart device is specific to the smart device, the Hash value obtained by performing calculation on the installation code information may also be specific to the smart device. The Hash value corresponding to the smart device may only be obtained by the smart device by performing the Hash calculation on the installation code information. Therefore, in the network, the Hash value corresponding to the smart device may be only known by the gateway and the smart device, and other devices in the network may not know the Hash value corresponding to the smart device.

According to the address information of the smart device, the gateway may determine whether the smart device has a network access permission, that is, the gateway may determine whether the MAC address of the smart device is legal and whether the smart device has been bound with the gateway. If the smart device has been bound with the gateway, the gateway may obtain the encrypted network key corresponding to the smart device according to the address information of the smart device, send the encrypted network key corresponding to the smart device to the smart device, and allocate a network address to the smart device. The encrypted network key may be obtained using the Hash value corresponding to the smart device, and only the smart device and the gateway may have a Hash value capable of decryption. In such cases, when the gateway executes step S802, even if the encrypted network key corresponding to the smart device is captured by a packet capturer in a transmission process, the encrypted network key may not be cracked because there is no Hash value required for decryption, which may improve the security of communication between the gateway and the smart device.

It should be noted that the execution sequence in which the gateway sends the network key corresponding to the smart device to the smart device and the gateway allocates the network address to the smart device may not affect the implementation of the embodiment of the present disclosure, and step S802 may also be regarded as that the smart device receives the encrypted network key corresponding to the smart device sent by the gateway, and obtains the network address allocated by the gateway.

Figure 9:
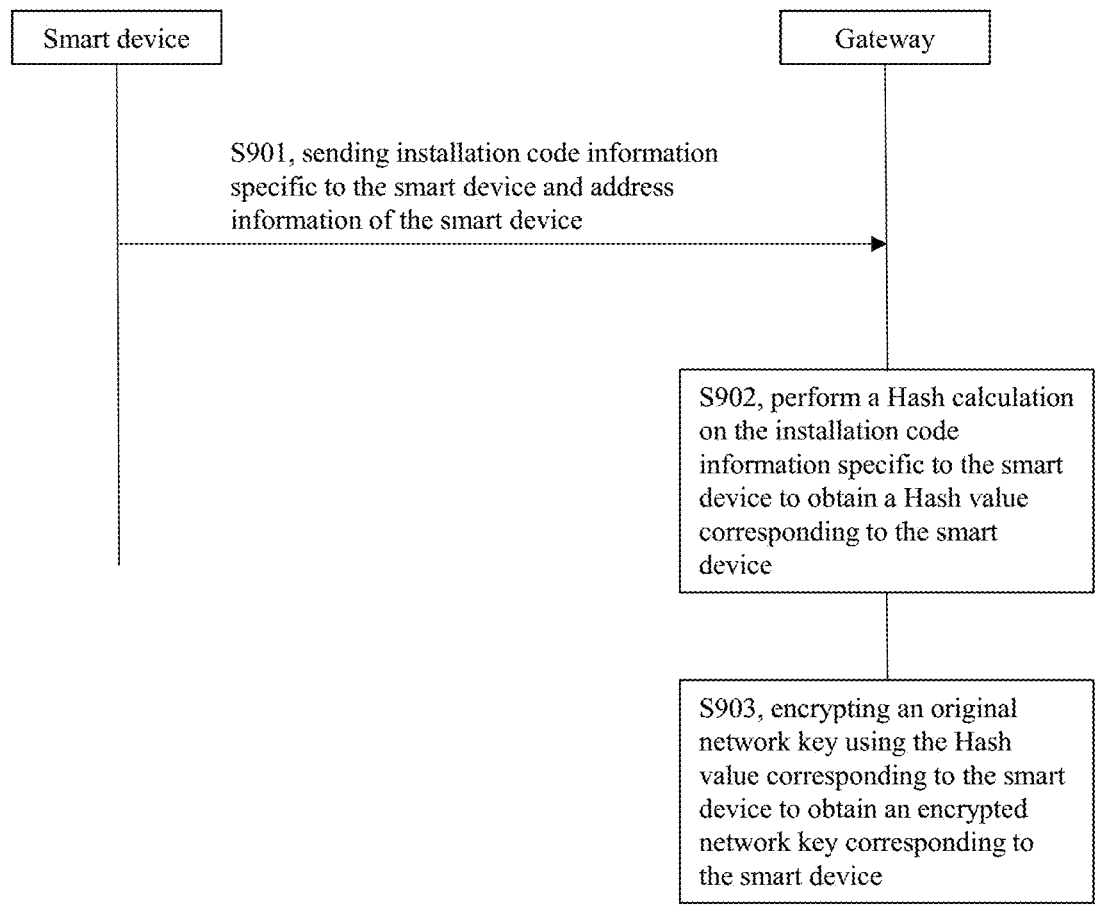
FIG. 9 is a flowchart illustrating another exemplary process for a secure communication according to some embodiments of the present disclosure.

FIG. 9 is a flowchart illustrating another exemplary process for secure communication according to some embodiments of the present disclosure.

In the description of the figure, the network may include a gateway, and the smart lock may be called a smart device. The embodiment may illustrate the sending of characteristic information of the smart lock through the network.

In some embodiments, as shown in FIG. 9, in a specific embodiment of the present disclosure, a process for the gateway to obtain an encrypted network key corresponding to the smart device may include:

S901: the smart device may send installation code information specific to the smart device and address information of the smart device to the gateway.

The installation code information specific to the smart device may refer to installation code information with a certain count of bytes stored inside the smart device. The installation code information may be unique, that is, the installation code information stored in each smart device may be unique and not repeated, and the installation code information of the smart device may not be known by smart devices in other networks except for the smart device.

In some embodiments, the installation code information may be written into an internal storage by a manufacturer when the device leaves the factory. In some embodiments, the installation code information may be generated by the device according to specific conditions when the user uses the installation code information for the first time, for example, using a serial number or an MAC address of the device, and in combination with current time, the installation code information may be generated using a preset algorithm, and written into the internal storage of the smart device.

In some embodiments, in a specific embodiment of the present disclosure, an implementation manner of performing step S901 may include:

The smart device may send the installation code information specific to the smart device and the address information of the smart device to the gateway in an out-of-band manner.

The network access permission of the gateway may be usually closed. After receiving the installation code information specific to the smart device and the address information of the smart device sent by the smart device, or obtaining installation code information specific to a new smart device and the address information of the smart device in other ways (e.g., obtaining from a database of the manufacturer), the network access permission may be opened, and then the smart device may send a network access request to access the network.

The out-of-band manner may refer to achieving communication using different protocols and different communication channels, instead of an established communication channel of the smart device and the gateway. The smart device may use the out-of-band manner to transmit the installation code information specific to the smart device and the address information of the smart device to the gateway, which may be more secure, and interference received in the transmission process may be lower.

In some embodiments, information such as the installation code information and the MAC address of the smart device may be pre-stored in a database, for example, the database of the manufacturer. The gateway may periodically send a request to obtain an installation code of the new smart device and the address information of the smart device from the database.

In some embodiments, the network access permission of the gateway may be usually closed. After receiving the installation code information specific to the smart device and the address information of the smart device sent by the smart device, or obtaining the installation code information specific to the new smart device and the address information of the smart device in other ways (e.g., obtaining from the database of the manufacturer), the network access permission may be opened, and then the smart device may send a network access request to access the network.

S902: the gateway may perform a Hash calculation on the installation code information specific to the smart device to obtain a Hash value corresponding to the smart device.

In some embodiments, the gateway may also perform the calculation on other characteristics specific to the smart device to obtain calculated values. Other characteristics may include, but are not limited to, one or a combination of multiple characteristics in characteristic information such as the MAC address, installation code information, and serial number of the smart device. In some embodiments, other calculation algorithms may also be used for the operation performed. Other calculation algorithms may include, but are not limited to, a DES algorithm, a 3DES algorithm, or the like.

The Hash value corresponding to the smart device may refer to a Hash value specific to the smart device. Since the installation code information of the smart device is specific to the smart device, the Hash value obtained by performing the calculation on the installation code information may also be specific to the smart device. The Hash value corresponding to the smart device may only be obtained by the smart device by performing the Hash calculation on the installation code information. Therefore, in the network, the Hash value corresponding to the smart device may be only known by the gateway and the smart device, and other devices in the network may not know the Hash value corresponding to the smart device.

The Hash value may be calculated from the installation code information of the smart device through a Hash algorithm (that is, a Hash calculation). The Hash algorithm may be obtained before calculating the Hash value. In some embodiments, the Hash algorithm may be preset when the smart device leaves the factory, and stored in the internal storage of the smart device. In some embodiments, the Hash algorithm may be updated by connecting to a gateway or a server, wherein transmission may be performed in an out-of-band manner or other methods. The updating may be understood as updating parameters in the Hash algorithm to prevent a possible leakage risk caused by long-term use of same parameters. In some embodiments, the Hash algorithm may be pre-stored in the internal storage of the gateway, or the Hash algorithm may also be obtained from external storage and written into the internal storage. In some embodiments, the gateway may update the Hash algorithm through the server.

It should be noted that step S902 may be executed after step S801 shown in FIG. 8, that is, the gateway may pre-store an association relationship between the address information of the smart device and the installation code information of the smart device until the smart device executes step S801, and then check whether there is installation code information specific to the associated smart device according to the address information of the smart device. If there is the installation code information specific to the associated smart device, the smart device may have the network access permission. After finding the installation code information of the smart device, the gateway may execute step S902.

Step S902 may also be executed before execution of step S801 shown in FIG. 8, that is, after the Hash value corresponding to the smart device is obtained by calculation, the gateway may store a corresponding association relationship of the address information of the smart device and the smart device until the smart device executes step S801. The gateway may check whether there is a Hash value of the associated smart device according to the address information of the smart device, and if there is the Hash value of the associated smart device, the smart device may have the network access permission, and execute step S903.

S903: the gateway may encrypt an original network key using the Hash value corresponding to the smart device to obtain an encrypted network key corresponding to the smart device.

The original network key may be a key that uniquely corresponds to the smart device and is used for secure network transmission. In some embodiments, the gateway may generate the original network key after obtaining the installation code and address information of the smart device (that is, after step S901). In some embodiments, the gateway may generate the original network key after receiving the network access request of the smart device (that is, after step S801).

The original network key may be obtained using an algorithm based on one or more characteristic information of the smart device. In some embodiments, the characteristic information may include, but is not limited to, the installation code and the MAC address of the smart device, or a combination thereof. In some embodiments, the original network key may be obtained by using an algorithm based on the characteristic information of the smart device in combination with other conditions such as the current time. In some embodiments, the algorithm may be a binary sum of the installation code and the MAC address of the smart device.

Since the Hash value corresponding to the smart device obtained in step S902 may not be known by other smart devices in the network, when step S903 is performed, the encrypted network key corresponding to the smart device obtained after encrypting the original network key using the Hash value corresponding to the smart device may only be decrypted by the corresponding smart device, thereby reducing the possibility that the encrypted network key is maliciously cracked.

It should be noted that the gateway may encrypt the original network key using the Hash value corresponding to the smart device to according to a plurality of encryption algorithms. Either an asymmetric encryption algorithm or a symmetric encryption algorithm may be used, which may not affect the implementation of the embodiment of the present disclosure.

The encryption algorithm may be obtained before encrypting/decrypting the original network key. In some embodiments, the encryption algorithm may be preset when the smart device leaves the factory, and stored in the internal storage of the smart device. In some embodiments, the encryption algorithm may be updated by connecting to a gateway or a server, wherein transmission may be performed in an out-of-band manner or other methods. In some embodiments, the encryption algorithm may be pre-stored in the internal storage of the gateway, or the encryption algorithm may be obtained from an external storage and written into the internal storage. In some embodiments, the gateway may update the encryption algorithm through the server.

It should be noted that step S903 may be executed before step S801 shown in FIG. 8, that is, after the gateway obtains the encrypted network key corresponding to the smart device by calculation, the address information of the smart device and the encrypted network key corresponding to the smart device may be stored until the smart device executes step S801 shown in FIG. 8, and the encrypted network key corresponding to the smart device may be found according to the address information of the smart device.

Step S903 may also be executed after step S801 shown in FIG. 8, that is, after the smart device sends the network access request, the Hash value corresponding to the smart device may be found according to the pre-stored association relationship, and then step S903 may be executed.

In the process shown in FIG. 9 for the gateway to obtain the encrypted network key corresponding to the smart device, step S901 may be executed before step S801 shown in FIG. 8, and step S902 and step S903 may be executed before step S801 and may also be executed after step S801.

S803: the smart device may decrypt the encrypted network key corresponding to the smart device using the Hash value corresponding to the smart device to obtain the original network key.

The Hash value corresponding to the smart device may be obtained by the smart device by performing a Hash calculation using the installation code information specific to the smart device. It should be noted that the Hash value corresponding to the smart device may be obtained by calculation before step S803 is executed, or the Hash value corresponding to the smart device may be obtained by calculation after the smart device receives the encrypted network key corresponding to the smart device. The two manners may not affect the implementation of the embodiment of the present disclosure.

In some embodiments, the smart device may perform the Hash calculation on one or more characteristics specific to the smart device to obtain a Hash value, which may refer to the related description of step S902.

After the smart device obtains the original network key, the smart device may use the original network key to encrypt a data packet to be transmitted, and send the encrypted data packet to the gateway. Then the gateway may use the original network key to perform decryption to complete wireless communication between the smart device and the gateway.

In some embodiments, after the smart device performs step S803, the smart device may also publish the association relationship between the address information and the allocated network address to the network such that other devices in the network may know the association relationship of the smart device. When the gateway cannot be used due to special reasons, the smart device may send a network access request to other gateway-like devices in the network. Since the smart device has published the association relationship between the address information and the allocated network address to the entire network, other gateway-like devices in the network may know that the smart device has the network access permission, and the network access request of the smart device may be passed.

In some embodiments, the gateway may close the network access permission after receiving the association relationship between the address information of the smart device and the allocated network address published by the smart device.

Figure 10:
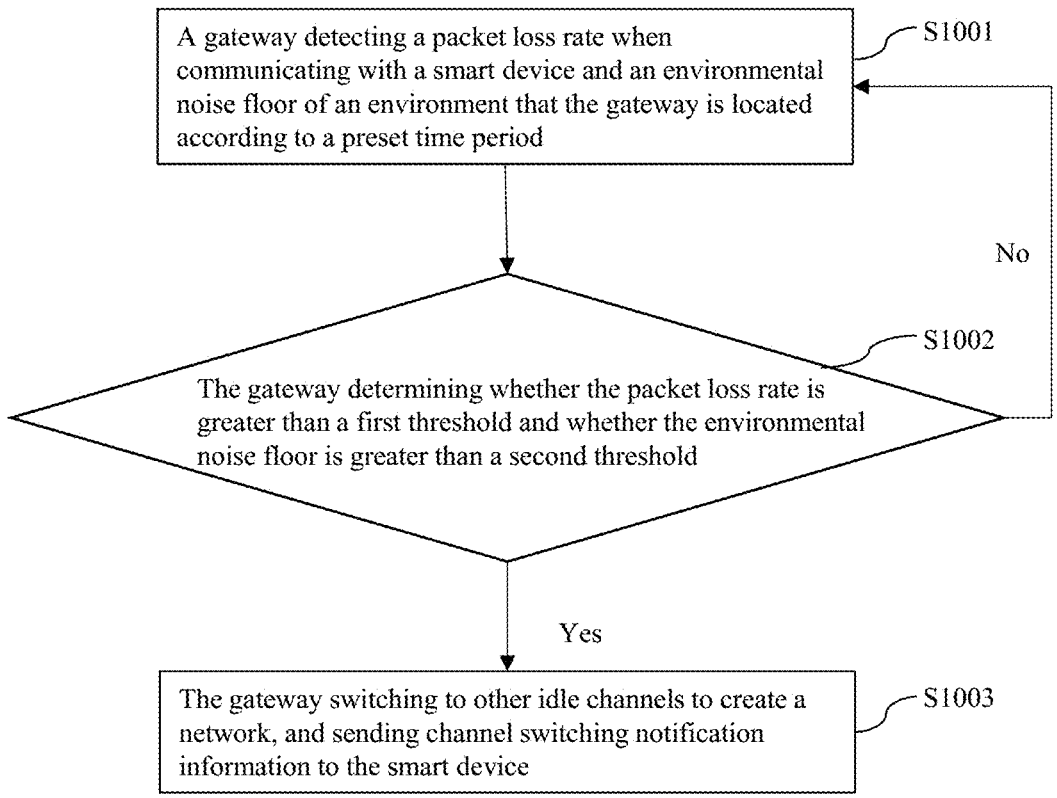
FIG. 10 is a flowchart illustrating another exemplary process for secure communication according to some embodiments of the present disclosure.

FIG. 10 is a flowchart illustrating another exemplary process for secure communication according to some embodiments of the present disclosure.

In the description of FIG. 10, the network may include a gateway, and the smart lock may be a smart device.

In some embodiments, as shown in FIG. 10, in a specific embodiment of the present disclosure, the process for secure communication shown in FIG. 7 may further include:

S1001: the gateway may detect a packet loss rate when communicating with the smart device and an environmental noise floor of an environment that the gateway is located according to a preset time period.

In the process of executing the method shown in FIG. 8, the gateway may periodically detect the packet loss rate when communicating with the smart device and the environmental noise floor of the environment that the gateway is located according to the preset time period. The time period may be set manually. The shorter the time period is, the more frequent the detection and the higher the security of communication between the gateway and the smart device may be.

Specifically, after the gateway is powered on and started, the gateway may first determine whether a network has been created. If the network has been created, the created network may be turned on, and step S1001 may be executed. Before performing step S801 shown in FIG. 8, the smart device may scan channels, and after finding a channel that the gateway is located, the smart device may send a network access request to the gateway, that is, step S801 may be performed. The network access request may refer to a request to access the network created by the gateway. If the gateway has not created a network, channels may be scanned, an idle channel may be selected to access and create the network, and step S1001 may be executed after creating the network.

S1002: the gateway may determine whether the packet loss rate is greater than a first threshold and whether the environmental noise floor is greater than a second threshold.

If the gateway determines that the packet loss rate is greater than the first threshold, and/or the environmental noise floor is greater than the second threshold, step S1003 may be executed. If the gateway determines that the packet loss rate is less than the first threshold and the environmental noise floor is greater than the second threshold, step S1001 may be executed continuously.

If the packet loss rate is greater than the first threshold, it may indicate that a current communication process between the gateway and the smart device is not secure, and a packet capturer may capture data in the channel. In such cases, the gateway may perform step S1003. If the environmental noise floor is greater than the second threshold, it may indicate that the current environment that the gateway is located is high in interference, which may affect communication between the gateway and the smart device. Therefore, step S1003 may also be executed.

It should be noted that the sequence in which the gateway determines the packet loss rate and the environmental noise floor does not affect the implementation of the embodiments of the present disclosure.

S1003: the gateway may switch to other idle channels to create a network, and send channel switching notification information to the smart device.

The channel switching notification information may carry identification information of a switched channel. After the smart device receives the channel switching notification information, the smart device may find the gateway according to the identification information of the switched channel, and then send a network access request to the gateway again. If the smart device does not receive the channel switching notification information, the smart device may scan the channels again, find the channel where the gateway is located, and then send the channel switching notification information to the gateway.

After the gateway switches to other channels, step S1001 may be executed to ensure security of communication. In the process shown in FIG. 10, by periodically detecting the packet loss rate and the environmental noise floor when the process shown in FIG. 8 is executed, the communication security between the gateway and the smart device may be further improved.

According to the above technical solutions, in the method for secure communication provided by the present disclosure, the gateway may receive the network access request carrying the address information of the smart device. The gateway may send the encrypted network key corresponding to the smart device to the smart device according to the address information of the smart device, and allocate a network address to the smart device, wherein the encrypted network key corresponding to the smart device may be obtained by the gateway by encrypting the original network key using the Hash value corresponding to the smart device, and the Hash value corresponding to the smart device may be obtained by the gateway by performing the Hash calculation on the installation code information specific to the smart device sent by the smart device. Since the gateway uses the Hash value corresponding to the smart device to encrypt the original network key, and the Hash value corresponding to the smart device is obtained by performing the Hash calculation on the installation code information specific to the smart device, the decryption manner of the encrypted network key may only be known by the corresponding smart device. Since other smart devices do not know the installation code information of the smart device, the encrypted network key may not be captured and cracked by a packet capturer, thereby improving the wireless communication security.

Figure 11:
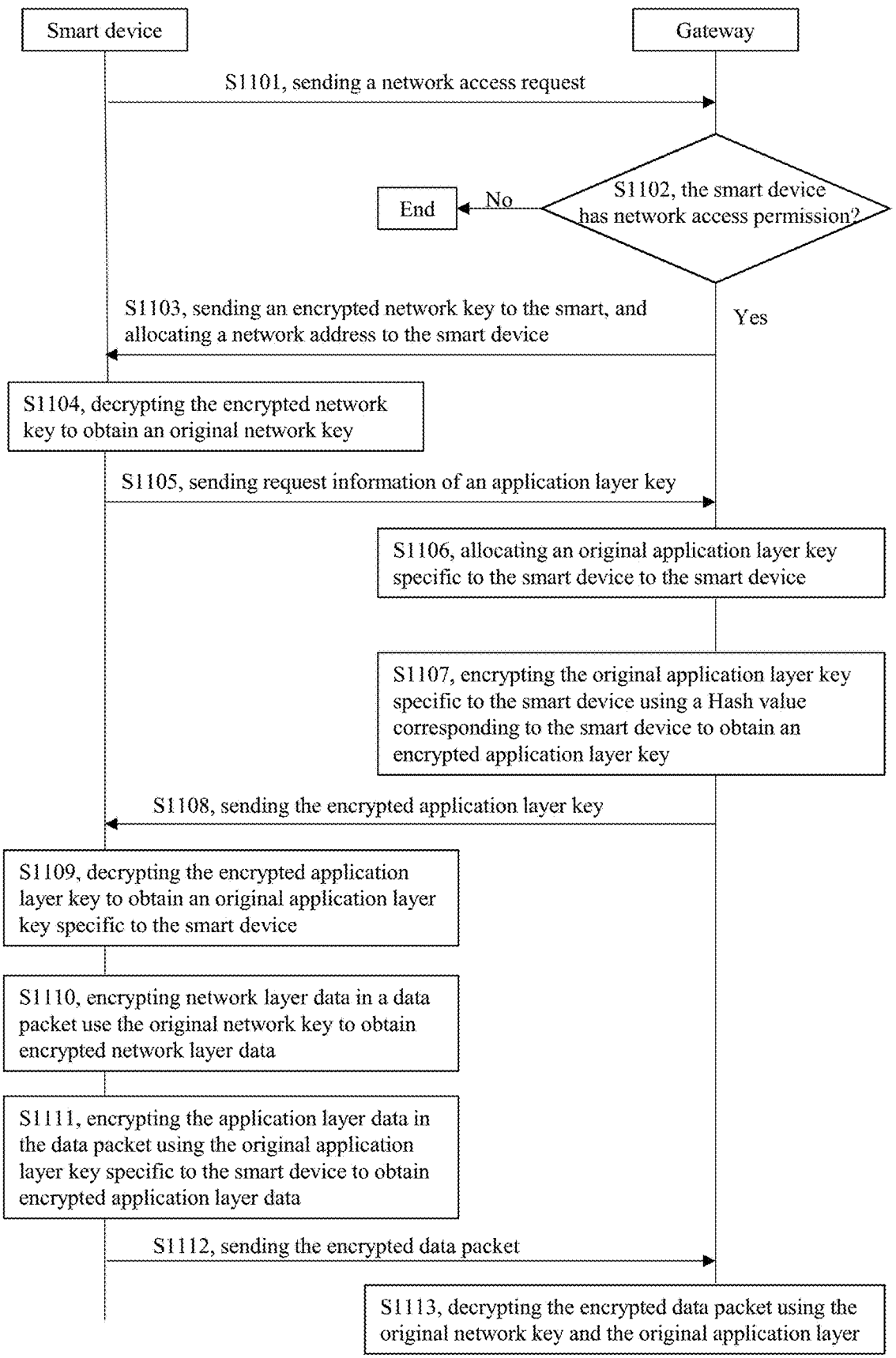
FIG. 11 is a flowchart illustrating another exemplary process for secure communication according to some embodiments of the present disclosure.

FIG. 11 is a flowchart illustrating another exemplary process for secure communication according to some embodiments of the present disclosure.

In the description of FIG. 11, the network may include a gateway, and the smart lock may be a smart device. The embodiment may illustrate sending characteristic information of the smart lock through the network, and obtaining an encryption ley through the network. The encryption key may be related to the characteristic information, and the characteristic information sent through the network may be encrypted based on the encryption key As shown in FIG. 11, the embodiment of the present disclosure discloses another process for secure communication, which may specifically include the following steps:

S1101: the smart device may send a network access request to the gateway.

The execution principles and process of step S1101 may be the same as those of step S801 shown in FIG. 8. Detailed description may be found in step S801 shown in FIG. 8, which may not be repeated herein.

S1102: the gateway may determine whether the smart device has network access permission according to address information of the smart device Determining whether the smart device has the network access permission may refer to determining whether an MAC address of the smart device is legal. If the smart device and the gateway have been bound, the MAC address of the smart device may be legal and the smart device may have the network access permission. Further, if the smart device and the gateway have been bound, the smart device may have sent address information and unique installation code information to the gateway, and the gateway may obtain an encrypted network key corresponding to the smart device according to the address information of the smart device, send the encrypted network key corresponding to the smart device to the smart device, and allocate a network address to the smart device.

If the smart device does not have the network access permission, communication with the smart device may be terminated. If the smart device has the network access permission, step S1103 may be executed.

S1103: the gateway may send the encrypted network key corresponding to the smart device to the smart device according to the address information of the smart device, and allocate the network address to the smart device.

The execution principles and process of step S1103 may be the same as those of step S802 shown in FIG. 8. Detailed description may be found in step S802 shown in FIG. 8, which may not be repeated herein.

S1104: the smart device may decrypt the encrypted network key corresponding to the smart device using a Hash value corresponding to the smart device to obtain an original network key.

The execution principles and process of step S1104 may be the same as those of step S803 shown in FIG. 8. Detailed description may be found in step S803 shown in FIG. 8, which may not be repeated herein.

S1105: the smart device may send request information of an application layer key to the gateway.

In some embodiments, for the transmission of different types of network data, the smart device may use a separate key to encrypt each type of network data. For example, the smart device may use a first key to encrypt network layer data, and a second key to encrypt application layer data. The first key may be different from the second key. In some embodiments, the smart device may request a plurality of keys from the gateway, for example, requesting the first key and the second key from the gateway.

A data packet transmitted by the smart device to the gateway may include both network layer data and application layer data. The application layer key may be a key used for encrypting the application layer data. The original network key obtained in step S1104 may be a key used for encrypting the network layer data. In order to further improve the security in the wireless communication process, the smart device may not only use the original network key for encryption, but also request the application layer key from the gateway for encryption.

In some embodiments, the network layer data and the application layer data may be encrypted using the network layer key or the application layer key in a unified manner.

It should be noted that, in addition to applying for allocation from the gateway, the application layer key may also be preset in the gateway and the smart device, that is, the same application layer key may be stored in the gateway and the smart device, such that there is no need to request the gateway to allocate the application layer key.

In some embodiments, the network key stored in the gateway and the smart device may be updated by sending a request to the server, or the server may actively issue the network key for updating.

It should also be noted that step S1105 may also be regarded as that the gateway receives the request information for the application layer key sent by the smart device.

S1106: the gateway may allocate an original application layer key specific to the smart device to the smart device.

The original application layer key specific to the smart device may be unique and may be a key exclusive to the smart device. The original application layer key specific to the smart device may be a key randomly generated by the gateway after receiving the application layer key request of the smart device, or the original application layer key may be generated by the gateway in advance. After the request of the smart device is received, one of keys that have not been allocated to other smart devices may be selected as the original application layer key specific to the smart device. It should also be noted that the original application layer key may refer to a key that has not been encrypted.

S1107: the gateway may encrypt the original application layer key specific to the smart device using a Hash value corresponding to the smart device to obtain an encrypted application layer key corresponding to the smart device.

The Hash value corresponding to the smart device mentioned in step S1107 may be the same value as the Hash value used for encrypting the original network key in step S1103, which is obtained by performing a Hash calculation on the installation code information specific to the smart device. After encrypting the original application layer key specific to the smart device using the Hash value corresponding to the smart device to, the encrypted application layer key corresponding to the smart device may only be decrypted using the Hash value corresponding to the smart device. The Hash value corresponding to the smart device may be calculated from the unique installation code of the smart device such that only the corresponding smart device and gateway know the Hash value corresponding to the smart device.

S1108: the gateway may send the encrypted application layer key corresponding to the smart device to the smart device.

In the transmission process of the encrypted application layer key corresponding to the smart device, if the encrypted application layer key corresponding to the smart device is captured by the packet capturer, the packet capturer may not be able to crack the encrypted application layer key corresponding to the smart device because the packet capturer does not have the Hash value corresponding to the smart device. The Hash value corresponding to the smart device may be calculated based on the installation code information specific to the smart device, and the installation code information specific to the smart device may not be disclosed to other smart devices in the network, which may reduce the probability that a third party maliciously cracks the application layer key.

S1109: the smart device may decrypt the encrypted application layer key corresponding to the smart device using the Hash value corresponding to the smart device to obtain the original application layer key specific to the smart device.

The Hash value corresponding to the smart device may be pre-calculated and stored in the smart device, or the Hash value corresponding to the smart device may be calculated after receiving the encrypted application layer key corresponding to the smart device.

S1110: the smart device may encrypt the network layer data in the data packet using the original network key to obtain encrypted network layer data.

The data packet that the smart device needs to send to the gateway may include application layer data and network layer data. The smart device may encrypt the network layer data in the data packet using the original network key obtained in step S1104 to obtain encrypted network layer data.

S1111: the smart device may encrypt the application layer data in the data packet using the original application layer key specific to the smart device to obtain encrypted application layer data.

The smart device may encrypt the application layer data in the data packet using the original application layer key obtained in step S1109 to obtain the encrypted application layer key.

It should be noted that the execution sequence of step S1110 and step S1111 may not affect the implementation of the embodiment of the present disclosure. In addition, only one step in step S1110 and step S1111 may be performed, that is, only the network layer data may be encrypted, or only the application layer data may be encrypted. If both the network layer data and the application layer data in the data packet are encrypted, the probability that the data packet is cracked may be lower, and the security of communication may be improved.

S1112: the smart device may send the encrypted data packet to the gateway.

The encrypted data packet may include the encrypted network layer data and the encrypted application layer data. Since the encrypted application layer data is obtained by encryption using the original application layer key specific to the smart device, only the corresponding smart device and gateway may have the key. Even if the encrypted data packet is captured and the network layer data encrypted by the original network key is cracked, the data packet may not be completely cracked because there is no original application layer key specific to the smart device, which may further improve the security of communication between the smart device and the gateway.

S1113: the gateway may decrypt the encrypted data packet using the original network key and the original application layer key specific to the smart device.

After performing step S1113, the gateway may obtain the data packet sent by the smart device. The data packet may include the application layer data and the network layer data, and a wireless communication may be established between the gateway and the smart device.

In a wireless communication process provided by the embodiment of the present disclosure, after the smart device sends request information of the application layer key to the gateway, what is received may be the encrypted application layer key corresponding to the smart device allocated by the gateway. The encrypted application layer key corresponding to the smart device may be obtained by the gateway by encrypting the original application layer key specific to the smart device using the Hash value corresponding to the smart device. Therefore, the smart device may decrypt the encrypted application layer key corresponding to the smart device using the Hash value corresponding to the smart device to obtain the original application layer key specific to the smart device. The smart device may encrypt the application layer data in the data packet using the original application layer key specific to the smart device, encrypt the network layer data in the data packet using the original network key, and send the encrypted data packet to the gateway. Since the original application layer key is specific to the smart device, even if the network layer data in the encrypted data packet is cracked, it may be impossible to crack the application layer data because there is no original application layer key specific to the smart device, which may further improve the security of wireless communication.

Figure 12:
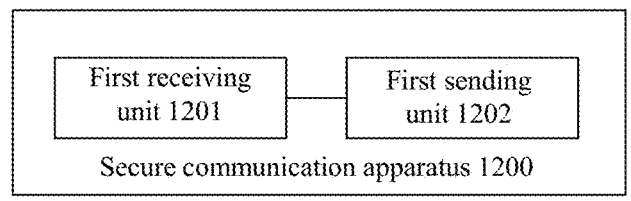
FIG. 12 is a schematic diagram illustrating an exemplary apparatus for secure communication according to some embodiments of the present disclosure.

FIG. 12 is a schematic diagram illustrating an exemplary apparatus for secure communication according to some embodiments of the present disclosure.

In the description of FIG. 12, the network may include a gateway, and the smart lock may be a smart device. The embodiment may illustrate obtaining an encryption key through the network, wherein the encryption key may be related to the characteristic information, and encrypting the characteristic information sent through the network based on the encryption key.

As shown in FIG. 12, according to the process for secure communication in the above embodiments, the embodiment of the present disclosure may further correspondingly disclose a secure communication apparatus 1200, which may be applied to the gateway. The secure communication apparatus 1200 may include a first receiving unit 1201 and a first sending unit 1202.

The first receiving unit 1201 may be used for receiving a network access request sent by the smart device. The network access request may carry address information of the smart device.

The first sending unit 1202 may be used for sending an encrypted network key corresponding to the smart device to the smart device according to the address information of the smart device, and allocating a network address to the smart device. The encrypted network key corresponding to the smart device may be obtained by the gateway by encrypting an original network key using a Hash value corresponding to the smart device, and the Hash value corresponding to the smart device may be obtained by the gateway by performing a Hash calculation on installation code information specific to the smart device sent by the smart device.

In some embodiments, in an embodiment of the present disclosure, the secure communication apparatus 1200 may further include a second receiving unit, an allocating unit, an encryption unit, and a second sending unit.

The second receiving unit may be used for receiving request information of an application layer key sent by the smart device.

The allocating unit may be used for allocating an original application layer key specific to the smart device to the smart device.

The encryption unit may be used for encrypting the original application layer key specific to the smart device using the Hash value corresponding to the smart device to obtain an encrypted application layer key corresponding to the smart device.

The second sending unit may be used for sending the encrypted application layer key corresponding to the smart device to the smart device.

In some embodiments, in an embodiment of the present disclosure, the secure communication apparatus 1200 may further include a third receiving unit and a decryption unit.

The third receiving unit may be used for receiving an encrypted data packet sent by the smart device. The encrypted data packet may include network layer data encrypted by the original network key, and application layer data encrypted by the original application layer key specific to the smart device.

The decryption unit may be used for decrypting the encrypted data packet using the original network key and the original application layer key specific to the smart device.

In some embodiments, in an embodiment of the present disclosure, the secure communication apparatus 1200 may further include:

A first determination unit used for determining whether the smart device has a network access permission according to the address information of the smart device. If determining that the smart device has the network access permission, the first sending unit may send the encrypted network key corresponding to the smart device to the smart device according to the address information of the smart device, and allocate the network address to the smart device.

In some embodiments, in an embodiment of the present disclosure, the secure communication apparatus 1200 may further include:

A detection unit used for detecting a packet loss rate when communicating with the smart device and an environmental noise floor of an environment where the gateway is located according to a preset time period.

A second determination unit used for determining whether the packet loss rate is greater than a first threshold and whether the environmental noise floor is greater than a second threshold.

A switching unit used for switching to another idle channel to create a network if the second determination unit determines that the packet loss rate is greater than the first threshold, and/or the environmental noise floor is greater than the second threshold.

A third sending unit used for sending channel switching notification information to the smart device. The channel switching notification information may carry identification information of a switched channel.

It should be noted that the secure communication apparatus 1200 may include a processor and a storage. The first receiving unit 1201 and the first sending unit 1202 may be both stored in the storage as program units, and the above program units stored in the storage may be executed by the processor to realize corresponding functions.

The processor may contain a kernel, and the kernel may retrieve the corresponding program unit from the storage. One or more kernels may be set, and the security of communication may be improved by adjusting kernel parameters.

The storage may include a non-permanent memory in a computer-readable medium, a random access memory (RAM), and/or a non-volatile memory, such as a read-only memory (ROM) or a flash random access memory (flash RAM), and the storage may include at least one storage chip.

In some embodiments, the storage may be a local storage, a network storage, a cloud storage, or other storages connected in a wired or wireless manner.

In some embodiments, the storage may store characteristic information of the smart device such as an installation code, an MAC address of the smart device, and a corresponding relationship thereof. In some embodiments, the storage may store a Hash algorithm, an encryption algorithm, or the like. In some embodiments, the storage may store a Hash value of the characteristic information of the smart device, for example, a Hash value of the installation code of the smart device. In some embodiments, the storage may store one or more network transmission keys corresponding to the smart device, for example, the original network key, the original application layer key, or the like. In some embodiments, the storage may store the network address corresponding to the smart device and the corresponding relationship of other information associated with the storage device, for example, the relationship between the smart device and the network transmission key.

The specific principles and execution process of the secure communication apparatus 1200 disclosed in the above embodiment of the present disclosure may be the same as those of the process for secure communication disclosed in the above embodiment of the present disclosure. Detailed description may be found in corresponding parts in the process for secure communication disclosed in the above embodiments of the present disclosure, which may not be repeated herein.

In the secure communication apparatus 1200 provided in the present disclosure, the network access request may be received through the first receiving unit 1201, wherein the network access request may carry the address information of the smart device. The first sending unit 1202 may send the encrypted network key corresponding to the smart device to the smart device according to the address information of the smart device, and allocate a network address to the smart device. The encrypted network key corresponding to the smart device may be obtained by the gateway by encrypting the original network key using the Hash value corresponding to the smart device, and the Hash value corresponding to the smart device may be obtained by the gateway by performing a Hash calculation on the installation code information specific to the smart device sent by the smart device. Since the original network key is encrypt by the gateway using the Hash value corresponding to the smart device, and the Hash value corresponding to the smart device is obtained by performing the Hash calculation on the installation code information specific to the smart device, the decryption manner of the encrypted network key may only be known by the corresponding smart device. Since other smart devices do not know the installation code information of the smart device, the encrypted network key may not be captured and cracked by a packet capturer, which may improve the security of wireless communication.

Figure 13:
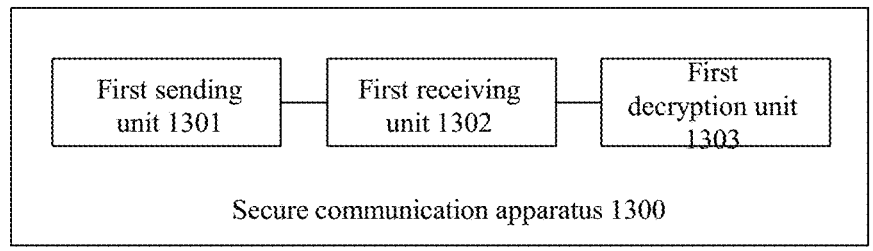
FIG. 13 is a schematic diagram illustrating another exemplary apparatus for a secure communication according to some embodiments of the present disclosure.

FIG. 13 is a schematic diagram illustrating another exemplary apparatus for secure communication according to some embodiments of the present disclosure.

In the description of FIG. 13, the network may include a gateway, and the smart lock may be a smart device. The embodiment may illustrate obtaining an encryption key through the network, the encryption key may be related to the characteristic information, and the characteristic information sent through the network may be encrypted based on the encryption key.

As shown in FIG. 13, according to the process for secure communication disclosed in the above embodiments, the embodiments of the present disclosure may further correspondingly disclose a secure communication apparatus 1300, which may be applied to the smart device and include a first sending unit 1301, a first receiving unit 1302, and a first decryption unit 1303.

In some embodiments, the first sending unit 1301 and the first receiving unit 1302 may correspond to the communication module 210, and the first decryption unit 1303 may correspond to the processing module 230.

The first sending unit 1301 may be used for sending a network access request to the gateway. The network access request may carry address information of the smart device.

The first receiving unit 1302 may be used for receiving an encrypted network key corresponding to the smart device sent by the gateway and obtaining a network address allocated by the gateway. The encrypted network key corresponding to the smart device may be obtained by the gateway by encrypting an original network key using a Hash value corresponding to the smart device, and the Hash value corresponding to the smart device may be obtained by the gateway by performing a Hash calculation on installation code information specific to the smart device sent by the smart device.

The first decryption unit 1303 may be used for decrypting the encrypted network key corresponding to the smart device using the Hash value corresponding to the smart device to obtain the original network key.

In some embodiments, in an embodiment of the present disclosure, the secure communication apparatus 1300 may further include a second sending unit, a second receiving unit, and a second decryption unit.

The second sending unit may be used for sending request information of an application layer key to the gateway.

The second receiving unit may be used for receiving the encrypted application layer key corresponding to the smart device allocated by the gateway. The encrypted application layer key may be obtained by the gateway by encrypting an original application layer password specific to the smart device using the Hash value corresponding to the smart device.

The second decryption unit may be used for decrypting the encrypted application layer key corresponding to the smart device using the Hash value corresponding to the smart device to obtain the original application layer key specific to the smart device.

In some embodiments, in an embodiment of the present disclosure, the secure communication apparatus 1300 may further include a first encryption unit, a second encryption unit, and a third sending unit.

The first encryption unit may be used for encrypting network layer data in a data packet using the original network key to obtain encrypted network layer data.

The second encryption unit may be used for encrypting application layer data in the data packet using the original application layer key specific to the smart device to obtain encrypted application layer data.

The third sending unit may be used for sending an encrypted data packet to the gateway. The encrypted data packet may include the encrypted network layer data and the encrypted application layer data.

It should be noted that the secure communication apparatus 1300 may include a processor and a storage. The first sending unit 1301, the first receiving unit 1302, and the first decryption unit 1303 may be all stored as program units in the storage, and the processor may execute the above-mentioned program unit stored in the storage to realize corresponding functions.

The processor may contain a kernel, and the kernel may retrieve the corresponding program unit from the storage. One or more kernels may be set, and the security of communication may be improved by adjusting kernel parameters.

The storage may include a non-permanent memory in a computer-readable medium, a random access memory (RAM), and/or a non-volatile memory, such as a read-only memory (ROM) or a flash random access memory (flash RAM). The storage may include at least one storage chip.

In some embodiments, the storage may be local storage, network storage, cloud storage, or other storage connected in a wired or wireless manner.

In some embodiments, the storage may store characteristic information of the smart device such as an installation code and an MAC address of the smart device. In some embodiments, the storage may store a Hash algorithm, an encryption algorithm, or the like. In some embodiments, the storage may store a Hash value of the characteristic information of the smart device, for example, a Hash value of the installation code of the smart device. In some embodiments, the storage may store one or more network transmission keys corresponding to the smart device, for example, the original network key, the original application layer key, or the like. In some embodiments, the storage may store the network address corresponding to the gateway and the corresponding relationship of other information associated with the gateway, for example, the relationship between the gateway and a network transmission key.

The specific principles and execution process of the secure communication apparatus 1300 disclosed in the above embodiment of the present disclosure may be the same as those of the method for secure communication disclosed in the above embodiment of the present disclosure. Detailed description may be found in corresponding parts in the process for secure communication disclosed in the above embodiment of the present disclosure, which may not be repeated herein.

In the secure communication apparatus 1300 provided by the embodiments of the present disclosure, the first sending unit 1301 may send a network access request to the gateway. The network access request may carry the address information of the smart device. The first receiving unit 1302 may receive the encrypted network key corresponding to the smart device sent by the gateway, and obtain the network address allocated by the gateway. The encrypted network key corresponding to the smart device may be obtained by the gateway by encrypting the original network key using the Hash value corresponding to the smart device, and the Hash value corresponding to the smart device may be obtained by the gateway by performing a Hash calculation on the installation code information specific to the smart device sent by the smart device. The first decryption unit 1303 may decrypt the encrypted network key corresponding to the smart device using the Hash value corresponding to the smart device to obtain the original network key. Since the encrypted network key corresponding to the smart device is obtained by the gateway by encrypting the original network key using the Hash value corresponding to the smart device, and the Hash value corresponding to the smart device is obtained by the gateway by performing the Hash calculation on the installation code information specific to the smart device sent by the smart device, the decryption manner of the encrypted network key may only be known by the corresponding smart device. Since other smart devices do not know the installation code information of the smart device, the encrypted network key may not be captured and cracked by a packet capturer, which may improve the security of wireless communication.

In some embodiments, the processing module 230 may establish a binding relationship between the control device and the smart lock 130, and may control the smart lock 130 through the control device. In order to simplify the binding process and perform binding efficiently and quickly, a relevant identification of the smart lock 130 may be scanned through the control device, and then the device information of the smart lock 130 may be read and sent to the processing module 230. The processing module 230 may determine whether the binding is allowed. If the binding is allowed, binding information may be sent to the control device and the smart lock. After the binding, the control device and the smart lock may interact according to the binding information, which may improve the efficiency of data transmission, shorten binding time, and improves user experience.

Figure 14:
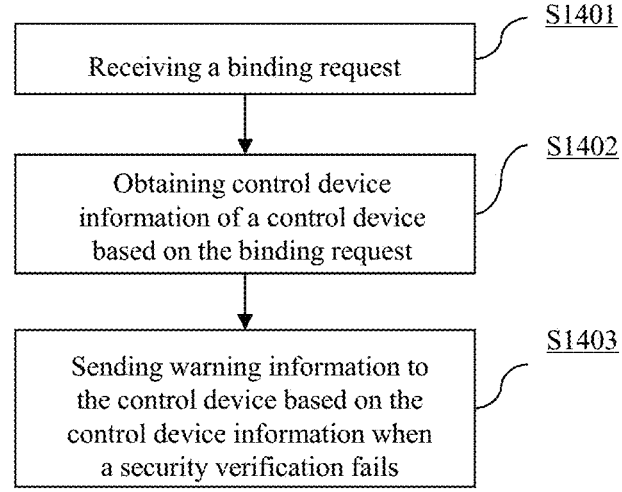
FIG. 14 is a flowchart illustrating an exemplary process 1400 for controlling a smart lock according to some embodiments of the present disclosure.

Some embodiments of the present disclosure provide a process for controlling a smart lock so as to establish a binding relationship between a control device and a smart lock. FIG. 14 is a flowchart illustrating an exemplary process 1400 for controlling a smart lock according to some embodiments of the present disclosure.

As shown in FIG. 14, in some embodiments, the smart lock may establish a binding relationship with the control device according to the following steps:

S1401: a binding request may be received. The smart lock 130 may establish the binding relationship with the control device by receiving the binding request sent by the control device through the processing module 230. The binding request may be an application for establishing a corresponding relationship between devices, for example, an application for establishing a corresponding relationship between the smart lock and the control device.

In some embodiments, the binding relationship may be stored in the smart lock 130, and the control device may directly send the binding request to the smart lock. More description regarding receiving the binding request may be found elsewhere in the present disclosure. See, e.g., step S1503 in FIG. 15 and the description thereof.

S1402: control device information of a control device may be obtained based on the binding request. The processing module 230 may obtain the control device information of the control device based on the binding request. The control device information may be information of the control device, for example, a device identification of the control device, operating system information, device hardware information, or the like.

In some embodiments, the processor in the smart lock 130 may directly obtain the control device information based on the binding request. More description regarding obtaining the control device information may be found elsewhere in the present disclosure. See, e.g., step S1504 in FIG. 15 and the description thereof.

S1403: warning information may be sent to the control device based on the control device information when a security verification fails. The processing module 230 may obtain device information of the smart lock 130 and the control device information of the control device based on the control device information sent by the control device, perform the security verification, and send the warning information if the security verification is failed. The security verification may be to confirm whether the control device information is in a permission list, for example, whether the control device information of the smart lock and/or the control device is in an information list of devices that are allowed to connect.

In some embodiments, the processor in the smart lock may directly perform the security verification based on the control device information, and send the warning information to the control device if the security verification is failed. More description regarding the security verification may be found elsewhere in the present disclosure. See, e.g., step S1505 in FIG. 15 and the description thereof.

Figure 15:
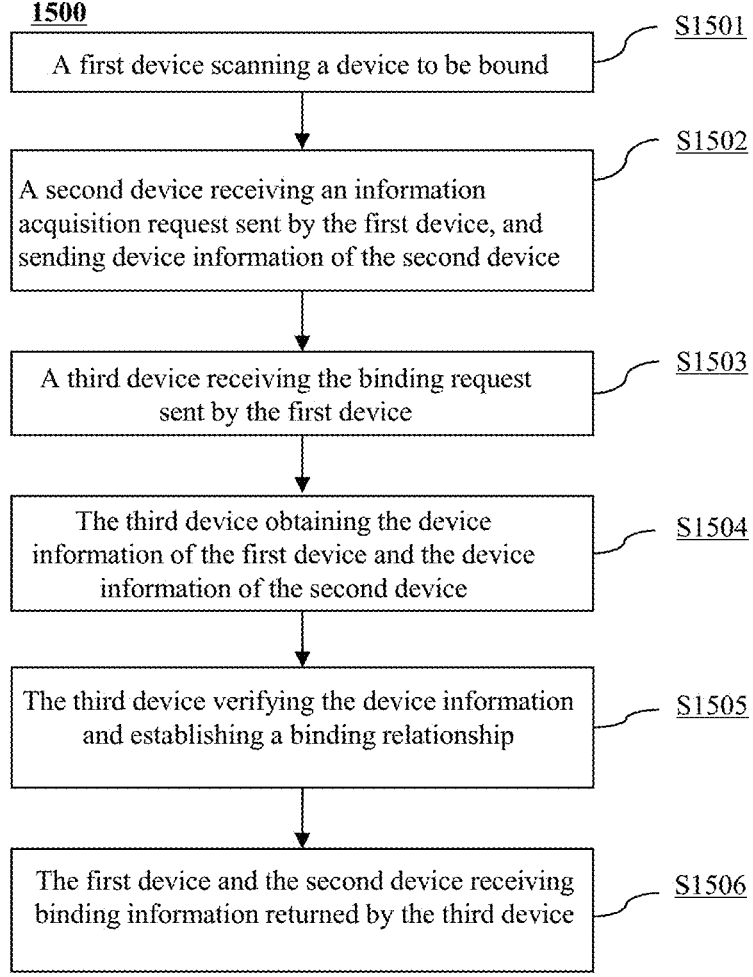
FIG. 15 is a flowchart illustrating an exemplary process for binding a device according to some embodiments of the present disclosure.

FIG. 15 is a flowchart illustrating an exemplary process for binding a device according to some embodiments of the present disclosure.

Some embodiments of the present disclosure provide a process for binding a device. The smart lock may also be the smart lock 130. In some embodiments, the control device may scan a device to be bound, send a device information acquisition request to a scanned device to be bound (the smart lock 130), and obtain device information of the smart lock returned by the smart lock 130. The control device may send a device binding request to the server 110, and the device binding request may carry device information of the smart lock 130 and device information of the control device. The smart lock 130 and the control device may receive binding information returned by the server 110 after binding the smart lock 130 with the control device, and the smart lock 130 and the control device may respectively obtain at least part of the information related to the other one in the binding information.

As shown in FIG. 15, some embodiments of the present disclosure provide a process 1500 for binding a device, which includes the following steps:

Step S1501: a first device may scan a device to be bound. Specifically, the first device may be a control device, and the device to be bound may be the smart lock 130 or a device similar to the smart lock 130. In some embodiments, the control device may scan surrounding devices to obtain the device to be bound.

Step S1502: a second device may receive an information acquisition request sent by the first device, and send device information of the second device. Specifically, the second device may be the smart lock 130, the information acquisition request may be a request for obtaining the second device information, and the device information may be a device identification of the second device, operating system information, device hardware information, or the like. In some embodiments, the control device may send a device information acquisition request to the smart lock 130 to obtain a device identification of the smart lock 130 returned by the smart lock 130, operating system information, device hardware information, or the like.

Step S1503: a third device may receive the binding request sent by the first device. Specifically, the third device may be the server 110, and the binding request may be the device binding request, which may be a request to establish a corresponding relationship between the first device and the second device. The device binding request may carry the device information of the first device and the device information of the second device. Specifically, the device information of the first device may be the device identification of the first device, operating system information, device hardware information, identity information of a user who uses a first application of the first device, or the like. In some embodiments, the control device may send the device binding request to the server 110, and the device binding request may carry the device information of the smart lock 130 and the device information of the control device.

Step S1504: the third device may obtain the device information of the first device and the device information of the second device. Specifically, the device information of the first device and the device information of the second device as the device information may be obtained based on the binding request. In some embodiments, the server 110 may obtain the device information of the smart lock 130 therein and the device information of the control device based on the device binding request.

Step S1505: the third device may verify the device information and establish the binding relationship. Specifically, the third device may check whether the device information of the first device satisfies a binding requirement, and establish a corresponding binding relationship between the first device and the second device if the device information of the first device satisfies the binding requirement. In some embodiments, the server 110 may check whether the device identification in the device information of the smart lock 130 has been saved and the binding relationship has not been established, and save the device information of the smart lock 130 and the device information of the control device correspondingly to bind the smart lock 130 with the control device if the verification is passed.

Step S1506: the first device and the second device may receive the binding information returned by the third device. Specifically, the binding information may be information including device information of the bound device. The binding information may be returned after the third device binds the first device and the second device. The smart lock 130 and the control device may respectively obtain at least part of the information related to the other one in the binding information. In some embodiments, the server 110 may send part of the binding information to the smart lock 130 and the control device after establishing the binding relationship between the smart lock 130 and the control device, and part of the binding information received by the smart lock 130 may include information related to the control device. The binding information received by the control device may include information related to the smart lock 130.

Figure 16:
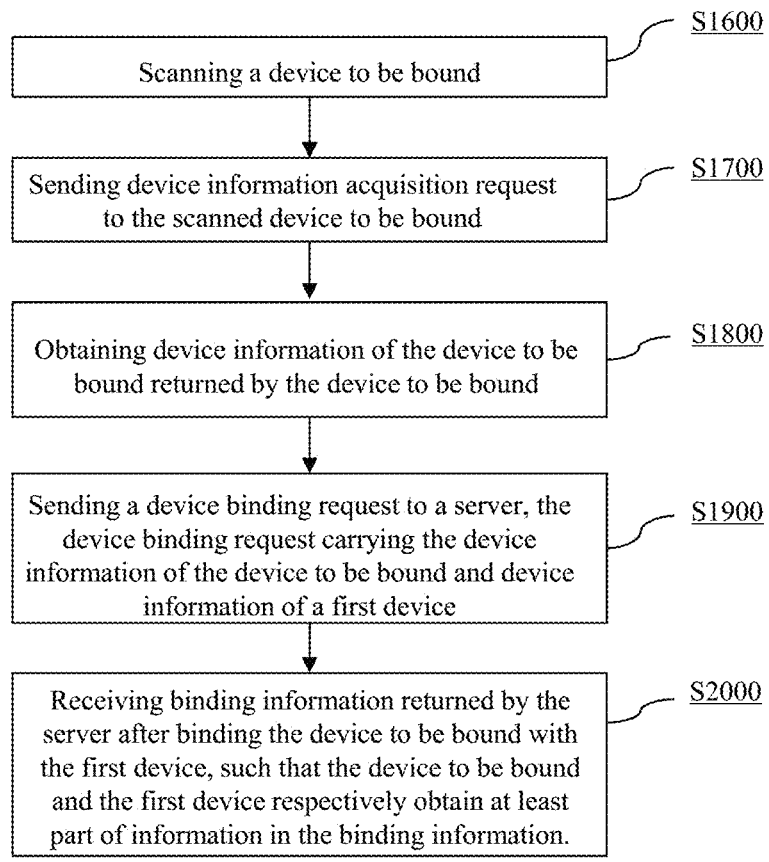
FIG. 16 is a flowchart illustrating an exemplary process for binding a device according to some embodiments of the present disclosure.

FIG. 16 is a flowchart illustrating an exemplary process for binding a device according to some embodiments of the present disclosure.

In the description of FIG. 16, a user terminal may include a control device. The embodiment may illustrate receiving a binding request, obtaining control device information of the control device based on the binding request, and sending warning information to the control device when the security verification is failed based on the control device information.

As shown in FIG. 16, the device binding process provided by the embodiment of the present invention may include:

S1600: a device to be bound may be scanned.

The process for binding a device of the present disclosure may bind a variety of different devices, for example, binding the user terminal with an electronic lock, as another example, binding a keypad device with a controllable smart device, wherein the controllable smart device may include any one of a camera, an electric switch, a TV set, an air conditioner, an electronic lock, or other devices, as another example, binding a Bluetooth key with the electronic lock. In some embodiments, two devices that need to be bound may perform wireless communication via communication manners such as Bluetooth and Wi-Fi, or perform wired communication via communication manners such as USB. In some embodiments, a distance between the two devices that need to be bound may be less than a certain preset distance, that is, the distance between the two devices that need to be bound may be relatively small.

In some embodiments, the devices that need to be bound may perform wireless communication in manners such as a Near Field Communication (NFC), a ZigBee network, or the like, for example, a mobile phone may use the NFC to bind with the electronic lock, and an IC card may use the NFC to bind with the electronic lock.

In some embodiments, the devices that need to be bound may communicate through other wired networks. These wired networks may transmit data through transmission media such as coaxial cables, twisted pairs, and optical fibers. The wired network may be a Local Area Network (LAN), a Metropolitan Area Network (MAN), a Wide Area Network (WAN), Internet, or the like. For example, the keypad device and the TV set may be connected to the same home LAN by using the twisted pair, and communicate through the LAN.

The process shown in FIG. 16 of the embodiment of the present disclosure may be applied to a user terminal, and the user terminal may include, but is not limited to, a desktop computer, a notebook computer, a smart phone, a Personal Digital Assistance (PDA), a tablet personal computer, a handheld game console, smart glasses, a smart watch, a wearable device, a virtual display device, a display enhancement device, or the like. In some embodiments, an application for controlling an electronic lock (also referred to as a smart lock, a door lock, etc.) may be installed in the above-mentioned user terminal. A user may register on the application that controls the electronic lock through a mobile phone number, a user name, an E-mail, an account number of a third-party application, or the like, thereby becoming a legal user. In some embodiments, the user may upload identity information of the user (such as a name, a mobile phone number, and an ID number) to a server through the application that controls the electronic lock. In some embodiments, the server may be a device for providing electronic lock management services. The server may pre-save device information of each electronic lock that has been sold or produced, such as a device identification of the electronic lock, and the device identification may be a product serial number (SN). In some embodiments, the server may be a single server or a server group. The server group may be centralized or distributed (e.g., the server may be a distributed system). In some embodiments, the server may be local or remote. For example, the server may access a device to be bound and/or the user terminal through a network. As another example, the server may be directly connected to the device to be bound and/or the user terminal to access stored information and/or data. In some embodiments, the server may be implemented on a cloud platform. Merely as an example, the cloud platform may include private cloud, public cloud, hybrid cloud, community cloud, distributed cloud, inter-cloud, multiple clouds, or the like, or any combination thereof. In some embodiments, the server may be implemented on a computing device. In some embodiments, the server may be implemented on a mobile device.

In some embodiments, the server may be a node in a blockchain network. The user identity information and/or device information may be saved in an account book of a blockchain, and the user may select any node in the blockchain network as the server to save the identity information of the user.

In some embodiments, the electronic lock may be configured with a Bluetooth module, a Wi-Fi module, a USB interface, or the like, and the electronic lock may perform wireless or wired communication with the user terminal through Bluetooth, Wi-Fi, and the USB interface.

In some embodiments, the electronic lock may also communicate with the user terminal through other wireless networks or wired networks. More description regarding the communication manner may be found in the illustration mentioned above, which may not be repeated herein.

Figure 17:
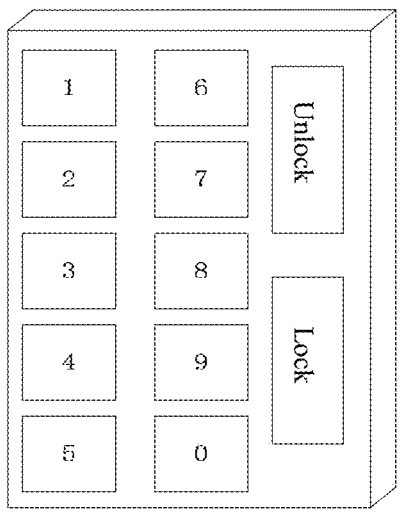
FIG. 17 is a schematic diagram illustrating an exemplary a keypad device according to some embodiments of the present disclosure.

FIG. 17 is a schematic diagram illustrating an exemplary keypad device according to some embodiments of the present disclosure.

In some embodiments, the device to be bound may be an electronic lock, a keypad device, or the like.

In some embodiments, the keypad device may correspond to the input/output module 260.

The keypad device in the embodiment may be an independent electronic device, and FIG. 17 is an optional schematic diagram of the keypad device. As shown in FIG. 17, the keypad device in the embodiment may include a plurality of physical keys, and the user may input an unlocking password by pressing the physical keys. The keypad device in the embodiment may also include other keys, such as an unlocking key and a locking key as shown in FIG. 17. In some embodiments, a Bluetooth module, a Wi-Fi module, a USB interface, or the like, may be arranged in the keypad device, and the keypad device may perform wireless or wired communication with the user terminal and the electronic lock through Bluetooth, Wi-Fi, and the USB interface. In other embodiments, the keypad device may further include a fingerprint input device, a voice input device, or the like. The user may perform unlocking by inputting the unlocking password through the fingerprint input device, the voice input device, or the like.

In some embodiments, keys of the keypad device may be virtual keys, for example, a virtual keypad displayed on a screen, and inputting may be achieved by clicking a mouse, a pointing stick, a touchpad, a trackball, or the like. In some embodiments, the screen may be a touch screen, and inputting may be made in a touch manner. In some embodiments, keypad device may include virtual keys disposed on the user terminal (e.g., a mobile phone). The user may input the unlocking password using the user terminal. In some embodiments, the keypad device may also be a projection keypad, and the keys of the keypad device may be projection keys. The user may perform inputting by clicking the projection keys.

In some embodiments, the keypad device may also include other biological characteristic acquisition devices such as an iris acquisition device or a facial recognition device that records a facial structure of a person. The user may enter the unlocking password in a manner of iris scanning or facial recognition to perform the unlocking.

In some embodiments, the keypad device may be integrated into the electronic lock as a part of the electronic lock.

Take an unlocking operation performed using the keypad device as an example, in some embodiments, the user terminal may be bound with the electronic lock according to the method described in FIG. 16 and issue an unlocking password to the electronic lock after a successful binding. The user may input the unlocking password through the keypad device to unlock the electronic lock. In some embodiments, the electronic lock may be unlocked when a preset unlocking condition is satisfied. Exemplary preset unlocking condition may include a preset time condition, a preset distance condition, a preset personnel condition, or the like, or any combination thereof. For example, the preset time condition may include that the unlocking password is in a valid time range (e.g., 1 month, 1 week, 1 day, etc. since the unlocking password is issued, or a specific time period such as daytime, working day, etc.). The valid time range may be determined based on effective time corresponding to the unlocking password and expiration time corresponding to the unlocking password. The effective time refers to the time when the unlocking password takes into effect (e.g., the time when the unlocking password is issued). The expiration time refers to the time when the unlocking password expires. For instance, if the valid time range of the unlocking password is 1 month, the electronic lock may be unlocked within 1 month since the unlocking password was issued. Additionally, the unlocking password may automatically expire after 1 month. The user may reset the unlocking password using the user terminal. As another example, the preset distance condition may include that the keypad device is within a certain distance (e.g., 50 centimeters, 1 meter, 2 meters, 5 meters, etc.) of the electronic lock. When the user input the unlocking password using the keypad device within the certain distance, the electronic lock may be unlocked. As a further example, the preset personnel condition may include that the unlocking password is input by certain users (e.g., designated family members, designated employees, etc.). In some embodiments, the electronic lock may be unlocked in a preset time range (e.g., 1 second, 2 seconds, 3 seconds, 5 seconds, etc.) after the user inputs the unlocking password. The preset time range may include transmission time of the unlocking password, motor drive time, etc. For example, the keypad device may communicate with the electronic lock through Bluetooth. Correspondingly, the transmission time of the unlocking password may include Bluetooth transmission time. The motor drive time refers to the time required for the motor of the electronic lock to drive the electronic lock to unlock. In some embodiments, the transmission time of the unlocking password and the motor drive time may be preset respectively. In some embodiments, in response to a result of the unlocking (e.g., a successful unlocking, a failed unlocking, etc.), the electronic lock may generate reminding information to remind the user of the result. The reminding information may be delivered to the user in any suitable form. For example, an indicator light of the electronic lock may be in green to remind the user of the successful unlocking, and/or in red to remind the user of the failed unlocking. As another example, the electronic lock may generate a voice prompt (e.g., different types of music, different voice broadcasts, etc.) to remind the user of the result. Alternatively or additionally, the user may obtain the result of the unlocking according to sound generated by hardware structures of the electronic lock. For example, in response to a right unlocking password, a motor (e.g., a driving motor) of the electronic lock maybe caused to rotate to realize the unlocking. The user may determine the successful unlocking according to the sound of the motor rotating. As another example, in response to a wrong unlocking password, the motor may be jammed. The user may determine the failed unlocking according to the sound of the motor jam.

In some embodiments, the electronic lock may record unlocking information when the electronic lock is unlocked. The unlocking information may include, but is not limited to, a person who performs unlocking, unlocking time, and an unlocking mechanism (e.g., a password, fingerprints, etc.). In some embodiments, when the electronic lock is networked with a cloud server via a gateway or APP, the electronic lock may encrypt the recorded unlocking information and upload the unlocking information to the gateway through the ZigBee transmission protocol. The gateway may upload the unlocking information to the cloud server via WiFi, or the unlocking information may be transmitted to the APP through Bluetooth, and the APP may upload the unlocking information to the cloud server through a cellular mobile network or WiFi. In some embodiments, the user may check the unlocking information on the APP.

In practical applications, in step S1600, the device to be bound may be scanned by receiving a broadcast message sent by the device to be bound. If the broadcast message sent by the device to be bound is received, it may be determined that the device to be bound is scanned. A certain device to be bound may automatically send the broadcast message after being powered on, or when a certain key is pressed with a predetermined times or for no less than a preset duration after the certain device to be bound is powered on, the broadcast message may be sent. It should be understood that, in order to receive the broadcast message sent by the device to be bound, the user terminal may be located around the device to be bound such that the surrounding device to be bound may be scanned.

In some embodiments, the device to be bound may receive an external instruction to trigger the sending of the broadcast message, for example, receiving an instruction sent by the server to start a binding process.

The above-mentioned broadcast message may carry a device identification of the device to be bound. The user terminal may establish communication connection with the device to be bound through the broadcast message so as to interact with the device to be bound through the communication connection. Further, the user terminal may send the device identification of the device to be bound to the server such that the server may determine whether the device to be bound may be bound. For example, the server may save the device identification of each device that has been bound, and when the device identification of the device to be bound sent by the user terminal is the device identification of the device that has been bound, the server may return an error message to the user terminal to inform the user terminal that the device to be bound may not be bound.

In some embodiments, when the device identification of the device to be bound sent by the user terminal is not found in the server, the server may return an error message to the user terminal to inform the user that the device to be bound is unavailable.

In some embodiments, after the user terminal establishes communication connection with the device to be bound, the user terminal may send an administrator password query request to the device to be bound. When the device to be bound returns a response that "an administrator password already exists", it may indicate that the device to be bound has been bound with other devices, and the user terminal may not be bound with the device to be bound. Conversely, when the device to be bound returns a response that "an administrator password does not exist", it may indicate that the device to be bound is not bound with other devices, and the user terminal may be bound with the device to be bound.

In some embodiments, the device to be bound may be bound with multiple user terminals. When the user terminal sends a binding request, as long as a preset count of devices that can be bound has not been exceeded, the user terminal may establish a binding relationship with the device to be bound. For example, the electronic lock may establish a binding relationship with mobile phones of multiple family members in the same family. In some embodiments, when the device to be bound is bound with the multiple user terminals, one or more of the user terminals may have administrator authority, and the user terminal with the administrator authority may manage other user terminals bound to the device to be bound. For example, the user terminal with the administrator authority may delete other user terminals bound to the device to be bound.

S1700: a device information acquisition request may be sent to the scanned device to be bound;

S1800: device information of the device to be bound returned by the device to be bound may be obtained.

The device information of the device to be bound may include at least one of the following information:

a device identification, operating system information, device hardware information, or the like.

The above-mentioned device identification may include a product serial number, a device name, a device type, or the like. The operating system information may be a type and version number of an operating system, and the operating system may be an embedded operating system. The device hardware information may include at least one of a CPU model, a GPU model, a memory size, a motherboard model, and other information in the device.

In some embodiments, the device identification may also include a device MAC address, an IPv6 address, or the like.

In practical applications, the device information of the device to be bound may be encrypted using multiple encryption manners in the embodiment, and one of the encryption manners may be an encryption using a challenge code. The challenge code may refer to a set of encryption passwords generated according to the challenge handshake authentication protocol (CHAP).

In some embodiments, a preset encryption algorithm may be used to encrypt the device information of the device to be bound. An encryption key may be a network key previously obtained from the server.

S1900: a device binding request may be sent to the server, and the device binding request may carry the device information of the device to be bound and device information of a first device.

The device information of the first device may include at least one of:

a device identification, operating system information, device hardware information, identity information of a user who uses a first application of the first device, or the like.

The device identification, the operating system information, the device hardware information, or the like, have already been described in the present disclosure and may not be repeated herein. The first application may be an application that is installed on the user terminal and may control an electronic lock, and the first device may be a user terminal. The identity information of the user who uses the first application of the first device may be one or more of a mobile phone number, a user name, an E-mail, an account number, and a password of a third-party application.

In some embodiments, the identity information of the user may be one or more of biological characteristics of the user, such as one or more of fingerprints, voiceprints, an iris, facial structures, and other biological characteristics.

In some embodiments, the identity information of the user may be an audio file for reading a passage of specified text. In some embodiments, the identity information of the user may be real-name authentication information of the user.

In some embodiments, the user terminal may be bound with the electronic lock, or the electronic lock may be bound with the keypad device in the present invention.

S2000: binding information returned by the server after binding the device to be bound with the first device may be received, such that the device to be bound and the first device may respectively obtain at least part of information in the binding information.

In practical applications, a device that executes the process in FIG. 16 of the present disclosure and/or two bound devices may first send a binding information acquisition request to the server such that the server may return the binding information.

In practical applications, after the server binds the device to be bound with the first device, the server may also send a notification message indicating a successful binding to the device (such as the user terminal) that executes the process in FIG. 16 of the present disclosure and/or the bound two devices. Further, when the first device is the user terminal and the device to be bound is the electronic lock, the user terminal may issue the unlocking password to the electronic lock after obtaining the notification message indicating the successful binding, and the electronic lock may save the unlocking password. The electronic lock may perform an operation such as unlocking according to the unlocking password. For example, a certain user terminal may send an unlocking instruction to the electronic lock, and the unlocking instruction may carry a first password. The electronic lock may compare the first password with the saved unlocking password, and when the two are consistent, an unlocking operation may be executed, otherwise, the unlocking operation may not be executed. After the user terminal obtains the notification message indicating the successful binding, the user terminal may also send the administrator password to the electronic lock to manage the electronic lock through the administrator password, such as updating the unlocking password and managing a valid time range of the unlocking password. The user terminal may also upload the administrator password to the server, which is not limited in the present disclosure. In some embodiments, the user terminal may issue multiple unlocking passwords with different unlocking permissions to the electronic lock, and the electronic lock may store all the unlocking passwords according to the unlocking permission. The above-mentioned unlocking permission may be divided into all-weather unlocking permission, single-time unlocking permission, and timed multiple-time unlocking permission.

In some embodiments, after step S2000, the user terminal may also perform a time synchronization with the electronic lock to synchronize the time of the two devices and prevent problems caused by time inconsistency. Specifically, a process of the time synchronization may include: the user terminal may send time of a native machine to the electronic lock such that the electronic lock may start timing with the received time as the current time. It should be understood that since the electronic lock is often powered by a battery, after the battery has run out of power, the time in the electronic lock may often stop, and the time in the user terminal may be updated regularly or irregularly. Therefore, the user terminal of the embodiment may send the time of the native machine to the electronic lock to ensure that the time in the electronic lock is correct and effective.

In some embodiments, after step S2000, the user terminal may also obtain battery level information of the electronic lock.

In some embodiments, after step S2000, the user terminal may also issue the unlocking password to the electronic lock, and the user terminal may receive a notification indicating that the unlocking password has taken effect returned by the electronic lock. The user may input a new unlocking password in the user terminal, and then the user terminal may issue the unlocking password to the electronic lock. After receiving the unlocking password, the electronic lock may save the unlocking password and add a valid identification to the unlocking password, and then the electronic lock may return the notification indicating that the unlocking password has taken effect to the user terminal.

In some embodiments, after step S2000, the user terminal may also check log records of the electronic lock, and the log records may include an unlocking history record, a user operation record, abnormal information, or the like. The unlocking history record may include unlocking time, an unlocking mechanism (e.g., a password, fingerprints, a Bluetooth key, etc.), and user information (e.g., a user name for performing the unlocking operation, the user permission, etc.). The user operation record may include an instruction sent by the user, the time when the instruction is sent, an operation result (e.g., success or failure), or the like. The abnormal information may include abnormal events and occurrence time of the abnormal events. Exemplary abnormal events may include an abnormal unlocking operation (e.g., the count consecutive incorrect password inputs exceed a limit value), an abnormal startup and shutdown operation, abnormal information about electronic lock programs, the electronic lock being picked, and opening the door from the cat eye, an alarming signal sent by the electronic lock, or the like. For example, when the electronic lock is bound with the user terminal, the user may check the abnormal information on an APP in the user terminal. As another example, the electronic lock may be connected to the user terminal through wired or wireless communication, and the abnormal information may be transmitted to the APP through the wired or wireless communication. The user may check the abnormal information on the APP. In some embodiments, the user may check the locking information on the APP.

In some embodiments, devices involved in the process in FIG. 16 of the present disclosure may communicate through a Bluetooth protocol 4.2 technology.

In some embodiments, the devices involved in the process in FIG. 16 of the present disclosure may also communicate through Bluetooth protocol technologies of other versions such as a near field communication (NFC) technology, and a ZigBee network.

The process for binding a device provided by the present disclosure may scan the device to be bound, send the device information acquisition request to the scanned device to be bound, obtain the device information of the device to be bound returned by the device to be bound, send the device binding request to the server, the device binding request carrying the device information of the device to be bound, and the device information of the first device, and receive the binding information returned by the server after binding the device to be bound with the first device to enable the device to be bound and the first device to obtain at least part of information in the binding information, respectively. A device binding technology provided by the present disclosure may quickly and efficiently bind devices.

Figure 18:
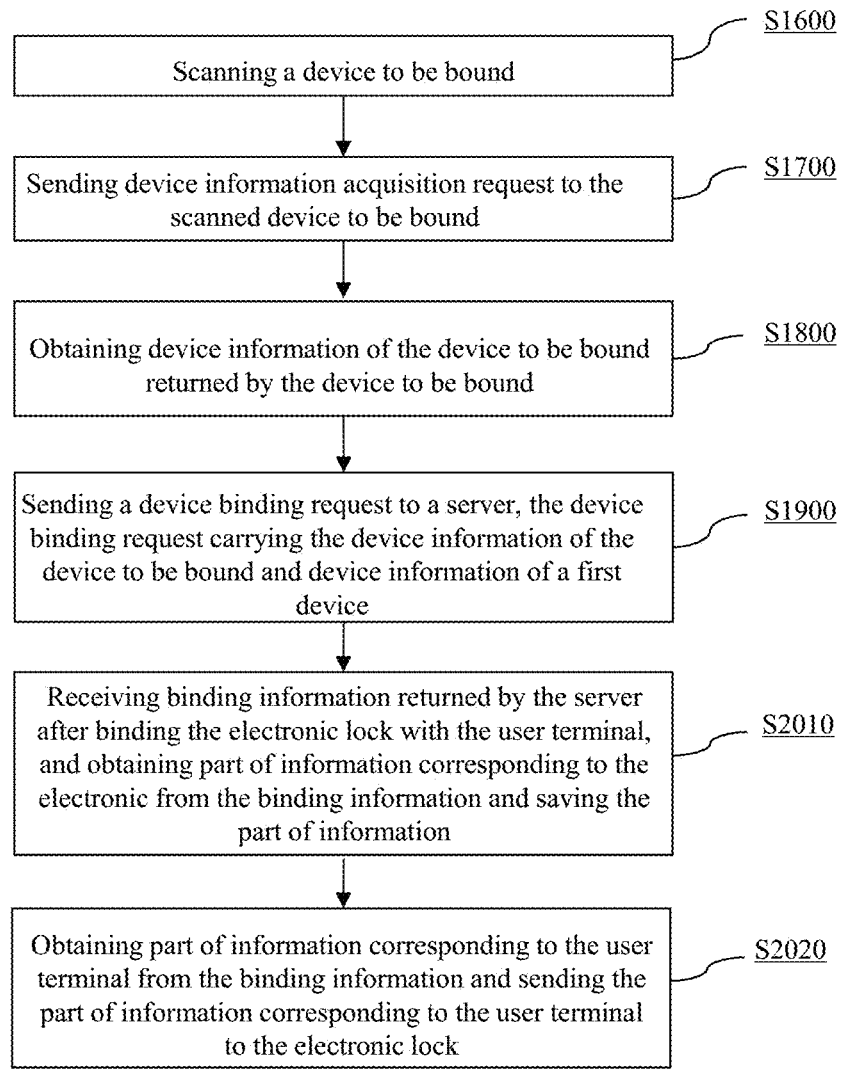
FIG. 18 is a flowchart illustrating another exemplary process for binding a device according to some embodiments of the present disclosure.

FIG. 18 is a flowchart illustrating another exemplary process for binding a device according to some embodiments of the present disclosure.

In the description of FIG. 18, a user terminal may include a control device. The embodiment may illustrate sending warning information to the control device based on the control device information when the security verification is failed.

In some embodiments, the process in FIG. 16 may be applied to the first device. The first device may be a user terminal, and the device to be bound may be an electronic lock. As shown in FIG. 18, step S2000 may include:

S2010: binding information returned by a server after binding the electronic lock with the user terminal may be received, and part of information corresponding to the electronic lock may be obtained from the binding information and saved.

The server may bind the electronic lock with the user terminal by saving device information of the electronic lock and device information of the user terminal correspondingly.

In some embodiments, when the server saves the device information, the server may calculate part or all of the device information using a preset algorithm, and then save a calculation result and part of the device information such that only necessary information may be stored, which may save storage space and facilitate more efficient information verification. For example, a Hash algorithm may be used to calculate all the device information of the electronic lock to obtain a Hash value, and the Hash value and a serial number of the electronic lock may be saved. As another example, the Hash value may be obtained by calculating all the device information of the user terminal using the Hash algorithm, and the Hash value, a mobile phone number, and a user name may be saved.

Part of information corresponding to the electronic lock may include the device information of the electronic lock or the calculation result obtained by calculating the device information of the electronic lock using a preset algorithm.

The preset algorithm in the present disclosure may be the Hash algorithm or an encryption algorithm.

S2020: part of information corresponding to the user terminal may be obtained from the binding information and sent to the electronic lock.

Part of information corresponding to the user terminal may include at least one of the device information of the user terminal, a calculation result obtained by calculating the device information of the user terminal using the preset algorithm, identity information of the user using a first application of the user terminal, and a calculation result obtained by calculating, using the preset algorithm, the identity information of the user using the first application of the user terminal.

Figure 19:
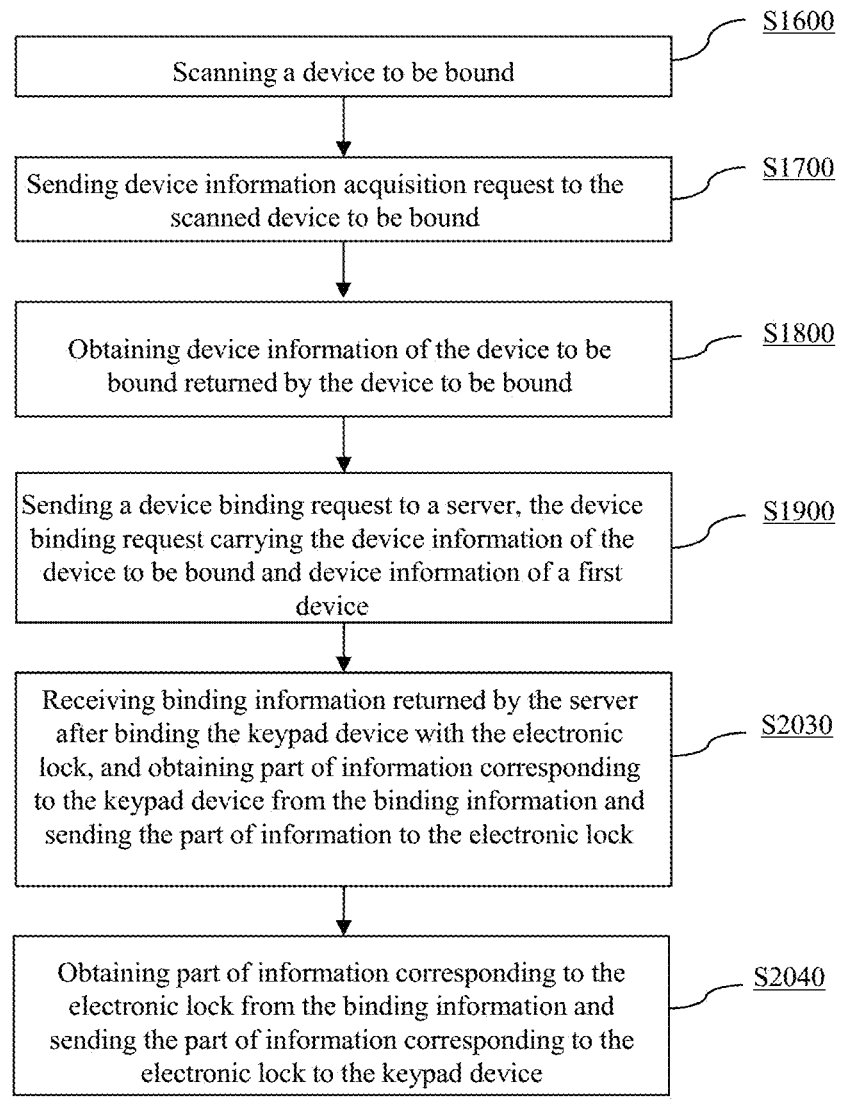
FIG. 19 is a flowchart illustrating another exemplary process for binding a device according to some embodiments of the present disclosure.

FIG. 19 is a flowchart illustrating another exemplary process for binding a device according to some embodiments of the present disclosure;

In some embodiments, the process in FIG. 16 may be applied to a user terminal. The first device may be an electronic lock, and the device to be bound may be a keypad device. As shown in FIG. 19, step S2000 may include:

S2030: binding information returned by a server after binding the keypad device with the electronic lock may be received, and part of information corresponding to the keypad device may be obtained from the binding information and sent to the electronic lock.

The server may bind the electronic lock with the keypad device by saving device information of the electronic lock and device information of the keypad device correspondingly.

In some embodiments, when the server saves the device information, the server may calculate part or all of the device information using a preset algorithm, and then save a calculation result and part of the device information. More description regarding the binding process may be found in FIG. 16 and the description thereof, which may not be repeated herein.

Part of the information corresponding to the keypad device may include the device information of the keypad device or a calculation result obtained by calculating the device information of the keypad device using the preset algorithm.

S2040: part of information corresponding to the electronic lock may be obtained from the binding information and sent to the keypad device.

Part of information corresponding to the electronic lock may include the device information of the electronic lock or a calculation result obtained by calculating the device information of the electronic lock using the preset algorithm.

In some embodiments, part of information corresponding to the keypad device may be obtained from the binding information and sent to the electronic lock, and then part of information corresponding to the electronic lock may be obtained from the binding information and sent to the keypad device. In some embodiments, the part of information corresponding to the electronic lock may be obtained from the binding information and sent to the keypad device, and then the part of information corresponding to the keypad device may be obtained from the binding information and sent to the electronic lock. In some embodiments of the present disclosure, the part of information corresponding to the electronic lock and the part of information corresponding to the keypad device may be obtained from the binding information and then sent to the keypad device and the electronic lock at the same time, which is not limited herein.

In some embodiments, in addition to sending part of information in the binding information to the device to be bound and the first device, in the present disclosure, the complete binding information may be sent to the device to be bound and the first device, respectively.

Figure 20:
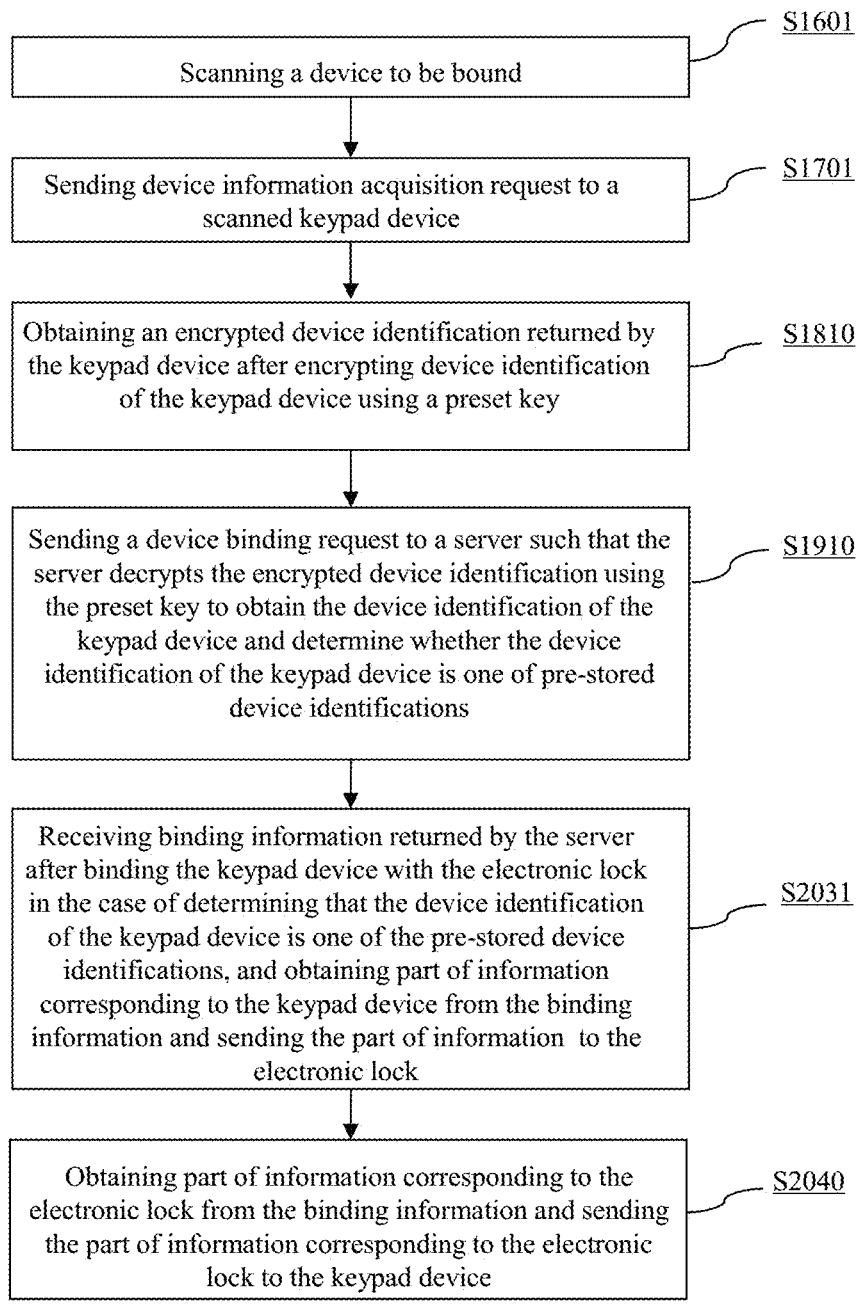
FIG. 20 is a flowchart illustrating another exemplary process for binding a device according to some embodiments of the present disclosure.

FIG. 20 is a flowchart illustrating another exemplary process for binding a device according to some embodiments of the present disclosure.

Based on the embodiment shown in FIG. 19, in another process for binding a device provided by the embodiment of the present disclosure, both the server and the keypad device may pre-store a device identification of the keypad device and a preset key. As shown in FIG. 20, another process for binding a device may include:

S1601: a keypad device may be scanned.

S1701: a device information acquisition request may be sent to the scanned keypad device.

Step S1601 may be a specific implementation manner of step S1600 shown in FIG. 16, and step S1701 may be a specific implementation manner of step S1700 shown in FIG. 16.

S1810: an encrypted device identification returned by the keypad device after encrypting the device identification of the keypad device using the preset key may be obtained;

Step S1810 may be a specific implementation manner of step S1800 shown in FIG. 19.

S1910: a device binding request may be sent to a server such that the server may decrypt the encrypted device identification using the stored preset key to obtain the device identification of the keypad device and determine whether the obtained device identification of the keypad device is one of the pre-stored device identifications. The device binding request may carry the encrypted device identification and device information of the electronic lock;

Step S1910 may be a specific implementation manner of step S1900 shown in FIG. 19.

The server may pre-store device identifications of multiple legal keypad devices such that after the device identification of a certain keypad device is obtained by decryption, the server may determine whether the obtained device identification of the keypad device is one of the pre-stored device identifications. If the obtained device identification of the keypad device is one of the pre-stored device identifications, the server may determine that the keypad device is a legal device, otherwise, the server may determine that the keypad device is an illegal device. The server may only bind legal devices. For illegal devices, the server may return an error message.

S2031: binding information returned by the server after binding the keypad device with the electronic lock may be received in the case of determining that the obtained device identification of the keypad device is one of the pre-stored device identifications, and part of information corresponding to the keypad device may be obtained from the binding information and sent to the electronic lock;

S2040: part of information corresponding to the electronic lock may be obtained from the binding information and sent to the keypad device.

Step S2031 may be a specific implementation manner of step S2030 shown in FIG. 19.

It should be understood that according to the above encryption and decryption process, security in the device binding process may be effectively improved in the present disclosure.

The processes provided in the above embodiments of the present disclosure may be processes for binding a device applied to the user terminal, and corresponding to the processes for binding a device applied to the user terminal provided by the embodiment of the present disclosure, the present disclosure may further provide processes for binding a device applied to the device to be bound.

Figure 21:
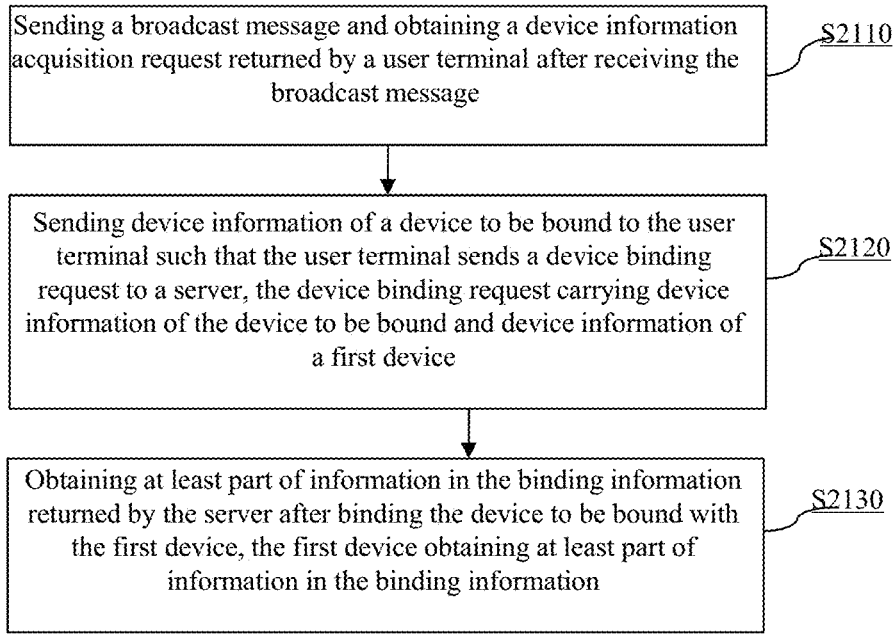
FIG. 21 is a flowchart illustrating another exemplary process for binding a device according to some embodiments of the present disclosure.

FIG. 21 is a flowchart illustrating another exemplary process for binding a device according to some embodiments of the present disclosure;

In the description of FIG. 21, a user terminal may include a control device. The embodiment may illustrate receiving a binding request, obtaining control device information of the control device based on the binding request, and sending warning information to the control device when the security verification is failed based on the control device information.

As shown in FIG. 21, the process for binding a device provided by the embodiment of the present disclosure may be applied to the device to be bound, and the process may include:

S2110: a broadcast message may be sent and a device information acquisition request returned by the user terminal may be obtained after receiving the broadcast message.

S2120: device information of the device to be bound may be sent to the user terminal such that the user terminal may send a device binding request to a server. The device binding request may carry the device information of the device to be bound and device information of a first device.

S2130: at least part of information in the binding information returned by the server after binding the device to be bound with the first device may be obtained. The first device may obtain at least part of information in the binding information.

In some embodiments, the first device may be a user terminal, and the device to be bound may be an electronic lock. At least part of information in the binding information obtained by the electronic lock may be part of information corresponding to the user terminal in the binding information. At least part of information in the binding information obtained by the user terminal may be part of information corresponding to the electronic lock in the binding information.

In some embodiments, the first device may be an electronic lock, and the device to be bound may be a keypad device. At least part of information in the binding information obtained by the electronic lock may be part of information corresponding to the keypad device in the binding information. At least part of information in the binding information obtained by the keypad device may be part of information corresponding to the electronic lock in the binding information.

Figure 22:
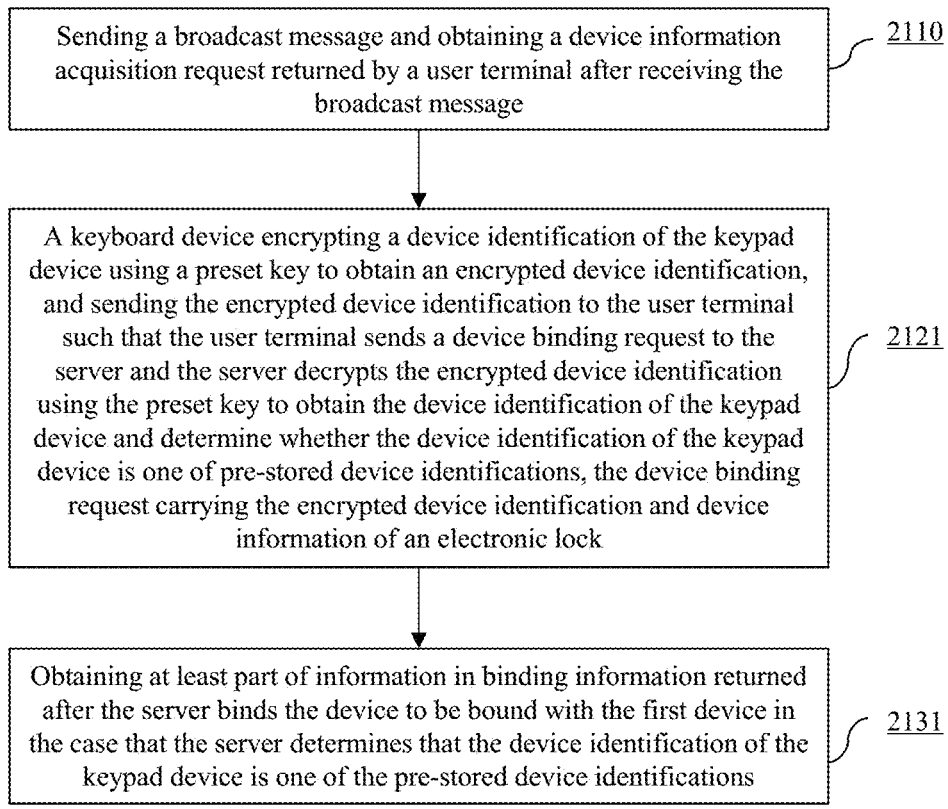
FIG. 22 is a flowchart illustrating another exemplary process for binding a device according to some embodiments of the present disclosure.

FIG. 22 is a flowchart illustrating another exemplary process for binding a device according to some embodiments of the present disclosure;

Based on the embodiment shown in FIG. 21, as shown in FIG. 22, in another process for binding a device applied to the device to be bound provided by the embodiment of the present disclosure, a device identification of a keypad device and a preset key may be pre-stored in the server and the keypad device, and the process may include:

S2110: a broadcast message may be sent, and a device information acquisition request returned by the user terminal after receiving the broadcast message may be obtained;

S2121: the keypad device may encrypt the device identification of the keypad device using the preset key to obtain an encrypted device identification, and send the encrypted device identification to the user terminal such that the user terminal may send a device binding request to the server. The server may decrypt the encrypted device identification using the stored preset key to obtain the device identification of the keypad device and determine whether the obtained device identification of the keypad device is one of the pre-stored device identifications. The device binding request may carry the encrypted device identification and the device information of the electronic lock.

Step S2121 may be a specific implementation manner of step S2120 shown in FIG. 21.

S2131: at least part of information in the binding information returned after the server binds the device to be bound with the first device may be obtained in the case that the server determines that the obtained device identification of the keypad device is one of the pre-stored device identifications. The first device may obtain at least part of information in the binding information.

Step S2131 may be a specific implementation manner of step S2130 shown in FIG. 21.

The steps shown in FIG. 21 and FIG. 22 of the present disclosure have been described in the embodiments shown in FIG. 16, FIG. 18, FIG. 19, and FIG. 20, which may not be repeated herein.

In practical applications, the process for binding a device of the present disclosure may be first performed to bind the user terminal with the electronic lock, and then the process for binding a device of the present disclosure may be performed to bind the keypad device with the electronic lock. The present disclosure does not limit the sequence of binding between the aforementioned devices.

Figure 23:
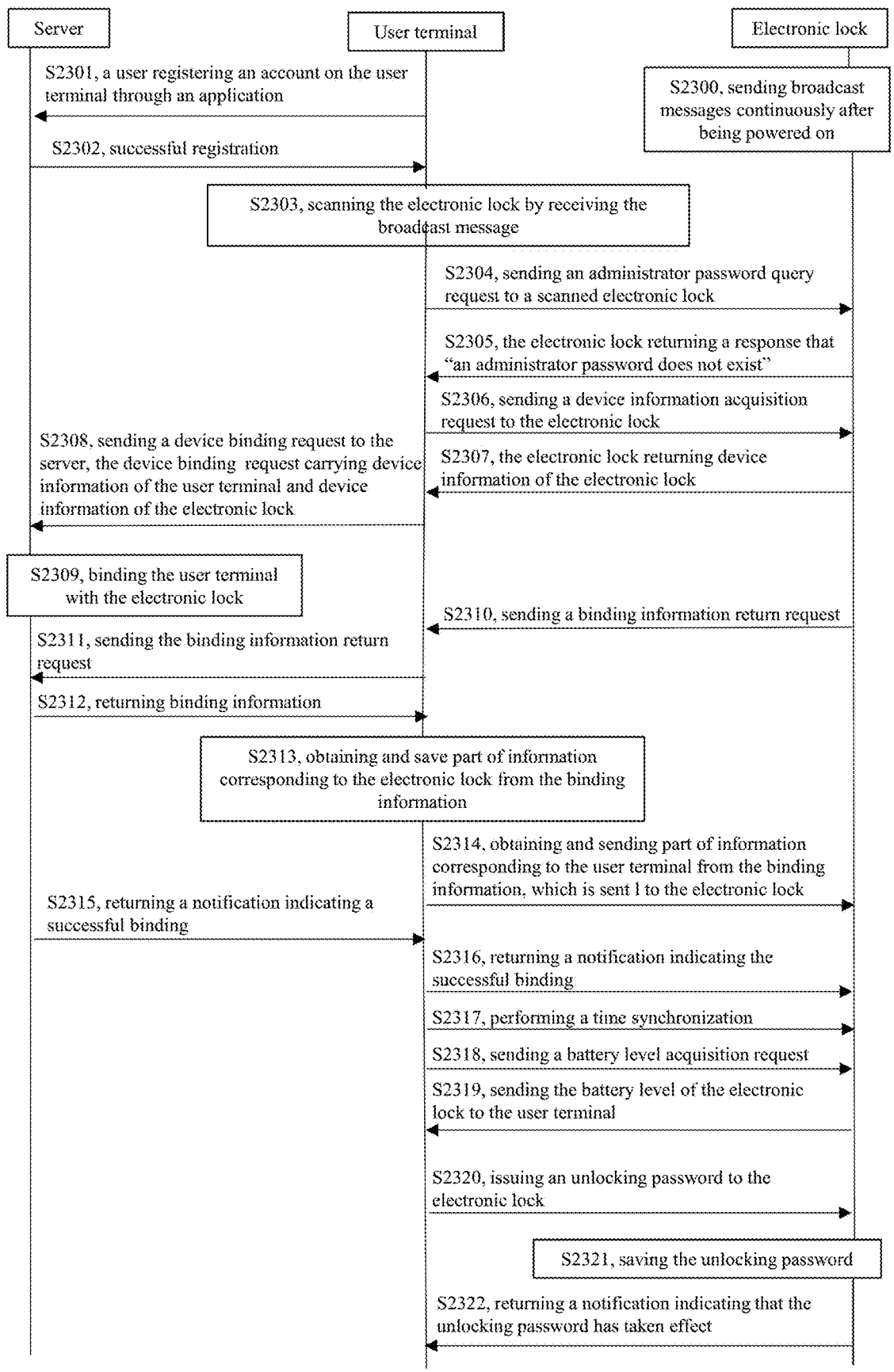
FIG. 23 is a flowchart illustrating another exemplary process for binding a device according to some embodiments of the present disclosure.

FIG. 23 is a flowchart illustrating another exemplary process for binding a device according to some embodiments of the present disclosure;

In the description of FIG. 23, a user terminal may include a control device. The embodiment may illustrate receiving a binding request, obtaining control device information of the control device based on the binding request, and sending warning information to the control device when the security verification is failed based on the control device information.

The following provides a specific embodiment for binding the user terminal with an electronic lock by implementing the process for binding a device of the present disclosure. As shown in FIG. 23, a binding process in the embodiment may include:

S2300: the electronic lock may send broadcast messages continuously after being powered on.

S2301: a user may register an account on the user terminal through an application.

S2302: a server may return a notification indicating a successful registration to the user terminal.

S2303: the user terminal may scan the electronic lock by receiving the broadcast message.

S2304: the user terminal may send an administrator password query request to the scanned electronic lock.

S2305: the electronic lock may return a response that "an administrator password does not exist" to the user terminal.

S2306: the user terminal may send a device information acquisition request to the electronic lock.

S2307: the electronic lock may return device information of the electronic lock to the user terminal.

S2308: the user terminal may send a device binding request to the server, and the device binding request may carry device information of the user terminal and the device information of the electronic lock.

S2309: the server may bind the user terminal with the electronic lock.

S2310: the electronic lock may send a binding information return request to the user terminal.

S2311: the user terminal may send the binding information return request to the server.

S2312: the server may return binding information to the user terminal.

S2313: the user terminal may obtain and save part of information corresponding to the electronic lock from the binding information.

S2314: the user terminal may obtain part of information corresponding to the user terminal from the binding information and send the part of information corresponding to the user terminal to the electronic lock.

S2315: the server may return a notification indicating a successful binding to the user terminal.

S2316: the user terminal may return the notification indicating the successful binding to the electronic lock.

S2317: the user terminal and the electronic lock may perform a time synchronization.

S2318: the user terminal may send a battery level acquisition request of the electric lock to the electronic lock.

S2319: the electronic lock may send a battery level of the electronic lock to the user terminal.

S2320: the user terminal may issue an unlocking password to the electronic lock.

S2321: the electronic lock may save the unlocking password.

S2322: the electronic lock may return a notification indicating that the unlocking password has taken effect to the user terminal.

Figure 24:
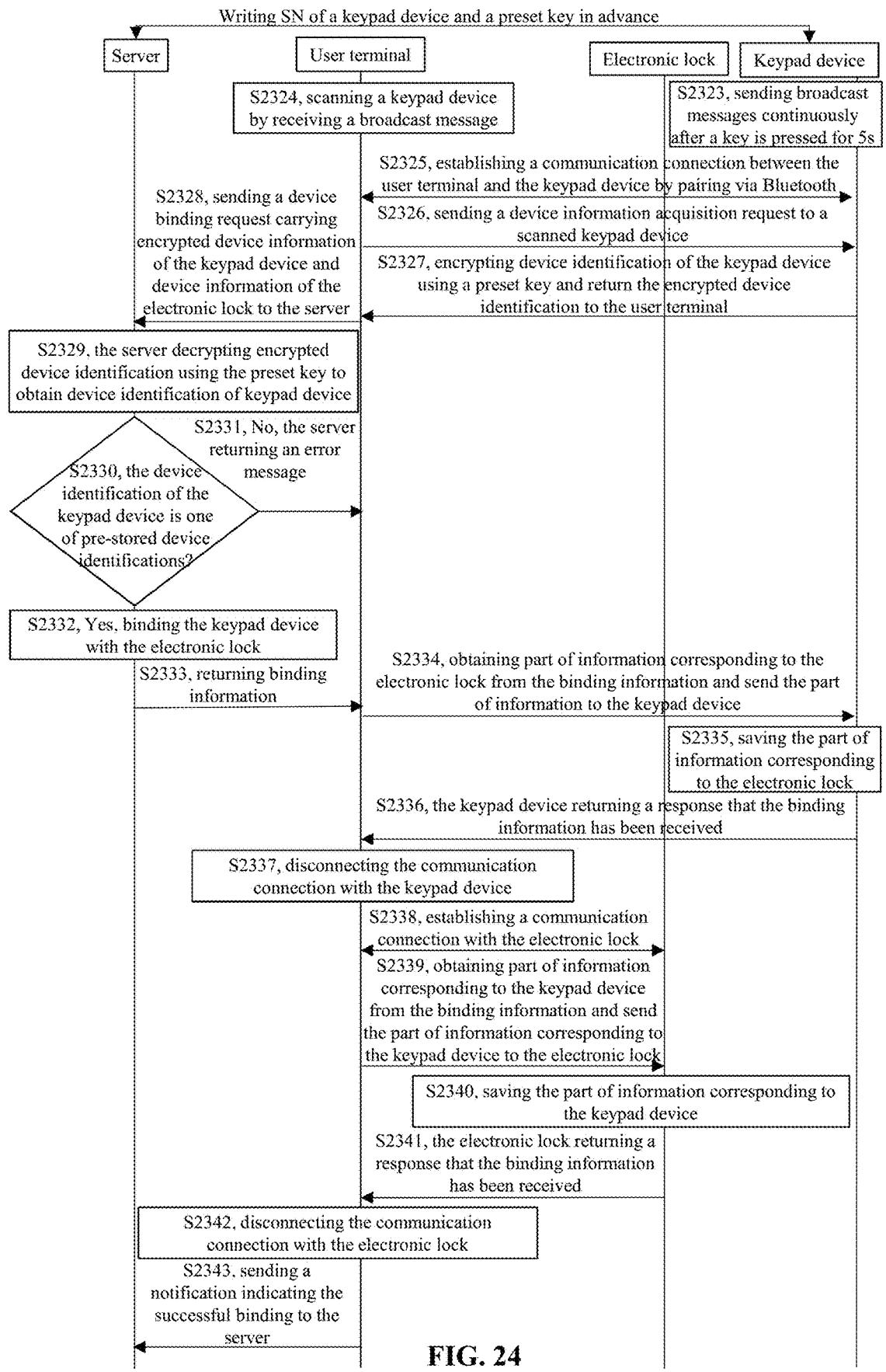
FIG. 24 is a flowchart illustrating another exemplary process for binding a device according to some embodiments of the present disclosure.

FIG. 24 is a flowchart illustrating another exemplary process for binding a device according to some embodiments of the present disclosure.

The following provides a specific embodiment for binding a keypad device with an electronic lock by implementing the method for binding a device of the present disclosure, as shown in FIG. 24. In some embodiments, each step in FIG. 24 may be executed after any one of steps S2316 to S2322 in FIG. 23. In the specific embodiment, a SN of the keypad device and a preset key may be written in a server and the keypad device in advance.

As shown in FIG. 24, a binding process in the specific embodiment may include:

S2323: the keypad device may send broadcast messages continuously after a user presses a certain key of the keypad device for five seconds.

S2324: a user terminal may scan the keypad device by receiving the broadcast message.

S2325: the user terminal and the keypad device may be paired via Bluetooth, and communication connection may be established between the user terminal and the keypad device.

S2326: the user terminal may send a device information acquisition request to a scanned keypad device.

S2327: the keypad device may encrypt the device identification of the keypad device using the preset key and then return the encrypted device identification to the user terminal.

S2328: the user terminal may send a device binding request to the server, and the device binding request may carry encrypted device information of the keypad device and device information of the electronic lock.

S2329: the server may decrypt the encrypted device identification using the stored preset key to obtain the device identification of the keypad device.

S2330: the server may determine whether the obtained device identification of the keypad device is one of pre-stored device identifications.

S2331: in response to determining that the obtained device identification of the keypad device is not one of pre-stored device identifications, the server may return an error message to the user terminal and end the binding process.

S2332: in response to determining that the obtained device identification of the keypad device is one of pre-stored device identifications, the server may bind the keypad device with the electronic lock and execute subsequent steps.

S2333: the server may return binding information to the user terminal.

S2334: the user terminal may obtain part of information corresponding to the electronic lock from the binding information and send the part of information corresponding to the electronic lock to the keypad device.

S2335: the keypad device may save the part of information corresponding to the electronic lock.

S2336: the keypad device may return a response that the binding information has been received to the user terminal.

S2337: the user terminal may disconnect the communication connection with the keypad device.

S2338: the user terminal may establish communication connection with the electronic lock.

S2339: the user terminal may obtain part of information corresponding to the keypad device from the binding information and send the part of information corresponding to the keypad device to the electronic lock.

S2340: the electronic lock may save the part of information corresponding to the keypad device.

S2341: the electronic lock may return a response that the binding information has been received.

S2342: the user terminal may disconnect the communication connection with the electronic lock.

S2343: the user terminal may send a notification indicating the successful binding to the server.

Figure 25:
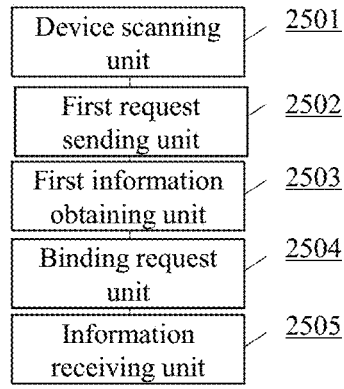
FIG. 25 is a schematic diagram illustrating an exemplary user device according to some embodiments of the present disclosure.

FIG. 25 is a schematic diagram illustrating an exemplary user device according to some embodiments of the present disclosure;

In the description of FIG. 25, a user terminal may include a control device. The embodiment may illustrate receiving a binding request, obtaining control device information of the control device based on the binding request, and sending warning information to the control device when the security verification is failed based on the control device information.

Corresponding to the process for binding a device provided in the embodiment shown in FIG. 16 of the present disclosure, the present disclosure may further provide a user terminal. As shown in FIG. 25, the user terminal may include a device scanning unit 2501, a first request sending unit 2502, a first information obtaining unit 2503, a binding request unit 2504, and an information receiving unit 2505.

In some embodiments, the first request sending unit 2502, the first information obtaining unit 2503, the binding request unit 2504, and the information receiving unit 2505 may correspond to the communication module 210. The device scanning unit 2501 may correspond to the control module 240.

The device scanning unit 2501 may be used for scanning a device to be bound.

The first request sending unit 2502 may be used for sending a device information acquisition request to the scanned device to be bound.

The first information obtaining unit 2503 may be used for obtaining device information of the device to be bound returned by the device to be bound.

The binding request unit 2504 may be used for sending a device binding request to the server, and the device binding request may carry the device information of the device to be bound and device information of a first device;

The information receiving unit 2505 may be used for receiving binding information returned by the server after binding the device to be bound with the first device such that the device to be bound and the first device may respectively obtain at least part of information in the binding information.

In some embodiments, the first device may be a user terminal, the device to be bound may be an electronic lock, and the information receiving unit 2505 may be specifically used for receiving the binding information returned by the server after binding the electronic lock with the user terminal, obtaining and saving part of information corresponding to the electronic lock from the binding information, and obtaining part of information corresponding to the user terminal from the binding information and sending the part of information corresponding to the user terminal to the electronic lock.

In some embodiments, the first device may be an electronic lock, the device to be bound may be a keypad device, and the information receiving unit 2505 may be specifically used for receiving binding information returned by the server after binding the keypad device with the electronic lock, obtaining part of information corresponding to the keypad device from the binding information and sending the part of information corresponding to the keypad device to the electronic lock, and obtaining part of information corresponding to the electronic lock from the binding information and sending the part of information corresponding to the electronic lock to the keypad device.

In other embodiments, the server and the keypad device may both pre-store a device identification of the keypad device and a preset key, and the first information obtaining unit 2503 may be used for: obtaining an encrypted device identification returned by the keypad device after encrypting the device identification using the preset key. The binding request unit 2504 may be used for sending a device binding request to the server such that the server may decrypt the encrypted device identification using the stored preset key to obtain the device identification of the keypad device and determine whether the obtained device identification of the keypad device is one of the pre-stored device identifications. The device binding request may carry the encrypted device identification and the device information of the electronic lock. Further, the information receiving unit 2505 may be used for receiving the binding information returned by the server after binding the keypad device with the electronic lock in the case of determining that the obtained device identification of the keypad device is one of the pre-stored device identifications such that the keypad device and the electronic lock may obtain at least part of information in the binding information, respectively.

Figure 26:
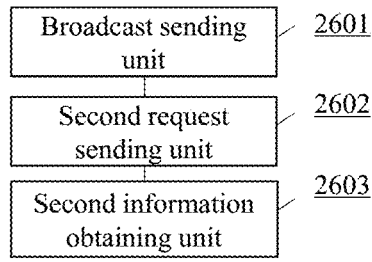
FIG. 26 is a schematic diagram illustrating an exemplary device to be bound according to some embodiments of the present disclosure.

FIG. 26 is a schematic diagram illustrating an exemplary device to be bound according to some embodiments of the present disclosure;

In the description of FIG. 26, a user terminal may include a control device. The embodiment may illustrate receiving a binding request, obtaining control device information of the control device based on the binding request, and sending warning information to the control device when the security verification is failed based on the control device information.

Corresponding to the process for binding a device provided in the embodiment shown in FIG. 21 of the present disclosure, the present disclosure may further provide a device to be bound, as shown in FIG. 26, the device to be bound may include a broadcast sending unit 2601, a second request sending unit 2602, and a second information obtaining unit 2603.

In some embodiments, the broadcast sending unit 2601, the second request sending unit 2602, and the second information obtaining unit 2603 may correspond to the communication module 210.

The broadcast sending unit 2601 may be used for sending a broadcast message to obtain a device information acquisition request returned by the user terminal after receiving the broadcast message;

The second request sending unit 2602 may be used for sending device information of the device to be bound to the user terminal such that the user terminal may send the device binding request to the server, and the device binding request may carry the device information of the device to be bound and device information of a first device;

The second information obtaining unit 2603 may be used for obtaining at least part of information in the binding information returned by the server after binding the device to be bound with the first device.

In some embodiments, the first device may be a user terminal, and the device to be bound may be an electronic lock. At least part of information in the binding information obtained by the electronic lock may be part of information corresponding to the user terminal in the binding information. At least part of information in the binding information obtained by the user terminal may be part of information corresponding to the electronic lock in the binding information.

In some embodiments, the first device may be an electronic lock, and the device to be bound may be a keypad device. At least part of information in the binding information obtained by the electronic lock may be part of information corresponding to the keypad device in the binding information. At least part of information in the binding information obtained by the keypad device may be part of information corresponding to the electronic lock in the binding information In some embodiments, the server and the keypad device may both pre-store a device identification of the keypad device and a preset key, and the second request sending unit

2602 may be used for encrypting the device identification using the preset key to obtain an encrypted device identification, and sending the encrypted device identification to the user terminal such that the user terminal may send the device binding request to the server, and the server may decrypt the encrypted device identification using the stored preset key to obtain the device identification of the keypad device and determine whether the obtained device identification of the keypad device is one of the pre-stored device identifications. The device binding request may carry the encrypted device identification and the device information of the electronic lock.

The second information obtaining unit 2603 may be used for obtaining at least part of information in the binding information returned by the server after binding the device to be bound with the first device in the case that the server determines that the obtained device identification of the keypad device is one of the pre-stored device identifications.

Corresponding to the process for binding a device provided by the embodiment shown in FIG. 16 of the present disclosure, the present disclosure may further provide a user terminal including a processor, a storage, and a program stored in the storage and executable on the processor. When the processor executes the program, the following steps may be implemented:

A device to be bound may be scanned.

A device information acquisition request may be sent to the scanned device to be bound.

Device information of the device to be bound returned by the device to be bound may be obtained.

A device binding request may be sent to a server, and the device binding request may carry the device information of the device to be bound and device information of a first device.

Binding information returned by the server after binding the device to be bound with the first device may be received such that the device to be bound and the first device may obtain at least part of information in the binding information, respectively.

In some embodiments, the first device may be a user terminal, and the device to be bound may be an electronic lock. Receiving the binding information returned by the server after binding the device to be bound with the first device such that the device to be bound and the first device may obtain at least part of information in the binding information, respectively, may include:

The binding information returned by the server after binding the electronic lock with the user terminal may be received, and part of information corresponding to the electronic lock may be obtained from the binding information and saved.

Part of information corresponding to the user terminal may be obtained from the binding information and sent to the electronic lock.

In some embodiments, the first device may be an electronic lock, and the device to be bound may be a keypad device. Receiving the binding information returned by the server after binding the device to be bound with the first device, such that the device to be bound and the first device may obtain at least part of information in the binding information, respectively, may include:

The binding information returned by the server after binding the keypad device with the electronic lock may be received, and part of information corresponding to the keypad device may be obtained from the binding information and sent to the electronic lock.

Part of information corresponding to the electronic lock may be obtained from the binding information and sent to the keypad device.

Corresponding to the process for binding a device provided in the embodiment shown in FIG. 21 of the present disclosure, the present disclosure may further provide a device to be bound, which may include a processor, a storage, and a program which is stored in the storage and executable on the processor. When the processor executes the program, the following steps may be implemented:

A broadcast message may be sent and a device information acquisition request returned by a user terminal after receiving the broadcast message may be obtained.

Device information of the device to be bound may be sent to the user terminal such that the user terminal may send a device binding request to a server, and the device binding request may carry the device information of the device to be bound and device information of a first device.

At least part of information may be obtained from the binding information returned by the server after binding the device to be bound with the first device.

In some embodiments, the first device may be a user terminal, and the device to be bound may be an electronic lock. At least part of information in the binding information obtained by the electronic lock may be part of information corresponding to the user terminal in the binding information. At least part of information in the binding information obtained by the user terminal may be part of information corresponding to the electronic lock in the binding information.

In some embodiments, the first device may be an electronic lock, and the device to be bound may be a keypad device. At least part of information in the binding information obtained by the electronic lock may be part of information corresponding to the keypad device in the binding information. At least part of information in the binding information obtained by the keypad device may be part of information corresponding to the electronic lock in the binding information.

In some embodiments, the keypad device may be integrated into an electronic lock as a part of the electronic lock, and a binding relationship has been established between the keypad device and the electronic lock in advance. A user may directly perform secure input through the keypad device on the electronic lock. In some embodiments, the electronic lock may be directly bound to the user terminal, and not need to be bound with the keypad device.

The user terminal and the device to be bound both may include a processor and a storage. The device scanning unit, the first request sending unit, the first information obtaining unit, the binding request unit, the information receiving unit, the broadcast sending unit, the second request sending unit, and the second information obtaining unit may be all stored in the storage as program units, and the processor may execute the above-mentioned program units stored in the storage to realize corresponding functions.

The processor may include a kernel, and the kernel may retrieve the corresponding program unit from the storage. One or more kernels may be set, and device binding may be achieved by adjusting kernel parameters.

The storage may include a non-permanent memory in a computer-readable medium, a random access memory (RAM), and/or a non-volatile memory, such as a read-only memory (ROM) or a flash random access memory (flash RAM), and the storage may include at least one storage chip.

An embodiment of the present disclosure provides a storage medium on which a program is stored, wherein when the program is executed by the processor, the method for binding a device may be implemented.

An embodiment of the present disclosure provides a processor, and the processor may be used for executing the program to implement the method for binding a device.

An embodiment of the present disclosure provides a device that includes a processor, a storage, and a program stored in the storage and executable on the processor. When the processor executes the program, the following steps may be implemented:

A broadcast message may be sent, and a device information acquisition request returned by a user terminal after receiving the broadcast message may be obtained.

Device information of the device to be bound may be sent to the user terminal such that the user terminal may send a device binding request to a server, and the device binding request may carry the device information of the device to be bound and device information of a first device.

At least part of information may be obtained from the binding information returned by the server after binding the device to be bound with the first device. The first device may obtain at least part of information in the binding information.

An embodiment of the present disclosure provides another device. The device may include a processor, a storage, and a program stored on the memory and executable on the processor. When the processor executes the program, the following steps may be implemented:

A device to be bound may be scanned.

A device information acquisition request may be sent to the scanned device to be bound.

Device information of the device to be bound returned by the device to be bound may be obtained.

A device binding request may be sent to a server, and the device binding request may carry the device information of the device to be bound and device information of a first device.

Binding information returned by the server after binding the device to be bound with the first device may be received such that the device to be bound and the first device may obtain at least part of information in the binding information, respectively.

The device in the present disclosure may be a server, a PC, a PAD, a mobile phone, or the like.

The present disclosure may further provide a computer program product which is suitable for executing and initializing a program having the following steps when being executed on a data processing device:

A device to be bound may be scanned.

A device information acquisition request may be sent to the scanned device to be bound.

Device information of the device to be bound returned by the device to be bound may be obtained.

A device binding request may be sent to a server, and the device binding request may carry the device information of the device to be bound and device information of a first device.

Binding information returned by the server after binding the device to be bound with the first device may be received such that the device to be bound and the first device may obtain at least part of information in the binding information, respectively.

The present disclosure may further provide another computer program product which is suitable for executing and initializing a program having the following steps when being executed on a data processing device:

A broadcast message may be sent, and a device information acquisition request returned by a user terminal after receiving the broadcast message may be obtained.

Device information of the device to be bound may be sent to the user terminal such that the user terminal may send a device binding request to a server, and the device binding request may carry the device information of the device to be bound and device information of a first device.

At least part of information in the binding information returned by the server after binding the device to be bound with the first device may be obtained. The first device may obtain at least part of information in the binding information.

In some embodiments, the security module 220 may decrypt at least part of an encrypted operation input, and perform a security verification with security control information to manage corresponding operations on the smart lock. In some embodiments, the input/output module 260 may receive the operation input of a user, and the operation input may include an operation instruction and/or operation information. The operation input may be encrypted or partially encrypted, for example, the operation information in the operation input may be encrypted. In some embodiments, the security module 220 may decrypt at least part of the encrypted operation input to obtain a decrypted operation input, and perform the security verification on the decrypted operation input and the security control information. If relevant information of the decrypted operation input matches the security control information, the security verification may be passed. The control module 240 may perform corresponding control operations (e.g., an unlocking operation) to ensure security of the operation input in the transmission process. In some embodiments, an anti-hijacking marker may be associated, and based on the corresponding control operations, the security module 220 may send information indicating that a user is hijacked to the server via the network 120. In some embodiments, after the server receives the information indicating that the user is hijacked, the server may send warning information to a designated device (e.g., a device bound to the smart lock, or a device used by the public security department), which may improve the personal and property safety of the user.

Figure 27:
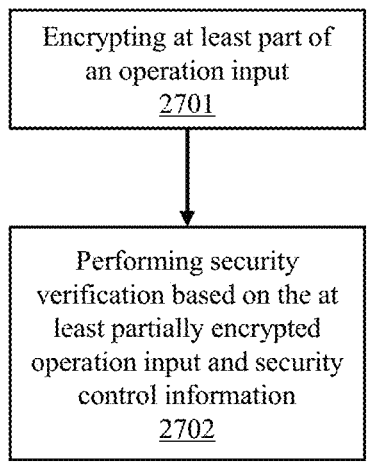
FIG. 27 is a flowchart illustrating an exemplary process for controlling a smart lock according to some embodiments of the present disclosure.

Some embodiments of the present disclosure provide a process for controlling a smart lock to manage operations on the smart lock and improve the security of the user. FIG. 27 is a flowchart illustrating an exemplary process for controlling a smart lock according to some embodiments of the present disclosure.

Step 2701: at least part of an operation input may be encrypted. The input/output module 260 may obtain the operation input, and the operation input may include an operation instruction and/or operation information. The operation input may be encrypted or partially encrypted, for example, the operation information in the operation input may be encrypted.

The operation input may also be referred to as input information. The input information may refer to information input by a user, such as a password. In some embodiments, the input information (e.g., the password) may be encrypted using a preset encryption algorithm. The encryption algorithm may be a conventional or customized encryption algorithm such as an AES-ECB-128 encryption algorithm.

It should be noted that the password involved in the present disclosure may be a character password such as numbers, words, symbols, or any combination thereof, a voice password, or biological characteristic information such as fingerprint information, an human face image, iris information, deoxyribonucleic acid (DNA), or the like.

The voice password may be voice information input by the user. In some embodiments, the voice password may include language information input by the user and voiceprint characteristics of the user. For example, the user may use voice information of reading the phrase "open sesame" by himself/herself as the voice password, which may include the language information of the phrase "open sesame" and the voiceprint characteristics of the user for reading the phrase.

The input information (or referred to as operation input) may include biological characteristic information (fingerprints, palm prints, finger veins, voice, an iris, a retina, and a human face), password information, user ID information, or the like, or any combination thereof. The user ID information may refer to information used for indicating a user identity and/or authority, and the user ID information may be stored in a magnetic card. In some embodiments, the input/output module 260 may include a fingerprint collector, a palm print collector, a finger vein collector, a sound collector (microphone), an iris collector, a facial information collector (e.g., a camera), an electronic tag reader, an information input device, or the like, or any combination thereof. In some embodiments, the security module 220 may include multiple identification units (not shown in FIG. 28), and different identification units may include different input information collection sub-units. The different input information collection sub-units may obtain different types of biological characteristic information. For example, the fingerprint collector may be used for obtaining fingerprint characteristic information of the user, the iris collector may be used for obtaining iris characteristic information of the user, the electronic tag reader may be used for obtaining user ID information (information in the magnetic card), and the user may input password information through the information input device. In some embodiments, the input manner of the password information may include a key input, a handwriting input, or a voice input.

The smart lock may obtain the encrypted input information through one or more of the following manners:

In some embodiments, the smart lock may obtain the encrypted input information from the control device through the network 120.

In some embodiments, the smart lock may also obtain the encrypted input information through the input/input module 260.

In some embodiments, the encrypted input information may include an operation instruction. After the security verification is passed, the smart lock may perform corresponding security operations based on the operation instruction included in the input information, such as password verifying, an unlocking operation, a locking operation, and information sending. A security verification method may be found in step S2702.

Step 2702: security verification may be performed based on the at least partially encrypted operation input and the security control information. The operation may be performed by the security module 220.

In some embodiments, the security control information may be information used for verifying the identity of the user. In some embodiments, the information used for verifying the identity of the user may be pre-stored password information and/or biological characteristic information of the user. More description regarding the security control information may be found elsewhere in the present disclosure. See, e.g., FIG. 29 and FIG. 30, and the relevant description thereof. In some embodiments, the information used for verifying the identity of the user may also be second verification information. More description regarding the second verification information may be found elsewhere in the present disclosure. See, e.g., FIG. 35 and the relevant description thereof.

A plurality of methods may be used for the security verification. In some embodiments, the smart lock may decrypt the encrypted input information and then perform a plaintext comparison with the security control information. In some embodiments, the smart lock may also perform a ciphertext comparison between the encrypted input information and the security control information, which is not limited in the present disclosure.

After the security verification is passed, the smart lock may perform corresponding security operations based on the operation instruction included in the input information, such as the password verifying, the unlocking operation, the locking operation, and the information sending. When the security verification is failed, the smart lock may perform an abnormal processing, such as sending warning information. More description regarding performing corresponding security operations may be found elsewhere in the present disclosure. See, e.g., FIG. 28 and the relevant description thereof.

The operation instruction may refer to a computer instruction that may instruct a specific operation, such as an unlocking instruction, a locking instruction, an information viewing instruction, and an information updating instruction. The password information stored in the smart lock may be viewed through the information viewing instruction. The information may include content of the password, a date when the password was set, an expiration date of the password, the count of the password, the identity of the owner of the password, or the like. Through the information updating instruction, the above information may be added, deleted and/or modified.

In some embodiments, the operation instruction may include password information. In some embodiments, the operation instruction may be input locally in the smart lock 130. In some embodiments, the operation instruction may also be remotely triggered by wireless communication or a remotely connected input device (e.g., keypad) or the user terminal 140 (e.g., a mobile phone). In some embodiments, the input device (e.g., the keypad) or the user terminal 140 (e.g., the mobile phone) may establish a secure connection with the smart lock 130 through the method as shown in FIG. 5 to improve security of data transmission. In some embodiments, the input device (e.g., the keypad) or the user terminal 140 (e.g., the mobile phone) may be bound with the smart lock 130 through the method as shown in FIG. 14 to improve security of data transmission and improve data transmission efficiency.

In some embodiments, the above-mentioned operation instructions may include a pre-set associated information marker. When a security operation corresponding to the operation instruction is performed, the smart lock may send information related to the associated information marker to the server such that the server may perform the corresponding operation. The associated information marker may refer to a marker associated with preset situation information. For example, the associated information marker may be an anti-hijacking marker used for sending information prompting that the user is hijacked to the server, and then the server may send warning information to a second designated device. The second designated device may be, for example, a user device used by a family member of the person to whom the smart lock belongs, or may be a device used by the relevant public security department, which is not specifically limited herein. In such cases, the user may send a distress signal under the condition that a hijacker does not know the distress signal, which may prevent the hijacker from harming the user. For example, the associated information marker may also be a marker indicating going home safely, and used for sending information indicating that the user has gone home safely to the server, and then the server may send the information to the second designated device. In such cases, the user may send a prompt message indicating that he/she has gone home safely to his/her family members at the same time when he/she goes home, and it may be no longer needed to use a mobile phone to send messages.

In some embodiments, if the above-mentioned operation instructions include a pre-set associated information marker, the smart lock may use a camera device to photograph and/or record a surrounding environment of the smart lock when the security operation corresponding to the operation instruction is performed and then upload the surrounding environment to the server.

For example, when the above operation instructions include an anti-hijacking marker, the camera device may photograph and/or record the surrounding environment of the smart lock when the security operation corresponding to the operation instruction is performed so as to obtain image information of the hijacker and the hijacking situation, and upload the image information of the hijacker and the hijacking situation to the server via the network. The server may send the image information of the hijacker and the hijacking situation to the second designated device (e.g., the device used by the public security department).

The user of the second designated device (e.g., the public security department) may identify and record the identity of the hijacker, and determine the hijacking situation in order to take further measures.

As another example, when the above operation instructions include the marker indicating going home safely, the camera device may photograph and/or record the user and upload the user to the server via the network when the security operation corresponding to the operation instruction is performed. The server may send image information of the user to the second designated device (e.g., the device of the family member of the user) such that the family member of the user may confirm that the user has gone home safely.

In some embodiments, the smart lock may send state information, warning information, or the like after the security verification to the control device or the server via the network. When performing the unlocking operation, the control module 240 may perform an unlocking verification operation on the smart lock 130, and control the smart lock to perform the locking operation after confirming a successful unlocking or control the smart lock to record and report information that the unlocking is failed after confirming that the unlocking is failed to achieve the unlocking operation monitoring and locking operation management of the smart lock 130. More description regarding the unlocking operation monitoring and locking operation management may be found elsewhere in the present disclosure. See, e.g., FIG. 43 and the description thereof.

Figure 28:
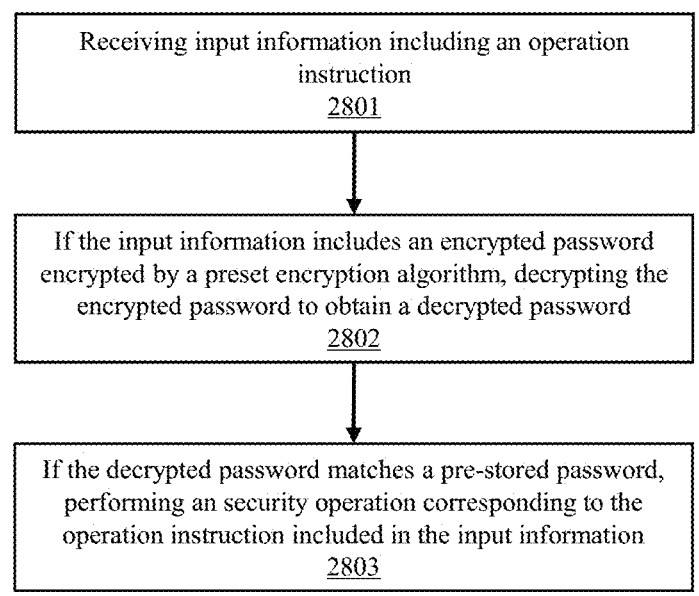
FIG. 28 is a flowchart illustrating an exemplary process for controlling a smart lock according to some embodiments of the present disclosure.

As shown in FIG. 28, FIG. 28 is a flowchart illustrating an exemplary process for controlling a smart lock according to an embodiment of the present disclosure. An operation input may include an operation instruction and operation information, and the "operation instruction" may be referred to as a "control instruction". The operation input may include encrypted input information. Security control information may include a pre-stored password.

The process may be applied to the smart lock, and the process may include the following steps:

2801: input information may be received. The input information may include an operation instruction.

2802: if the input information includes an encrypted password encrypted by a preset encryption algorithm, the encrypted password may be decrypted to obtain a decrypted password;

2803: if the decrypted password matches a pre-stored password, a security operation corresponding to the operation instruction included in the input information may be performed.

The process for controlling the smart lock of the present disclosure may not only ensure security of a password in the transmission process, but also identify the identity of a person, and solve an identity identifying security problem. Only when authenticated information is passed, may the smart lock perform corresponding security operations.

The above-mentioned operation instructions may be various instructions related to the smart lock, such as an unlocking instruction, a locking instruction, an information updating instruction, and an information viewing instruction, which are not specifically limited herein. Information updating may refer to adding, deleting and/or modifying information (such as password information). It should be noted that the above-mentioned operation instructions may be operation instructions sent by a user through the control device, or operation instructions input by the user on the smart lock, for example, operation instructions triggered by entering biological characteristic information, which is not specifically limited herein. In addition, a password involved in the present disclosure may include a character password such as numbers, characters, symbols, or any combination thereof, a voice password, or biological characteristic information such as fingerprint information, a facial images, iris information, and deoxyribonucleic (DNA), which is not specifically limited herein.

In some embodiments, the encryption process of the preset encryption algorithm may include encrypting a password to be encrypted based on an encryption password. If the input information is received from the control device and the input information includes the encrypted password, the smart lock may receive an encryption password generation request sent by the control device before receiving the input information. Based on the encryption password generation request, the encryption password may be randomly generated, and the randomly generated encryption password may be returned to the control device such that the control device may encrypt the password to be encrypted based on the randomly generated encryption password to obtain an encrypted password. It should be noted that by transmitting the encrypted encryption password, security of the password in the transmission process may be improved, and leakage of the password may be prevented, thereby ensuring the personal safety and property safety of a person to whom the smart lock belongs.

Further, the smart lock may decrypt the encrypted password based on the above-mentioned randomly generated encryption password.

In some embodiments, the encryption process of the preset encryption algorithm may further include encrypting the encryption password with a key to obtain an encrypted encryption password, and encrypting the password to be encrypted with the encrypted encryption password. In the case that the encrypted password is obtained by the control device through the encryption manner, the smart lock may use the following decryption manner after receiving the above input information. The decryption manner may include encrypting the above randomly generated encryption password using the key to obtain the encrypted encryption password, and decrypt the encrypted password using the encrypted encryption password to obtain the decrypted password. It should be noted that by using the encryption manner, security of the password in the transmission process may be further improved.

In some optional implementation manners of the embodiment, if the decrypted password is the biological characteristic information, the smart lock may also perform identity authentication based on the decrypted password. After the security operation corresponding to the operation instruction is executed, the smart lock may also send a security operation execution result and an identity authentication result to a first designated device. The smart lock may locally store the biological characteristic information and personal information corresponding to the biological characteristic information. For example, the personal information may include, but is not limited to, personal information such as the name of a person, or the like. The smart lock may search the biological characteristic information that matches the decrypted password locally, and use the personal information corresponding to the biological characteristic information in advance as the identity authentication result. It should be noted that, the first designated device may be, for example, a control device that sends the foregoing operation instruction, or may be a device indicated by a preset device identification, which is not specifically limited herein.

In some embodiments, the operation instruction may include a preset associated information marker. When the security operation corresponding to the operation instruction is performed, the smart lock may send information related to the associated information marker to the server such that the server may perform the corresponding operation.

In some embodiments, the associated information marker may be an anti-hijacking marker. When the security operation corresponding to the operation instruction is performed, the smart lock may send information prompting that the user is hijacked to the server such that the server send warning information to a second designated device.

In some embodiments, when the operation instruction includes an anti-hijacking marker, a camera device may photograph and/or record the surrounding environment of the smart lock when the security operation corresponding to the operation instruction is performed so as to obtain image information of the hijacker and the hijacking situation, and upload the image information of the hijacker and the hijacking situation to the server via the network. The server may send the image information of the hijacker and the hijacking situation to the second designated device (e.g., the device used by the public security department). The user of the second designated device (e.g., the public security department) may identify and record the identity of the hijacker, and determine the hijacking situation in order to take further measures.

The warning information may be text information or voice information, or the like, which is not specifically limited herein. It should be noted that the solution provided by the implementation manner may reduce the risk that a hijacked person is injured when the warning information is given. Since the warning information is not issued directly by the device but issued in the background, the hijacker on the scenario may not know the warning information, which may reduce the risk that the hijacked person may be injured. In addition, different anti-hijacking levels may be provided, which may increase the selection way for the user to given an alarm, is more convenient and flexible to use, and may also increase security of the user.

In some embodiments, when the operation instruction includes a marker indicating going home safely, the camera device may photograph and/or record the user and upload the user to the server via the network when the security operation corresponding to the operation instruction is performed. The server may send image information of the user to the second designated device (e.g., the device of the family member of the user) such that the family member of the user may confirm that the user has gone home safely.

Figure 29:
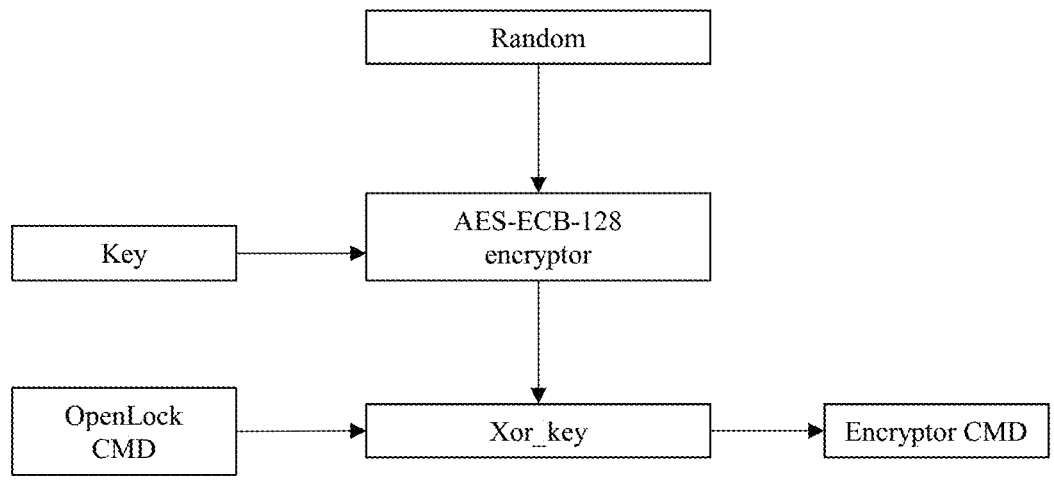
FIG. 29 is a schematic diagram illustrating an application scenario of a method for controlling a smart lock according to some embodiments of the present disclosure.

FIG. 29 is a schematic diagram of an application scenario for controlling a smart lock according to an embodiment of the present disclosure. In the application scenario, taking an encryption password as a challenge code as an example, the challenge code may refer to a set of encryption passwords generated according to the challenge handshake authentication protocol (CHAP), and may be used for preventing a real password of the user from leakage in the transmission process. It should be understood that the application scenario may be intended to make the process of the present disclosure be clearer, which is not intended to limit the present disclosure.

In the application scenario shown in FIG. 29, when the user controls the smart lock to perform the unlocking through a control device, the following authentication process may be used: (1) the user may send a challenge code obtaining instruction to the smart lock through APP (Application)/keypad on the control device; (2) after the smart lock receives the challenge code obtaining instruction, the smart lock may return a random number Random of 16 bytes to the control device; (3) the control device may encrypt the Random using a key of 16 bytes using an AES-ECB-128 encryptor, and an xor_key of 16 bytes (exclusive or keyword-an algorithm logic) may be generated. The control device may use the xor_key to encrypt the password (OpenLock CMD) used for unlocking and obtain a ciphertext (Encrypted CMD), and send the ciphertext to the smart lock; (4) after the smart lock receives the ciphertext, the smart lock may use the key and Random returned by step (2) to perform an AES-ECB-128 encryption operation to obtain the xor_key. The ciphertext may be decrypted using the xor_key to obtain a plaintext, that is, the password used for unlocking; (5) if the decrypted plaintext matches a prestored password, the smart lock may perform the unlocking operation.

Specifically, the smart lock may select a corresponding key to decrypt data according to a received blekey_id (which may be understood as identity information of a person performing the unlocking), determine whether a decrypted command belongs to the blekey_id. If the decrypted command belongs to the blekey_id, permission and operation of the corresponding key may be executed. The blekey_id may be used to distinguish the permission, or distinguish the identities of an administrator and ordinary person, and different identities may have different permissions, that is, different operations.

In the above step (3), the xor_key may be used to encrypt the transmitted communication instruction. The principle for achieving the xor_key may be to use the key to perform the AES-ECB-128 encryption on the challenge code to obtain the xor_key.

The processing procedure/manners when the input information includes unencrypted biological characteristic information may be described in detail in combination with the following description to describe the present disclosure clearly.

Figure 30:
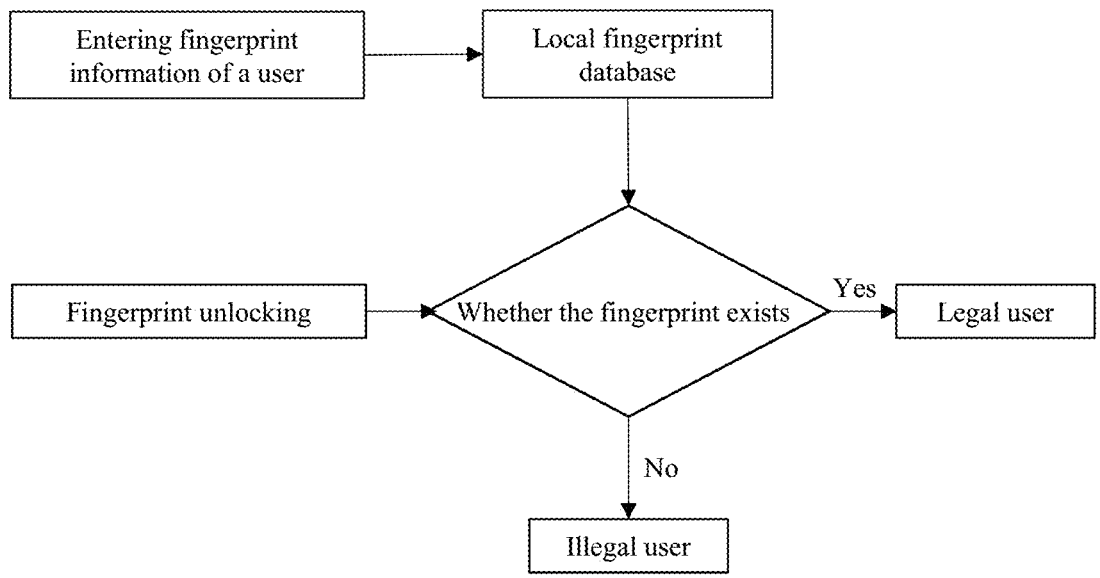
FIG. 30 is a flowchart illustrating an exemplary process for controlling a smart lock according to some embodiments of the present disclosure.

As shown in FIG. 30, FIG. 30 is a flowchart illustrating an exemplary process for controlling a smart lock according to another embodiment of the present disclosure. When the input information includes unencrypted biological characteristic information, the biological characteristic information may be information collected by the smart lock that uses a biological characteristic information collection module contained therein. In the embodiments shown in FIG. 30, fingerprint information may be taken as an example for description.

Fingerprint identification, due to the uniqueness of biological fingerprints, illegal user identities may be directly excluded at the input end. Fingerprint information of a user may be collected and entered to a device in advance. When the user opens a door with fingerprints, only correct fingerprints may be identified and passed.

Specifically, the smart lock may include a local database. The user may need to enter fingerprint information in advance such that the fingerprint information may be stored in the local database. When the user performs the unlocking through fingerprints, the smart lock may compare the fingerprint information of the user which is collected newly with the fingerprint information stored in the local database to determine whether the local database includes the fingerprint information of the user. If the fingerprint information comparison is successful, the smart lock may determine that local database includes the fingerprint information of the user, and determine that the user is a legitimate user, and the smart lock may perform security operations (such as an unlocking operation, a lock operation, an information updating operation, or an information obtaining operation) corresponding to operation instructions triggered when the user enters the fingerprint information. If the fingerprint information comparison is unsuccessful, the smart lock may determine that the local database does not include the fingerprint information of the user and the user is an illegal user, and perform a corresponding processing.

Furthermore, if the operation instruction triggered when the user enters the fingerprint information includes fingerprint information associated with an anti-hijacking marker, the smart lock may also send information used for prompting that the user is hijacked to a server in the case of a normal response to the operation instruction, such that the server may send warning information to a second designated device.

In some optional implementation manners of the process for controlling the smart lock according to the embodiments corresponding to FIG. 28 and FIG. 30, the local database of the smart lock may store information input in advance by the user. At least one piece of password information input by the user may be stored in the database, and the password information may be a character password (such as a number password) or biological characteristic information. In addition, when there is anti-hijacking password information in the at least one piece of password information, the anti-hijacking marker corresponding to the password information may also be stored in the database to indicate that the password information is an anti-hijacking password. In addition, when the anti-hijacking password is divided according to anti-hijacking levels, the database may also store the anti-hijacking levels set by the user corresponding to the password information corresponding to the anti-hijacking marker. Different anti-hijacking levels may represent different degrees of severity of a hijacking incident. A high anti-hijacking level may correspond to a serious hijacking incident. In addition, a device identification corresponding to the anti-hijacking level set by the user may also be stored in the database. When the password information corresponding to the anti-hijacking marker does not need to be divided according to the anti-hijacking levels, the user may not set the anti-hijacking level for the password information, and the user may directly set a corresponding device identification for the password information. A device indicated by the device identification may be a device for receiving the warning information sent by the server.

Figure 31:
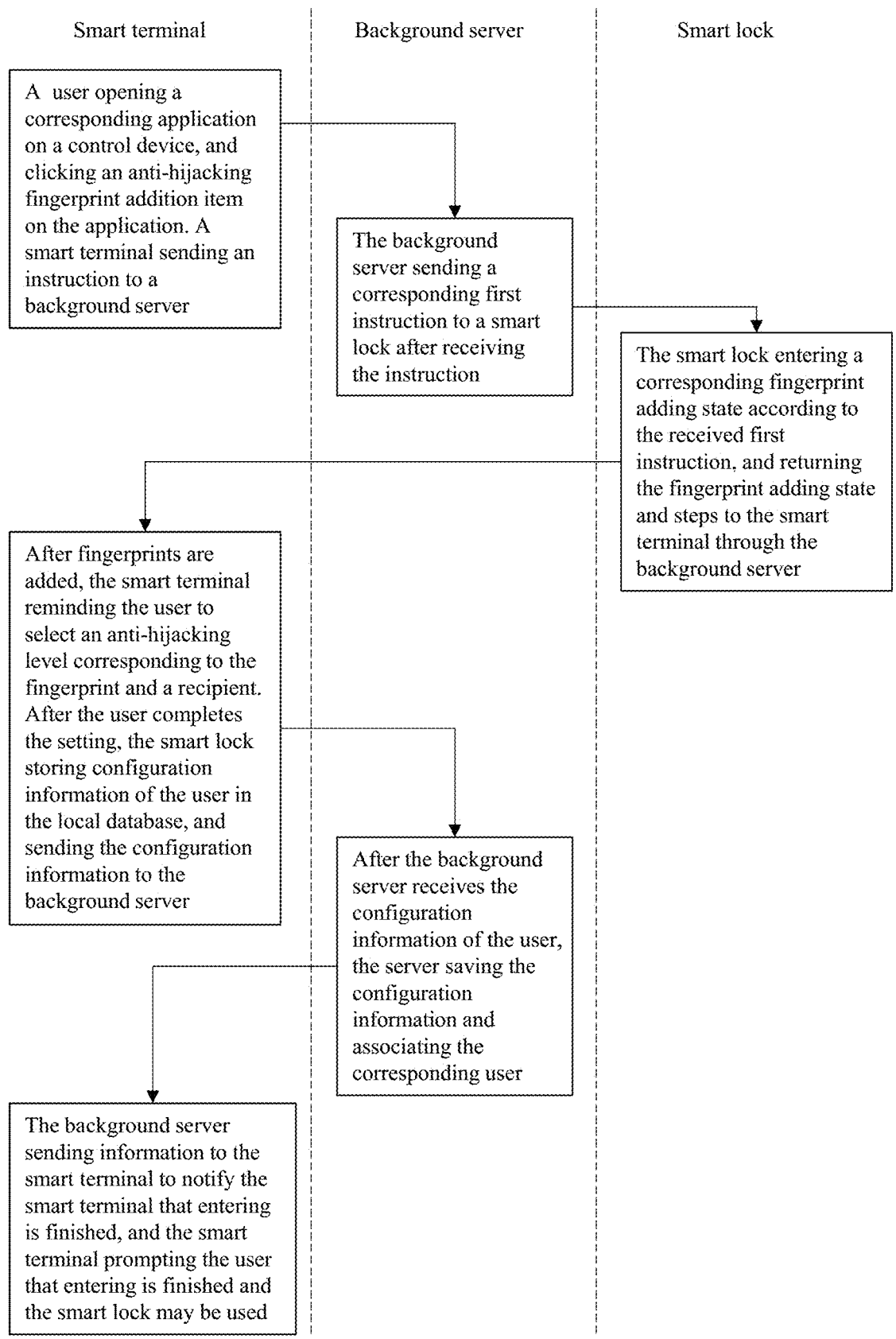
FIG. 31 is a schematic diagram illustrating an exemplary process for a user to input anti-hijacking fingerprint information in advance according to some embodiments of the present disclosure.

FIG. 31 is a schematic diagram illustrating an exemplary process for a user to enter anti-hijacking fingerprint information in advance.

In some embodiments, the process for the user to input the anti-hijacking fingerprint information in advance may include:

The user may open a corresponding application on a control device (e.g., a smart terminal such as a mobile phone), and click an anti-hijacking fingerprint addition item on the application. The smart terminal may send an instruction to a background server (such as the abovementioned server).

After receiving the instruction sent by the smart terminal, the background server may send a corresponding first instruction to a smart lock.

The smart lock may enter a corresponding fingerprint adding state according to the received first instruction, and return the fingerprint adding state and steps to the smart terminal through the background server.

After fingerprints are added, the smart terminal may remind the user to select an anti-hijacking level corresponding to the fingerprint and a recipient (a person to whom a device for receiving warning information sent by the background server belongs). After the user completes the setting, the smart lock may store configuration information of the user in the local database, and send the configuration information to the background server.

After the background server receives the configuration information of the user, the server may save the configuration information and associate the configuration information with the corresponding user.

The background server may send information to the smart terminal to notify the smart terminal that the input is finished, and the smart terminal may prompt the user that the input is finished and the smart lock may be used.

When the fingerprint information needs to be deleted, the user may click a deletion item on an application management page of the smart terminal. The smart terminal may prompt the user whether the deletion is confirmed. If the deletion is confirmed, the smart terminal may send an instruction to the smart lock through the background server such that the smart lock may delete the fingerprint. After the deletion, a successful deletion may be prompted to the user.

Figure 32:
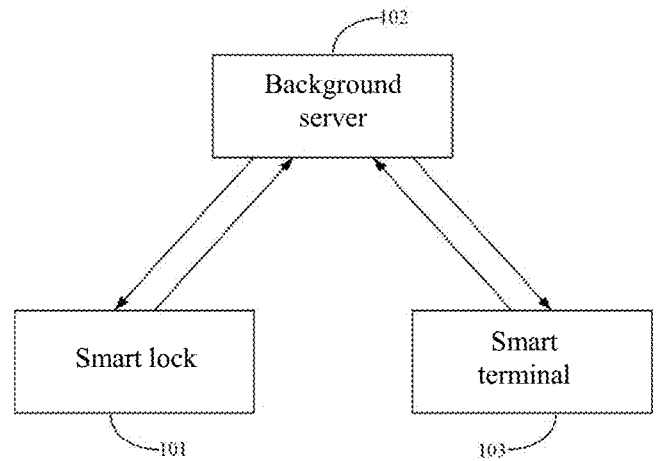
FIG. 32 is a schematic diagram illustrating an exemplary system for controlling a smart lock according to some embodiments of the present disclosure.

FIG. 32 is a schematic diagram illustrating an exemplary system for controlling a smart lock according to an embodiment of the present disclosure. The "smart lock" may be called an "intelligent lock", a "server" may be called a "background server", and a "user terminal" may be called a "smart terminal".

The system may include an intelligent lock 3201, a background server 3202, and a smart terminal 3203. The intelligent lock 3201 may be connected to the background server 3202 in a wired or wireless manner, and the background server 3202 may be connected to the smart terminal 3203 in a wired or wireless manner. The intelligent lock 3201 may be installed on a room door of a user (such as a room front door or a bedroom door), and may also be installed in any other scenario that needs locks, for example, the locks may be installed on a safe box or a car door of an automobile, which is not limited herein.

The intelligent lock 3201 may include an information entry unit, such as a keypad for inputting a password or a fingerprint input unit for entering fingerprints, such that the intelligent lock 3201 may be used for inputting preset information of the user and obtaining information of the user for controlling a door lock. The intelligent lock 3201 may also include a storage unit used for storing the input preset information of the user. The intelligent lock 3201 may also include a data processing unit and a communication module (depending on different connection manners with the background server 3202, the connection manners may be a wired communication module or a wireless communication module) which are respectively used for obtaining instructions of the background server 3202 and sending information to the background server 3202.

The background server 3202 may be a physical server or a cloud server, which is not specifically limited herein. When the background server 3202 is the cloud server, the background server 3202 may be connected to the intelligent lock 3201 in a wireless manner, and used for sending instructions to the intelligent lock 3201 and receiving information sent by the intelligent lock 3201, such as receiving the preset information of the user entered by the intelligent lock 3201. The background server 3202 may also be connected to the smart terminal 3203 in a wireless manner, and used for sending messages to the smart terminal 3203 and receiving instructions sent by the smart terminal 3203.

The smart terminal 3203 may be a terminal in any form, such as a smart phone, a tablet personal computer, a notebook computer, or a desktop computer, which is not limited herein. The smart terminal 3203 may be used for sending instructions to the background server 3202, receiving information sent by the background server, and managing the preset information of the database. For example, the preset information may be added or deleted as needed. Taking the intelligent lock 3201 installed on the door of a house as an example, when the user needs to open the door, he/she may need to input corresponding control information for controlling the intelligent lock 3201 through the intelligent lock 3201. The type of the information for controlling the door lock may be set according to requirements. For example, the control information may be a fingerprint of the user. The intelligent lock 3201 may be configured with a fingerprint input unit. To open the door, the user may place his/her finger on the surface of the fingerprint input unit, and the fingerprint input unit may read the fingerprint information of the user to obtain the control information of the user. As another example, the control information may be a password of the user. The intelligent lock 3201 may include the keypad (e.g., a numeric keypad, a full keypad containing letters, numbers, etc., or keypads of other forms). To open the door, the user may input the password through the keypad such that the intelligent lock 3201 may obtain the control information of the user.

The control information may be matched with the preset information in the database to obtain preset information that matches the control information.

After obtaining the control information input by the user, it may be necessary to match the control information with the preset information in the database in order to confirm the identity of the user. The preset information may refer to user information that is pre-entered before performing the unlocking. The user information may be the fingerprint of the user or the password, which may be set according to requirements. When the control information matches certain preset information in the database, the preset information may be preset information that needs to be obtained.

According to the preset information, a response operation associated with the preset information may be executed.

Figure 33:
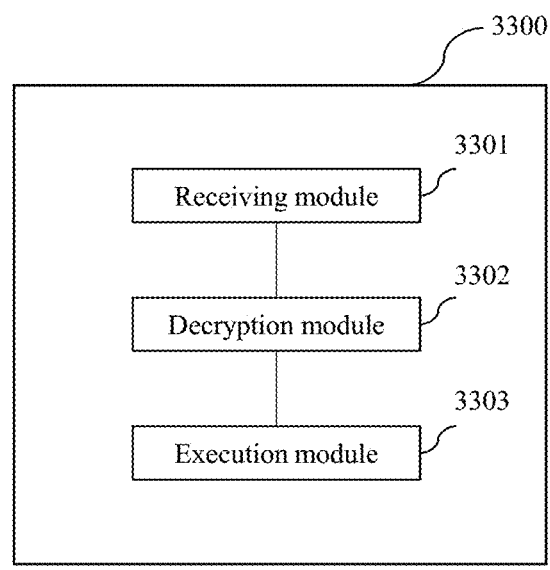
FIG. 33 is a schematic diagram illustrating an exemplary apparatus for controlling a smart lock according to some embodiments of the present disclosure.

Referring to FIG. 33, the embodiment of the present disclosure further provides an apparatus 300 for controlling a smart lock, and the apparatus 3300 may be applied to the smart lock. The apparatus 3300 may include a receiving module 3301, a decryption module 3302, and an execution module 3303. The apparatus 3300 may correspond to the apparatus 200 in FIG. 2, the receiving module 3301 may correspond to the input/output module 260 in FIG. 2, the decryption module 3302 may correspond to the security module 220 in FIG. 2, and the execution module 3303 may correspond to the control module 240 in FIG. 2.

The receiving module 3301 may be used for receiving operation information and/or operation instructions. If the operation information includes an encrypted password encrypted by a preset encryption algorithm, the decryption module 3302 may decrypt the encrypted password to obtain a decrypted password. If the decrypted password matches a pre-stored password, the execution module 3303 may execute a security operation corresponding to the operation instruction.

In some optional implementation manners of the embodiment, the encryption process of the preset encryption algorithm may include encrypting a password to be encrypted based on an encryption password. If the above operation information is received from a control device, and the operation information includes the encrypted password, before receiving the operation information, the apparatus 3300 may further include a first receiving module (not shown in the figure) used for receiving an encryption password generation request sent by the control device, a generation module ((not shown in the figure) used for randomly generating an encryption password based on the encryption password generation request, and a first sending module (not shown in the figure) used for returning the randomly generated encryption password to the control device, such that the control device may encrypt the password to be encrypted based on the randomly generated encryption password to obtain the encrypted password.

In some optional implementation manners of the embodiment, the decryption module 3302 may include a decryption sub-module (not shown in the figure) for decrypting the encrypted password based on the randomly generated encryption password.

In some optional implementation manners of the embodiment, the encryption process of the preset encryption algorithm may further include encrypting the encryption password with a key to obtain the encrypted encryption password, and encrypting the password to be encrypted using the above encrypted encryption password. The decryption sub-module may be further used for encrypting the randomly generated encryption password with the key to obtain the encrypted encryption password, and decrypting the encrypted password using the encrypted encryption password.

In some optional implementation manners of the embodiment, the apparatus 3300 may further include an identity authentication module used for performing identity authentication based on the decrypted password if the decrypted password belongs to biological characteristic information, and a second sending module (not shown in the figure) used for sending a security operation execution result and an identity authentication result to a first designated device after the execution module 3303 executes the security operation corresponding to the above operation instruction.

In some optional implementation manners of the embodiment, the above apparatus 3300 may further include a third sending module (not shown in the figure) used for sending information for prompting that the user is hijacked to a server such that the server may send warning information to a second designated device when the execution module 303 executes the security operation corresponding to the operation instruction if the decrypted password is associated with an anti-hijacking marker in advance.

In some optional implementation manners of the embodiment, the operation instruction may be any one of an unlocking instruction, a locking instruction, an information viewing instruction, and an information updating instruction.

It should be noted that the apparatus 3300 may include a processor and a storage. The receiving module 3301, the decryption module 3302, the execution module 3303, or the like may be all stored in the storage as program units, and the processor may execute the above program units stored in the storage to realize corresponding functions.

The processor may contain a kernel, and the kernel may retrieve the corresponding program unit from the storage. One or more kernels may be set, and the above-described objectives of the present disclosure may be achieved by adjusting kernel parameters.

The storage may include a non-permanent memory in a computer-readable medium, a random access memory (RAM), and/or a non-volatile memory, such as a read-only memory (ROM) or a flash random access memory (flash RAM), and the storage may include at least one storage chip.

The apparatus provided in the embodiments of the present disclosure may receive the operation information, decrypt the encrypted password encrypted by the preset encryption algorithm in the operation information to obtain the decrypted password, execute a security operation corresponding to the operation instruction in the operation information in response to determining that the decrypted password matches the pre-stored password, which may improve the security of the password in the transmission process, realize the identity verification of a person performing the unlocking, and solve the security problem in identity identifying. Only after authenticated information is passed, may the smart lock perform the corresponding security operation.

The embodiments of the present application provide a computer-readable medium on which a computer program is stored, wherein when the program is executed by a processor, the methods for controlling the smart lock described in the above embodiments may be implemented.

An embodiment of the present disclosure provides a processor used for executing a program to implement the method for controlling the smart lock described in the embodiments.

The present disclosure further provides a computer program product. When executed on a data processing device, the computer program product may direct the data processing device to implement the method for controlling the smart lock described in the embodiments.

Figure 34:
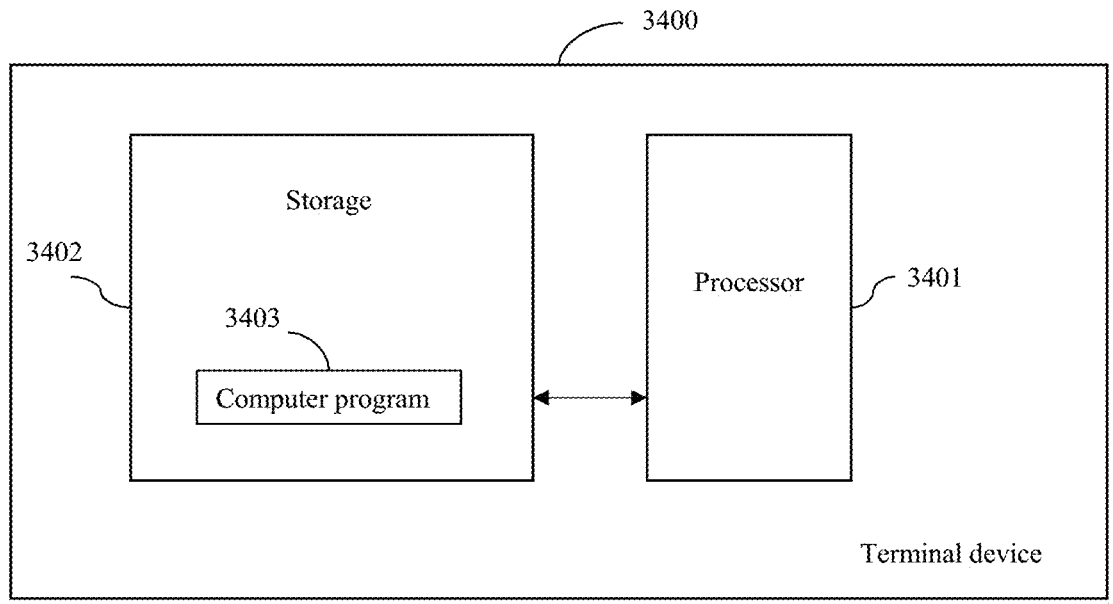
FIG. 34 is a schematic diagram illustrating an exemplary control device according to some embodiments of the present disclosure.

FIG. 34 is a schematic diagram illustrating an exemplary control device according to some embodiments of the present disclosure. The "control device" may be referred to as a "terminal device". A processor 3401 in FIG. 34 may correspond to the processor 320 in FIG. 3, and a storage 3402 in FIG. 34 may correspond to the read-only memory 330, the random access memory 340, and/or the hard disk 370 in FIG. 3.

As shown in FIG. 34, a terminal device 3400 of the embodiment may include the processor 3401, the storage 3402, and a computer program 3403 stored in the storage 3402 and executable on the processor 3401, such as a program for controlling a smart lock. When the processor 3401 executes the computer program 3403, the steps of the method for controlling the smart lock in some embodiments, such as steps 2801 to 2803 shown in FIG. 28, may be implemented. Alternatively, when the processor 3401 executes the computer program 3403, functions of modules/units in the foregoing embodiments, such as functions of the modules 3301 to 3303 shown in FIG. 33 may be realized.

For example, the computer program 3403 may be divided into one or more modules/units, and the one or more modules/units may be stored in the storage 3402 and executed by the processor 3401 to implement the present disclosure. One or more modules/units may be a series of computer program instruction segments capable of implementing specific functions, and the instruction segments may be used for describing the execution process of the computer program 3403 in the terminal device 3400.

The terminal device 3400 may be a computing device such as a desktop computer, a notebook computer, a palm computer, and a cloud server. The terminal device 3400 may include, but is not limited to, the processor 3401 and the storage 3402. Those skilled in the art may understand that FIG. 34 is only an example of the terminal device 3400, which does not constitute a limitation on the terminal device 3400. The terminal device 3400 may include more or less components than those shown in the figure, or a combination of certain components, or different components. For example, the control device may also include an input and output device, a network access device, a bus, or the like.

The processor 3401 may be a Central Processing Unit (CPU), or other general-purpose processors, a Digital Signal Processor (DSP), an Application Specific Integrated Circuit (ASIC), a Field-Programmable Gate Array (FPGA), or other programmable logic devices, a discrete gate or a transistor logic device, a discrete hardware component, or the like. The general-purpose processor may be a microprocessor or the processor may also be any conventional processor.

The storage 3402 may be an internal storage unit of the terminal device 3400, such as a hard disk or internal storage of the terminal device 3400. The storage 3402 may also be an external storage device of the terminal device 3400, for example, a plug-in hard disk, a Smart Media Card (SMC), a Secure Digital (SD) card, a Flash Card and the like equipped on the terminal device 3400. Further, the storage 3402 may also include both an internal storage unit of the terminal device 3400 and an external storage device. The storage 3402 may be used for storing computer programs and other programs and data required by the terminal device 3400. The storage 3402 may also be used for temporarily storing data that has been output or may be output.

In some embodiments, the security module 220 may obtain second verification information based on security control information. The security module 220 may obtain first verification information composed of at least a plurality of characters, and determine whether the second verification information and the first verification information satisfy a preset condition. If the security module 220 determines that the second verification information and the first verification information satisfy the preset condition, the security verification may be passed, and management of the corresponding operation on the smart lock may be realized. The first verification information may include multiple characters currently input by a user. The second verification information may include information for performing security verification on the first verification information. Generally, for a password-verified smart lock, when the user inputs a password, there may be a situation that the password is peeped during password outputting or inputting. In order to avoid the above situation, the security module 220 may compare the password (first verification information) input by the user with a real password (second verification information). In some embodiments, if the password input by the user includes password ending flag bit information (e.g., #) and characters same as those of the real password, the security module 220 may determine that the input password matches the real password. In some embodiments, if the current time satisfies a preset time condition (e.g., the preset unlocking-allowed time range, or the valid time range of the real password), the security module 220 may confirm that the security verification is passed, and the control module 240 may perform a subsequent unlocking operation, which may improve the security performance and convenience of the smart lock.

Figure 35:
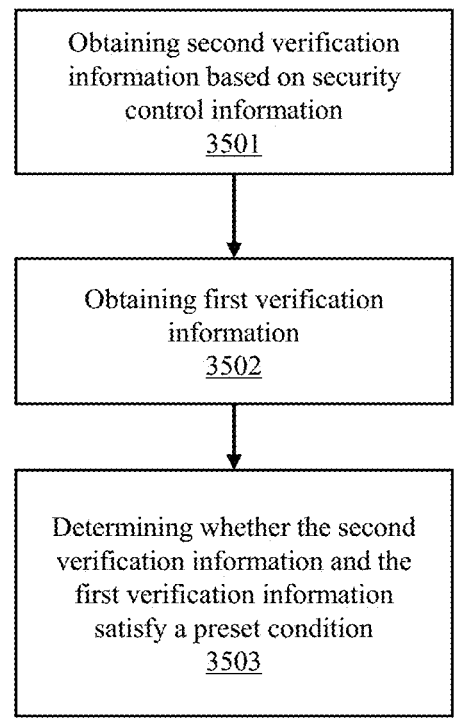
FIG. 35 is a flowchart illustrating an exemplary process for controlling a smart lock according to some embodiments of the present disclosure.

Some embodiments of the present disclosure provide a method for controlling a smart lock to realize the operation management of a smart lock and improve the security performance and convenience of the smart lock. FIG. 35 is a flowchart illustrating an exemplary process for controlling a smart lock according to some embodiments of the present disclosure.

Step 3501: second verification information may be obtained based on security control information. The step may be performed by the security module 220.

The security control information may be information stored in the smart lock and used for verifying operation information, and the security control information may include the second verification information. More description regarding the second verification information may be found elsewhere in the present disclosure. See, e.g., FIG. 36 and the relevant description thereof.

The second verification information may be information stored in the smart lock and used for performing security verification on first verification information, for example, a password, a preset time condition, or the like.

The preset time condition may be one or more conditions about time preset by a user, for example, a preset time range, valid time of the password, a maximum time limit for inputting the password, or the like.

Step 3502: first verification information may be obtained. The step may be performed by the input/output module 260.

The first verification information may be the password input by the user that at least includes multiple characters, for example, a character password composed of numbers, words, symbols, or any combination thereof, or other passwords that may be converted into characters, for example, a voice password. After the smart lock receives the voice password, the voice password may be converted into the character password.

In some embodiments, the first verification information may be obtained in the following manners:

An operation input obtained by the input/output module 260 may be parsed, and if ending flag bit information indicating ending of password input is obtained by parsing, the first verification information in the operation input may be obtained.

The ending flag bit information may be information indicating ending of password input, and the specific content may be preset.

It should be noted that the ending flag bit information may be the character information input by the user through a keypad, or the voice information input by the user through voice. For example, the character * may be preset as the ending flag bit information, or the voice information of the word "ending" read by the user may be preset as the ending flag bit information.

The following illustrates a method for obtaining the first verification information in the operation input as an example.

In some embodiments, the method for obtaining the first verification information in the operation input may be to extract fixed-length character information or voice information from a fixed position in the operation input as the first verification information. For example, if the operation input that is input by the user is characters 123456, the last four digits 3456 may be extracted as the first verification information. As another example, if the operation input that is input by the user is the voice information in which the user reads the sentence "please open sesame", the voice information of the last words "open sesame" may be extracted as the first verification information.

In some embodiments, the method for obtaining the first verification information in the operation input may also be to extract fixed-length character information or voice information from any position in the operation input as the first verification information. More description regarding obtaining the first verification information may be found elsewhere in the present disclosure. See, e.g., FIG. 36 and the relevant description thereof.

Step 3503: whether the second verification information and the first verification information satisfy a preset condition may be determined. The step may be performed by the security module 220.

If the second verification information and the first verification information satisfy the preset condition, the security verification may be passed. If the second verification information and the first verification information do not satisfy the preset condition, the security verification may be failed.

The preset condition may be a determination condition preset in the smart lock, for example, determining whether the password in the first verification information matches the password in the second verification information, and determining whether the current time satisfies the preset time condition in the second verification information, or the like. The current time may be the time when the first verification information is obtained.

The following uses an example to illustrate how to perform the security verification based on the first verification information and the second verification information.

For example, if the second verification information stored in the smart lock is the character password 123 #78, when the obtained first verification information is the character password 123 #78 that exactly matches the second verification information, the security verification may be passed, otherwise, the security verification may be failed.

As another example, the second verification information stored in the smart lock may include the character password 123 #78 and a preset time range. The preset time range may be 9 am to 6 pm every day. The security verification may be passed only when the following two conditions are satisfied at the same time: 1. the obtained first verification information is the character password 123 #78 that exactly matches the second verification information; 2. the current time is between 9 am and 6 pm, otherwise, the security verification may be failed.

The security verification may be passed only when the first verification information including multiple characters input by the user needs to completely match the second verification information and the current time satisfies the preset time condition, which ensures the security of the smart lock.

Taking that the first verification information is a character password as an example, it may be known from the background technology that when a user inputs an unlocking password at present, a fixed-length unlocking password may be likely to be peeped and remembered by other persons, and the security performance may be low. At the same time, when the user inputs the unlocking password, once the unlocking password is input incorrectly, the incorrectly input part may need to be deleted, which is less convenient.

Therefore, the method and apparatus for the security verification according to some embodiments of the present disclosure may perform unlocking as long as all the input characters include the correct password and the preset time conditions are satisfied, and unlocking may also be performed without deleting the incorrectly input part when the password is input incorrectly so as to improve the security performance and convenience.

It should be noted that the above method may be executed on both a smart lock and a control device bound to the smart lock. A method for binding the control device with the smart lock may be found in FIG. 14 and the relevant description thereof.

In some embodiments, when operation inputs are input on the control device bound with the smart lock, at least part of the operation input may be encrypted. More description regarding the encryption of at least part of the operation input may be found elsewhere in the present disclosure.

At the same time, the application scenarios of the method may include, but are not limited to scenarios of screen unlocking, page unlocking, door lock unlocking, or the like. In the embodiments of the present disclosure, there may be no specific limitation on the device and application scenario for executing the method.

Figure 36:
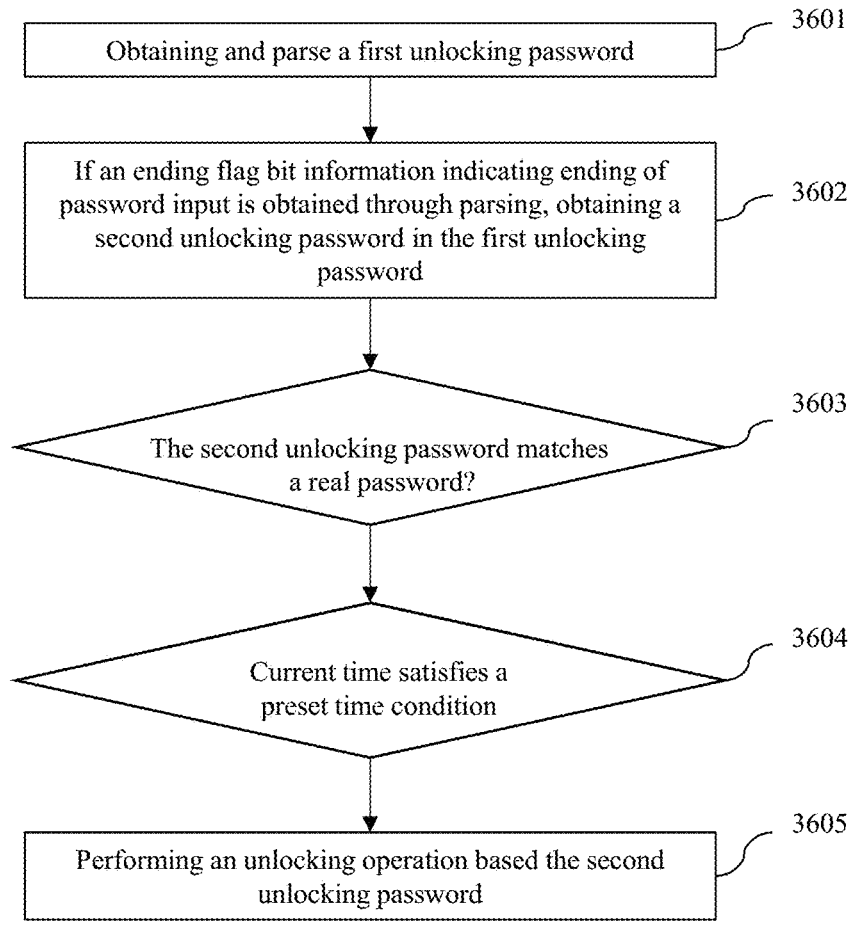
FIG. 36 is a flowchart illustrating an exemplary process for unlocking according to some embodiments of the present disclosure.

FIG. 36 is a flowchart illustrating an exemplary process for unlocking according to an embodiment of the present disclosure.

In the descriptions of FIG. 36 to FIG. 40, "lock opening" may be referred to as "unlocking", and an "operation input" may be referred to as a "first unlocking password". "First verification information" may be referred to as a "second unlocking password". The embodiment explains how to obtain the first verification information based on the operation input, and perform the security verification based on the first verification information and the second verification information. The second verification information may include a real password and a preset time condition.

The method may be applied to the aforementioned smart lock, and the method may include the following steps:

Step 3601: a first unlocking password may be obtained and parsed.

In S3601, when a user inputs the first unlocking password through a device with an input function such as a keypad, the first unlocking password input by the user and the current time may be obtained, and the first unlocking password may be parsed.

It should be noted that the aforementioned keypad may be a virtual keypad or a physical keypad. For example, for a control device (e.g., a mobile phone) bound with the smart lock, the keypad may be a virtual keypad, and for an input device on the smart device, the keypad may be a physical keypad. It should be noted that the above examples are only used for illustrating some embodiments of the present disclosure, which are not intended to limit the scope of the present disclosure.

It should be noted that the password is not limited to a character password, such as numbers, words, symbols, or any combination thereof, which may also be other passwords that may be converted into characters. For example, the user may also input a password by voice, and after the smart lock receives the voice password, the voice password may be converted into a character password.

In some embodiments, the voice password may not only include language information that may be converted into characters, but also include voiceprint characteristics of the user. For example, the user may use voice information of reading the phrase "open sesame" by himself/herself as the voice password, which includes language information of the phrase "open sesame" and also includes the voiceprint characteristics of the user for reading the phrase. When the security verification is performed, it may be necessary to both match characters of the phrase "open sesame" and match the voiceprint characteristics of the user. When the two conditions are satisfied at the same time, the security verification may be passed. In this way, not only the convenience for the user to input the password is improved, but also the security of the use of the password is improved.

In some optional implementation manners of the embodiment, before step 3601 is performed, in response to detecting the first unlocking password input by the user through the keypad, whether the keypad is currently in a working state may be determined. In response to determining that the keypad is currently in the working state, the first unlocking password may be obtained.

It should be noted that, in order to improve the security performance, when the user does not need to unlock for a long time or due to special needs, the user may freeze the keypad for inputting the unlocking password, that is, set the working state of the keypad to a dormant state. In the dormant period, the unlocking password input through the keypad may be an invalid password. When the user needs to unlock, the user may set the working state of the keypad to an active state.

Further, it should be noted that the user may set the working state of the keypad through a preset key combination on the keypad, for example, the user may set the working state of the keypad from "dormant" to "active" by inputting characters "*#*#" on the keypad. In the same way, the user may also set the working state of the keypad through a mobile control device or computer connected to a door lock via a network, for example, if the user installs a door lock app on a mobile phone, the user may remotely set the working state of the keypad through the door lock app.

In some optional implementation manners of the embodiment, when the user deletes the first unlocking password, the first unlocking password may be determined as an invalid password.

In a further implementation, when the user inputs the unlocking password, the user may need to input ending flag bit information indicating ending of password input after the input is finished. Whether the first unlocking password carries the ending flag bit information indicating ending of password input may be looked up, and if the first unlocking password does not carry the ending flag bit information, the first unlocking password may be determined as an invalid password.

Step 3602: if the ending flag bit information indicating ending of password input is obtained through parsing, the second unlocking password in the first unlocking password may be parsed.

In S3602, in some embodiments, after determining that the first unlocking password carries the ending flag bit information, the second unlocking passwords in the first unlocking password may be sequentially obtained in a preset order, and each time after the second unlocking password may be obtained. The second unlocking password may be compared with the real password until the second unlocking password that is consistent with the real password is obtained or it is determined that all the second unlocking passwords are inconsistent with the real password. For example, assuming that the ending flag bit information is #, the first unlocking password input by the user is 00123456 #, and the real password consists of 5 characters, any 5 characters in the first unlocking password may be used as the second unlocking password in sequence, and each time after the second unlocking password is obtained, the second unlocking password may be compared with the real password until the second unlocking password that is consistent with the real password is obtained or it is determined that all the second unlocking passwords are inconsistent with the real password.

In some embodiments, when it is determined that the first unlocking password carries the ending flag bit information, the last few characters in the first unlocking password may be directly obtained as the second unlocking password, and the second unlocking password may be compared with the real password to determine whether the obtained second unlocking password is consistent with the real password. For example, assuming that the ending flag bit information is #, the first unlocking password input by the user is 00123456 #, and the real password consists of 5 characters, the last 5 characters in the first unlocking password may be directly used as the second unlocking password, and the second unlocking password may be compared with the read password such that it may be determined whether the obtained second unlocking password is consistent with the real password.

Step 3603: whether the second unlocking password matches the real password may be determined. If the second unlocking password matches the real password, step 3604 may be executed, and if the second unlocking password does not match the real password, the first unlocking password may be cleared.

In S3603, the real password that may unlock a door lock may be preset, and after the second unlocking password is obtained, whether the second unlocking password matches the preset real password may be determined. For example, if characters included in the second unlocking password are consistent with characters included in the real password, it may be determined that the second unlocking password matches the real password. In some embodiments, if the characters included in the second unlocking password and the arrangement mode of the characters are consistent with the characters included in the real password and the arrangement mode of the characters, it may be determined that the second unlocking password matches the real password. If the second unlocking password matches the real password, step 3604 may be executed next to determine whether the current time satisfies the preset time condition. If all the obtained second unlocking passwords are inconsistent with the real password, the first unlocking password may be determined as an invalid password, and the first unlocking password may be cleared.

It should be noted that, according to the description mentioned above, the second unlocking password may be characters of a preset count of digits in the first unlocking password. Therefore, when the user inputs the unlocking password, if he/she inputs an unlocking password wrong before inputting the ending flag bit information, the user may not need to delete the input wrong part, but continue to input the correct and complete unlocking password with the ending flag bit information to perform the unlocking. For example, assuming that the correct unlocking password is "456123" and the ending flag bit information is "#". When the user inputs the unlocking password, if the unlocking password input by the user is "4562", the user may not need to delete the input wrong part, but continue to input the correct and complete unlocking password with the ending flag bit information to perform the unlocking, that is, all the unlocking password input by the user is "4562456123 #", and when the obtained second unlocking password is 456123, the unlocking may be performed.

Step 3604: whether the current time satisfies the preset time condition may be determined. If the current time satisfies the preset time condition, step 3605 may be executed, and if the current time does not satisfy the preset time condition, the first unlocking password may be cleared.

The preset time condition may be one or more conditions about time preset by the user, for example, a preset unlocking-allowed time range, a valid time range calculated based on the effect-taking time corresponding to the real password and the expiration time corresponding to the real password, a maximum time limit for inputting the password, or the like.

In some embodiments, the preset time condition may include any of the following: a preset unlocking-allowed time range, and a valid time range calculated based on the effect-taking time corresponding to the real password and the expiration time corresponding to the real password.

Further, an unlocking prohibition time range for prohibiting unlocking may be preset. When the unlocking password is input, if the current time is within the unlocking prohibition time range, a subsequent unlocking process may not be performed.

In the process of specifically implementing step 3604, the valid time range of the real password may be preset. After the second unlocking password is determined to be the real password, whether the current time is within the valid time range may be determined. If the current time is within the valid time range, the second unlocking password may be determined to be valid. For example, setting the valid time range of the real password from September 1 to October 1, after the second unlocking password is determined to be the real password, if the current time is within the range from September 1 to October 1, the unlocking may be performed, and if the current time is not within the range of September 1 to October 1, the second unlocking password may be determined to be an invalid password.

In some embodiments, the preset time condition may also include the maximum time limit for inputting a password. For example, the user may preset the maximum time limit for inputting a password to 10 seconds. If the user inputs the password continuously for more than 10 seconds at a time, the first unlocking password may be cleared and the user may need to input the first unlocking password again, which may prevent a situation that because the password is input continuously for a long time by other persons, the password may be cracked, for example, using a malicious program to input the password continuously.

In some embodiments, when the input is timed out, the smart lock may send a prompt message, for example, generating a prompt sound, or sending a message prompting the user that input is timed out to the bound control device.

In some embodiments, if the input by the user is timed out for multiple consecutive times, the smart lock may perform abnormal situation processing, for example, sending warning information to a designated device. When other persons try to unlock by continuously inputting the password, the user may be reminded in time, which improves the security of the smart lock. In some embodiments, a camera device arranged on the smart lock may also be used for recording an image of a person inputting a password and uploading the image of the person inputting the password to the server via the network, and the server may send the image information to the designated device, such as a control terminal of the user.

It should be noted that the smart lock may include a clock chip, and the local time of the clock chip may be obtained and the local time may be used as the current time.

Further, it should be noted that the smart lock may be in communication connection with the control device, and the local time of the clock chip may be calibrated according to the preset period. The specific calibration method may include: the control device may obtain the Network Time Protocol (NTP) time from the server, and the control device may send the NTP time to the smart lock such that the smart lock may calibrate the local time of the clock chip according to the NTP time.

In some embodiments, the smart lock may also periodically obtain the NTP time from the server, and calibrate the local time of the clock chip according to the NTP time.

Step 3605: an unlocking operation may be performed based on an operation instruction in the second unlocking password.

In the embodiments of the present disclosure, the first unlocking password carrying the ending flag bit information may be received, and the second unlocking password with the preset count of digits in the first unlocking password may be obtained. If the second unlocking password matches the real password and the preset time condition is satisfied, unlocking may be performed based on the operation instruction included in the second unlocking password. Unlocking may be performed when the correct password is included in all the input characters, and unlocking may also be performed without deleting the input wrong part when the password is input wrong, which improves the security performance and convenience.

Figure 37:
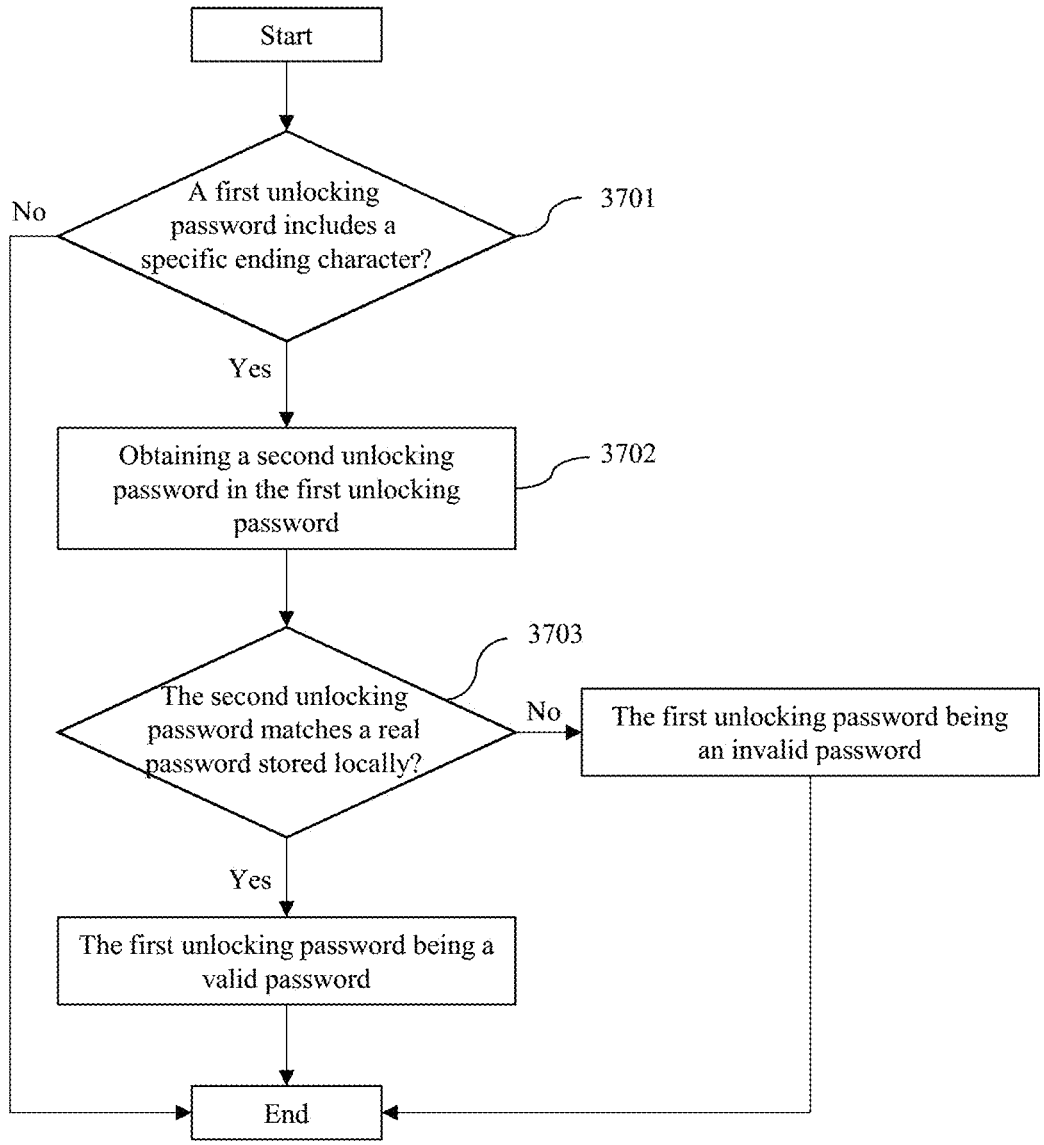
FIG. 37 is a flowchart illustrating an exemplary process for unlocking according to some embodiments of the present disclosure.

In order to better explain the method for unlocking involved in the above embodiment of the present disclosure, the flowchart of the process for unlocking shown in FIG. 37 may be used as an example for illustration, and FIG. 37 may include the following steps:

Step 3701: whether the first unlocking password input by the user includes a specific ending character may be determined. If yes, step 3702 may be performed, and if not, the unlocking operation may be ended.

Step 3702: the second unlocking password in the first unlocking password may be obtained.

Step 3703: whether the second unlocking password matches the real password stored locally may be determined. If yes, the first unlocking password may include a valid password, and if not, the first unlocking password may be an invalid password.

It should be noted that the execution principles of the above steps 3701 to 3703 may be found in the description of each step in the above FIG. 36, which may not be repeated herein.

In the embodiment of the present disclosure, the first unlocking password carrying the ending flag bit information may be received, and the second unlocking password with the preset count of digits in the first unlocking password may be obtained. If the second unlocking password matches the real password, it may be determined that the first unlocking password may include a valid password (the second unlocking password), and the subsequent unlocking process may be executed based on the operation instruction included in the second unlocking password. In such cases, the unlocking may be performed when all the input characters include the correct password, and the unlocking may also be performed without deleting the input wrong part when the password is input wrong, which improves the security performance and convenience.

Figure 38:
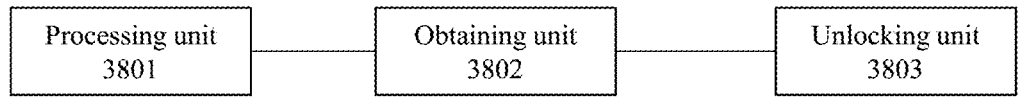
FIG. 38 is a block diagram illustrating an exemplary apparatus for unlocking according to some embodiments of the present disclosure.

Corresponding to the method for unlocking involved in the above embodiment of the present disclosure, as shown in FIG. 38, an embodiment of the present disclosure further provides a block diagram of an apparatus for unlocking, and the apparatus may be applied to a smart lock. The apparatus may include a processing unit 3801, an obtaining unit 3802, and an unlocking unit 3803.

The processing unit 3801 may be used for obtaining a first unlocking password, and parsing the first unlock password.

In a specific implementation, the processing unit 3801 may be used for determining whether the first unlocking password carries ending flag bit information indicating ending of password input. If the first unlocking password does not carry the ending flag bit information, it may be determined that the first unlocking password is an invalid password.

The obtaining unit 3802 may be used for obtaining a second unlocking password in the first unlocking password if the ending flag bit information indicating ending of password input is obtained through parsing.

The unlocking unit 3803 may be used for performing an unlocking operation based on an operation instruction in the second unlocking password if the second unlocking password matches a preset real password and a preset time condition is satisfied.

In some embodiments, the preset time condition may include that the current time is within a specified valid time range, and the specified valid time range may include any one of the following: a preset unlocking-allowed time range and a valid time range calculated based on the effect-taking time corresponding to a real password and the expiration time corresponding to the real password.

In some embodiments, the preset time condition may also include a maximum time limit for inputting a password, such as 5 seconds, 10 seconds, or the like. If the time for inputting the password exceeds the maximum time limit, the first unlocking password may be cleared, and the user may need to input the first unlocking password again, which may prevent a situation that because the password is input continuously for a long time by other persons, the password may be cracked, for example, using a malicious program to input the password continuously.

Correspondingly, the unlocking unit 3803 may be used for obtaining the local time of a clock chip, and using the local time as the current time.

In some embodiments, the first unlocking password carrying the ending flag bit information may be received, and the second unlocking password with a preset count of digits in the first unlocking password may be obtained. If the second unlocking password matches the real password and the current time satisfies the preset time condition, unlocking may be performed based on the operation instruction included in the second unlocking password. Unlocking may be performed when all the input characters include the correct password, and unlocking may also be performed without deleting the input wrong part when the password is wrong, which improves the security performance and convenience.

Figure 39:
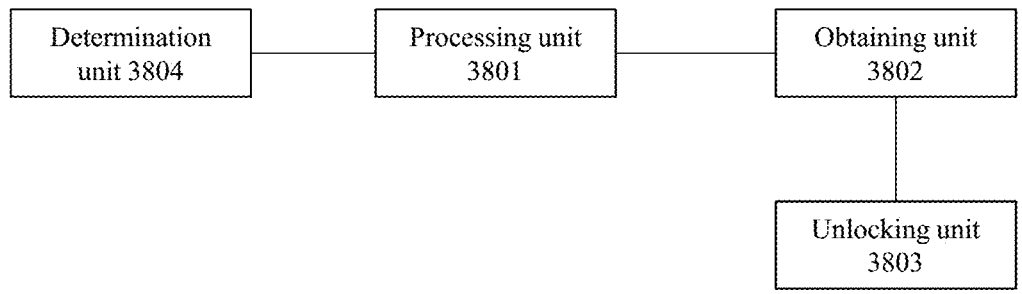
FIG. 39 is a block diagram illustrating an exemplary apparatus for unlocking according to some embodiments of the present disclosure.

In some embodiments, in combination with FIG. 38, FIG. 39 is a block diagram illustrating an exemplary apparatus for unlocking according to an embodiment of the present disclosure, and the apparatus may further include a determination unit 3804 used for determining whether a keypad is currently in a working state in response to detecting the first unlocking password input by the user through the keypad.

Correspondingly, the processing unit 3801 may be used for obtaining the first unlocking password in response to the determination unit 3804 determining that the keypad is currently in the working state.

In some embodiments, the determination unit 3804 may be further used for clearing the first unlocking password in response to determining that the keypad is not currently in the working state.

In some embodiments, before the unlocking password is input, whether the keypad is in the working state may be confirmed. Only when the keypad is in the working state, may the unlocking password be obtained, and the subsequent unlocking process may be executed, which improves security.

Figure 40:
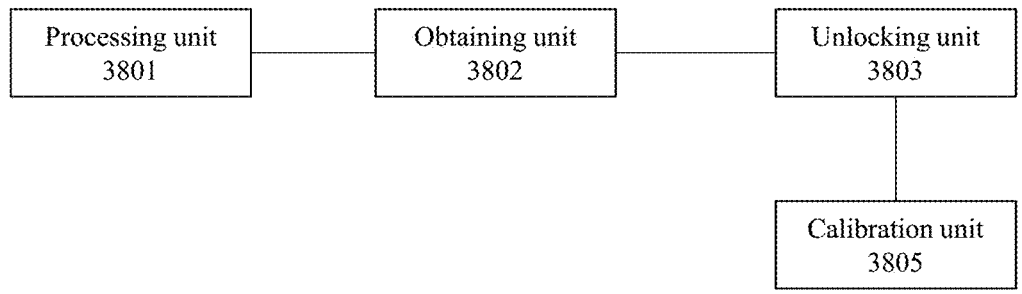
FIG. 40 is a block diagram illustrating an exemplary apparatus for unlocking according to some embodiments of the present disclosure.

In some embodiments, in combination with FIG. 38, FIG. 40 is a block diagram illustrating an exemplary apparatus for unlocking according to an embodiment of the present disclosure, and the apparatus may further include a calibration unit 3805 used for obtaining NTP time and calibrating the local time of a clock chip based on the NTP time.

In some embodiments, the calibration unit 3805 may be specifically used for receiving the NTP time sent by the control device, and the NTP time may be obtained by the control device from the server.

In some embodiments, the calibration unit 3805 may also periodically obtain the NTP time from the server, and calibrate the local time of the clock chip according to the NTP time.

In some embodiments, the local time of the clock chip may be calibrated according to the preset period, and whether the current time satisfies the preset time condition is determined according to the local time, which improves the accuracy of unlocking.

It should be noted that the unlocking apparatus for unlocking may include a processor and a memory. The processing unit, the obtaining unit, and the unlocking unit may be all stored as program units in the memory, and the processor may execute the above program units stored in the memory to realize corresponding functions.

The processor may include a kernel, and the kernel may retrieve the corresponding program unit from the memory. One or more kernels may be set, and unlocking may be completed by determining kernel parameters.

The memory may include a non-permanent memory in a computer-readable medium, a random access memory (RAM), and/or a non-volatile memory, such as a read-only memory (ROM) or a flash random access memory (flash RAM), and the memory may include at least one storage chip.

An embodiment of the present disclosure provides a computer-readable medium on which a computer program is stored, wherein when the program is executed by a processor, the methods provided in the embodiments corresponding to FIG. 36 and FIG. 37 may be implemented.

An embodiment of the present disclosure provides a processor, and the processor may be used for running a program, wherein when the program runs, the methods provided in the embodiments corresponding to FIG. 36 and FIG. 37 may be implemented.

An embodiment of the present disclosure provides a device (such as a server, a PC, a PAD, and a smart phone). The device may include a processor, a memory, and a program stored in the memory and executable on the processor. When the processor executes the program, the methods provided in the embodiments corresponding to FIG. 36 and FIG. 37, respectively, may be implemented.

The present disclosure further provides a computer program product. When the computer program product is executed on a data processing device, the data processing device may be enabled to implement the methods provided in the embodiments corresponding to FIG. 36 and FIG. 37.

The present disclosure is described with reference to the flowcharts and/or block diagrams of the methods, devices (systems), and computer program products according to the embodiments of the present disclosure. It should be understood that each process and/or block in the flowchart and/or block diagram, and the combination of the processes and/or blocks in the flowchart and/or block diagram may be realized by computer program instructions. These computer program instructions may be provided to processors of a general-purpose computer, a special-purpose computer, an embedded processor, or other programmable data processing devices to produce a machine, such that an apparatus for achieving designated functions in one process or multiple processes in the flowchart and/or one block or multiple blocks in the block diagram may be produced through the instructions executed by the processors of the computer or other programmable data processing devices.

These computer program instructions may also be stored in a computer-readable memory that may guide the computer or other programmable data processing devices to work in a specific manner, such that the instructions stored in the computer-readable memory may produce an article of manufacture including an instruction apparatus, and the instruction apparatus may realize the designated functions in one process or multiple processes in the flowchart and/or one block or multiple blocks in the block diagram.

These computer program instructions may also be loaded on the computer or other programmable data processing devices, such that a series of operation steps may be executed on the computer or other programmable devices to produce computer-implemented processing, such that the instruction executed on the computer or other programmable devices may provide steps for implementing the designated functions in one process or multiple processes in the flowchart and/or one block or multiple blocks in the block diagram.

In a typical configuration, a computing device may include one or more central processing units (CPU), an input/output interface, a network interface, and an internal storage.

The storage may include a non-permanent memory in a computer-readable medium, a random access memory (RAM), and/or a non-volatile memory, such as a read-only memory (ROM) or a flash random access memory (flash RAM). The storage may be an example of the computer-readable medium.

The computer-readable medium may include permanent and non-permanent, and removable and non-removable media which may achieve information storage by any method or technology. Information may be a computer-readable instruction, a data structure, a program module, or other data. Examples of a computer storage medium may include, but are not limited to, a phase change random access memory (PRAM), a static random access memory (SRAM), a dynamic random access memory (DRAM), a random access memory (RAM) in other types, a read-only memory (ROM), an electrically erasable programmable read-only memory (EEPROM), a flash memory or other internal storage technologies, a compact disk read-only memory (CD-ROM), a digital versatile disc (DVD) or other optical storage, magnetic cassette type magnetic tape, magnetic tape disk storage or other magnetic storage devices or any other non-transmission media, and may be used for storing information that may be accessed by the computing device. According to the definition in the present disclosure, the computer-readable medium may not include transitory media, such as modulated data signals and carrier waves.

Those skilled in the art should understand that the embodiments of the present disclosure may be provided as methods, systems, or computer program products. Therefore, the present disclosure may adopt the form of a complete hardware embodiment, a complete software embodiment, or an embodiment combining software and hardware. Moreover, the present disclosure may adopt the form of a computer program product implemented on one or more computer-usable storage media (including but not limited to, a disk memory, a CD-ROM, an optical memory, etc.) containing computer-usable program codes therein.

The above description is only a preferred embodiment of the present disclosure and an explanation of the applied technical principles, which is not intended to limit the present disclosure. For those skilled in the art, the present disclosure may have various modifications and changes. The scope of application involved in the present disclosure is not limited to the technical solutions formed by the specific combination of the above technical features, and may also cover other technical solutions formed by any combination of the above technical features or the equivalent features without departing from the concept of the above application, for example, technical solutions formed by mutually replacing the above-mentioned features and the technical features disclosed in the present disclosure (but not limited to) with similar functions.

The security module 220 may compare one or more operation inputs with security control information to realize the management of corresponding operations on the smart device. The smart device may be the smart lock 130. In some embodiments, the operation input may include operation instructions and/or operation information. In general, there may be only a single unlocking method for locks, such as key unlocking, fingerprint unlocking, or password unlocking. However, when the user forgets to carry a key or forget a password, unlocking may not be performed. The single unlocking method may not be suitable for people of different ages, such as the elderly or children. In practical applications, in order to adapt to family members of different ages or prevent one unlocking method from being unsuitable or invalid, the smart lock 130 with multiple unlocking methods (e.g., numeric password unlocking, biological characteristic input unlocking, Bluetooth unlocking, and NFC unlocking) may be used to avoid the above problems.

The various unlocking methods in the embodiments of the present disclosure may be input locally on the smart lock or may be input on the control device bound with the smart lock. For the method for binding the control device with the smart lock, refer to the description of FIG. 14.

In some embodiments, when the operation input is input on the control device bound with the smart lock, at least part of content of the input operation input may be encrypted. More descriptions may be found elsewhere in the present disclosure.

In addition, in order to facilitate the security management on the smart lock 130, a state detection (such as spring bolt detection, handle detection, key detection, light brightness detection of an ambient environment, noise detection, etc.) function, a security detection (such as picking-proof detection) function, a power management function, a wireless communication function and an encryption function may be set on the smart lock 130. In order to manage the smart lock 130 more conveniently, the smart lock 130 may be directly managed on the control device, such that the user may have a better experience of using the smart lock 130.

In addition, after the smart lock 130 detects an unlocking state, the smart lock 130 may also automatically perform an automatic locking operation or an information reporting operation. More descriptions may be found elsewhere in the present disclosure.

Figure 41:
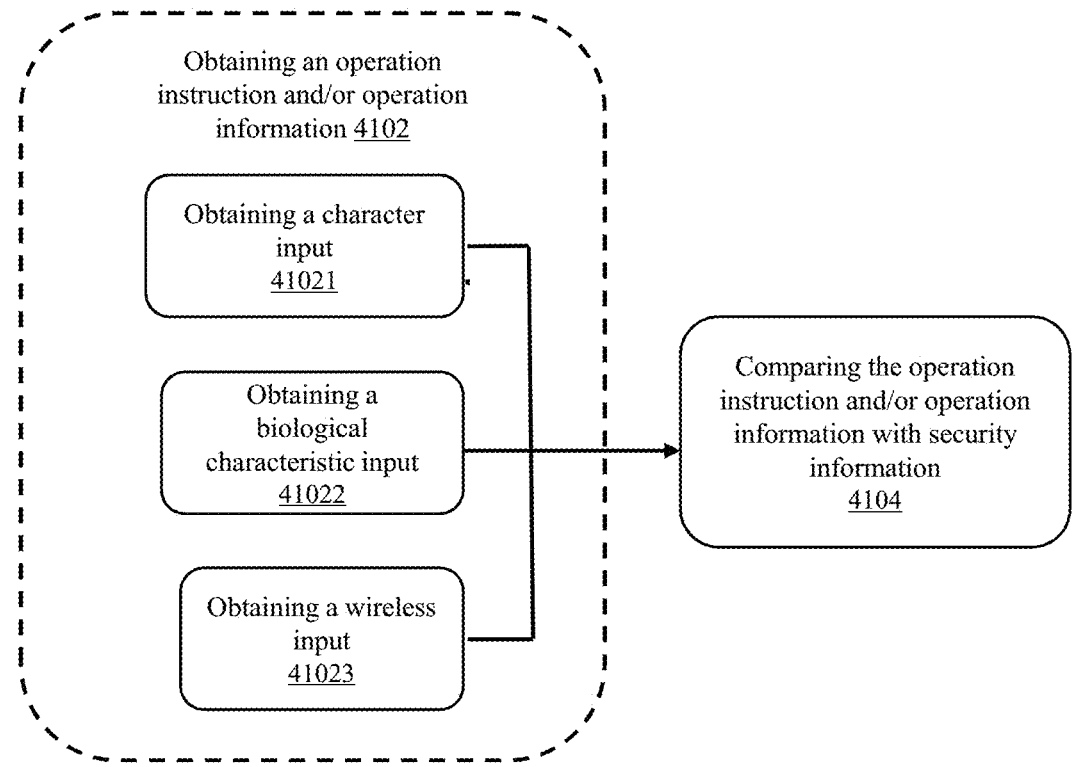
FIG. 41 is a flowchart illustrating an exemplary process for a smart lock 130 to obtain an operation instruction and/or operation information according to some embodiments of the present disclosure.
Figure 42:
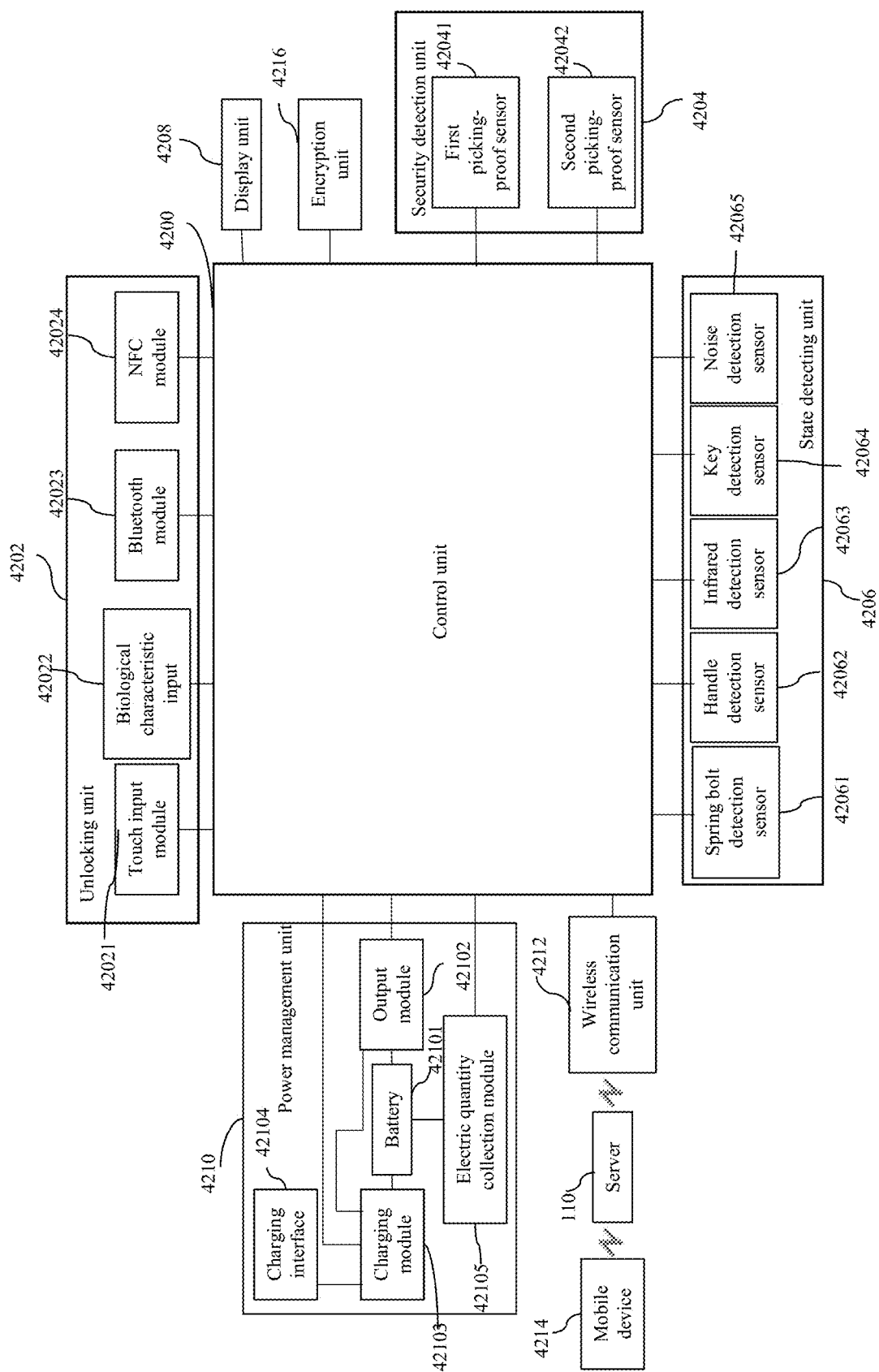
FIG. 42 is a schematic diagram illustrating an exemplary control circuit of a smart lock 130 according to some embodiments of the present disclosure.

Some embodiments of the present disclosure provide a method for controlling a smart lock to realize operation management and security management of the smart lock 130. FIG. 41 is a flowchart illustrating an exemplary process for a smart lock to obtain operation instructions and/or operation information according to some embodiments of the present disclosure. FIG. 42 is a schematic diagram illustrating an exemplary control circuit of a smart lock according to some embodiments of the present disclosure.

Step 4102: an operation instruction and/or operation information may be obtained.

The operation instruction and/or operation information may refer to information input by a user for security verification, such as a password, and a control instruction. The operation instruction and/or operation information may be obtained through the input/output module 260. More descriptions regarding the operating instruction and/or operating information may be found in FIG. 27 and the description thereof.

In some embodiments, obtaining the operation instruction and/or operation information may include obtaining one or more of the following inputs: obtaining a character input 41021, obtaining a biological characteristic input 41022, and obtaining a wireless input 41023.

In some embodiments, the character input 41021 may be obtained. The character input may be defined as a numeric password input by the user. The character input may be obtained from a character input module. For a detailed introduction of the character input module, refer to the following description.

In some embodiments, the biological characteristic input 41022 may be obtained. The biological characteristic input may be defined as biological characteristic information input by the user. The biological characteristic input may be obtained from a biological characteristic input module.

In some embodiments, the wireless input 41023 may be obtained. The wireless input may be defined as the operation instruction and/or operation information obtained by a control unit 4200 in a wireless communication manner. At least one wireless communication module may be used for establishing communication with another wireless communication module and obtaining password information stored therein. For a detailed introduction of the wireless communication module, refer to the following description.

The above-mentioned multiple methods for obtaining the operation instruction and/or operation information may be used in combination.

The multiple methods for obtaining the operation instruction and/or operation information may be adopted and prevent a situation that due to mechanical key forgetting or losing, the user may not perform unlocking.

In some embodiments, the security verification may be performed based on receiving the security control information obtained in the foregoing steps, as well as the operation instruction and/or operation information.

In some embodiments, the security control information may refer to information related to execution of security operations stored in the security module 220.

The control unit 4200 in the smart lock 130 may correspond to the security module 220. The control unit 4200 may be a central processing unit or a controller, and the control unit 4200 may be composed of one or more processors, or at least one set of chips.

Step 4104, the obtained operation instruction and/or operation information may be compared with security information, and an unlocking operation may be performed when a preset condition is satisfied.

In some embodiments, the operating instruction and/or operating information may be obtained from the user terminal 140 through a network, the preset condition or other information related to the comparison may be obtained from the user terminal 140 and/or the server 110, and state information, alarming information, or the like, after the comparison may be sent to the user terminal 140 and/or the server 110 via the network. After unlocking, an unlocking verification and a locking operation may also be performed, which may refer to the description of FIG. 43.

In some embodiments, the control unit 4200 may perform wireless communication with the user terminal 140 and/or the server 110 through a wireless communication module 4212. The wireless communication unit 4212 may correspond to the communication module 210. In some embodiments, the wireless communication unit 4212 may be a ZigBee module.

For the obtained operation instruction and/or operation information, the control unit 4200 may perform a comparison in one or more of the following methods:

In some embodiments, after obtaining the operation instruction and/or operation information, the smart lock 130 may compare the obtained operation instruction and/or operation information with security information. In some embodiments, the smart lock 130 may perform a plaintext comparison on the operation instruction and/or operation information and the security information. In some embodiments, the operation instruction and/or operation information encrypted by a preset encryption algorithm and the security information may be subjected to a ciphertext comparison, which is not limited herein in the present disclosure.

When the comparison succeeds, the control unit 4200 may issue an unlocking instruction to the control module 240 to perform the unlocking operation.

When the comparison is abnormal, the control unit 4200 may perform one or more of the following processing:

In some embodiments, one or more thresholds may be set for a comparison abnormality occurring at the nth time, and n is a positive integer greater than or equal to 1. The control unit 4200 may perform processing of different abnormality levels according to different threshold intervals in which n is located.

For example, a count of set thresholds may be two.

When n is less than a first threshold, the control unit 4200 may perform an abnormal information prompt on an unlocking operator through the reminding module 250 provided on the smart lock 130. The abnormal information prompt may include, but is not limited to, one or more of a voice prompt and a word display prompts, or comparison abnormality information may be sent to the user terminal 140 and/or the server 110 via the network for prompting.

When n is greater than or equal to the first threshold and less than a second threshold, the control unit 4200 may use the reminding module 250 or the network to perform a prompt of the comparison abnormality information. The control unit 4200 may give an alarming prompt. The alarming prompt may include, but is not limited to, one or more of alarm bell buzzing and lamplight flickering.

When n is greater than or equal to the second threshold, the control unit 4200 may temporarily lock an input/output obtaining module while performing the above processing. At the moment, the unlocking operator may temporarily be unable to perform the unlocking. In some embodiments, locking time of an unlocking operation obtaining module may be set by the user himself/herself.

In some embodiments, a threshold may be set for an abnormality of the same operation instruction and/or operation information occurring at the mth time, and m is a positive integer greater than or equal to 1.

When the same type of operation instruction and/or operation information has a comparison abnormality for the mth time, the control unit 4200 may prompt the unlocking operator to change a mode of the operation instruction and/or operation information mode through the reminding module 250. The prompt may include, but is not limited to, one or more of a voice prompt and a word display prompt, or comparison abnormality information may be sent to the user terminal 140 and/or the server 110 via the network for prompting.

The above-mentioned multiple abnormality processing methods may be used in combination.

In some embodiments, an unlocking unit 4202 may correspond to the input/output module 260.

In some embodiments, the unlocking unit 4202 may be a character input module. The character input module may be a touch input module 42021. In some embodiments, the touch input module 42021 may be a capacitive touch screen, and the touch input module 42021 may support touch in various forms and multi-point touch, and have better sensitivity and anti-interference performance. In some embodiments, the touch input module 42021 may be integrated with a display unit 4208.

In some embodiments, the unlocking unit 4202 may be a biological characteristic input module 42022. Biological characteristic information may be fingerprint information, iris information, facial features, or the like.

In some embodiments, the unlocking unit 4202 may be a wireless communication module. In some embodiments, the wireless communication module may be an NFC module 42024. The NFC module 42024 may sense an NFC card and obtain its NFC password, and the control unit 4200 may determine whether to perform the unlocking according to the obtained NFC password. In some other embodiments, the wireless communication module may be a Bluetooth module 42023. The Bluetooth module 42023 may be used for establishing communication with another Bluetooth module and obtaining the Bluetooth secret key. The control unit 4200 may determine whether to perform the unlocking according to the obtained Bluetooth secret key.

In some embodiments, another Bluetooth module may be arranged in a mobile device 4214. The mobile device 4214 may correspond to the user terminal 140.

In some embodiments, the mobile device 4214 may be a mobile phone. Another Bluetooth module may be arranged in the mobile phone and communicate with the Bluetooth module 42023 to realize a Bluetooth unlocking function of the mobile phone. In some other embodiments, another Bluetooth module may be set in the Bluetooth key and communicate with the Bluetooth module 42023 to realize an unlocking function of the Bluetooth key.

In some embodiments, the Bluetooth module of the Bluetooth key may be matched with the Bluetooth module 42023. The Bluetooth key may have a secret key. When the Bluetooth key approaches the Bluetooth module 42023 of a lock body, the Bluetooth secret key of the Bluetooth key may be read, and whether to perform the unlocking may be determined according to the Bluetooth secret key. In some embodiments, the Bluetooth secret key of the Bluetooth key may be set by a manufacturer when leaving the factory, or the Bluetooth secret key may be set after the mobile device 4214 is connected to the Bluetooth key.

In some embodiments, the smart lock 130 may be configured with the mechanical structure 280, which has a mechanical key unlocking function of a traditional lock.

In some embodiments, the control unit 4200 may determine whether to perform the unlocking according to the operation instruction and/or operation information, and further generate unlocking information according to a determination result. The unlocking information may refer to various information related to the unlocking operation, including but not limited to time, method, and result of unlocking, for example, 10 am, numeric password unlocking and successful unlocking or 10 am, biological characteristic unlocking or failed unlocking.

In some embodiments, security detection of the smart lock 130 may be performed. The smart lock 130 may detect a security state of the smart lock 130 through a security detection unit 4204.

In some embodiments, security detection may be performed in one or more of the following ways:

In some embodiments, lock picking detection may be performed. By lock picking detection, whether the smart lock 130 is picked may be detected through a first picking-proof sensor 42041. The first picking-proof sensor 42041 may send an alarming signal to the control unit 4200 when the smart lock 130 is picked, thereby issuing an alarm. In some embodiments, the first picking-proof sensor 42041 may be any one of a picking-proof switch, a proximity switch, or an infrared detector. In some embodiments, the first picking-proof sensor 42041 may be arranged in the lock body of the smart lock 130, and the first picking-proof sensor 42041 may be triggered when the lock body of the smart lock 130 is picked.

In some embodiments, cat-eye theft detection may be performed. By cat eye theft detection, whether the user opens a door through an inside handle may be detected through a second picking-proof sensor 42042. If the user opens the door through the inside handle, the door may be opened normally, otherwise, the door may not be opened. The second picking-proof sensor 42042 may be any one of a picking-proof switch, a proximity switch, an infrared detector, or a pressure sensor. The second picking-proof sensor 42042 may be arranged on an inner panel of the smart lock 130, and only when the second picking-proof sensor 42042 is touched, may the inside handle be pressed down to perform unlocking. If the inside handle is pressed down through a cat eye, since the second picking-proof sensor 42042 may not be touched, unlocking may not be performed through the inside handle, thereby preventing lock picking caused by pressing down the inside handle from the cat eye The above-mentioned multiple security detection methods may be combined.

In some embodiments, the control unit 4200 may determine whether to generate security abnormality information according to a detection result of the security detection, and the security abnormality information may refer to information that unlocking is attempted through various abnormal means. The security abnormality information may include, but is not limited to, repeated attempts to perform unlocking by using a mismatched password (or key), hitting the smart lock 130, the smart lock 130 being picked, and opening the door from the cat eye.

In some embodiments, the state of the smart lock 130 may be detected. The smart lock 130 may detect the state of the smart lock 130 through the state detection unit 4206, and transmit detected state information of the smart lock to the control unit 4200.

In some embodiments, the state may be detected in one or more of the following ways.

In some embodiments, a lock body state may be detected. For detecting the lock body state, the lock body state of the smart lock 130 may be detected through a spring bolt detection sensor 42061, and the lock body state may be transmitted to the control unit 4200. The lock body state of the smart lock 130 may include detecting a state of a main spring bolt, identifying the lock body, and detecting a state of an oblique spring bolt. A locking situation of the smart lock 130 may be determined according to the lock body state. In some embodiments, detecting the lock body state may further include detecting a starting action of a lock body square shaft from being stationary to rotation, an angular displacement of rotation of the lock body square shaft, or the like. In some embodiments, detecting the lock body state may further include detecting rotation of an output shaft of a motor of the smart lock. For example, the detection module 290 may be connected or adapted to a transmission component in the smart lock, and detect an angular displacement of the rotation of the output shaft of the motor through the transmission component.

In some embodiments, detecting the lock body state may further include detecting jam information of the lock body (e.g., the spring bolt). A jam of the spring bolt may occur during the locking process and/or the unlocking process. In some embodiments, a misalignment of the lock body and a gusset of the smart lock in any direction may cause the jam. Exemplary misalignments may include a vertical misalignment caused by a deformation of the door on which the lock body is installed, a horizontal misalignment caused when the door cannot be closed firmly, or the like, or any combination thereof. In some embodiments, the jam information may be detected by one or more sensors. For example, the spring bolt detection sensor 42061 may detect a distance that the spring bolt sticks out during the locking process and determine that the jam occurs if the detected distance is less than a preset distance threshold. As another example, the spring bolt detection sensor 42061 may detect a pressure of the spring bolt when the spring bolt sticks out or retracts from the gusset, and determine that the jam occurs if the detected pressure is larger than a preset pressure threshold. As a further example, the detection module 290 may include a sensor configured to detect a driving force of the motor of the smart lock when the spring bolt sticks out or retracts from the gusset, and determine that the jam occurs if the detected driving force is larger than a preset driving force threshold. The detected jam information may be transmitted to the control unit 4200 for further processing. For example, the control unit 4200 may generate a jam alarming signal to remind the user of the jam. Alternatively or additionally, the detection module 290 may further include a sensor configured to detect a relative position of the lock body and the gusset when the jam occurs. The relative position may be used to determine whether a misalignment of the lock body and the gusset occurs. For example, if an abnormal relative position (a distance between a point on the lock body and a point on the gusset is larger than a threshold) is detected, the sensor may transmit the abnormal relative position to the control unit 4200. The control unit 4200 may generate reminding information to help users determine possible reasons of the jam.

In some embodiments, a handle state may be detected. Detecting the handle state may include detecting the handle state of the smart lock 130 by using a handle detection sensor 42062 and transmitting the handle state to the control unit 4200. The handle state may include an outside handle state and an inside handle state. The handle detection sensor 42062 may be a proximity switch or an infrared detector. When the user touches an outside handle and an inside handle, the handle detection sensor 42062 may be triggered, and according to the handle state, it may be determined whether the user opens the door through the outside handle or the inside handle.

In some embodiments, an unlocking state of a mechanical key may be detected. For detecting the unlocking state of the mechanical key, the unlocking state of the mechanical key in the smart lock 130 may be detected by a key detection sensor 42064, and the unlocking state of the mechanical key may be transmitted to the control unit 4200. The key detection sensor 42064 may be a proximity switch or an infrared detector. When the mechanical key is inserted into the smart lock 130 for unlocking, the key detection sensor 42064 may be triggered.

The above-mentioned multiple state detection methods may be combined.

In some embodiments, the smart lock state information may include a locked door, an unlocked door, door opening with the outside handle, door opening with the inside handle, and door opening with the mechanical key.

In some embodiments, the state information of the smart lock 130 may be displayed through the display unit 4208, for example, the operation instruction and/or operation information input by the user, or the like. In some embodiments, the display unit 4208 may adopt 24-bit RGB full-color display of an LCD, and compared with traditional LED lamp display, the display unit 4208 may support full-color display, which is rich in display color and diverse in image.

In some embodiments, the control unit 4200 may perform mode switching.

In some embodiments, the control unit 4200 may switch to a working mode. In the working mode, it may be defined that the smart lock 130 is in a state for performing unlocking or in a state that a sensor in the smart lock is triggered.

When the control unit 4200 is in the working mode, a noise detection sensor 42065 in the state detection unit 4206 may be used for detecting noise of a surrounding environment, and the control unit 4200 may adjust a speaker volume of a doorbell in real time according to the detected noise.

In some embodiments, the control unit 4200 may switch to a sleep mode. The sleep mode may be defined as a state that the smart lock 130 is in a non-working state.

When the control unit 4200 is in the sleep mode, an infrared detection sensor 42063 in the state detection unit 4206 may be used for quickly waking up the control unit 4200 so as to make the control unit 4200 switch from the sleep mode to the working mode. In addition, the infrared detection sensor 42063 may also be used for detecting brightness of light of an environment around the smart lock 130, and adjusting brightness of the display unit 4208 in real time according to the detected brightness.

In some embodiments, power management of the smart lock 130 may be performed by a power management unit 4210.

In some embodiments, the power management unit 4210 may supply power to the control unit 4200.

In some embodiments, the power management unit may include a battery 42101, a power output module 42102, a charging module 42103, a charging interface 42104, and a battery level collection module 42105.

The battery 42101 may be connected to the control unit 4200 through the power output module 42102 to supply power to the control unit 4200. In some embodiments, the battery 42101 may be a polymer rechargeable battery that may support USB interface charging. The battery 42101 may be charged by the charging module 42103 after being connected to a power source through the charging interface 42104. In a charging process of the battery 42101, the use of the smart lock 130 may not be affected.

The battery level collection module 42105 may be used for obtaining a battery level in real time and transmitting the obtained battery level to the control unit 4200. In addition, the control unit 4200 may include a preset battery level value. When the battery level reaches the preset battery level value, the control unit 4200 may remind the user through an indicator light (e.g., an indicator light in green), a voice prompt, etc., and at the same time, the battery 42101 may be controlled to stop power supply. The indicator light and/or the component for broadcasting the voice prompt may be installed on the smart lock (e.g., on a lock body, a keypad integrated in the smart lock, a keypad connected to the smart lock, etc.). In some embodiments, the control unit 4200 may include a preset battery level threshold. When the battery level is less than the preset battery level threshold, the control unit 4200 may remind the user of low battery level. For example, the control unit 4200 may remind the user through an indicator light (e.g., an indicator light in red), a voice prompt, etc.

In some embodiments, the control unit 4200 may generate battery level information according to the battery level obtained by the battery level collection module 42105.

In some embodiments, the control unit 4200 may be in communicate connection with an application based on the mobile device 4214, and the application may send a control instruction signal, and remotely manage the smart lock 130 through the wireless communication unit 4212. The wireless communication unit 4212 may correspond to the communication module 210. The mobile device 4214 may correspond to the user terminal 140.

In some embodiments, the smart lock 130 may be remotely managed in one or more of the following ways.

In some embodiments, the user may use mobile phone Bluetooth to perform an unlocking operation. A smart lock management application may be installed in the mobile device 4214, and the mobile device 4214 may realize functions such as mobile phone Bluetooth unlocking through the smart lock management application. The mobile device 4214 may start the smart lock management application, bind the smart lock 130 through the mobile phone Bluetooth unlocking function of the smart lock management application, generate a virtual Bluetooth key, and finally bind and pair the virtual Bluetooth key with the Bluetooth module 42023. In this way, unlocking may be performed through the virtual Bluetooth key.

In some embodiments, the user may perform state management on the smart lock 130. State management may include, but is not limited to realizing binding a gateway, binding the smart lock 130, adding user biological characteristics (e.g., a fingerprint, and iris information), managing a password, issuing a password, querying smart lock related information, or the like.

The smart lock related information may include, but is not limited to, unlocking information, comparison abnormality information, security abnormality information, smart lock state information, battery level information, or the like.

The control unit 4200 may upload the smart lock related information to the server through the wireless communication unit 4212, and the user may obtain the information from the server through the smart lock management application in the mobile device 4214, such that the user may grasp a condition of the smart lock 130 in real time. For example, the user may check the battery level information on the smart lock management application in the mobile device 4214. Alternatively or additionally, the server may send reminding information to the user through the smart lock management application in the mobile device 4214. For example, the server may determine whether the battery level in the battery level information is less than a preset battery level threshold. In response to determine that the battery level in the battery level information is less than a preset battery level threshold, the server may send the reminding information to the user through the smart lock management application in the mobile device 4214. The reminding information may be used to remind the user to charge the smart lock or change the battery of the smart lock. In some embodiments, the user may check the battery level information on the smart lock management application in the mobile device 4214 at any time. For example, the user may check the battery level information by clicking on a battery level button of the smart lock management application. In response to the clicking, the mobile device 4214 may send a request for obtaining the battery level information to the smart lock. The smart lock may return the battery level information to mobile device 4214 in response to the request.

In some embodiments, an encryption unit 4216 may encrypt the smart lock related information before uploading the smart lock related information to the server 110. In some embodiments, the encryption unit 4216 may be further used for encrypting information transmitted in Bluetooth connection established between the Bluetooth module 42023 and the Bluetooth key so as to improve security of information transmission.

The control module 240 may perform an unlocking verification operation on the smart lock 130, and control the smart lock to perform a locking operation after confirming a successful unlocking so as to realize unlocking operation monitoring and locking operation management on the smart lock 130. Generally, the smart lock 130 may only perform the unlocking operation according to the operation input of the user, and may not perform subsequent control operations after unlocking of the smart lock 130. For the smart lock to ensure environmental security, the smart lock 130 may be controlled to perform the unlocking operation. In some embodiments, the control module 240 may detect the unlocking operation of the smart lock, and after detecting the unlocking operation of the smart lock 130, unlocking operation information may be recorded and the unlocking operation information may be reported. After confirming a successful unlocking, the control module 240 may control the smart lock 130 to perform the locking operation. In some embodiments, the control module 240 may jointly turn on a camera device associated with the smart lock 130 after the locking operation so as to monitor the environment in which the smart lock 130 is located. In this way, the user may master the unlocking situation of the smart lock 130, and the locking operation may be performed after unlocking, which ensures security of a living environment of the user. In some embodiments, the smart lock may also be referred to as a smart door lock, and the locking operation may also be referred to as an automatic locking operation.

Figure 43:
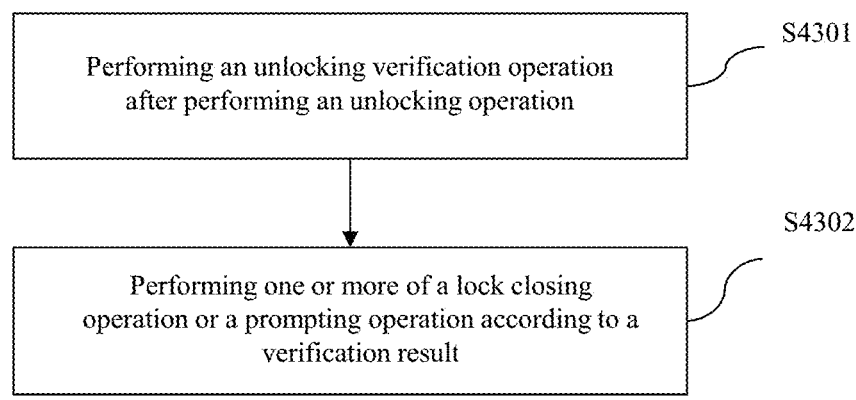
FIG. 43 is a flowchart illustrating an exemplary process for controlling a smart lock according to some embodiments of the present disclosure.

Some embodiments of the present disclosure provide a method for controlling a smart lock to realize unlocking operation and locking operation management of a smart lock. FIG. 43 is a flowchart illustrating an exemplary process 4300 for controlling a smart lock according to some embodiments of the present disclosure.

Step 4301: an unlocking verification operation may be performed. In some embodiments, the security module 220 may perform the security verification on a user operation input received by the input/output module 260 based on security control information obtained by the communication module 210. After the security verification is passed, the control module 240 may perform the unlocking operation. After the unlocking operation is completed, the security module 220 may perform the unlocking verification (in some embodiments, the unlocking verification may also be referred to as the unlocking detection) on the unlocking operation according to a preset method for unlocking to be detected. For specific content, refer to step S4501.

Step 4302: one or more of a locking operation or a prompting operation may be performed according to a verification result. The control module 240 may execute the locking operation and/or prompting operation according to a result of the unlocking verification. The prompting operation may include prompting an unlocking operation, prompting a locking operation, or prompting an illegal unlocking operation. The smart lock may be applied to a door body, and the smart lock may also be called a smart door lock. In some embodiments, if the unlocking verification is passed, a door closing detection stage may be triggered. The security module 220 may detect that the door body is closed, the control module 240 may control the smart door lock to perform the locking operation, and the communication module 210 may upload information of the unlocking operation and/or the locking operation to a server and a bound terminal. If the unlocking verification is failed, it may be considered that an illegal unlocking operation instruction and/or unlocking operation information may be received, and the control module 240 may control the smart door lock to record the illegal unlocking operation instruction and/or unlocking operation information. The communication module 210 may upload the illegal unlocking operation instruction and/or unlocking operation information to the server and the bound terminal.

In some embodiments, a processor of the smart door lock may record the unlocking operation information, and report the unlocking operation information through the network 120 that establishes secure connection. In some embodiments, the processor of the smart door lock may record automatic locking information, and report the automatic locking information through the network 120 that establishes secure connection. In some embodiments, the smart door lock may also transmit the unlocking operation information to other devices (e.g., the control device) bound with the smart door lock, such that the user may manage the smart door lock more conveniently. For the method for binding the control device with the smart lock, refer to the related description in FIG. 14.

In some embodiments, the control module 240 may perform the locking operation according to the unlocking detection situation of the smart door lock. The unlocking detection may refer to detecting various situations of the door lock related to unlocking, for example, detecting whether an unlocking operation instruction, or unlocking operation information is received. As another example, detecting whether the unlocking operation of the smart door lock is executed successfully. The locking operation may refer to an operation for performing locking. For example, an automatic locking operation may be executed when it is detected that the door body configured with the smart door lock is in a closed state.

Figure 44:
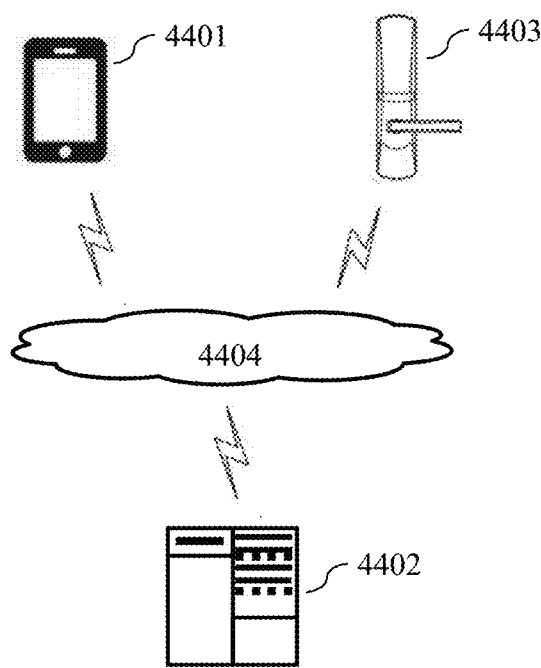
FIG. 44 is schematic diagram illustrating an exemplary system according to some embodiments of the present disclosure.

FIG. 44 is a schematic diagram illustrating an exemplary system 4400 according to some embodiments of the present disclosure. The system 4400 be applied to a method for controlling a smart door lock or an apparatus for controlling a smart door lock of the present disclosure.

As shown in FIG. 44, the system 4400 may include a terminal device 4401, a server 4402, a smart door lock 4403, and a network 4404, wherein the terminal device 4401 may correspond to the terminal device 140, the server 4402 may correspond to the server 110, the smart door lock 4403 may correspond to the smart door lock 130, and the network 4404 may correspond to the network 120. The network 4404 may be used for providing a communication link medium between the terminal device 4401, the server 4402, and the smart door lock 4403. The network 4404 may include various connection types, such as wired and wireless communication links, or fiber optic cables.

A user may use the terminal device 4401 to interact with the server 4405 via the network 4404 to receive or send messages, or the like. Various client applications, such as remote control applications, may be installed on the terminal device 4401. Specifically, the terminal device 4401 and the server 4402 may communicate directly through cellular mobile network or Wi-Fi network communication. The smart door lock 4403 and the server 4402 may communicate directly through the network 4404 or may be connected through an IoT gateway (not shown in the figure). The smart door lock 4403 and the IoT gateway may communicate based on the Zigbee protocol. The IoT gateway and the server 4402 may communicate based on a cellular mobile network or a Wi-Fi network. The smart door lock 4403 and the terminal device 4401 may also communicate based on the Bluetooth protocol.

The terminal device may be either hardware or software. When the terminal device 4401 is hardware, the terminal device 4401 may be various electronic devices with a display screen, including, but not limited to, smart phones, tablet personal computers, laptop computers, desktop computers, or the like. When the terminal device 4401 is software, the terminal device 4401 may be installed in the electronic devices listed above. The terminal device 4401 may be implemented as multiple software or software modules (e.g., used for providing distributed services), or as single software or software module, which is not specifically limited herein.

The server 4402 may be a server that provides various services. For example, in response to receiving a door lock control instruction sent by the terminal device 4401, the server 4402 may analyze and process the door lock control instruction to obtain a door lock control request, and the door lock control request may be sent to the smart door lock 4403, such that the user may control the smart door lock 4403.

It should be noted that the server 4402 may be hardware or software. When the server is hardware, the server may be implemented as a distributed server cluster composed of multiple servers, or as a single server. When the server is software, the server may be implemented as multiple software or software modules (e.g., used for providing distributed services), or as single software or software module, which is not specifically limited herein.

It should be noted that a method for controlling a smart door lock according to the embodiment of the present disclosure may be generally executed by the smart door lock 4403, and correspondingly, an apparatus for controlling a smart door lock may be generally set in the smart door lock 4403.

It should be understood that the counts of terminal devices, networks, servers, and smart door locks in FIG. 44 are merely for illustrative purposes. According to realizing needs, there may be any number of terminal devices, networks, servers, and smart door locks.

Figure 45:
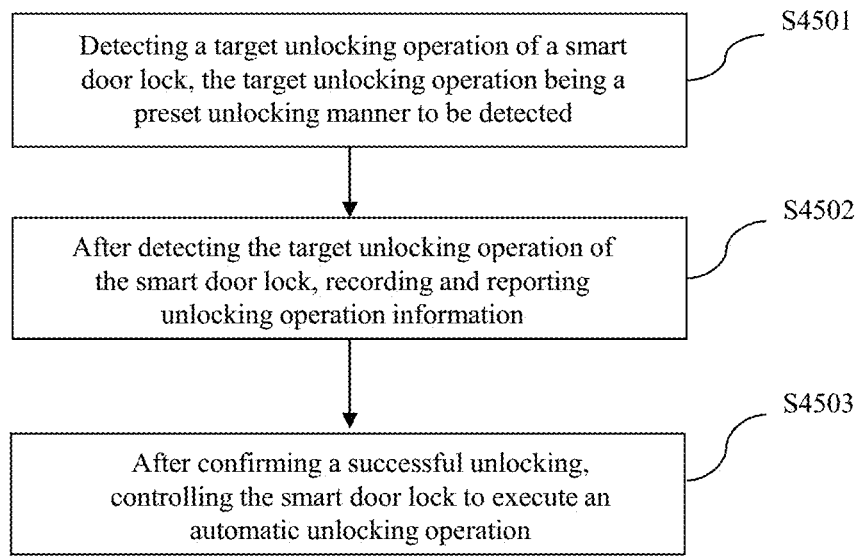
FIG. 45 is a flowchart illustrating an exemplary process for controlling a smart door lock according to some embodiments of the present disclosure.

FIG. 45 is a flowchart illustrating an exemplary process 4500 for controlling a smart door lock according to some embodiments of the present disclosure. The method may be applied to a processor in a smart door lock. The smart door lock control method 4500 may include the following steps.

S4501: a target unlocking operation of the smart door lock may be detected. The target unlocking operation may be a preset unlocking mechanism to be detected.

An execution body of the method for controlling the smart door lock may detect an unlocking operation of the smart door lock, there may be multiple unlocking operations capable of being detected by the smart door lock, and each unlocking operation may match at least one unlocking method. The target unlocking operation may be the preset unlocking mechanism to be detected. When a user selects a certain unlocking method to perform unlocking, a corresponding unlocking operation may be generated, and the smart door lock may determine whether to generate the unlocking operation based on a detection rule corresponding to the unlocking operation.

The unlocking operation may refer to various operations related to unlocking. The unlocking operation may be executed by an unlocking instruction.

The unlocking method may refer to a method for executing the unlocking operation with a certain type of unlocking instruction. The type of the unlocking instruction may include, but is not limited to, a mechanical instruction, a password instruction, a biological characteristic instruction, a network instruction, or the like. There may be multiple preset unlocking mechanisms that need to be detected, such as a key unlocking method, a password unlocking method, a fingerprint unlocking method, a card swiping unlocking method, and an unlocking method by issuing an unlocking instruction through a smart door lock APP. In some embodiments, the unlocking method may be obtained by an operating instruction. In some embodiments, the operating instruction may be obtained locally or remotely. In some embodiments, a remote input device (e.g., the control device, the user terminal, etc.) may establish secure connection with the smart lock. For specific content, refer to the related description of FIG. 5. In some embodiments, the smart lock may also establish a binding relationship with the remote input device. For specific content, refer to the related description of FIG. 14. In some embodiments, the smart lock may perform the security verification on the obtained operation instruction. For specific content, refer to the related description of FIG. 27 and FIG. 35.

The detection rule may refer to a rule for detecting the unlocking operation, and different unlocking methods may correspond to different rules. For example, a key may be used for opening the door, it may be determined to be mechanical key door opening by a door lock chip by checking a potential change (a low level to a high level and a high level to a low level) of an IO interface of a spare key lock cylinder, and detection of the unlocking operation may be realized. The door may be opened manually by a rear panel knob of the door lock, and the door lock chip may detect the unlocking operation by checking a potential change (a low level to a high level and a high level to a low level) of an IO interface of the rear panel knob. Mobile phone APP Bluetooth may be used for unlocking, and the door lock may perform decryption and authentication according to Bluetooth encrypted information received by the door lock. The door lock may be opened after a success, and the unlocking operation may be detected. A keypad may be used for inputting a password for unlocking, and after the password is input on the keypad, the keypad may encrypt password information and issues the password information to the door lock through Bluetooth. The door lock may perform decryption according to the received encrypted information. After the password information is obtained, the password information may be compared with a valid password in the door lock. After the comparison is successful, the door lock may perform unlocking, and the detection of the unlocking operation may be realized. The keypad may be used for pressing a fingerprint for unlocking, and the keypad may encrypt fingerprint information and issues the fingerprint information to the door lock via Bluetooth. The door lock may perform decryption according to the received encrypted information. After the fingerprint information is obtained, the fingerprint information may be compared with an effective fingerprint in the door lock. After the comparison is successful, the door lock may perform unlocking, and detection of the unlocking operation may be realized. When the door lock is in a normal networked state, the user may click an unlocking key on the APP, and an instruction may be issued to the door lock through a gateway to realize the detection of the unlocking operation.

The unlocking detection may be performed before, after, or at the same time when the unlocking operation is executed.

In some embodiments, the preset unlocking mechanism to be detected may be set by a bound terminal or server, or may be preset in the smart door lock. In some embodiments, the smart door lock may identify whether the target unlocking operation is legal. When the target unlocking operation is detected, if an inside handle of the smart door lock is driven, it may be determined as a legal inside unlocking operation. When the target unlocking operation is detected, if an outside handle of the smart door lock is driven, it may be determined as an outside unlocking operation. If the unlocking operation of this time is legally authorized, that is, the unlocking operation of this time conforms to the preset unlocking rule, it may be determined as a legal unlocking behavior, otherwise, it may be determined as an illegal unlocking operation, and the operation may be recorded and uploaded to the bound terminal or server.

Whether a potential of an input and output IO interface of a preset component of the smart door lock changes may be detected. If it is detected that the potential of the IO interface of the preset component changes, it may be determined that the target unlocking operation of the smart door lock may be detected. For a first example, it may detect whether the potential of the input and output IO interface of the spare key lock cylinder changes, and when the potential of the IO interface of the spare key lock cylinder changes, it may be determined that the target unlocking operation of the smart door lock is detected. It should be noted that when the potential changes, that is, the potential is switched from a low level to a high level, or the potential is switched from a high level to a low level. For a second example, whether a potential of an IO interface of a lock control mechanism of the smart door lock changes is detected, the lock control mechanism may be a mechanism for controlling unlocking or locking of the smart door lock, such as a handle or a knob arranged on a smart door lock panel. When the potential of the IO interface of the lock control mechanism changes, it may be determined that the target unlocking operation of the smart door lock is detected. It should be noted that when the potential changes, that is, the potential is switched from a low level to a high level, or the potential is switched from a high level to a low level. Whether a state of the smart door lock changes may be determined by detecting a potential change. It should be noted that when the state of the door lock changes, that is, the door lock changes from a locked state to an open state. Description mentioned above is used for detecting the unlocking operation.

In some embodiments, whether an unlocking instruction sent by a target terminal device is received may be determined, and the target terminal device may be a terminal device associated with the smart door lock. If the unlocking instruction is detected, it may be determined that the target unlocking operation of the smart door lock is detected. For a first example, it may detect whether a Bluetooth unlocking instruction sent by the target terminal device is received. If the Bluetooth unlocking instruction is received, the Bluetooth unlocking instruction may be authenticated, and if authentication is passed, it may determine that the target unlocking operation of the smart door lock is detected. It should be noted that the user may use a client installed on the terminal device (e.g., the smart door lock APP) to trigger a Bluetooth unlocking option, and the Bluetooth unlocking instruction may be generated. The Bluetooth unlocking instruction may be sent to the smart door lock through the terminal device. If the smart door lock receives the Bluetooth unlocking instruction, that is, the Bluetooth unlocking instruction is decrypted and authenticated, and if the Bluetooth unlocking instruction is decrypted and the authentication is passed, the smart door lock may be controlled to perform unlocking. For a second example, whether a remote unlocking instruction sent by the target terminal device is received may be detected. If the remote unlocking instruction is received, the remote unlocking instruction may be authenticated, and if authentication is passed, it may be determined that a manual unlocking operation of the smart door lock may be detected. It should be noted that when the door lock is in a normal networked state, the user may click the door opening key on the smart door lock APP and then the remote unlocking instruction may be generated. The terminal device may send the remote unlocking instruction to the smart door lock, and the smart door lock may perform authentication on the remote unlocking instruction. If authentication is passed, the smart door lock may be unlocked. For a third example, whether a Near Field Communication (NFC) unlocking instruction sent by the target terminal device is received may be detected. If the NFC unlocking instruction is received, the NFC unlocking instruction may be authenticated, and if authentication is passed, it may be determined that the target unlocking operation of the smart door lock is detected.

An unlocking action of the smart door lock may be detected by detecting the unlocking instruction and authenticating the unlocking instruction. If authentication is passed, it may be considered that the unlocking instruction is received, and a target unlocking action of the smart door lock may be detected.

When the unlocking detection is performed, according to an actual situation, the unlocking instruction may be first detected, and the target unlocking action may be detected, or the target unlocking action may be first detected, the unlocking instruction may be detected, or the unlocking instruction and the target unlocking action may be detected at the same time.

In some optional implementation manners of the embodiment, whether a password unlocking instruction is received may be detected. If the password unlocking instruction is detected, the target unlocking operation of the smart door lock may be determined to be detected. For a first example, whether a numeric password unlocking instruction is received may be detected. If the numeric password unlocking instruction is received, the numeric password unlocking instruction may be authenticated, and if authentication is passed, the target unlocking operation of the smart door lock may be determined to be detected. It should be noted that the user may use a password keypad input device to input a password to generate the numeric password unlocking instruction. The password keypad input device may encrypt the numeric password unlocking instruction and send the numeric password unlocking instruction to the smart door lock. If the smart door lock receives the numeric password unlocking instruction, the numeric password may be decrypted and obtained, and the numeric password may be compared with a valid numeric password in the smart door lock. After the comparison succeeds, the smart door lock may be unlocked. For a second example, whether a biological characteristic password unlocking instruction is received may be detected. If the biological characteristic password unlocking instruction is received, the biological characteristic password unlocking instruction may be authenticated, and if authentication is passed, the target unlocking operation of the smart door lock may be determined to be detected. It should be noted that the user may use the password keypad input device to input a biological characteristic password such as a fingerprint. The biological characteristic password unlocking instruction may be generated, and the biological characteristic password unlocking instruction may be encrypted and sent to the smart door lock. If the smart door lock receives the biological characteristic password unlocking instruction, the unlocking biological characteristic password may be decrypted and obtained, and the unlocking fingerprint may be compared with a valid biological characteristic password in the smart door lock. After the comparison succeeds, the smart door lock may be unlocked.

S4502: the target unlocking operation of the smart door lock is detected, unlocking operation information may be recorded, and the unlocking operation information may be reported.

An execution body (e.g., the smart door lock 4403 shown in FIG. 44) of the method for controlling the smart door lock may identify the unlocking method that matches the target unlocking operation after detecting the target unlocking operation of the smart door lock, and generate the unlocking operation information. The unlocking operation information may include a person who performs unlocking, unlocking time, an unlocking method, or the like. Further, the smart door lock may first record the generated unlocking operation information locally, and report the unlocking operation information recorded locally to the terminal device or server when the smart door lock is networked to the server through the gateway or terminal device.

After detecting the target unlocking operation of the smart door lock, the execution body of the method for controlling the smart door lock may determine whether the target unlocking operation is executed successfully, and generate unlocking state information. The unlocking state information may include two types: successful unlocking and failed unlocking. Successful unlocking may be understood as that the entire unlocking action is completely executed by the smart door lock. Conversely, the failed unlocking may be understood as that the entire unlocking action is not completely executed by the smart door lock. For example, if the unlocking action is not executed, the unlocking state information may indicate failed unlocking. As another example, if the unlocking action is partially executed, the unlocking state information may indicate failed unlocking.

When it is determined that the target unlocking operation is successfully executed, an unlocking success state may be determined, and the smart door lock may save unlocking success information locally. When the smart door lock is networked to the server through the gateway or terminal device, the locally recorded unlocking success information may be reported to the terminal device or server. At the same time, notification information may be generated to notify the user.

When it is determined that the target unlocking operation is failed, an unlocking failure state may be determined, and the smart door lock may save unlocking failure information locally. The locally recorded unlocking failure information may be reported to the terminal device or server. At the same time, notification information may be generated to notify the user.

When it is determined that the target unlocking operation is failed, problem diagnosis may be executed. A reason for a failure of execution of the unlocking operation may be determined, and the reason may be saved locally. The locally recorded reason for the failure of unlocking may be reported to the terminal device or server. Notification information may be generated and sent to the user such that the user may adopt coping methods conveniently.

A process of problem diagnosis may be a process of determining the reason for the failure of execution of the unlocking operation, and specifically a type of a problem and a cause may be included. A diagnosis method and strategy may be preset on a device that executes the problem diagnosis.

Problem diagnosis may be executed by the smart door lock, or by the terminal device or server. When diagnosis is performed by the door lock, the smart door lock may save the unlocking failure information or the reason for the failure locally together and report the unlocking failure information or the reason for the failure to the terminal device or server. The user may be informed of the failure information and the reason for the failure. When diagnosis is performed by the terminal device or server, the smart door lock may report execution failure information to the terminal device or server. The terminal device or server may diagnose the reason for the failure, and save the reason for the failure. The user may be informed of the failure information and the reason for the failure.

In some embodiments, after the smart door lock detects the unlocking operation, the smart door lock may record corresponding unlocking information. The unlocking information may include, but is not limited to, a person who performs unlocking, unlocking time, and an unlocking mechanism. In some embodiments, when the smart door lock is networked with a cloud server via a gateway or APP, the smart door lock may encrypt the recorded unlocking information and upload the unlocking information to the gateway through the ZigBee transmission protocol. The gateway may upload the unlocking information to the cloud server via WiFi, or the unlocking information may be transmitted to the APP through Bluetooth, and the APP may upload the unlocking information to the cloud server through a cellular mobile network or WiFi. In some embodiments, the user may check the unlocking information on the APP.

S4503: after confirming a successful unlocking, the smart door lock may be controlled to execute an automatic locking.

In addition, after the successful unlocking of the smart door lock, the user may open the door body installed with the smart door lock to come into or go out from a room, and close the door body. In the embodiment, the execution body (e.g., the smart door lock 4403 shown in FIG. 44) of the method for controlling the smart door lock may control the smart door lock to execute the automatic locking operation after confirming a successful unlocking of the smart door lock, thereby ensuring the security of the living environment of the user. Specifically, a spring bolt of the smart door lock may be driven to pop out to realize automatic locking.

In some embodiments, the smart door lock may record locking information of the smart door lock. For example, if the locking operation is performed by the user, the locking information may include, but is not limited to, a person who performs locking, locking time, and a locking mechanism. For example, if the locking operation is performed automatic, the locking information may include, but is not limited to, locking time, and a locking mechanism. In some embodiments, when the smart door lock is networked with a cloud server via a gateway or APP, the smart door lock may encrypt the recorded locking information and upload the locking information to the gateway through the ZigBee transmission protocol. The gateway may upload the locking information to the cloud server via WiFi, or the locking information may be transmitted to the APP through Bluetooth, and the APP may upload the locking information to the cloud server through a cellular mobile network or WiFi. In some embodiments, the user may check the locking information on the APP.

The method provided by the foregoing embodiment of the present disclosure detects the target unlocking operation of the smart door lock, and the target unlocking operation may be a preset unlocking mechanism to be detected. After detecting the target unlocking operation of the smart door lock, the unlocking operation information may be recorded and the unlocking operation information may be reported. After confirming a successful unlocking, the smart door lock may be controlled to execute the automatic locking operation, which enables the user to master the unlocking situation of the smart door lock and guarantees the security of the living environment of the user.

In some embodiments, the smart door lock may record unlocking information and upload the unlocking information to the bound terminal or server.

Figure 46:
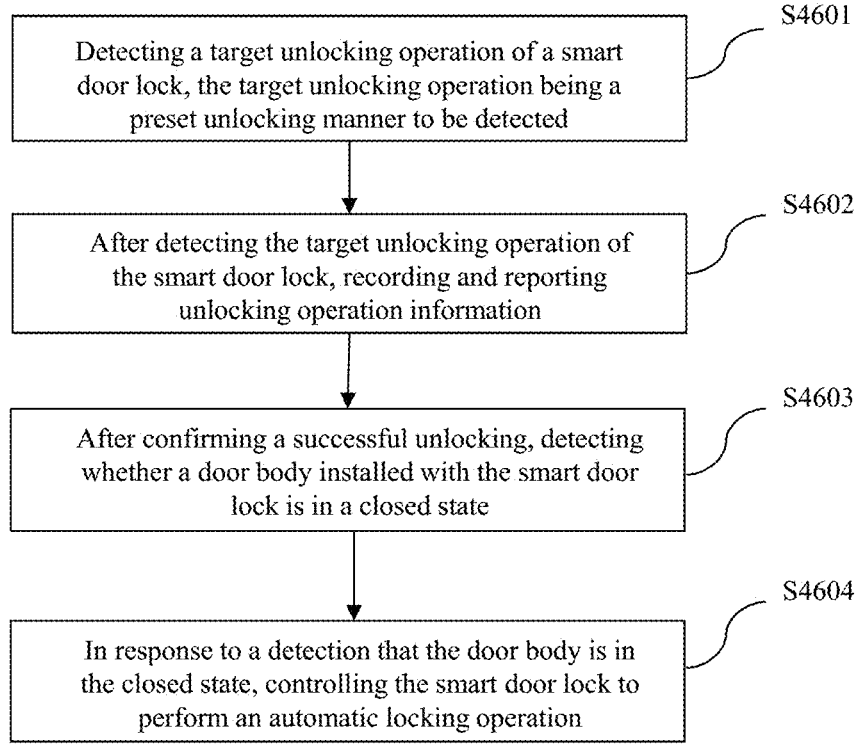
FIG. 46 is a flowchart illustrating another exemplary process for controlling a smart door lock according to some embodiments of the present disclosure.

FIG. 46 is a flowchart of another exemplary process 4600 for controlling a smart door lock according to some embodiments of the present disclosure. The method may include the following steps.

S4601: a target unlocking operation of a smart door lock may be detected, and the target unlocking operation may be a preset unlocking mechanism to be detected.

S4602: after detecting the target unlocking operation of the smart door lock, unlocking operation information may be recorded and the unlocking operation information may be reported.

Specific implementations of S4601 and S4602 may refer to S4501 and S4502, which may not be repeated in the embodiment.

S4603: after confirming a successful unlocking, whether a door body configured with the smart door lock is in a closed state may be detected.

In the prior art, only one type of sensor may be used for determining whether the door body is in the closed state, and the sensor may be often subject to various interference, causing that the smart door lock determines a state of the door body incorrectly, for example, the door body may be actually in the closed state, but the smart door lock may detect that the door body is in an open state, or the door body may be actually in the open state, but the smart door lock may detect that the door body is in the closed state.

In the implementation manner, when a first sensor first detects that acceleration of the door body configured with the smart door lock is greater than a preset threshold, then whether the door body is in the closed state may be determined according to data collected by a second sensor, which may improve an accuracy rate of door body state recognition.

Figure 47:
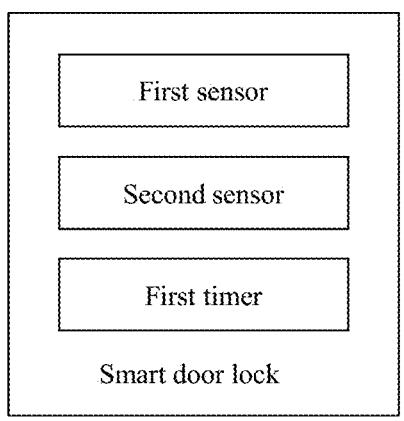
FIG. 47 is a schematic diagram illustrating an exemplary smart door lock according to some embodiments of the present disclosure.

In some embodiments, as shown in FIG. 47, the first sensor, the second sensor, and a first timer may be set in the smart door lock. When whether the door body configured with the smart door lock is in the closed state is detected, collected data of the first sensor may be obtained. The acceleration of the door body may be determined according to the collected data of the first sensor. When the acceleration is greater than the preset threshold, data collected by the second sensor before a timed duration of the first timer reaches a first preset duration may be obtained. After the timed duration of the first timer reaches the first preset duration, the second sensor may be controlled to be in a dormant state, and according to the data collected by the second sensor, whether the door body is in the closed state or open state may be determined.

In the implementation manner, a state of the second sensor may be controlled by setting the timer, and the duration of the second sensor for continuously collecting data may be controlled within the preset duration, which may prevent a situation that the second sensor is in a working state for a long time and high power consumption is generated. For example, when the user waits for persons, shaking the door body may cause that the acceleration of the door body is greater than the preset threshold for a long time. If there is no timer, the second sensor may be always in the working state. After the timer is added, time for the second sensor to be in the working state may be limited, thereby reducing the power consumption of the smart door lock.

In some embodiments, a position sensor (e.g., a gyroscope sensor or an acceleration sensor) may be provided in the smart door lock to detect the state (e.g., the open state, the closed state, etc.) of the door body corresponding to the smart lock and the duration for being kept in the state. For example, when it is detected that an angle of the door body fed back by the gyroscope sensor is smaller than a preset angle (e.g., 1 degree) and maintained for at least preset time (e.g., 0.5 second), the door body may be determined to be in the closed state. As another example, when it is detected that the acceleration of the door body fed back by an accelerometer is greater than the preset acceleration, the door body may be determined to be in the closed state.

In some embodiments, after controlling the smart door lock to execute an automatic locking operation, the second sensor may be controlled to be in the dormant state, which may also reduce the power consumption of the smart door lock. Before the data collected by the second sensor needs to be obtained, the second sensor may also need to be awakened.

In some embodiments, the first sensor may be an acceleration sensor, and the acceleration sensor may be a low-power consumption sensor, which may not increase the power consumption of the smart door lock if the smart lock is always in the working state.

In some embodiments, the second sensor may be a geomagnetic sensor. When whether the door body configured with the smart door lock is in the closed state is detected, a geomagnetic flux collected by the geomagnetic sensor may be obtained. When the geomagnetic flux is within a preset geomagnetic flux interval, it may be determined that the door body is in the closed state. When the geomagnetic flux is outside the preset geomagnetic flux interval, it may be determined that the door body is in the open state.

In some embodiments, before obtaining the geomagnetic flux collected by the geomagnetic sensor, the preset geomagnetic flux interval may be determined by calibrating the geomagnetic sensor. Specifically, calibration may need to make sure that the door body is in the closed state each time. In the closed state, the geomagnetic flux collected by the geomagnetic sensor in the smart door lock may be obtained. By performing calibration many times, multiple geomagnetic fluxes may be obtained. An interval between a minimum value and a maximum value in the multiple geomagnetic fluxes may be the preset geomagnetic flux interval. It may be manually determined that the door body configured with the smart door lock may be in the closed state, for example, after the smart door lock is installed on the door body, the user may close the door body to confirm that the door body is in the closed state, or when the user opens the door and enters a room, the door body may be closed to make sure that the door body is in the closed state.

In the embodiment, the smart door lock state or geomagnetic flux may be detected by the first sensor and the second sensor to detect a door closing action, which may reduce magnetic field interference caused by nearby magnetic materials and reduce a misjudgment on the door lock state so as to ensure accuracy of a subsequent automatic locking operation.

S4604: in response to detecting that that the door body is in the closed state, the smart door lock may be controlled to perform the automatic locking operation.

In some embodiments, the smart door lock may obtain a locking instruction to complete the locking operation. The locking instruction may be issued by the user through the bound terminal or directly.

In the embodiment, the execution body (e.g., the smart door lock 4403 shown in FIG. 44) of the method for controlling the smart door lock may detect that the door body configured with the smart door lock is in the closed state after confirming a successful unlocking, and then the smart door lock may be controlled to perform the automatic locking operation, thereby ensuring the security of the living environment of the user.

In some embodiments, after the execution body (e.g., the smart door lock 4403 shown in FIG. 44) of the method for controlling the smart door lock detects that the door body configured with the smart door lock is in the closed state, whether to control the smart door lock to perform the automatic locking operation may be determined. For example, after unlocking succeeds for a certain period of time, the locking operation may be automatically executed. A distance between a terminal device that sends out an unlocking instruction and the door lock may be determined, and the locking operation may be automatically executed after the distance exceeds a certain distance.

In some embodiments, the distance between the terminal device and the smart door lock may be determined based on strength of a Bluetooth signal.

In some embodiments, the distance between the terminal device and the smart door lock may be determined by a change in strength of a network signal.

In some embodiments, the execution body (e.g., the smart door lock 4403 shown in FIG. 44) of the method for controlling the smart door lock may set a way for opening a door lock next time according to a method for locking a door. The method for locking the door may be a method for locking the smart door lock, which may include two types of locking after receiving a locking instruction and automatic locking. The way for opening the door lock may refer to whether a door opening instruction is sent out from an inside of the door body or from an outside of the door body. For example, manual door opening by a rear panel knob may indicate an instruction sent out from the inside of the door body. A fingerprint or password input on a keypad may indicate an instruction sent out from the outside of the door body. An instruction sent via Bluetooth or an instruction sent through the Internet of Things may be sent out from the inside of the door body or may be sent out from the outside of the door body.

Specifically, when it is detected that the door lock receives the locking instruction to lock, corresponding to a scenario when the user goes out, the door opening instruction received next time may be set to be sent out from the inside of the door body or from the outside of the door body. When it is detected that the smart door lock is locked through in an automatic locking way, corresponding to a scenario when the user comes in, it may be set to accept only the unlocking instruction sent out from the inside of the door body next time.

Figure 48:
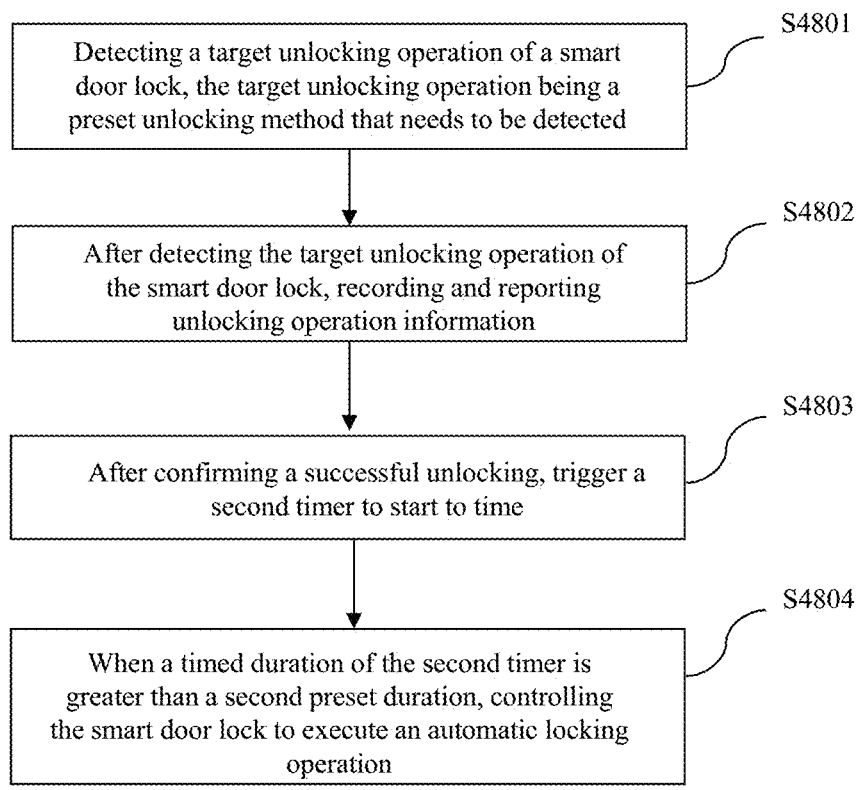
FIG. 48 is a flowchart illustrating another exemplary process for controlling a smart door lock according to some embodiments of the present disclosure.

FIG. 48 is a flowchart illustrating another exemplary process 4800 for controlling a smart door lock. The method may include the following steps.

S4801: a target unlocking operation of a smart door lock may be detected, and the target unlocking operation may be a preset unlocking mechanism to be detected.

S4802: after detecting the target unlocking operation of the smart door lock, unlocking operation information may be recorded and the unlocking operation information may be reported.

Specific implementations of S4801 and S4802 may refer to S4501 and S4502, which may not be repeated in the embodiment.

S4803: after confirming a successful unlocking, a second timer to start to time may be triggered.

In some embodiments, the second timer may be set in the smart door lock, and after confirming the successful unlocking, the second timer may be triggered to start to time.

In some embodiments, a preset duration may be set for the second timer to determine whether to perform a locking operation.

In some embodiments, a user may choose to set one or several different second preset durations to correspond to different situations in daily life. Setting multiple preset durations may better cope with different scenarios in life. For example, when the user goes out, a shorter second preset duration may avoid a potential safety hazard that may be caused by that a door lock is not locked in time when the user goes out. When the user comes in, a relatively longer second preset duration may prevent that an unlocking instruction is repeatedly sent out in a short period of time when the user stays in a room for short time.

S4804: when a timed duration of the second timer is greater than second preset duration, the smart door lock may be controlled to execute an automatic locking operation.

For example, when the timed duration is longer than 5 minutes, the smart door lock may be controlled to execute the automatic locking operation.

In the embodiment, an execution body (e.g., the smart door lock 4403 shown in FIG. 44) of the method for controlling the smart door lock may trigger the second timer to start to time after confirming the successful unlocking. When a timed duration of the second timer is greater than the second preset duration, the smart door lock may be controlled to perform the automatic locking, thereby ensuring security of the living environment of the user.

In some embodiments, the execution body (e.g., the smart door lock 4403 shown in FIG. 44) of the method for controlling the smart door lock may set a way for opening a door lock next time according to locking time. For example, if the locking time is in the morning, it may be set to be opened from the outside next time. For example, if the locking time is at night, it may be set to be opened from the inside next time.

In some embodiments, the smart door lock may set a way for opening the door lock next time according to a way for opening the door lock last time. For example, if the door lock was opened from the outside last time, it may be set to open from the inside next time.

In some embodiments, the smart door lock may set a way for opening the door lock next time according to unlocking time and a way for opening the door lock last time.

In some embodiments, a way for opening the smart door lock next time may be manually set by the user through a bound terminal as needed.

Figure 49:
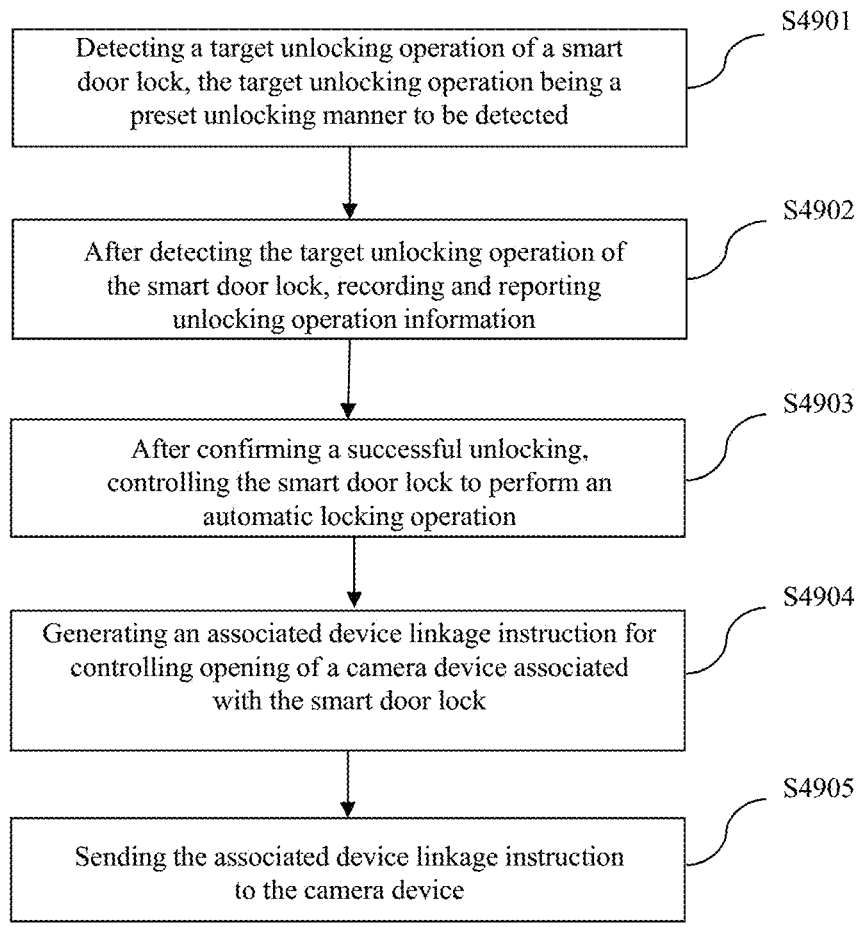
FIG. 49 is a flowchart illustrating another exemplary process for controlling a smart door lock according to some embodiments of the present disclosure.

FIG. 49 is a flowchart illustrating another exemplary process 4900 for controlling a smart door lock. The method may include the following steps.

S4901: a target unlocking operation of a smart door lock may be detected, and the target unlocking operation may be a preset unlocking mechanism to be detected.

S4902: after detecting the target unlocking operation of the smart door lock, unlocking operation information may be recorded and the unlocking operation information may be reported.

S4903: after confirming a successful unlocking, the smart door lock may be controlled to perform an automatic locking operation.

Specific implementations of S4901, S4902, and S4903 may refer to S4501, S4502, and S4503, which may not be repeated in the embodiment.

S4904: an associated device linkage instruction may be generated, and the associated device linkage instruction may be used for controlling opening of a camera device associated with the smart door lock.

In the embodiment, after the smart door lock is controlled to execute the automatic locking operation, the associated device linkage instruction may also be generated, and the associated device linkage instruction may be used for controlling opening of the camera device associated with the smart door lock. The camera device may be generally a home camera or a smart cat eye of a user whose door is configured with the smart door lock, and the camera device may be associated with the smart door lock.

In some embodiments, the smart door lock may be associated with the camera device through a server, and the associated device linkage instruction may be sent to the camera device.

In some embodiments, the smart door lock may be associated with the camera device via Bluetooth, and the associated device linkage instruction may be sent to the camera device.

In some embodiments, the smart door lock may be associated with the camera device in a coverage area of an Internet of Things network through an Internet of Things gateway, and send the associated device linkage instruction to the camera device.

S4905: the associated device linkage instruction may be sent to the camera device.

Specifically, the smart door lock may send the associated device linkage instruction to the server, and the server may determine the camera device associated with the smart door lock, and forward the associated device linkage instruction to the camera device. The smart door lock may also send the associated device linkage instruction directly to the camera device via Bluetooth. Alternatively, the smart door lock may send the associated device linkage instruction to the Internet of Things gateway, and the Internet of Things gateway may send the associated device linkage instruction to the camera device in the network coverage area.

In some embodiments, the smart door lock may detect abnormal behaviors within a monitoring range of the camera device, and record and report the abnormal behaviors. The abnormal behaviors may refer to behaviors under a situation of abnormal door opening, for example, deliberately concealing a face, wandering for a long time, marking at a gate, and other behaviors that have a possibility of a theft. or behaviors carrying out destruction maliciously such as scribbling, violently smashing a door, or breaking a door.

In some embodiments, after detecting the abnormal behavior, the smart door lock may record time when the abnormal behavior occurs, save a relevant image, and upload the relevant image to the server and the bound terminal to notify the user of the abnormal situation so as to take appropriate response measures.

In the implementation manner, the smart door lock may be linked with the camera device to wake up the camera device to start to work, and record a security condition of the living environment of the user in time, such that in the event of a residential security accident, an occurrence process of the accident may be recorded timely and accurately.

In some embodiments, after the smart door lock is controlled to perform the automatic locking operation, automatic locking information may also be recorded and the automatic locking information may be reported such that the user may master the condition of the smart door lock.

It should be noted that the linkage between the smart door lock and the camera device is merely for illustrative purposes. In some embodiments, the associated device may include any suitable device. For example, the associated device may include a smart home device, a wearable device, a smart mobile device, a security device, a virtual reality device, an augmented reality device, or the like, or any combination thereof. The smart furniture device may include a smart lighting device, a control device of a smart electrical appliance, a smart monitoring device, a smart TV, a smart camera, a walkie-talkie, or the like, or any combination thereof. The wearable device may include a smart bracelet, a smart footwear, smart glasses, a smart helmet, a smart watch, smart clothes, a smart backpack, smart accessories, or the like, or any combination thereof. The smart mobile device may include a smart phone, a personal digital assistant (PDA), a game device, a navigation device, a POS device, or the like, or any combination thereof. The security device may include an alarm device, a protective device, or the like, or any combination thereof. The virtual reality device and/or augmented reality device may include a virtual reality helmet, virtual reality glasses, virtual reality goggles, an augmented reality helmet, augmented reality glasses, augmented reality goggles, or the like, or any combination thereof. In some embodiments, the associated device may include a local device (e.g., a device in or out the door on which the smart door lock is installed). In some embodiments, the associated device may include a remote device (a device wirelessly connected to the smart door lock).

In some embodiments, the linkage may be performed according to user ID information. The user ID information may refer to information used for indicating a user identity and/or authority. The user ID information may be pre-collected by the smart door lock and stored in a storage (e.g., a storage of the smart door lock). For example, an input/output module of the smart door lock may include a fingerprint collector, a palm print collector, a finger vein collector, a sound collector (microphone), an iris collector, a facial information collector (e.g., a camera), an electronic tag reader, an information input device, or the like, or any combination thereof. The user identity and/or authority of the user ID information may be set up when the user ID information is collected for the first time. In some embodiments, a user ID may be unique to a user. In some embodiments, a user ID may correspond to one or more specific unlocking mechanisms (e.g., unlocking passwords, biological characteristics (e.g., a fingerprint, iris information, finger vein information, face information, etc.) etc.). In such cases, the smart door lock may determine the user ID of the user operating the smart door lock according to the unlocking mechanism of the user. For example, different family members who use a smart door lock may use different passwords such that the smart door lock may determine or identify an identity of the family member operating the smart door lock based on the unlocking password he/she inputs. In some embodiments, the smart door lock may send different associated device linkage instructions to one or more associated devices according to different user ID information. For example, if the smart door lock determines that a user A opens the door, the associated device linkage instruction may be used to cause a music player to play a song specific to user A. The song specific to user A may be preset by a user (e.g., user A himself/herself, a family member of user A, etc.) of the smart door lock. For example, the song specific to user A may be customized by the user. As another example, the user may change the song casually.

Figure 50:
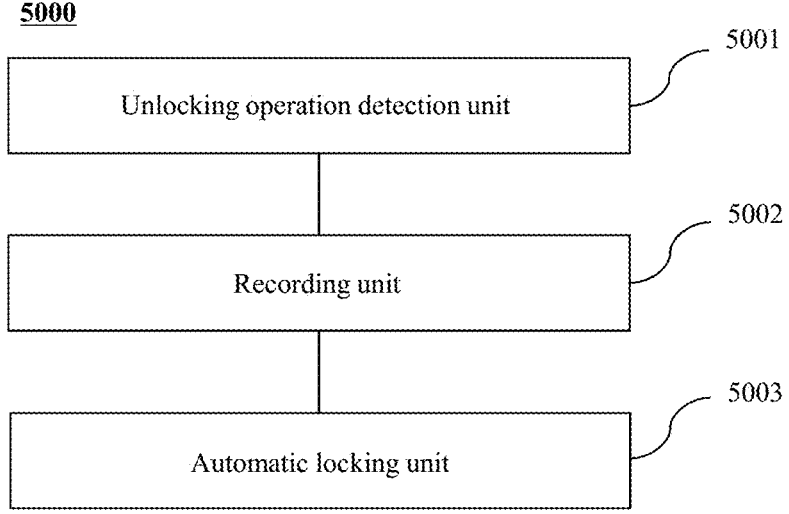
FIG. 50 is a diagram illustrating an exemplary smart door lock control apparatus according to some embodiments of the present disclosure.

FIG. 50 is a diagram illustrating an exemplary smart door lock control apparatus according to some embodiments of the present disclosure. The apparatus may correspond to the method embodiment shown in FIG. 45. The control apparatus may be specifically applied to various electronic devices.

As shown in FIG. 50, the apparatus 5000 for controlling the smart door lock may include an unlocking operation detection unit 5001, a recording unit 5002, and an automatic locking unit 5003.

The unlocking operation detection unit 5001 may be configured to be used for detecting a target unlocking operation of a smart door lock, and the target unlocking operation may be a preset unlocking mechanism to be detected;

The recording unit 5002 may be configured to be used for recording unlocking operation information and reporting the unlocking operation information after the target unlocking operation of the smart door lock is detected.

The automatic locking unit 5003 may be configured to be used for controlling the smart door lock to perform an automatic locking operation after confirming a successful unlocking.

In the embodiment, specific processing of the unlocking operation detection unit 5001, the recording unit 5002, and the automatic locking unit 5003, and technical effects may refer to relevant descriptions of step S4501, step S4502 and step S4502 in the corresponding embodiments in FIG. 45, respectively, which may not be repeated herein.

In some embodiments, the unlocking operation detection unit may be specifically used for:
  detecting whether a potential of an input and output IO interface of a preset component of the smart door lock changes.
  if it is detected that the potential of the IO interface of the preset component changes, it may be determined that the target unlocking operation of the smart door lock may be detected.

In some embodiments, the unlocking operation detection unit may be specifically used for:
  detecting whether a potential of an IO interface of a key lock cylinder has changed;
  or, detecting whether a potential of an IO interface of a lock control mechanism of the smart door lock has changed.

In some embodiments, the unlocking operation detection unit may be specifically used for:
  detecting whether an unlocking instruction sent by a target terminal device is received, and the target terminal device may be a terminal device associated with the smart door lock.
  if the unlocking instruction is detected, it may be determined that the target unlocking operation of the smart door lock may be detected.

In some embodiments, the unlocking operation detection unit may be specifically used for:
  detecting whether a Bluetooth unlocking instruction sent by the target terminal device is received;
  or, detecting whether a remote unlocking instruction sent by the target terminal device is received;
  or, detecting whether a Near Field Communication (NFC) unlocking instruction sent by the target terminal device is received.

In some embodiments, the unlocking operation detection unit may be specifically used for:
  detecting whether a password unlocking instruction is received.
  if the password unlocking instruction is detected, it may be determined that the target unlocking operation of the smart door lock may be detected.

In some embodiments, the unlocking operation detection unit may be specifically used for:
  detecting whether a numeric password unlocking instruction is received;
  or, detecting whether a biological characteristic password unlocking instruction is received.

In some embodiments, the unlocking operation detection unit may be specifically used for:
  detecting whether an unlocking operation is legal.

In some embodiments, the automatic locking unit specifically may include:
- a door body state detection sub-unit, used for detecting whether a door body configured with the smart door lock is in a closed state after confirming a successful unlocking; and
- an automatic locking sub-unit, used for controlling the smart door lock to perform the automatic locking operation when it is detected that the door body is in the closed state.

In some embodiments, a first sensor and a second sensor may be arranged in the smart door lock, and the door body state detection sub-unit may be specifically used for:
- obtaining collected data of the first sensor;
- determining acceleration of the door body according to the collected data of the first sensor;
- when the acceleration is greater than a preset threshold, obtaining data collected by the second sensor; and
- determining whether the door body is in a closed state or an open state according to the data collected by the second sensor.

In some embodiments, a first timer may also be arranged in the smart door lock, and the door body state detection sub-unit may be specifically used for:
- when the acceleration is greater than the preset threshold, obtaining the data collected by the second sensor before a timed duration of the first timer reaches a first preset duration, and controlling the second sensor to be in a dormant state after the timed duration of the first timer reaches the first preset duration.

In some embodiments, the second sensor may be a geomagnetic sensor, and the door body state detection sub-unit may be specifically used for:
- obtaining a geomagnetic flux collected by the geomagnetic sensor.

Determining whether the door body is in the closed state or the open state according to the data collected by the second sensor may include:
- when the geomagnetic flux is within a preset geomagnetic flux interval, it may be determined that the door body is in the closed state;
- when the geomagnetic flux is outside the preset geomagnetic flux interval, it may be determined that the door body is in the open state.

In some embodiments, the smart door lock may be further configured with a second timer, and the automatic locking unit may be specifically used for:
- after confirming a successful unlocking, the second timer to start to time may be triggered; and
- when a timed duration of the second timer is greater than a second preset duration, the smart door lock may be controlled to perform an automatic locking operation.

In some embodiments, the apparatus may further include:
- a linkage unit, used for generating an associated device linkage instruction after the smart door lock is controlled to perform the automatic locking operation, and the associated device linkage instruction may be used for controlling opening of a camera device associated with the smart door lock, and sending the associated device linkage instruction to the camera device.

In some embodiments, the recording unit may be further used for:
- after controlling the smart door lock to perform the automatic locking operation, recording automatic locking information and reporting the automatic locking information.

It should be noted that apparatus 5000 for controlling the smart door lock may include a processor and a memory. The unlocking operation detection unit 5001, the recording unit 5002, the automatic locking unit 5003, or the like, may be all stored as program units in the memory, and the above-mentioned program units stored in the memory may be executed by the processor to implement corresponding functions.

The processor may include a kernel, and the kernel may retrieve the corresponding program unit from the memory. One or more kernels may be set, and the smart door lock may be controlled by adjusting kernel parameters.

The memory may include a non-permanent memory in a computer-readable medium, a random access memory (RAM), and/or a non-volatile memory, such as a read-only memory (ROM) or a flash random access memory (flash RAM), and the memory may include at least one storage chip.

The apparatus for controlling the smart door lock according to the above-mentioned embodiment of the present disclosure may detect the target unlocking operation of the smart door lock through the unlocking operation detection unit, and the target unlocking operation may be the preset unlocking mechanism to be detected. The recording unit may record the unlocking operation information and report the unlocking operation information after detecting the target unlocking operation of the smart door lock. After confirming a successful unlocking, the automatic locking unit may control the smart door lock to perform the automatic locking operation, such that the user may master the unlocking situation of the smart door lock, and security of the living environment of the user may be ensured.

An embodiment of the present disclosure provides a computer-readable medium on which a computer program is stored, wherein when the program is executed by a processor, the methods for controlling the smart door lock described in the above method embodiments may be implemented.

An embodiment of the present disclosure provides a processor, and the processor may be used for running a program, wherein when the program runs, the methods for controlling the smart door lock described in the above method embodiments may be implemented.

An embodiment of the present disclosure provides a device. The device may include a processor, a memory, and a program stored in the memory and executable on the processor. When the processor executes the program, the methods for controlling the smart door lock described in the above method embodiments may be implemented.

The present disclosure may further provide a computer program product. When the computer program product is executed on a data processing device, the data processing device may be enabled to implement the methods for controlling the smart door lock described in the above method embodiments.

The present disclosure is described with reference to the flow charts and/or block diagrams of the methods, devices (systems), and computer program products according to the embodiments of the present disclosure. It should be understood that each process and/or block in the flow chart and/or block diagram, and the combination of the processes and/or blocks in the flow chart and/or block diagram may be realized by computer program instructions. These computer program instructions may be provided to processors of a general-purpose computer, a special-purpose computer, an embedded processor, or other programmable data processing devices to produce a machine, such that an apparatus for achieving designated functions in one process or multiple processes in the flow chart and/or one block or multiple blocks in the block diagram may be produced through the instructions executed by the processors of the computer or other programmable data processing devices.

These computer program instructions may also be stored in a computer-readable memory that can guide the computer or other programmable data processing devices to work in a specific manner, such that the instructions stored in the computer-readable memory may produce an article of manufacture including an instruction apparatus, and the instruction apparatus may realize the designated functions in one process or multiple processes in the flow chart and/or one block or multiple blocks in the block diagram.

These computer program instructions may also be loaded on the computer or other programmable data processing devices, such that a series of operation steps may be executed on the computer or other programmable devices to produce computer-implemented processing, such that the instruction executed on the computer or other programmable devices may provide steps for implementing the designated functions in one process or multiple processes in the flow chart and/or one block or multiple blocks in the block diagram.

In a typical configuration, a computing device may include one or more central processing units (CPU), an input/output interface, a network interface, and an internal storage.

The storage may include a non-permanent memory in a computer-readable medium, a random access memory (RAM), and/or a non-volatile memory, such as a read-only memory (ROM), or a flash random access memory (flash RAM). The storage may be an example of the computer-readable medium.

A computer-readable media may include a permanent and non-permanent media, and a removable and non-removable media. Information storage may be realized by any method or technology. The information may be computer-readable instructions, data structures, program modules, or other data. Examples of computer storage media may include, but be not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, CD-ROM, digital versatile disc (DVD), or other optical storage, magnetic cassettes, magnetic tape storage, or other magnetic storage devices, or any other non-transmission media that may be used to store information that may be accessed by computing devices. According to the definition in the present disclosure, computer-readable media may not include transitory media, such as modulated data signals and carrier waves.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used in the description of the embodiments use the modifiers "approximately", "approximately" or "substantially" in some examples to modify. Unless otherwise stated, "approximately", "approximately" or "substantially" indicates that the number is allowed to vary by ±20%. Correspondingly, in some embodiments, the numerical parameters used in the specification and claims are approximate values, and the approximate values may be changed according to the required characteristics of individual embodiments. In some embodiments, the numerical parameter should consider the prescribed effective digits and adopt the method of general digit retention. Although the numerical ranges and parameters configured to confirm the breadth of the range in some embodiments of the present disclosure are approximate values, in specific embodiments, the setting of such numerical values is as accurate as possible within the feasible range.

For each patent, the present disclosure, the present disclosure publication, and other materials cited in the present disclosure, such as articles, books, specifications, publications, documents, etc., the entire contents are hereby incorporated into the present disclosure by reference. The present disclosure history documents that are inconsistent or conflicting with the content of the present disclosure are excluded, and documents that restrict the broadest scope of the claims of the present disclosure (currently or later attached to the present disclosure) are also excluded. It should be noted that if there is any inconsistency or conflict between the description, definition, and/or use of terms in the attached materials of the present disclosure and the content of the present disclosure, subject to the description, definition, and/or terms of the present disclosure.

At last, it should be understood that the embodiments described in the present disclosure may be merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

We claim:

1. A method for controlling a smart lock, comprising:
   obtaining security control information;
   sending encryption information to a user;
   obtaining at least partially encrypted input based on the encryption information;
   verifying the at least partially encrypted input; and
   performing a corresponding operation based on the at least partially encrypted input when the verification is successful, wherein the corresponding operation includes an unlocking operation, and the method further comprises:
   performing an unlocking verification operation; and
   after determining that a verification result of the unlocking verification operation indicates a successful unlocking,
      detecting whether a door body installed with the smart lock is in a closed state, and
      in response to determining that the door body installed with the smart lock is in the closed state, causing the smart lock to execute a locking operation; or
      starting timing, and
      when a time duration is greater than a preset duration, causing the smart lock to execute the locking operation.

2. The method of claim 1, wherein the sending encryption information to a user includes:
   receiving an encryption information generation request of the user;
   obtaining the encryption information based on the encryption information generation request; and
   sending the encryption information to the user.

3. The method of claim 1, wherein the obtaining at least partially encrypted input based on the encryption information includes:
   obtaining the at least partially encrypted input by encrypting, based on the encryption information, at least part of an input of the user.

4. The method of claim 3, wherein the encrypting, based on the encryption information, at least part of an input of the user includes:
   obtaining encrypted encryption information by encrypting, based on a key, the encryption information; and
   encrypting the least part of the input based on the encrypted encryption information.

5. The method of claim 4, wherein the verifying the at least partially encrypted input includes:
   obtaining a decrypted input by decrypting, based on the encryption information, the at least partially encrypted input;
   determining whether the decrypted input matches the security control information; and
   in response to determining that the decrypted input matches the security control information, determining that the verification is successful.

6. The method of claim 5, wherein the decrypting, based on the encryption information, the at least partially encrypted input includes:
   decrypting, based on the encrypted encryption information, the at least partially encrypted input.

7. The method of claim 5, wherein the decrypted input includes biological characteristic information, and the determining whether the decrypted input matches the security control information includes: performing an identity authentication based on the decrypted input; and the method further includes:
  sending a result of the identity authentication and a result of performing the corresponding operation to a first designated device.

8. The method of claim 5, wherein the decrypted input includes an associated information marker, and the method further includes:
  sending associated information corresponding to the associated information marker to a server.

9. The method of claim 5, wherein the decrypted input at least includes first verification information composed of a plurality of characters, and the determining whether the decrypted input matches the security control information comprises:
  obtaining second verification information based on the security control information; and
  determining whether the second verification information and the first verification information satisfy a preset condition; and
  in response to determining that the second verification information and the first verification information satisfy a preset condition, determining that the decrypted input matches the security control information.

10. The method of claim 9, wherein the preset condition includes a preset time condition and a condition that the first verification information matches the second verification information, wherein the determining whether the second verification information and the first verification information satisfy a preset condition comprises:
  obtaining network time protocol time; and
  calibrating local time based on the network time protocol time.

11. The method of claim 1, wherein the obtaining the security control information includes:
  establishing a secure connection with a network; and
  obtaining the security control information through the secure connection.

12. The method of claim 11, wherein the establishing a secure connection with a network includes:
  sending characteristic information of the smart lock through the network;
  obtaining an encryption key through the network, wherein
    the encryption key is obtained by encrypting an original network key using a Hash value corresponding to the smart lock; and
    the Hash value corresponding to the smart lock is obtained by performing a Hash operation on the characteristic information of the smart lock; and
  obtaining the original network key by decrypting, based on the encryption key, the encryption key.

13. The method of claim 12, wherein after obtaining the encryption key through the network, the method further comprises:
  sending request information of an application layer key;
  obtaining an encrypted application layer key corresponding to the smart lock, wherein the encrypted application layer key is obtained by encrypting an original application layer key specific to the smart lock using the Hash value corresponding to the smart lock; and
  obtaining the original application layer key specific to the smart lock by decrypting, based on the Hash value corresponding to the smart lock, the encrypted application layer key corresponding to the smart lock.

14. The method of claim 13, wherein after obtaining the original application layer key specific to the smart lock by decrypting, based on the Hash value corresponding to the smart lock, the encrypted application layer key corresponding to the smart lock, the method further comprises:
  obtaining encrypted network layer data by encrypting, based on the original network key, network layer data in a data packet;
  obtaining encrypted application layer data by encrypting, based on the original application layer key specific to the smart device, application layer data in the data packet; and
  sending an encrypted data packet through the network, the encrypted data packet including the encrypted network layer data and the encrypted application layer data.

15. The method of claim 1, further comprising:
  receiving a binding request;
  obtaining, based on the binding request, control device information of a control device; and
  sending, based on the control device information, warning information to the control device when the verification is failed.

16. The method of claim 15, further comprising at least one of:
  performing a time synchronization for the control device and the smart lock;
  obtaining state information of the smart lock, and sending the state information to the control device;
  obtaining operation information generated by the control device, and sending the operation information to the smart lock; and
  obtaining an operation result of the smart lock, and sending the operation result to the control device.

17. The method of claim 1, wherein the performing an unlocking verification operation comprises:
  detecting whether a potential of an input and output interface of a preset component of the smart lock has changed, and
  in response to detecting that the potential of the input and output interface of the preset component of the smart lock has changed, determining that a target unlocking operation of the smart lock is detected; or
  detecting whether the at least partially encrypted input is received, the at least partially encrypted input including an operation instruction or operation information, and
  in response to detecting that the at least partially encrypted input is received, determining that the target unlocking operation of the smart lock is detected.

18. The method of claim 1, wherein after the smart lock executes the locking operation, the method further comprises:
  generating an associated device linkage instruction configured to control an opening of a camera device associated with the smart lock, and sending the associated device linkage instruction to the camera device; or
  recording locking information and reporting the locking information.

* * * * *